US011748592B1

(12) United States Patent
Cosic

(10) Patent No.: US 11,748,592 B1
(45) Date of Patent: Sep. 5, 2023

(54) DEVICES, SYSTEMS, AND METHODS FOR LEARNING AND USING ARTIFICIALLY INTELLIGENT INTERACTIVE MEMORIES

(71) Applicant: Jasmin Cosic, Miami, FL (US)

(72) Inventor: Jasmin Cosic, Miami, FL (US)

(73) Assignee: STORYFILE, INC., Pacific Palisades, CA (US)

( * ) Notice: Subject to any disclaimer, the term of this patent is extended or adjusted under 35 U.S.C. 154(b) by 877 days.

(21) Appl. No.: 15/401,024

(22) Filed: Jan. 7, 2017

Related U.S. Application Data

(63) Continuation of application No. 15/016,280, filed on Feb. 5, 2016, now Pat. No. 9,582,762.

(51) Int. Cl.
*G06N 3/006* (2023.01)
*G06N 5/04* (2023.01)
*G06N 20/00* (2019.01)

(52) U.S. Cl.
CPC ............... *G06N 3/006* (2013.01); *G06N 5/04* (2013.01); *G06N 20/00* (2019.01)

(58) Field of Classification Search
CPC ........... G06N 3/006; G06N 20/00; G06N 5/04
See application file for complete search history.

(56) References Cited

U.S. PATENT DOCUMENTS 5,560,011 A 9/1996 Uyama
6,754,631 B1 * 6/2004 Din ........................ G10L 15/26 704/270
6,842,877 B2 1/2005 Robarts et al.
7,113,946 B2 9/2006 Cosic
7,117,225 B2 10/2006 Cosic
7,565,340 B2 7/2009 Herlocker et al.
7,797,146 B2 * 9/2010 Harless .................. G10L 15/26 345/473
8,335,805 B2 12/2012 Cosic
8,417,740 B2 4/2013 Cosic
8,572,035 B2 10/2013 Cosic
8,655,900 B2 2/2014 Cosic
8,996,432 B1 3/2015 Fu
9,026,935 B1 * 5/2015 Rasmussen ............ H04L 51/04 715/764
9,047,324 B2 6/2015 Cosic
9,305,216 B1 4/2016 Mishra
2003/0026588 A1 2/2003 Elder et al.
2003/0065662 A1 4/2003 Cosic
2004/0194017 A1 9/2004 Cosic
(Continued)

OTHER PUBLICATIONS

Lin, Wei-hao, and Alexander G. Hauptmann. "A wearable digital library of personal conversations." Proceedings of the 2nd ACM/IEEE-CS joint conference on Digital libraries. 2002. (Year: 2002).*
(Continued)

*Primary Examiner* — Eric Nilsson
(74) *Attorney, Agent, or Firm* — Foundation Law Group LLP; J D Harriman

(57) ABSTRACT

Aspects of the disclosure generally relate to computing devices and may be generally directed to devices, systems, methods, and/or applications for learning conversations among two or more conversation participants, storing this knowledge in a knowledgebase (i.e. neural network, graph, sequences, etc.), and enabling a user to simulate a conversation with an artificially intelligent conversation participant.

20 Claims, 26 Drawing Sheets

(56) References Cited

U.S. PATENT DOCUMENTS

| | | | | |
|---|---|---|---|---|
| 2004/0249774 | A1 | 12/2004 | Caid et al. | |
| 2004/0267521 | A1 | 12/2004 | Cutler et al. | |
| 2005/0149517 | A1 | 7/2005 | Cosic | |
| 2005/0149542 | A1 | 7/2005 | Cosic | |
| 2005/0245303 | A1 | 11/2005 | Graepel et al. | |
| 2005/0289105 | A1 | 12/2005 | Cosic | |
| 2006/0047612 | A1 | 3/2006 | Stanley et al. | |
| 2006/0184410 | A1 | 8/2006 | Ramamurthy et al. | |
| 2006/0265406 | A1 | 11/2006 | Chkodrov et al. | |
| 2007/0050606 | A1 | 3/2007 | Ferren et al. | |
| 2007/0050719 | A1 | 3/2007 | Lui et al. | |
| 2007/0058856 | A1 | 3/2007 | Boregowda et al. | |
| 2007/0061735 | A1 | 3/2007 | Hoffberg et al. | |
| 2007/0106633 | A1 | 5/2007 | Reiner | |
| 2008/0144893 | A1 | 6/2008 | Guo et al. | |
| 2008/0288259 | A1 | 11/2008 | Chambers et al. | |
| 2009/0110061 | A1 | 4/2009 | Lee et al. | |
| 2009/0131152 | A1 | 5/2009 | Busse | |
| 2009/0141969 | A1 | 6/2009 | Yu et al. | |
| 2009/0222388 | A1 | 9/2009 | Hua et al. | |
| 2009/0287643 | A1 | 11/2009 | Corville et al. | |
| 2009/0324010 | A1 | 12/2009 | Hou | |
| 2010/0023541 | A1 | 1/2010 | Cosic | |
| 2010/0033780 | A1 | 2/2010 | Gitter | |
| 2010/0063949 | A1 | 3/2010 | Eaton et al. | |
| 2010/0082536 | A1 | 4/2010 | Cosic | |
| 2010/0114746 | A1 | 5/2010 | Bobbitt et al. | |
| 2010/0241595 | A1 | 9/2010 | Felsher | |
| 2010/0278420 | A1 | 11/2010 | Shet et al. | |
| 2011/0007079 | A1 | 1/2011 | Perez et al. | |
| 2011/0030031 | A1 | 2/2011 | Lussier et al. | |
| 2011/0085734 | A1 | 4/2011 | Berg et al. | |
| 2011/0270794 | A1 | 11/2011 | Drory et al. | |
| 2012/0276513 | A1* | 11/2012 | Ayers | G09B 19/00 434/310 |
| 2012/0284026 | A1* | 11/2012 | Cardillo | G10L 17/08 704/246 |
| 2012/0290347 | A1 | 11/2012 | Elazouni et al. | |
| 2013/0156345 | A1 | 6/2013 | Shmunk | |
| 2013/0159021 | A1 | 6/2013 | Felsher | |
| 2013/0218932 | A1 | 8/2013 | Cosic | |
| 2013/0226974 | A1 | 8/2013 | Cosic | |
| 2013/0278631 | A1 | 10/2013 | Border et al. | |
| 2014/0036022 | A1* | 2/2014 | Croen | H04N 7/147 348/14.01 |
| 2014/0052717 | A1 | 2/2014 | Franks et al. | |
| 2014/0075249 | A1 | 3/2014 | Sato et al. | |
| 2014/0161250 | A1 | 6/2014 | Leeds et al. | |
| 2014/0177946 | A1 | 6/2014 | Lim et al. | |
| 2014/0207580 | A1 | 6/2014 | Minnis et al. | |
| 2014/0211988 | A1 | 7/2014 | Fan et al. | |
| 2015/0006171 | A1 | 1/2015 | Westby et al. | |
| 2015/0039304 | A1 | 2/2015 | Wein | |
| 2015/0055821 | A1 | 2/2015 | Fotland | |
| 2015/0264306 | A1 | 9/2015 | Marilly et al. | |
| 2015/0269415 | A1 | 9/2015 | Gelbman | |
| 2015/0310041 | A1 | 10/2015 | Kier et al. | |
| 2015/0324685 | A1 | 11/2015 | Bohn et al. | |
| 2015/0339213 | A1 | 11/2015 | Lee et al. | |
| 2016/0274187 | A1 | 9/2016 | Menon et al. | |
| 2016/0328480 | A1 | 11/2016 | Owens et al. | |

OTHER PUBLICATIONS

Black, Rolf, et al. "A mobile phone based personal narrative system." The proceedings of the 13th international ACM SIGACCESS conference on Computers and accessibility. 2011. (Year: 2011).*

ABOUT | OpenCV, retrieved from <URL: http://opencv.org/about.html> on Dec. 13, 2014, 1 pages.

Animetrics, Inc. | 3D Facial Recognition, retrieved from <URL: http://animetrics.com/> on Dec. 13, 2014, 2 pages.

Bag-of-words model, retrieved from <URL: http://wikipedia.com> on Nov. 19, 2015, 2 pages.

Beier-Neely morphing algorithm, retrieved from <URL: http://wikipedia.com> on Nov. 19, 2015, 1 pages.

Computer vision, retrieved from <URL: http://wikipedia.com> on Nov. 19, 2015, 7 pages.

Convolutional neural network, retrieved from <URL: http://wikipedia.com> on Nov. 11, 2015, 5 pages.

Decimation (signal processing), retrieved from <URL: http://wikipedia.com> on Nov. 19, 2015, 3 pages.

Digital image processing, retrieved from <URL: http://wikipedia.com> on Nov. 19, 2015, 3 pages.

Dissolve (filmmaking), retrieved from <URL: http://wikipedia.com> on Nov. 11, 2015, 2 pages.

Facial recognition system, retrieved from <URL: http://wikipedia.com> on Nov. 11, 2015, 6 pages.

Feature detection (computer vision), retrieved from <URL: http://wikipedia.com> on Nov. 19, 2015, 3 pages.

Feature extraction, retrieved from <URL: http://wikipedia.com> on Nov. 19, 2015, 2 pages.

Gesture recognition, retrieved from <URL: http://wikipedia.com> on Nov. 19, 2015, 5 pages.

GrabCut, retrieved from <URL: http://wikipedia.com> on Nov. 1, 2015, 1 pages.

Image processing, retrieved from <URL: http://wikipedia.com> on Nov. 19, 2015, 2 pages.

Image segmentation, retrieved from <URL: http://wikipedia.com> on Nov. 19, 2015, 12 pages.

Image warping, retrieved from <URL: http://wikipedia.com> on Nov. 1, 2015, 2 pages.

Inbetweening, retrieved from <URL: http://wikipedia.com> on Nov. 11, 2015, 2 pages.

Interpolation, retrieved from <URL: http://wikipedia.com> on Nov. 1, 2015, 5 pages.

Language model, retrieved from <URL: http://wikipedia.com> on Nov. 19, 2015, 4 pages.

List of speech recognition software, retrieved from <URL: http://wikipedia.com> on Nov. 19, 2015, 4 pages.

Livewire Segmentation Technique, retrieved from <URL: http://wikipedia.com> on Nov. 1, 2015, 2 pages.

Morphing, retrieved from <URL: http://wikipedia.com> on Nov. 11, 2015, 2 pages.

Motion estimation, retrieved from <URL: http://wikipedia.com> on Nov. 19, 2015, 2 pages.

Muse: Face Morph || Mesh Warping, retrieved from <URL: http://alexwolfe.blogspot.com/2011/10/face-morph-mesh-warping.html> on Nov. 19, 2015, 2 pages.

N-gram, retrieved from <URL: http://wikipedia.com> on Nov. 1, 2015, 5 pages.

Optical flow, retrieved from <URL: http://wikipedia.com> on Nov. 1, 2015, 4 pages.

Outline of object recognition, retrieved from <URL: http://wikipedia.com> on Nov. 19, 2015, 7 pages.

Phonotactics, retrieved from <URL: http://wikipedia.com> on Nov. 19, 2015, 3 pages.

Recurrent neural network, retrieved from <URL: http://wikipedia.com> on Nov. 11, 2015, 5 pages.

Sample rate conversion, retrieved from <URL: http://wikipedia.com> on Nov. 1, 2015, 2 pages.

Simple interactive object extraction, retrieved from <URL: http://wikipedia.com> on Nov. 19, 2015, 2 pages.

Speech recognition, retrieved from <URL: http://wikipedia.com> on Nov. 11, 2015, 12 pages.

Speech segmentation, retrieved from <URL: http://wikipedia.com> on Nov. 1, 2015, 4 pages.

Welcome to recognize-speech.com, retrieved from <URL: http://recognize-speech.com/> on Oct. 18, 2015, 1 pages.

Introduction Speech, retrieved from <URL: http://recognize-speech.com/speech> on Oct. 18, 2015, 1 pages.

Preprocessing, retrieved from <URL: http://recognize-speech.com/preprocessing> on Oct. 18, 2015, 4 pages.

Feature Extraction, retrieved from <URL: http://recognize-speech.com/feature-extraction> on Oct. 18, 2015, 3 pages.

(56) References Cited

OTHER PUBLICATIONS

Acoustic model, retrieved from <URL: http://recognize-speech.com/acoustic-model> on Oct. 18, 2015, 2 pages.
Video content analysis, retrieved from <URL: http://wikipedia.com> on Nov. 19, 2015, 2 pages.
Video tracking, retrieved from <URL: http://wikipedia.com> on Nov. 1, 2015, 2 pages.
Andrej Karpathy, Thomas Leung, George Toderici, Rahul Sukthankar, Sanketh Shetty, Li Fei-Fei, Large-scale Video Classification with Convolutional Neural Networks, Apr. 14, 2014, 8 pages, Stanford University.
Karen Simonyan, Andrew Zisserman, Two-Stream Convolutional Networks for Action Recognition in Videos, Nov. 13, 2014, 11 pages, University of Oxford.
Chen et al. Case-Based Reasoning System and Artificial Neural Networks: A Review Neural Comput & Applic (2001) 10: pp. 264-276, 13 pages.
Artificial intelligence, retrieved from <URL: http://wikipedia.com> on Apr. 2, 2017, 28 pages.
John J. Grefenstette, Connie Loggia Ramsey, Alan C. Schultz, Learning Sequential Decision Rules Using Simulation Models and Competition, 1990, Navy Center for Applied Research in Artificial Intelligence, Naval Research Laboratory, Washington, DC, 27 pages.
Alan C. Schultz, John J. Grefenstette, Using a Genetic Algorithm to Learn Behaviors for Autonomous Vehicles, 1992, Navy Center for Applied Research in Artificial Intelligence, Naval Research Laboratory, Washington, DC, 12 pages.
Artificial neural network, retrieved from <URL: http://wikipedia.com> on Apr. 2, 2017, 12 pages.
Koppula et al., "Anticipating human activities using object affordances for reactive robotic response", IEEE TRAMI 2016, published May 5, 2015, 16 pages.
Orme, "System design tips for entry level smartphones—part 3", found online at "https://community.arm.com/processors/b/blog/posts/system-design-tips-for-entry-level-smartphones---part-3", Oct. 21, 2013, 12 pages.

* cited by examiner

DEVICES, SYSTEMS, AND METHODS FOR LEARNING AND USING ARTIFICIALLY INTELLIGENT INTERACTIVE MEMORIES

CROSS REFERENCE TO RELATED APPLICATION

This application is a continuation of, and claims priority under 35 U.S.C. § 120 from, nonprovisional U.S. patent application Ser. No. 15/016,280 entitled "DEVICES, SYSTEMS, AND METHODS FOR LEARNING AND USING ARTIFICIALLY INTELLIGENT INTERACTIVE MEMORIES", filed on Feb. 5, 2016. The disclosure of the foregoing document is incorporated herein by reference.

FIELD

The disclosure generally relates to electronic devices. The disclosure includes devices, apparatuses, systems, and related methods for providing advanced learning, anticipation, simulation, and/or other functionalities to enable artificially intelligent interactive memories.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent fie or records, but otherwise reserves all copyright rights whatsoever.

BACKGROUND

Still pictures are commonly used to record memories of persons or objects. One of still picture's limitations is the fact that it is still and that it provides no interactivity. Motion pictures are also commonly used to record memories of persons or objects including the time dimension. One of motion picture's limitations is the fact that the only operations a user can perform on a motion picture are playing, pausing, forwarding, and rewinding the sequence of pictures. Essentially, a user can only watch persons or objects depicted in a still or motion picture without being able to interact with them. Still and motion pictures fail to provide a way in which a user may want to experience content through the use of artificial intelligence on today's computing, mobile, and/or embedded devices.

SUMMARY OF THE INVENTION

In some aspects, the disclosure relates to a system for learning artificially intelligent interactive memories. The system may be implemented at least in part on one or more computing devices. In some embodiments, the system comprises a server including one or more processor circuits coupled to a memory unit. The system may further include a first computing device including a picture-capturing device configured to capture a stream of digital pictures of a first conversation participant and include a sound-capturing device configured to capture a stream of digital sound samples of the first conversation participant, the first computing device coupled to the server via a network. The system may further include a second computing device including a picture-capturing device configured to capture a stream of digital pictures of a second conversation participant and include a sound-capturing device configured to capture a stream of digital sound samples of the second conversation participant, the second computing device coupled to the server via the network. The one or more processor circuits may be configured to detect the first conversation participant's first conversational activity from at least one of the stream of digital pictures of the first conversation participant or the stream of digital sound samples of the first conversation participant. The one or more processor circuits may be further configured to detect the second conversation participant's first conversational activity from at least one of the stream of digital pictures of the second conversation participant or the stream of digital sound samples of the second conversation participant. The one or more processor circuits may be further configured to generate a first round of conversational exchange including a recording of the first conversation participant's first conversational activity and a recording of the second conversation participant's first conversational activity. The one or more processor circuits may be further configured to cause the memory unit to store the first round of conversational exchange, the first round of conversational exchange being part of a stored plurality of rounds of conversational exchange.

In certain embodiments, the picture-capturing device of the first computing device or the picture-capturing device of the second computing device includes a motion picture camera. In further embodiments, the stream of digital pictures of the first conversation participant includes the first conversation participant's visual expressions or communication and the stream of digital pictures of the second conversation participant includes the second conversation participant's visual expressions or communication. In further embodiments, the stream of digital pictures of the first conversation participant or the stream of digital pictures of the second conversation participant includes a digital motion picture. The digital motion picture may include a MPEG motion picture, an AVI motion picture, a FLV motion picture, a MOV motion picture, a RM motion picture, a SWF motion picture, a WMV motion picture, a DivX motion picture, or a digitally encoded motion picture. In further embodiments, the stream of digital pictures of the first conversation participant or the stream of digital pictures of the second conversation participant includes or is associated with an extra information, the extra information comprising a time information, a location information, an observed information, or a contextual information.

In some embodiments, the sound-capturing device of the first computing device or the sound-capturing device of the second computing device includes a microphone. In further embodiments, the stream of digital sound samples of the first conversation participant includes the first conversation participant's verbal expressions or communication and the stream of digital sound samples of the second conversation participant includes the second conversation participant's verbal expressions or communication. In further embodiments, the stream of digital sound samples of the first conversation participant or the stream of digital sound samples of the second conversation participant includes a digital sound. The digital sound may include a WAV digital sound, a WMA digital sound, an AIFF digital sound, a MP3 digital sound, a RA digital sound, a OGG digital sound, or a digitally encoded sound. In further embodiments, the stream of digital sound samples of the first conversation participant or the stream of digital sound samples of the second conversation participant includes or is associated with an extra information, the extra information comprising a time information, a location information, an observed information, or a contextual information. In further embodiments, the stream of digital pictures of the first conversation participant and the stream of digital sound samples of the first conversation participant are captured simultaneously. In further embodiments, the stream of digital pictures of the second conversation participant and the stream of digital sound samples of the second conversation participant are captured simultaneously. In further embodiments, the stream of digital pictures of the first conversation participant, the stream of digital sound samples of the first conversation participant, the stream of digital pictures of the second conversation participant, and the stream of digital sound samples of the second conversation participant are captured simultaneously.

In certain embodiments, the first conversation participant's first conversational activity or the second conversation participant's first conversational activity includes at least one of: a speaking, a silent facial expression, a silent body movement, a motionless silence, an absence from the conversation, or a conversational action. In further embodiments, the first conversation participant's first conversational activity includes a first conversation participant's speaking and the second conversation participant's first conversational activity includes a second conversation participant's silent facial expression, a second conversation participant's silent body movement, a second conversation participant's motionless silence, or a second conversation participant's absence from the conversation. In further embodiments, the detecting the first conversation participant's speaking includes recognizing the first conversation participant's speech in the stream of digital sound samples of the first conversation participant. In further embodiments, the detecting the first conversation participant's speaking includes determining a beginning and an end of the first conversation participant's speaking. The determining the beginning of the first conversation participant's speaking may include recognizing the first conversation participant's speech after a threshold period of silence in the stream of digital sound samples of the first conversation participant. The determining the end of the first conversation participant's speaking may include recognizing a threshold period of silence after the first conversation participant's speech in the stream of digital sound samples of the first conversation participant. In further embodiments, the detecting the second conversation participant's silent facial expression includes recognizing the second conversation participant's facial expression in the stream of digital pictures of the second conversation participant and recognizing the second conversation participant's silence in the stream of digital sound samples of the second conversation participant. In further embodiments, the detecting the second conversation participant's silent body movement includes recognizing the second conversation participant's body movement in the stream of digital pictures of the second conversation participant and recognizing the second conversation participant's silence in the stream of digital sound samples of the second conversation participant. In further embodiments, the detecting the second conversation participant's motionless silence includes recognizing no motion or a marginal motion of the second conversation participant in the stream of digital pictures of the second conversation participant and recognizing the second conversation participant's silence in the stream of digital sound samples of the second conversation participant. The marginal motion of the second conversation participant may include a motion of the second conversation participant that does not exceed a threshold for motion. In further embodiments, the detecting the second conversation participant's absence from the conversation includes recognizing the second conversation participant's absence in the stream of digital pictures of the second conversation participant.

In some embodiments, the first conversation participant's first conversational activity includes a first conversation participant's silent facial expression, a first conversation participant's silent body movement, a first conversation participant's motionless silence, or a first conversation participant's absence from the conversation and the second conversation participant's first conversational activity includes a second conversation participant's speaking. In further embodiments, the first conversation participant's first conversational activity includes a first conversation participant's speaking and the second conversation participant's first conversational activity includes a second conversation participant's speaking. In further embodiments, the first conversation participant's first conversational activity includes a first conversation participant's silent facial expression, a first conversation participant's silent body movement, a first conversation participant's motionless silence, or a first conversation participant's absence from the conversation and the second conversation participant's first conversational activity includes a second conversation participant's silent facial expression, a second conversation participant's silent body movement, a second conversation participant's motionless silence, or a second conversation participant's absence from the conversation. In further embodiments, the timing of the first conversation participant's first conversational activity coincides, partially coincides, or overlaps with the timing of the second conversation participant's first conversational activity.

In certain embodiments, the detecting the first conversation participant's first conversational activity includes recognizing the first conversation participant's visual and verbal expressions or communication in a first part of a conversation. In further embodiments, wherein the detecting the first conversation participant's first conversational activity includes identifying a first sub-stream of the stream of digital pictures of the first conversation participant, wherein the first sub-stream of the stream of digital pictures of the first conversation participant comprises the first conversation participant's visual expressions or communication in a first part of a conversation. In further embodiments, the detecting the first conversation participant's first conversational activity includes identifying a first sub-stream of the stream of digital sound samples of the first conversation participant, wherein the first sub-stream of the stream of digital sound samples of the first conversation participant comprises the first conversation participant's verbal expressions or communication in a first part of a conversation. In further embodiments, the detecting the second conversation participant's first conversational activity includes recognizing the second conversation participant's visual and verbal expressions or communication in a first part of a conversation. In further embodiments, the detecting the second conversation participant's first conversational activity includes identifying a first sub-stream of the stream of digital pictures of the second conversation participant, wherein the first sub-stream of the stream of digital pictures of the second conversation participant comprises the second conversation participant's visual expressions or communication in a first part of a conversation. In further embodiments, the detecting the second conversation participant's first conversational activity includes identifying a first sub-stream of the stream of digital sound samples of the second conversation participant, wherein the first sub-stream of the stream of digital sound samples of the second conversation participant comprises the second conversation participant's verbal expressions or communication in a first part of a conversation. In further embodiments, the detecting the first conversation participant's first conversational activity includes recognizing the first conversation participant's speech or sound in the stream of digital sound samples of the first conversation participant. In further embodiments, the detecting the second conversation participant's first conversational activity includes recognizing the second conversation participant's speech or sound in the stream of digital sound samples of the second conversation participant. In further embodiments, the detecting the first conversation participant's first conversational activity includes recognizing the first conversation participant's face or body part in the stream of digital pictures of the first conversation participant. In further embodiments, the detecting the second conversation participant's first conversational activity includes recognizing the second conversation participant's face or body part in the stream of digital pictures of the second conversation participant. In further embodiments, the detecting the first conversation participant's first conversational activity includes determining a beginning and an end of the first conversation participant's first conversational activity. In further embodiments, the detecting the second conversation participant's first conversational activity includes determining a beginning and an end of the second conversation participant's first conversational activity.

In some embodiments, the recording of the first conversation participant's first conversational activity includes the first conversation participant's visual expressions or communication in a first part of a conversation and the first conversation participant's verbal expressions or communication in the first part of the conversation. In further embodiments, the recording of the first conversation participant's first conversational activity includes a first sub-stream of the stream of digital pictures of the first conversation participant and a first sub-stream of the stream of digital sound samples of the first conversation participant. The first sub-stream of the stream of digital pictures of the first conversation participant may comprise the first conversation participant's visual expressions or communication in a first part of a conversation and the first sub-stream of the stream of digital sound samples of the first conversation participant comprises the first conversation participant's verbal expressions or communication in the first part of the conversation. In further embodiments, the recording of the second conversation participant's first conversational activity includes the second conversation participant's visual expressions or communication in a first part of a conversation and the second conversation participant's verbal expressions or communication in the first part of the conversation. In further embodiments, the recording of the second conversation participant's first conversational activity includes a first sub-stream of the stream of digital pictures of the second conversation participant and a first sub-stream of the stream of digital sound samples of the second conversation participant. The first sub-stream of the stream of digital pictures of the second conversation participant may comprise the second conversation participant's visual expressions or communication in a first part of a conversation and the first sub-stream of the stream of digital sound samples of the second conversation participant comprises the second conversation participant's verbal expressions or communication in the first part of the conversation. In further embodiments, the recording of the first conversation participant's first conversational activity or the recording of the second conversation participant's first conversational activity includes or is associated with an extra information, the extra information comprising a time information, a location information, an observed information, or a contextual information.

In certain embodiments, the first round of conversational exchange includes a unit of knowledge of how the first conversation participant acted relative to the second conversation participant in a first part of a conversation and how the second conversation participant acted relative to the first conversation participant in the first part of the conversation. In further embodiments, the first round of conversational exchange includes or is associated with an extra information, the extra information comprising a time information, a location information, an observed information, or a contextual information. In further embodiments, the recording of the first conversation participant's first conversational activity is correlated with the recording of the second conversation participant's first conversational activity.

In some embodiments, the stored plurality of rounds of conversational exchange are organized into at least one of: a neural network, a graph, a collection of sequences, a sequence, a knowledgebase, a knowledge structure, or a data structure. In further embodiments, each round of conversational exchange of the stored plurality of rounds of conversational exchange is included in a neuron, a node, a vertex, or an element of a neural network, a graph, a collection of sequences, a sequence, a knowledgebase, a knowledge structure, or a data structure. In further embodiments, some rounds of conversational exchange of the stored plurality of rounds of conversational exchange are interconnected.

In certain embodiments, the one or more processor circuits may be further configured to: compare the first round of conversational exchange with the stored plurality of rounds of conversational exchange, and determine that the stored plurality of rounds of conversational exchange do not include a round of conversational exchange whose similarity with the first round of conversational exchange exceeds a similarity threshold.

In some embodiments, the one or more processor circuits may be further configured to detect the first conversation participant's second conversational activity from at least one of the stream of digital pictures of the first conversation participant or the stream of digital sound samples of the first conversation participant. The one or more processor circuits may be further configured to detect the second conversation participant's second conversational activity from at least one of the stream of digital pictures of the second conversation participant or the stream of digital sound samples of the second conversation participant. The one or more processor circuits may be further configured to generate a second round of conversational exchange including the first conversation participant's second conversational activity and the second conversation participant's second conversational activity. The one or more processor circuits may be further configured to cause the memory unit to store the second round of conversational exchange, the second round of conversational exchange being part of the stored plurality of rounds of conversational exchange.

In some embodiments, the one or more processor circuits may be further configured to create a connection between the stored first round of conversational exchange and the stored second round of conversational exchange. In further embodiments, the connection between the stored first round of conversational exchange and the stored second round of conversational exchange includes or is associated with at least one of: an occurrence count, a weight, a parameter, or a data. In further embodiments, the stored plurality of rounds of conversational exchange are organized into a neural network, and wherein the first round of conversational exchange is stored into a first node of the neural network and the second round of conversational exchange is stored into a second node of the neural network. The first node and the second node may be connected by a connection. The first node may be part of a first layer of the neural network and the second node may be part of a second layer of the neural network. In further embodiments, the stored plurality of rounds of conversational exchange are organized into a graph, and wherein the first round of conversational exchange is stored into a first node of the graph and the second round of conversational exchange is stored into a second node of the graph. The first node and the second node may be connected by a connection. In further embodiments, the stored plurality of rounds of conversational exchange are organized into a collection of sequences, and wherein the first round of conversational exchange is stored into a first node of a sequence of the collection of sequences and the second round of conversational exchange is stored into a second node of the sequence of the collection of sequences. In further embodiments, the stored plurality of rounds of conversational exchange are organized into a sequence, and wherein the first round of conversational exchange is stored into a first node of the sequence and the second round of conversational exchange is stored into a second node of the sequence. In further embodiments, the one or more processor circuits may be further configured to: compare the second round of conversational exchange with the stored plurality of rounds of conversational exchange, and determine that the stored plurality of rounds of conversational exchange do not include a round of conversational exchange whose similarity with the second round of conversational exchange exceeds a similarity threshold. The recording of the first conversation participant's second conversational activity may be correlated with the recording of the second conversation participant's second conversational activity.

In certain embodiments, the one or more processor circuits may be further configured to update a connection between the stored first round of conversational exchange and another round of conversational exchange of the stored plurality of rounds of conversational exchange.

In some embodiments, the one or more processor circuits may be further configured to detect the first conversation participant's third conversational activity from at least one of the stream of digital pictures of the first conversation participant or the stream of digital sound samples of the first conversation participant. The one or more processor circuits may be further configured to detect the second conversation participant's third conversational activity from at least one of the stream of digital pictures of the second conversation participant or the stream of digital sound samples of the second conversation participant. The one or more processor circuits may be further configured to generate a third round of conversational exchange including a recording of the first conversation participant's third conversational activity and a recording of the second conversation participant's third conversational activity. The one or more processor circuits may be further configured to compare the third round of conversational exchange with the stored plurality of rounds of conversational exchange. The one or more processor circuits may be further configured to determine that the stored plurality of rounds of conversational exchange include a round of conversational exchange whose similarity with the third round of conversational exchange exceeds a similarity threshold. The one or more processor circuits may be further configured to update a connection between the stored first round of conversational exchange and the round of conversational exchange whose similarity with the third round of conversational exchange exceeds a similarity threshold. In further embodiments, the updating the connection between the stored first round of conversational exchange and the round of conversational exchange whose similarity with the third round of conversational exchange exceeds a similarity threshold includes updating at least one of: an occurrence count, a weight, a parameter, or a data included in or associated with the connection. In further embodiments, the recording of the first conversation participant's third conversational activity is correlated with the recording of the second conversation participant's third conversational activity.

In some embodiments, the one or more processor circuits may be further configured to filter the first conversation participant's face or body part from the stream of digital pictures of the first conversation participant. In further embodiments, the filtering the first conversation participant's face or body part from the stream of digital pictures of the first conversation participant includes retaining the first conversation participant's face or body part and removing an insignificant content from the stream of digital pictures of the first conversation participant.

In certain embodiments, the one or more processor circuits may be further configured to filter the first conversation participant's speech or sound from the stream of digital sound samples of the first conversation participant. In further embodiments, the filtering the first conversation participant's speech or sound from the stream of digital sound samples of the first conversation participant includes retaining the first conversation participant's speech or sound and removing an insignificant sound from the stream of digital sound samples of the first conversation participant.

In some aspects, the disclosure relates to a non-transitory computer storage medium having a computer program stored thereon, the program comprising instructions that when executed by one or more computing devices cause the one or more computing devices to perform operations comprising: capturing a stream of digital pictures of a first conversation participant by a picture-capturing device of a first computing device. The operations may further include capturing a stream of digital sound samples of the first conversation participant by a sound-capturing device of the first computing device, the first computing device coupled to a server via a network. The operations may further include capturing a stream of digital pictures of a second conversation participant by a picture-capturing device of a second computing device. The operations may further include capturing a stream of digital sound samples of the second conversation participant by a sound-capturing device of the second computing device, the second computing device coupled to the server via the network. The operations may further include detecting the first conversation participant's first conversational activity from at least one of the stream of digital pictures of the first conversation participant or the stream of digital sound samples of the first conversation participant. The operations may further include detecting the second conversation participant's first conversational activity from at least one of the stream of digital pictures of the second conversation participant or the stream of digital sound samples of the second conversation participant. The operations may further include generating a first round of conversational exchange including a recording of the first conversation participant's first conversational activity and a recording of the second conversation participant's first conversational activity. The operations may further include storing the first round of conversational exchange into a memory unit of the server, the first round of conversational exchange being part of a stored plurality of rounds of conversational exchange.

In some aspects, the disclosure relates to a method comprising: (a) capturing a stream of digital pictures of a first conversation participant by a picture-capturing device of a first computing device. The method may further include (b) capturing a stream of digital sound samples of the first conversation participant by a sound-capturing device of the first computing device, the first computing device coupled to a server via a network. The method may further include (c) capturing a stream of digital pictures of a second conversation participant by a picture-capturing device of a second computing device. The method may further include (d) capturing a stream of digital sound samples of the second conversation participant by a sound-capturing device of the second computing device, the second computing device coupled to the server via the network The method may further include (e) detecting the first conversation participant's first conversational activity from at least one of the stream of digital pictures of the first conversation participant or the stream of digital sound samples of the first conversation participant, the detecting of (e) performed by one or more processor circuits of the server The method may further include (f) detecting the second conversation participant's first conversational activity from at least one of the stream of digital pictures of the second conversation participant or the stream of digital sound samples of the second conversation participant, the detecting of (f) performed by the one or more processor circuits of the server The method may further include (g) generating a first round of conversational exchange including a recording of the first conversation participant's first conversational activity and a recording of the second conversation participant's first conversational activity, the generating of (g) performed by the one or more processor circuits of the server The method may further include (h) storing the first round of conversational exchange into a memory unit of the server, the first round of conversational exchange being part of a stored plurality of rounds of conversational exchange, the storing of (h) caused by the one or more processor circuits of the server.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In some embodiments, the picture-capturing device of the first computing device or the picture-capturing device of the second computing device includes a motion picture camera. In further embodiments, the stream of digital pictures of the first conversation participant includes the first conversation participant's visual expressions or communication and the stream of digital pictures of the second conversation participant includes the second conversation participant's visual expressions or communication. In further embodiments, the stream of digital pictures of the first conversation participant or the stream of digital pictures of the second conversation participant includes a digital motion picture. The digital motion picture may include a MPEG motion picture, an AVI motion picture, a FLV motion picture, a MOV motion picture, a RM motion picture, a SWF motion picture, a WMV motion picture, a DivX motion picture, or a digitally encoded motion picture. In further embodiments, the stream of digital pictures of the first conversation participant or the stream of digital pictures of the second conversation participant includes or is associated with an extra information, the extra information comprising a time information, a location information, an observed information, or a contextual information.

In certain embodiments, the sound-capturing device of the first computing device or the sound-capturing device of the second computing device includes a microphone. In further embodiments, the stream of digital sound samples of the first conversation participant includes the first conversation participant's verbal expressions or communication and the stream of digital sound samples of the second conversation participant includes the second conversation participant's verbal expressions or communication. In further embodiments, the stream of digital sound samples of the first conversation participant or the stream of digital sound samples of the second conversation participant includes a digital sound. The digital sound may include a WAV digital sound, a WMA digital sound, an AIFF digital sound, a MP3 digital sound, a RA digital sound, a OGG digital sound, or a digitally encoded sound. In further embodiments, the stream of digital sound samples of the first conversation participant or the stream of digital sound samples of the second conversation participant includes or is associated with an extra information, the extra information comprising a time information, a location information, an observed information, or a contextual information. In further embodiments, the stream of digital pictures of the first conversation participant and the stream of digital sound samples of the first conversation participant are captured simultaneously. In further embodiments, the stream of digital pictures of the second conversation participant and the stream of digital sound samples of the second conversation participant are captured simultaneously. In further embodiments, the stream of digital pictures of the first conversation participant, the stream of digital sound samples of the first conversation participant, the stream of digital pictures of the second conversation participant, and the stream of digital sound samples of the second conversation participant are captured simultaneously.

In some embodiments, the first conversation participant's first conversational activity or the second conversation participant's first conversational activity includes at least one of: a speaking, a silent facial expression, a silent body movement, a motionless silence, an absence from the conversation, or a conversational action. In further embodiments, the first conversation participant's first conversational activity includes a first conversation participant's speaking and the second conversation participant's first conversational activity includes a second conversation participant's silent facial expression, a second conversation participant's silent body movement, a second conversation participant's motionless silence, or a second conversation participant's absence from the conversation. In further embodiments, the detecting the first conversation participant's speaking includes recognizing the first conversation participant's speech in the stream of digital sound samples of the first conversation participant. In further embodiments, the detecting the first conversation participant's speaking includes determining a beginning and an end of the first conversation participant's speaking. The determining the beginning of the first conversation participant's speaking may include recognizing the first conversation participant's speech after a threshold period of silence in the stream of digital sound samples of the first conversation participant. The determining the end of the first conversation participant's speaking may include recognizing a threshold period of silence after the first conversation participant's speech in the stream of digital sound samples of the first conversation participant. In further embodiments, the detecting the second conversation participant's silent facial expression includes recognizing the second conversation participant's facial expression in the stream of digital pictures of the second conversation participant and recognizing the second conversation participant's silence in the stream of digital sound samples of the second conversation participant. In further embodiments, the detecting the second conversation participant's silent body movement includes recognizing the second conversation participant's body movement in the stream of digital pictures of the second conversation participant and recognizing the second conversation participant's silence in the stream of digital sound samples of the second conversation participant. In further embodiments, the detecting the second conversation participant's motionless silence includes recognizing no motion or a marginal motion of the second conversation participant in the stream of digital pictures of the second conversation participant and recognizing the second conversation participant's silence in the stream of digital sound samples of the second conversation participant. The marginal motion of the second conversation participant may include a motion of the second conversation participant that does not exceed a threshold for motion. In further embodiments, the detecting the second conversation participant's absence from the conversation includes recognizing the second conversation participant's absence in the stream of digital pictures of the second conversation participant. In further embodiments, the first conversation participant's first conversational activity includes a first conversation participant's silent facial expression, a first conversation participant's silent body movement, a first conversation participant's motionless silence, or a first conversation participant's absence from the conversation and the second conversation participant's first conversational activity includes a second conversation participant's speaking. In further embodiments, the first conversation participant's first conversational activity includes a first conversation participant's speaking and the second conversation participant's first conversational activity includes a second conversation participant's speaking. In further embodiments, the first conversation participant's first conversational activity includes a first conversation participant's silent facial expression, a first conversation participant's silent body movement, a first conversation participant's motionless silence, or a first conversation participant's absence from the conversation and the second conversation participant's first conversational activity includes a second conversation participant's silent facial expression, a second conversation participant's silent body movement, a second conversation participant's motionless silence, or a second conversation participant's absence from the conversation. In further embodiments, the timing of the first conversation participant's first conversational activity coincides, partially coincides, or overlaps with the timing of the second conversation participant's first conversational activity.

In certain embodiments, the detecting the first conversation participant's first conversational activity includes recognizing the first conversation participant's visual and verbal expressions or communication in a first part of a conversation. In further embodiments, the detecting the first conversation participant's first conversational activity includes identifying a first sub-stream of the stream of digital pictures of the first conversation participant, wherein the first sub-stream of the stream of digital pictures of the first conversation participant comprises the first conversation participant's visual expressions or communication in a first part of a conversation. In further embodiments, the detecting the first conversation participant's first conversational activity includes identifying a first sub-stream of the stream of digital sound samples of the first conversation participant, wherein the first sub-stream of the stream of digital sound samples of the first conversation participant comprises the first conversation participant's verbal expressions or communication in a first part of a conversation. In further embodiments, the detecting the second conversation participant's first conversational activity includes recognizing the second conversation participant's visual and verbal expressions or communication in a first part of a conversation. In further embodiments, the detecting the second conversation participant's first conversational activity includes identifying a first sub-stream of the stream of digital pictures of the second conversation participant, wherein the first sub-stream of the stream of digital pictures of the second conversation participant comprises the second conversation participant's visual expressions or communication in a first part of a conversation. In further embodiments, the detecting the second conversation participant's first conversational activity includes identifying a first sub-stream of the stream of digital sound samples of the second conversation participant, wherein the first sub-stream of the stream of digital sound samples of the second conversation participant comprises the second conversation participant's verbal expressions or communication in a first part of a conversation.

In some embodiments, the detecting the first conversation participant's first conversational activity includes recognizing the first conversation participant's speech or sound in the stream of digital sound samples of the first conversation participant. In further embodiments, the detecting the second conversation participant's first conversational activity includes recognizing the second conversation participant's speech or sound in the stream of digital sound samples of the second conversation participant. In further embodiments, the detecting the first conversation participant's first conversational activity includes recognizing the first conversation participant's face or body part in the stream of digital pictures of the first conversation participant. In further embodiments, the detecting the second conversation participant's first conversational activity includes recognizing the second conversation participant's face or body part in the stream of digital pictures of the second conversation participant. In further embodiments, the detecting the first conversation participant's first conversational activity includes determining a beginning and an end of the first conversation participant's first conversational activity. In further embodiments, the detecting the second conversation participant's first conversational activity includes determining a beginning and an end of the second conversation participant's first conversational activity.

In certain embodiments, the recording of the first conversation participant's first conversational activity includes the first conversation participant's visual expressions or communication in a first part of a conversation and the first conversation participant's verbal expressions or communication in the first part of the conversation. In further embodiments, the recording of the first conversation participant's first conversational activity includes a first sub-stream of the stream of digital pictures of the first conversation participant and a first sub-stream of the stream of digital sound samples of the first conversation participant. The first sub-stream of the stream of digital pictures of the first conversation participant may comprise the first conversation participant's visual expressions or communication in a first part of a conversation and the first sub-stream of the stream of digital sound samples of the first conversation participant may comprise the first conversation participant's verbal expressions or communication in the first part of the conversation. In further embodiments, the recording of the second conversation participant's first conversational activity includes the second conversation participant's visual expressions or communication in a first part of a conversation and the second conversation participant's verbal expressions or communication in the first part of the conversation. In further embodiments, the recording of the second conversation participant's first conversational activity includes a first sub-stream of the stream of digital pictures of the second conversation participant and a first sub-stream of the stream of digital sound samples of the second conversation participant. The first sub-stream of the stream of digital pictures of the second conversation participant may comprise the second conversation participant's visual expressions or communication in a first part of a conversation and the first sub-stream of the stream of digital sound samples of the second conversation participant may comprise the second conversation participant's verbal expressions or communication in the first part of the conversation. In further embodiments, the recording of the first conversation participant's first conversational activity or the recording of the second conversation participant's first conversational activity includes or is associated with an extra information, the extra information comprising a time information, a location information, an observed information, or a contextual information.

In some embodiments, the first round of conversational exchange includes a unit of knowledge of how the first conversation participant acted relative to the second conversation participant in a first part of a conversation and how the second conversation participant acted relative to the first conversation participant in the first part of the conversation. In further embodiments, the first round of conversational exchange includes or is associated with an extra information, the extra information comprising a time information, a location information, an observed information, or a contextual information. In further embodiments, the recording of the first conversation participant's first conversational activity is correlated with the recording of the second conversation participant's first conversational activity.

In certain embodiments, the stored plurality of rounds of conversational exchange are organized into at least one of: a neural network, a graph, a collection of sequences, a sequence, a knowledgebase, a knowledge structure, or a data structure. In further embodiments, each round of conversational exchange of the stored plurality of rounds of conversational exchange is included in a neuron, a node, a vertex, or an element of a neural network, a graph, a collection of sequences, a sequence, a knowledgebase, a knowledge structure, or a data structure. In further embodiments, some rounds of conversational exchange of the stored plurality of rounds of conversational exchange are interconnected.

In certain embodiments, the non-transitory computer storage medium and/or the method further comprise: comparing the first round of conversational exchange with the stored plurality of rounds of conversational exchange, the comparing performed by the one or more processor circuits of the server, and determining that the stored plurality of rounds of conversational exchange do not include a round of conversational exchange whose similarity with the first round of conversational exchange exceeds a similarity threshold, the determining performed by the one or more processor circuits of the server.

In some embodiments, the non-transitory computer storage medium and/or the method further comprise: detecting the first conversation participant's second conversational activity from at least one of the stream of digital pictures of the first conversation participant or the stream of digital sound samples of the first conversation participant, the detecting performed by the one or more processor circuits of the server The non-transitory computer storage medium and/or the method further comprise: detecting the second conversation participant's second conversational activity from at least one of the stream of digital pictures of the second conversation participant or the stream of digital sound samples of the second conversation participant, the detecting performed by the one or more processor circuits of the server The non-transitory computer storage medium and/or the method further comprise: generating a second round of conversational exchange including the first conversation participant's second conversational activity and the second conversation participant's second conversational activity, the generating performed by the one or more processor circuits of the server The non-transitory computer storage medium and/or the method further comprise: storing the second round of conversational exchange into the memory unit, the second round of conversational exchange being part of the stored plurality of rounds of conversational exchange, the storing caused by the one or more processor circuits of the server.

In certain embodiments, the non-transitory computer storage medium and/or the method further comprise: creating a connection between the stored first round of conversational exchange and the stored second round of conversational exchange, the creating performed by the one or more processor circuits of the server. The connection between the stored first round of conversational exchange and the stored second round of conversational exchange may include or be associated with at least one of: an occurrence count, a weight, a parameter, or a data. In further embodiments, the stored plurality of rounds of conversational exchange are organized into a neural network, and wherein the first round of conversational exchange is stored into a first node of the neural network and the second round of conversational exchange is stored into a second node of the neural network. The first node and the second node may be connected by a connection. The first node may be part of a first layer of the neural network and the second node may be part of a second layer of the neural network. In further embodiments, the stored plurality of rounds of conversational exchange are organized into a graph, and wherein the first round of conversational exchange is stored into a first node of the graph and the second round of conversational exchange is stored into a second node of the graph. The first node and the second node may be connected by a connection. In further embodiments, the stored plurality of rounds of conversational exchange are organized into a collection of sequences, and wherein the first round of conversational exchange is stored into a first node of a sequence of the collection of sequences and the second round of conversational exchange is stored into a second node of the sequence of the collection of sequences. In further embodiments, the stored plurality of rounds of conversational exchange are organized into a sequence, and wherein the first round of conversational exchange is stored into a first node of the sequence and the second round of conversational exchange is stored into a second node of the sequence. The non-transitory computer storage medium and/or the method further comprise: comparing the second round of conversational exchange with the stored plurality of rounds of conversational exchange, the comparing performed by the one or more processor circuits of the server, and determining that the stored plurality of rounds of conversational exchange do not include a round of conversational exchange whose similarity with the second round of conversational exchange exceeds a similarity threshold, the determining performed by the one or more processor circuits of the server. The recording of the first conversation participant's second conversational activity is correlated with the recording of the second conversation participant's second conversational activity.

In some embodiments, the non-transitory computer storage medium and/or the method further comprise: updating a connection between the stored first round of conversational exchange and another round of conversational exchange of the stored plurality of rounds of conversational exchange, the updating performed by the one or more processor circuits of the server.

In certain embodiments, the non-transitory computer storage medium and/or the method further comprise: detecting the first conversation participant's third conversational activity from at least one of the stream of digital pictures of the first conversation participant or the stream of digital sound samples of the first conversation participant, the detecting performed by the one or more processor circuits of the server. The non-transitory computer storage medium and/or the method further comprise: detecting the second conversation participant's third conversational activity from at least one of the stream of digital pictures of the second conversation participant or the stream of digital sound samples of the second conversation participant, the detecting performed by the one or more processor circuits of the server The non-transitory computer storage medium and/or the method further comprise: generating a third round of conversational exchange including a recording of the first conversation participant's third conversational activity and a recording of the second conversation participant's third conversational activity, the generating performed by the one or more processor circuits of the server The non-transitory computer storage medium and/or the method further comprise: comparing the third round of conversational exchange with the stored plurality of rounds of conversational exchange, the comparing performed by the one or more processor circuits of the server The non-transitory computer storage medium and/or the method further comprise: determining that the stored plurality of rounds of conversational exchange include a round of conversational exchange whose similarity with the third round of conversational exchange exceeds a similarity threshold, the determining performed by the one or more processor circuits of the server The non-transitory computer storage medium and/or the method further comprise: updating a connection between the stored first round of conversational exchange and the round of conversational exchange whose similarity with the third round of conversational exchange exceeds a similarity threshold, the updating performed by the one or more processor circuits of the server. In further embodiments, the updating the connection between the stored first round of conversational exchange and the round of conversational exchange whose similarity with the third round of conversational exchange exceeds a similarity threshold includes updating at least one of: an occurrence count, a weight, a parameter, or a data included in or associated with the connection. In further embodiments, the recording of the first conversation participant's third conversational activity is correlated with the recording of the second conversation participant's third conversational activity.

In some embodiments, the non-transitory computer storage medium and/or the method further comprise filtering the first conversation participant's face or body part from the stream of digital pictures of the first conversation participant, the filtering performed by the one or more processor circuits of the server. In further embodiments, the filtering the first conversation participant's face or body part from the stream of digital pictures of the first conversation participant includes retaining the first conversation participant's face or body part and removing an insignificant content from the stream of digital pictures of the first conversation participant.

In certain embodiments, the non-transitory computer storage medium and/or the method further comprise filtering the first conversation participant's speech or sound from the stream of digital sound samples of the first conversation participant, the filtering performed by the one or more processor circuits of the server. In further embodiments, the filtering the first conversation participant's speech or sound from the stream of digital sound samples of the first conversation participant includes retaining the first conversation participant's speech or sound and removing an insignificant sound from the stream of digital sound samples of the first conversation participant.

In some aspects, the disclosure relates to a system for learning artificially intelligent interactive memories. The system may be implemented at least in part on one or more computing devices. In some embodiments, the system comprises one or more processor circuits coupled to a memory unit The system may further include a first picture-capturing device configured to capture a stream of digital pictures of a first conversation participant and a second picture-capturing device configured to capture a stream of digital pictures of a second conversation participant, the first and the second picture-capturing devices coupled to the one or more processor circuits The system may further include a first sound-capturing device configured to capture a stream of digital sound samples of the first conversation participant and a second sound-capturing device configured to capture a stream of digital sound samples of the second conversation participant, the first and the second sound-capturing devices coupled to the one or more processor circuits. The one or more processor circuits may be configured to: detect the first conversation participant's first conversational activity from at least one of the stream of digital pictures of the first conversation participant or the stream of digital sound samples of the first conversation participant. The one or more processor circuits may be further configured to: detect the second conversation participant's first conversational activity from at least one of the stream of digital pictures of the second conversation participant or the stream of digital sound samples of the second conversation participant. The one or more processor circuits may be further configured to: generate a first round of conversational exchange including a recording of the first conversation participant's first conversational activity and a recording of the second conversation participant's first conversational activity. The one or more processor circuits may be further configured to: cause the memory unit to store the first round of conversational exchange, the first round of conversational exchange being part of a stored plurality of rounds of conversational exchange.

In certain embodiments, the one or more processor circuits, the memory unit, the first picture-capturing device, the second picture-capturing device, the first sound-capturing device, and the second sound-capturing device of the system are included in a single device. In further embodiments, at least one of: the one or more processor circuits or the memory unit of the system are included in a server, and wherein the first picture-capturing device and the first sound-capturing device of the system are included in a first computing device, and the second picture-capturing device and the second sound-capturing device of the system are included in a second computing device, the first and the second computing devices coupled to the server via a network.

In some embodiments, the one or more processor circuits may be further configured to: compare the first round of conversational exchange with the stored plurality of rounds of conversational exchange, and determine that the stored plurality of rounds of conversational exchange do not include a round of conversational exchange whose similarity with the first round of conversational exchange exceeds a similarity threshold.

In some embodiments, the one or more processor circuits may be further configured to: detect the first conversation participant's second conversational activity from at least one of the stream of digital pictures of the first conversation participant or the stream of digital sound samples of the first conversation participant. The one or more processor circuits may be further configured to: detect the second conversation participant's second conversational activity from at least one of the stream of digital pictures of the second conversation participant or the stream of digital sound samples of the second conversation participant The one or more processor circuits may be further configured to: generate a second round of conversational exchange including the first conversation participant's second conversational activity and the second conversation participant's second conversational activity The one or more processor circuits may be further configured to: cause the memory unit to store the second round of conversational exchange, the second round of conversational exchange being part of the stored plurality of rounds of conversational exchange. The one or more processor circuits may be further configured to: create a connection between the stored first round of conversational exchange and the stored second round of conversational exchange.

The one or more processor circuits may be further configured to: compare the second round of conversational exchange with the stored plurality of rounds of conversational exchange, and determine that the stored plurality of rounds of conversational exchange do not include a round of conversational exchange whose similarity with the second round of conversational exchange exceeds a similarity threshold.

In certain embodiments, the one or more processor circuits may be further configured to: detect the first conversation participant's third conversational activity from at least one of the stream of digital pictures of the first conversation participant or the stream of digital sound samples of the first conversation participant. The one or more processor circuits may be further configured to: detect the second conversation participant's third conversational activity from at least one of the stream of digital pictures of the second conversation participant or the stream of digital sound samples of the second conversation participant. The one or more processor circuits may be further configured to: generate a third round of conversational exchange including a recording of the first conversation participant's third conversational activity and a recording of the second conversation participant's third conversational activity The one or more processor circuits may be further configured to: compare the third round of conversational exchange with the stored plurality of rounds of conversational exchange. The one or more processor circuits may be further configured to: determine that the stored plurality of rounds of conversational exchange include a round of conversational exchange whose similarity with the third round of conversational exchange exceeds a similarity threshold. The one or more processor circuits may be further configured to: update a connection between the stored first round of conversational exchange and the round of conversational exchange whose similarity with the third round of conversational exchange exceeds a similarity threshold.

In some embodiments, the one or more processor circuits may be further configured to: filter the first conversation participant's face or body part from the stream of digital pictures of the first conversation participant.

In certain embodiments, the one or more processor circuits may be further configured to: filter the first conversation participant's speech or sound from the stream of digital sound samples of the first conversation participant.

In some aspects, the disclosure relates to a non-transitory computer storage medium having a computer program stored thereon, the program comprising instructions that when executed by one or more computing devices cause the one or more computing devices to perform operations comprising: capturing a stream of digital pictures of a first conversation participant by a first picture-capturing device. The operations may further include capturing a stream of digital sound samples of the first conversation participant by a first sound-capturing device. The operations may further include capturing a stream of digital pictures of a second conversation participant by a second picture-capturing device. The operations may further include capturing a stream of digital sound samples of the second conversation participant by a second sound-capturing device. The operations may further include detecting the first conversation participant's first conversational activity from at least one of the stream of digital pictures of the first conversation participant or the stream of digital sound samples of the first conversation participant. The operations may further include detecting the second conversation participant's first conversational activity from at least one of the stream of digital pictures of the second conversation participant or the stream of digital sound samples of the second conversation participant. The operations may further include generating a first round of conversational exchange including a recording of the first conversation participant's first conversational activity and a recording of the second conversation participant's first conversational activity. The operations may further include storing the first round of conversational exchange into a memory unit, the first round of conversational exchange being part of a stored plurality of rounds of conversational exchange.

In some aspects, the disclosure relates to a method comprising: (a) capturing a stream of digital pictures of a first conversation participant by a first picture-capturing device. The method may further include (b) capturing a stream of digital sound samples of the first conversation participant by a first sound-capturing device. The method may further include (c) capturing a stream of digital pictures of a second conversation participant by a second picture-capturing device. The method may further include (d) capturing a stream of digital sound samples of the second conversation participant by a second sound-capturing device. The method may further include (e) detecting the first conversation participant's first conversational activity from at least one of the stream of digital pictures of the first conversation participant or the stream of digital sound samples of the first conversation participant, the detecting of (e) performed by one or more processor circuits. The method may further include (f) detecting the second conversation participant's first conversational activity from at least one of the stream of digital pictures of the second conversation participant or the stream of digital sound samples of the second conversation participant, the detecting of (f) performed by the one or more processor circuits. The method may further include (g) generating a first round of conversational exchange including a recording of the first conversation participant's first conversational activity and a recording of the second conversation participant's first conversational activity, the generating of (g) performed by the one or more processor circuits. The method may further include (h) storing the first round of conversational exchange into a memory unit, the first round of conversational exchange being part of a stored plurality of rounds of conversational exchange, the storing of (h) caused by the one or more processor circuits.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In some embodiments, the one or more processor circuits, the memory unit, the first picture-capturing device, the second picture-capturing device, the first sound-capturing device, and the second sound-capturing device of the system are included in a single device. In further embodiments, at least one of: the one or more processor circuits or the memory unit of the system are included in a server, and wherein the first picture-capturing device and the first sound-capturing device of the system are included in a first computing device, and the second picture-capturing device and the second sound-capturing device of the system are included in a second computing device, the first and the second computing devices coupled to the server via a network.

In certain embodiments, the non-transitory computer storage medium and/or the method further comprise: comparing the first round of conversational exchange with the stored plurality of rounds of conversational exchange, the comparing performed by the one or more processor circuits, and determining that the stored plurality of rounds of conversational exchange do not include a round of conversational exchange whose similarity with the first round of conversational exchange exceeds a similarity threshold, the determining performed by the one or more processor circuits.

In some embodiments, the non-transitory computer storage medium and/or the method further comprise: detecting the first conversation participant's second conversational activity from at least one of the stream of digital pictures of the first conversation participant or the stream of digital sound samples of the first conversation participant, the detecting performed by the one or more processor circuits. The non-transitory computer storage medium and/or the method further comprise: detecting the second conversation participant's second conversational activity from at least one of the stream of digital pictures of the second conversation participant or the stream of digital sound samples of the second conversation participant, the detecting performed by the one or more processor circuits. The non-transitory computer storage medium and/or the method further comprise: generating a second round of conversational exchange including the first conversation participant's second conversational activity and the second conversation participant's second conversational activity, the generating performed by the one or more processor circuits. The non-transitory computer storage medium and/or the method further comprise: storing the second round of conversational exchange into a memory unit, the second round of conversational exchange being part of the stored plurality of rounds of conversational exchange, the storing caused by the one or more processor circuits. The non-transitory computer storage medium and/or the method further comprise: creating a connection between the stored first round of conversational exchange and the stored second round of conversational exchange, the creating performed by the one or more processor circuits. The non-transitory computer storage medium and/or the method further comprise: comparing the second round of conversational exchange with the stored plurality of rounds of conversational exchange, the comparing performed by the one or more processor circuits, and determining that the stored plurality of rounds of conversational exchange do not include a round of conversational exchange whose similarity with the second round of conversational exchange exceeds a similarity threshold, the determining performed by the one or more processor circuits.

In certain embodiments, the non-transitory computer storage medium and/or the method further comprise: detecting the first conversation participant's third conversational activity from at least one of the stream of digital pictures of the first conversation participant or the stream of digital sound samples of the first conversation participant, the detecting performed by the one or more processor circuits. The non-transitory computer storage medium and/or the method further comprise: detecting the second conversation participant's third conversational activity from at least one of the stream of digital pictures of the second conversation participant or the stream of digital sound samples of the second conversation participant, the detecting performed by the one or more processor circuits. The non-transitory computer storage medium and/or the method further comprise: generating a third round of conversational exchange including a recording of the first conversation participant's third conversational activity and a recording of the second conversation participant's third conversational activity, the generating performed by the one or more processor circuits. The non-transitory computer storage medium and/or the method further comprise: comparing the third round of conversational exchange with the stored plurality of rounds of conversational exchange, the comparing performed by the one or more processor circuits. The non-transitory computer storage medium and/or the method further comprise: determining that the stored plurality of rounds of conversational exchange include a round of conversational exchange whose similarity with the third round of conversational exchange exceeds a similarity threshold, the determining performed by the one or more processor circuits. The non-transitory computer storage medium and/or the method further comprise: updating a connection between the stored first round of conversational exchange and the round of conversational exchange whose similarity with the third round of conversational exchange exceeds a similarity threshold, the updating performed by the one or more processor circuits.

In some embodiments, the non-transitory computer storage medium and/or the method further comprise: filtering the first conversation participant's face or body part from the stream of digital pictures of the first conversation participant, the filtering performed by the one or more processor circuits.

In certain embodiments, the non-transitory computer storage medium and/or the method further comprise: filtering the first conversation participant's speech or sound from the stream of digital sound samples of the first conversation participant, the filtering performed by the one or more processor circuits.

In some aspects, the disclosure relates to a system for learning artificially intelligent interactive memories. The system may be implemented at least in part on one or more computing devices. In some embodiments, the system comprises one or more processor circuits coupled to a memory unit. The system may further include a picture-capturing device configured to capture a stream of digital pictures of a first and a second conversation participants, the picture-capturing device coupled to the one or more processor circuits. The system may further include a sound-capturing device configured to capture a stream of digital sound samples of the first and the second conversation participants, the sound-capturing device coupled to the one or more processor circuits. The one or more processor circuits may be configured to: detect the first conversation participant's first conversational activity from at least one of the stream of digital pictures of the first and the second conversation participants or the stream of digital sound samples of the first and the second conversation participants. The one or more processor circuits may be further configured to: detect the second conversation participant's first conversational activity from at least one of the stream of digital pictures of the first and the second conversation participants or the stream of digital sound samples of the first and the second conversation participants. The one or more processor circuits may be further configured to: generate a first round of conversational exchange including a recording of the first conversation participant's first conversational activity and a recording of the second conversation participant's first conversational activity. The one or more processor circuits may be further configured to: cause the memory unit to store the first round of conversational exchange, the first round of conversational exchange being part of a stored plurality of rounds of conversational exchange.

In certain embodiments, the one or more processor circuits, the memory unit, the picture-capturing device, and the sound-capturing device of the system are included in a single device. In further embodiments, at least one of: the one or more processor circuits or the memory unit of the system are included in a server, and wherein the picture-capturing device and the sound-capturing device of the system are included in a computing device, the computing device coupled to the server via a network.

In some embodiments, the stream of digital pictures of the first and the second conversation participants includes the first and the second conversation participants' visual expressions or communication. In further embodiments, the stream of digital sound samples of the first and the second conversation participants includes the first and the second conversation participants' verbal expressions or communication. In further embodiments, the stream of digital pictures of the first and the second conversation participants and the stream of digital sound samples of the first and the second conversation participants are captured simultaneously.

In certain embodiments, the first conversation participant's first conversational activity or the second conversation participant's first conversational activity includes at least one of: a speaking, a silent facial expression, a silent body movement, a motionless silence, an absence from the conversation, or a conversational action. In further embodiments, the first conversation participant's first conversational activity includes a first conversation participant's speaking and the second conversation participant's first conversational activity includes a second conversation participant's silent facial expression, a second conversation participant's silent body movement, a second conversation participant's motionless silence, or a second conversation participant's absence from the conversation. In further embodiments, the detecting the first conversation participant's speaking includes recognizing the first conversation participant's speech in the stream of digital sound samples of the first and the second conversation participants. In further embodiments, the detecting the first conversation participant's speaking includes determining a beginning and an end of the first conversation participant's speaking. The determining the beginning of the first conversation participant's speaking may include recognizing the first conversation participant's speech after a threshold period of silence in the stream of digital sound samples of the first and the second conversation participants. The determining the end of the first conversation participant's speaking may include recognizing a threshold period of silence after the first conversation participant's speech in the stream of digital sound samples of the first and the second conversation participants. In further embodiments, the detecting the second conversation participant's silent facial expression includes recognizing the second conversation participant's facial expression in the stream of digital pictures of the first and the second conversation participants and recognizing the second conversation participant's silence in the stream of digital sound samples of the first and the second conversation participants. In further embodiments, the detecting the second conversation participant's silent body movement includes recognizing the second conversation participant's body movement in the stream of digital pictures of the first and the second conversation participants and recognizing the second conversation participant's silence in the stream of digital sound samples of the first and the second conversation participants. In further embodiments, the detecting the second conversation participant's motionless silence includes recognizing no motion or a marginal motion of the second conversation participant in the stream of digital pictures of the first and the second conversation participants and recognizing the second conversation participant's silence in the stream of digital sound samples of the first and the second conversation participants. The marginal motion of the second conversation participant may include a motion of the second conversation participant that does not exceed a threshold for motion. In further embodiments, the detecting the second conversation participant's absence from the conversation includes recognizing the second conversation participant's absence in the stream of digital pictures of the first and the second conversation participants. In further embodiments, the first conversation participant's first conversational activity includes a first conversation participant's silent facial expression, a first conversation participant's silent body movement, a first conversation participant's motionless silence, or a first conversation participant's absence from the conversation and the second conversation participant's first conversational activity includes a second conversation participant's speaking. In further embodiments, the first conversation participant's first conversational activity includes a first conversation participant's speaking and the second conversation participant's first conversational activity includes a second conversation participant's speaking. In further embodiments, the first conversation participant's first conversational activity includes a first conversation participant's silent facial expression, a first conversation participant's silent body movement, a first conversation participant's motionless silence, or a first conversation participant's absence from the conversation and the second conversation participant's first conversational activity includes a second conversation participant's silent facial expression, a second conversation participant's silent body movement, a second conversation participant's motionless silence, or a second conversation participant's absence from the conversation.

In some embodiments, the timing of the first conversation participant's first conversational activity coincides, partially coincides, or overlaps with the timing of the second conversation participant's first conversational activity. In further embodiments, the detecting the first conversation participant's first conversational activity includes recognizing the first conversation participant's visual and verbal expressions or communication in a first part of a conversation.

In certain embodiments, the detecting the first conversation participant's first conversational activity includes identifying a parallel sub-stream of the stream of digital pictures of the first and the second conversation participants, wherein the parallel sub-stream of the stream of digital pictures of the first and the second conversation participants comprises the first conversation participant's visual expressions or communication in a first part of a conversation. In further embodiments, the detecting the first conversation participant's first conversational activity includes identifying a parallel sub-stream of the stream of digital sound samples of the first and the second conversation participants, wherein the parallel sub-stream of the stream of digital sound samples of the first and the second conversation participants comprises the first conversation participant's verbal expressions or communication in a first part of a conversation.

In some embodiments, the detecting the second conversation participant's first conversational activity includes recognizing the second conversation participant's visual and verbal expressions or communication in a first part of a conversation. In further embodiments, the detecting the second conversation participant's first conversational activity includes identifying a parallel sub-stream of the stream of digital pictures of the first and the second conversation participants, wherein the parallel sub-stream of the stream of digital pictures of the first and the second conversation participants comprises the second conversation participant's visual expressions or communication in a first part of a conversation. In further embodiments, the detecting the second conversation participant's first conversational activity includes identifying a parallel sub-stream of the stream of digital sound samples of the first and the second conversation participants, wherein the parallel sub-stream of the stream of digital sound samples of the first and the second conversation participants comprises the second conversation participant's verbal expressions or communication in a first part of a conversation.

In certain embodiments, the detecting the first conversation participant's first conversational activity includes recognizing the first conversation participant's speech or sound in the stream of digital sound samples of the first and the second conversation participants. In further embodiments, the recognizing the first conversation participant's speech or sound includes utilizing at least one of: a speaker dependent speech recognition, or a speech or sound segmentation. In further embodiments, the detecting the second conversation participant's first conversational activity includes recognizing the second conversation participant's speech or sound in the stream of digital sound samples of the first and the second conversation participants. In further embodiments, the recognizing the second conversation participant's speech or sound includes utilizing at least one of: a speaker dependent speech recognition, or a speech or sound segmentation. In further embodiments, the detecting the first conversation participant's first conversational activity includes recognizing the first conversation participant's face or body part in the stream of digital pictures of the first and the second conversation participants. In further embodiments, the recognizing the first conversation participant's face or body part includes utilizing a picture segmentation. In further embodiments, the detecting the second conversation participant's first conversational activity includes recognizing the second conversation participant's face or body part in the stream of digital pictures of the first and the second conversation participants. In further embodiments, the recognizing the second conversation participant's face or body part includes utilizing a picture segmentation. In further embodiments, the detecting the first conversation participant's first conversational activity includes determining a beginning and an end of the first conversation participant's first conversational activity. In further embodiments, the detecting the second conversation participant's first conversational activity includes determining a beginning and an end of the second conversation participant's first conversational activity.

In some embodiments, the recording of the first conversation participant's first conversational activity includes the first conversation participant's visual expressions or communication in a first part of a conversation and the first conversation participant's verbal expressions or communication in the first part of the conversation. In further embodiments, the recording of the first conversation participant's first conversational activity includes a parallel sub-stream of the stream of digital pictures of the first and the second conversation participants and a parallel sub-stream of the stream of digital sound samples of the first and the second conversation participants. In further embodiments, the parallel sub-stream of the stream of digital pictures of the first and the second conversation participants comprises the first conversation participant's visual expressions or communication in a first part of a conversation and the parallel sub-stream of the stream of digital sound samples of the first and the second conversation participants comprises the first conversation participant's verbal expressions or communication in the first part of the conversation.

In certain embodiments, the recording of the second conversation participant's first conversational activity includes the second conversation participant's visual expressions or communication in a first part of a conversation and the second conversation participant's verbal expressions or communication in the first part of the conversation. In further embodiments, the recording of the second conversation participant's first conversational activity includes a parallel sub-stream of the stream of digital pictures of the first and the second conversation participants and a parallel sub-stream of the stream of digital sound samples of the first and the second conversation participants. In further embodiments, the parallel sub-stream of the stream of digital pictures of the first and the second conversation participants comprises the second conversation participant's visual expressions or communication in a first part of a conversation and the parallel sub-stream of the stream of digital sound samples of the first and the second conversation participants comprises the second conversation participant's verbal expressions or communication in the first part of the conversation.

In some embodiments, the one or more processor circuits may be further configured to: compare the first round of conversational exchange with the stored plurality of rounds of conversational exchange, and determine that the stored plurality of rounds of conversational exchange do not include a round of conversational exchange whose similarity with the first round of conversational exchange exceeds a similarity threshold.

In certain embodiments, the one or more processor circuits may be further configured to: detect the first conversation participant's second conversational activity from at least one of the stream of digital pictures of the first and the second conversation participants or the stream of digital sound samples of the first and the second conversation participants. The one or more processor circuits may be further configured to: detect the second conversation participant's second conversational activity from at least one of the stream of digital pictures of the first and the second conversation participants or the stream of digital sound samples of the first and the second conversation participants. The one or more processor circuits may be further configured to: generate a second round of conversational exchange including the first conversation participant's second conversational activity and the second conversation participant's second conversational activity. The one or more processor circuits may be further configured to: cause the memory unit to store the second round of conversational exchange, the second round of conversational exchange being part of the stored plurality of rounds of conversational exchange. The one or more processor circuits may be further configured to: create a connection between the stored first round of conversational exchange and the stored second round of conversational exchange. The one or more processor circuits may be further configured to: compare the second round of conversational exchange with the stored plurality of rounds of conversational exchange, and determine that the stored plurality of rounds of conversational exchange do not include a round of conversational exchange whose similarity with the second round of conversational exchange exceeds a similarity threshold.

In some embodiments, the one or more processor circuits may be further configured to: detect the first conversation participant's third conversational activity from at least one of the stream of digital pictures of the first and the second conversation participants or the stream of digital sound samples of the first and the second conversation participants. The one or more processor circuits may be further configured to: detect the second conversation participant's third conversational activity from at least one of the stream of digital pictures of the first and the second conversation participants or the stream of digital sound samples of the first and the second conversation participants. The one or more processor circuits may be further configured to: generate a third round of conversational exchange including the first conversation participant's third conversational activity and the second conversation participant's third conversational activity. The one or more processor circuits may be further configured to: compare the third round of conversational exchange with the stored plurality of rounds of conversational exchange. The one or more processor circuits may be further configured to: determine that the stored plurality of rounds of conversational exchange include a round of conversational exchange whose similarity with the third round of conversational exchange exceeds a similarity threshold. The one or more processor circuits may be further configured to: update a connection between the stored first round of conversational exchange and the round of conversational exchange whose similarity with the third round of conversational exchange exceeds a similarity threshold.

In certain embodiments, the one or more processor circuits may be further configured to: filter the first and the second conversation participants' faces or body parts from the stream of digital pictures of the first and the second conversation participants. The one or more processor circuits may be further configured to: the filtering the first and the second conversation participants' faces or body parts from the stream of digital pictures of the first and the second conversation participants includes retaining the first and the second conversation participants' faces or body parts and removing an insignificant content from the stream of digital pictures of the first and the second conversation participants.

In some embodiments, the one or more processor circuits may be further configured to: filter the first and the second conversation participants' speeches or sounds from the stream of digital sound samples of the first and the second conversation participants. The one or more processor circuits may be further configured to: the filtering the first and the second conversation participants' speeches or sounds from the stream of digital sound samples of the first and the second conversation participants includes retaining the first and the second conversation participants' speeches or sounds and removing an insignificant sound from the stream of digital sound samples of the first and the second conversation participants.

In some aspects, the disclosure relates to a non-transitory computer storage medium having a computer program stored thereon, the program comprising instructions that when executed by one or more computing devices cause the one or more computing devices to perform operations comprising: capturing a stream of digital pictures of a first and a second conversation participants by a picture-capturing device. The operations may further include capturing a stream of digital sound samples of the first and the second conversation participants by a sound-capturing device. The operations may further include detecting the first conversation participant's first conversational activity from at least one of the stream of digital pictures of the first and the second conversation participants or the stream of digital sound samples of the first and the second conversation participants. The operations may further include detecting the second conversation participant's first conversational activity from at least one of the stream of digital pictures of the first and the second conversation participants or the stream of digital sound samples of the first and the second conversation participants. The operations may further include generating a first round of conversational exchange including a recording of the first conversation participant's first conversational activity and a recording of the second conversation participant's first conversational activity. The operations may further include storing the first round of conversational exchange into a memory unit, the first round of conversational exchange being part of a stored plurality of rounds of conversational exchange.

In some aspects, the disclosure relates to a method comprising: (a) capturing a stream of digital pictures of a first and a second conversation participants by a picture-capturing device. The method may further include (b) capturing a stream of digital sound samples of the first and the second conversation participants by a sound-capturing device. The method may further include (c) detecting the first conversation participant's first conversational activity from at least one of the stream of digital pictures of the first and the second conversation participants or the stream of digital sound samples of the first and the second conversation participants, the detecting of (c) performed by one or more processor circuits. The method may further include (d) detecting the second conversation participant's first conversational activity from at least one of the stream of digital pictures of the first and the second conversation participants or the stream of digital sound samples of the first and the second conversation participants, the detecting of (d) performed by the one or more processor circuits. The method may further include (e) generating a first round of conversational exchange including a recording of the first conversation participant's first conversational activity and a recording of the second conversation participant's first conversational activity, the generating of (e) performed by the one or more processor circuits. The method may further include (f) storing the first round of conversational exchange into a memory unit, the first round of conversational exchange being part of a stored plurality of rounds of conversational exchange, the storing of (f) caused by the one or more processor circuits.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In certain embodiments, the one or more processor circuits, the memory unit, the picture-capturing device, and the sound-capturing device of the system are included in a single device. In further embodiments, at least one of: the one or more processor circuits or the memory unit of the system are included in a server, and wherein the picture-capturing device and the sound-capturing device of the system are included in a computing device, the computing device coupled to the server via a network.

In some embodiments, the stream of digital pictures of the first and the second conversation participants includes the first and the second conversation participants' visual expressions or communication. In further embodiments, the stream of digital sound samples of the first and the second conversation participants includes the first and the second conversation participants' verbal expressions or communication. In further embodiments, the stream of digital pictures of the first and the second conversation participants and the stream of digital sound samples of the first and the second conversation participants are captured simultaneously.

In certain embodiments, the first conversation participant's first conversational activity or the second conversation participant's first conversational activity includes at least one of: a speaking, a silent facial expression, a silent body movement, a motionless silence, an absence from the conversation, or a conversational action. In further embodiments, the first conversation participant's first conversational activity includes a first conversation participant's speaking and the second conversation participant's first conversational activity includes a second conversation participant's silent facial expression, a second conversation participant's silent body movement, a second conversation participant's motionless silence, or a second conversation participant's absence from the conversation. In further embodiments, the detecting the first conversation participant's speaking includes recognizing the first conversation participant's speech in the stream of digital sound samples of the first and the second conversation participants. In further embodiments, the detecting the first conversation participant's speaking includes determining a beginning and an end of the first conversation participant's speaking. The determining the beginning of the first conversation participant's speaking may include recognizing the first conversation participant's speech after a threshold period of silence in the stream of digital sound samples of the first and the second conversation participants. The determining the end of the first conversation participant's speaking may include recognizing a threshold period of silence after the first conversation participant's speech in the stream of digital sound samples of the first and the second conversation participants. In further embodiments, the detecting the second conversation participant's silent facial expression includes recognizing the second conversation participant's facial expression in the stream of digital pictures of the first and the second conversation participants and recognizing the second conversation participant's silence in the stream of digital sound samples of the first and the second conversation participants. In further embodiments, the detecting the second conversation participant's silent body movement includes recognizing the second conversation participant's body movement in the stream of digital pictures of the first and the second conversation participants and recognizing the second conversation participant's silence in the stream of digital sound samples of the first and the second conversation participants. In further embodiments, the detecting the second conversation participant's motionless silence includes recognizing no motion or a marginal motion of the second conversation participant in the stream of digital pictures of the first and the second conversation participants and recognizing the second conversation participant's silence in the stream of digital sound samples of the first and the second conversation participants. The marginal motion of the second conversation participant may include a motion of the second conversation participant that does not exceed a threshold for motion. In further embodiments, the detecting the second conversation participant's absence from the conversation includes recognizing the second conversation participant's absence in the stream of digital pictures of the first and the second conversation participants. In further embodiments, the first conversation participant's first conversational activity includes a first conversation participant's silent facial expression, a first conversation participant's silent body movement, a first conversation participant's motionless silence, or a first conversation participant's absence from the conversation and the second conversation participant's first conversational activity includes a second conversation participant's speaking. In further embodiments, the first conversation participant's first conversational activity includes a first conversation participant's speaking and the second conversation participant's first conversational activity includes a second conversation participant's speaking. In further embodiments, the first conversation participant's first conversational activity includes a first conversation participant's silent facial expression, a first conversation participant's silent body movement, a first conversation participant's motionless silence, or a first conversation participant's absence from the conversation and the second conversation participant's first conversational activity includes a second conversation participant's silent facial expression, a second conversation participant's silent body movement, a second conversation participant's motionless silence, or a second conversation participant's absence from the conversation. In further embodiments, the timing of the first conversation participant's first conversational activity coincides, partially coincides, or overlaps with the timing of the second conversation participant's first conversational activity.

In certain embodiments, the detecting the first conversation participant's first conversational activity includes recognizing the first conversation participant's visual and verbal expressions or communication in a first part of a conversation. In further embodiments, the detecting the first conversation participant's first conversational activity includes identifying a parallel sub-stream of the stream of digital pictures of the first and the second conversation participants, wherein the parallel sub-stream of the stream of digital pictures of the first and the second conversation participants comprises the first conversation participant's visual expressions or communication in a first part of a conversation. In further embodiments, the detecting the first conversation participant's first conversational activity includes identifying a parallel sub-stream of the stream of digital sound samples of the first and the second conversation participants, wherein the parallel sub-stream of the stream of digital sound samples of the first and the second conversation participants comprises the first conversation participant's verbal expressions or communication in a first part of a conversation.

In some embodiments, the detecting the second conversation participant's first conversational activity includes recognizing the second conversation participant's visual and verbal expressions or communication in a first part of a conversation. In further embodiments, the detecting the second conversation participant's first conversational activity includes identifying a parallel sub-stream of the stream of digital pictures of the first and the second conversation participants, wherein the parallel sub-stream of the stream of digital pictures of the first and the second conversation participants comprises the second conversation participant's visual expressions or communication in a first part of a conversation. In further embodiments, the detecting the second conversation participant's first conversational activity includes identifying a parallel sub-stream of the stream of digital sound samples of the first and the second conversation participants, wherein the parallel sub-stream of the stream of digital sound samples of the first and the second conversation participants comprises the second conversation participant's verbal expressions or communication in a first part of a conversation.

In certain embodiments, the detecting the first conversation participant's first conversational activity includes recognizing the first conversation participant's speech or sound in the stream of digital sound samples of the first and the second conversation participants. In further embodiments, wherein the recognizing the first conversation participant's speech or sound includes utilizing at least one of: a speaker dependent speech recognition, or a speech or sound segmentation. In further embodiments, the detecting the second conversation participant's first conversational activity includes recognizing the second conversation participant's speech or sound in the stream of digital sound samples of the first and the second conversation participants. In further embodiments, the recognizing the second conversation participant's speech or sound includes utilizing at least one of: a speaker dependent speech recognition, or a speech or sound segmentation. In further embodiments, the detecting the first conversation participant's first conversational activity includes recognizing the first conversation participant's face or body part in the stream of digital pictures of the first and the second conversation participants. In further embodiments, the recognizing the first conversation participant's face or body part includes utilizing a picture segmentation.

In further embodiments, the detecting the second conversation participant's first conversational activity includes recognizing the second conversation participant's face or body part in the stream of digital pictures of the first and the second conversation participants. In further embodiments, the recognizing the second conversation participant's face or body part includes utilizing a picture segmentation. In further embodiments, the detecting the first conversation participant's first conversational activity includes determining a beginning and an end of the first conversation participant's first conversational activity. In further embodiments, the detecting the second conversation participant's first conversational activity includes determining a beginning and an end of the second conversation participant's first conversational activity.

In some embodiments, the recording of the first conversation participant's first conversational activity includes the first conversation participant's visual expressions or communication in a first part of a conversation and the first conversation participant's verbal expressions or communication in the first part of the conversation. In further embodiments, the recording of the first conversation participant's first conversational activity includes a parallel sub-stream of the stream of digital pictures of the first and the second conversation participants and a parallel sub-stream of the stream of digital sound samples of the first and the second conversation participants. In further embodiments, the parallel sub-stream of the stream of digital pictures of the first and the second conversation participants comprises the first conversation participant's visual expressions or communication in a first part of a conversation and the parallel sub-stream of the stream of digital sound samples of the first and the second conversation participants comprises the first conversation participant's verbal expressions or communication in the first part of the conversation.

In certain embodiments, the recording of the second conversation participant's first conversational activity includes the second conversation participant's visual expressions or communication in a first part of a conversation and the second conversation participant's verbal expressions or communication in the first part of the conversation. In further embodiments, the recording of the second conversation participant's first conversational activity includes a parallel sub-stream of the stream of digital pictures of the first and the second conversation participants and a parallel sub-stream of the stream of digital sound samples of the first and the second conversation participants. In further embodiments, the parallel sub-stream of the stream of digital pictures of the first and the second conversation participants comprises the second conversation participant's visual expressions or communication in a first part of a conversation and the parallel sub-stream of the stream of digital sound samples of the first and the second conversation participants comprises the second conversation participant's verbal expressions or communication in the first part of the conversation.

In some embodiments, the non-transitory computer storage medium and/or the method further comprise: comparing the first round of conversational exchange with the stored plurality of rounds of conversational exchange, the comparing performed by the one or more processor circuits, and determining that the stored plurality of rounds of conversational exchange do not include a round of conversational exchange whose similarity with the first round of conversational exchange exceeds a similarity threshold, the determining performed by the one or more processor circuits.

In certain embodiments, the non-transitory computer storage medium and/or the method further comprise: detecting the first conversation participant's second conversational activity from at least one of the stream of digital pictures of the first and the second conversation participants or the stream of digital sound samples of the first and the second conversation participants, the detecting performed by the one or more processor circuits. The non-transitory computer storage medium and/or the method further comprise: detecting the second conversation participant's second conversational activity from at least one of the stream of digital pictures of the first and the second conversation participants or the stream of digital sound samples of the first and the second conversation participants, the detecting performed by the one or more processor circuits. The non-transitory computer storage medium and/or the method further comprise: generating a second round of conversational exchange including the first conversation participant's second conversational activity and the second conversation participant's second conversational activity, the generating performed by the one or more processor circuits. The non-transitory computer storage medium and/or the method further comprise: storing the second round of conversational exchange into a memory unit, the second round of conversational exchange being part of the stored plurality of rounds of conversational exchange, the storing caused by the one or more processor circuits. The non-transitory computer storage medium and/or the method further comprise: creating a connection between the stored first round of conversational exchange and the stored second round of conversational exchange, the creating performed by the one or more processor circuits. The non-transitory computer storage medium and/or the method further comprise: comparing the second round of conversational exchange with the stored plurality of rounds of conversational exchange, the comparing performed by the one or more processor circuits, and determining that the stored plurality of rounds of conversational exchange do not include a round of conversational exchange whose similarity with the second round of conversational exchange exceeds a similarity threshold, the determining performed by the one or more processor circuits.

In certain embodiments, the non-transitory computer storage medium and/or the method further comprise: detecting the first conversation participant's third conversational activity from at least one of the stream of digital pictures of the first and the second conversation participants or the stream of digital sound samples of the first and the second conversation participants, the detecting performed by the one or more processor circuits. The non-transitory computer storage medium and/or the method further comprise: detecting the second conversation participant's third conversational activity from at least one of the stream of digital pictures of the first and the second conversation participants or the stream of digital sound samples of the first and the second conversation participants, the detecting performed by the one or more processor circuits. The non-transitory computer storage medium and/or the method further comprise: generating a third round of conversational exchange including the first conversation participant's third conversational activity and the second conversation participant's third conversational activity, the generating performed by the one or more processor circuits. The non-transitory computer storage medium and/or the method further comprise: comparing the third round of conversational exchange with the stored plurality of rounds of conversational exchange, the comparing performed by the one or more processor circuits. The non-transitory computer storage medium and/or the method further comprise: determining that the stored plurality of rounds of conversational exchange include a round of conversational exchange whose similarity with the third round of conversational exchange exceeds a similarity threshold, the determining performed by the one or more processor circuits. The non-transitory computer storage medium and/or the method further comprise: updating a connection between the stored first round of conversational exchange and the round of conversational exchange whose similarity with the third round of conversational exchange exceeds a similarity threshold, the updating performed by the one or more processor circuits.

In some embodiments, the non-transitory computer storage medium and/or the method further comprise: filtering the first and the second conversation participants' faces or body parts from the stream of digital pictures of the first and the second conversation participants, the filtering performed by the one or more processor circuits. In further embodiments, the filtering the first and the second conversation participants' faces or body parts from the stream of digital pictures of the first and the second conversation participants includes retaining the first and the second conversation participants' faces or body parts and removing an insignificant content from the stream of digital pictures of the first and the second conversation participants.

In certain embodiments, the non-transitory computer storage medium and/or the method further comprise: filtering the first and the second conversation participants' speeches or sounds from the stream of digital sound samples of the first and the second conversation participants, the filtering performed by the one or more processor circuits. In further embodiments, the filtering the first and the second conversation participants' speeches or sounds from the stream of digital sound samples of the first and the second conversation participants includes retaining the first and the second conversation participants' speeches or sounds and removing an insignificant sound from the stream of digital sound samples of the first and the second conversation participants.

In some aspects, the disclosure relates to a system for learning artificially intelligent interactive memories. The system may be implemented at least in part on one or more computing devices. In some embodiments, the system comprises one or more processor circuits coupled to a memory unit. The system may further include a first picture-capturing device configured to capture a stream of digital pictures of a first conversation participant and a second picture-capturing device configured to capture a stream of digital pictures of a second conversation participant, the first and the second picture-capturing devices coupled to the one or more processor circuits. The system may further include a first sound-capturing device configured to capture a stream of digital sound samples of the first conversation participant and a second sound-capturing device configured to capture a stream of digital sound samples of the second conversation participant, the first and the second sound-capturing devices coupled to the one or more processor circuits. The one or more processor circuits may be configured to: detect the first conversation participant's first and second conversational activities from at least one of the stream of digital pictures of the first conversation participant or the stream of digital sound samples of the first conversation participant. The one or more processor circuits may be further configured to: detect the second conversation participant's first and second conversational activities from at least one of the stream of digital pictures of the second conversation participant or the stream of digital sound samples of the second conversation participant. The one or more processor circuits may be further configured to: generate a first round of conversational exchange including recordings of the first conversation participant's first and second conversational activities and recordings of the second conversation participant's first and second conversational activities. The one or more processor circuits may be further configured to: cause the memory unit to store the first round of conversational exchange, the first round of conversational exchange being part of a stored plurality of rounds of conversational exchange.

In some aspects, the disclosure relates to a non-transitory computer storage medium having a computer program stored thereon, the program comprising instructions that when executed by one or more computing devices cause the one or more computing devices to perform operations comprising: capturing a stream of digital pictures of a first conversation participant by a first picture-capturing device. The operations may further include capturing a stream of digital sound samples of the first conversation participant by a first sound-capturing device. The operations may further include capturing a stream of digital pictures of a second conversation participant by a second picture-capturing device. The operations may further include capturing a stream of digital sound samples of the second conversation participant by a second sound-capturing device. The operations may further include detecting the first conversation participant's first and second conversational activities from at least one of the stream of digital pictures of the first conversation participant or the stream of digital sound samples of the first conversation participant. The operations may further include detecting the second conversation participant's first and second conversational activities from at least one of the stream of digital pictures of the second conversation participant or the stream of digital sound samples of the second conversation participant. The operations may further include generating a first round of conversational exchange including recordings of the first conversation participant's first and second conversational activities and recordings of the second conversation participant's first and second conversational activities. The operations may further include storing the first round of conversational exchange into a memory unit, the first round of conversational exchange being part of a stored plurality of rounds of conversational exchange.

In some aspects, the disclosure relates to a method comprising: (a) capturing a stream of digital pictures of a first conversation participant by a first picture-capturing device. The method may further include (b) capturing a stream of digital sound samples of the first conversation participant by a first sound-capturing device. The method may further include (c) capturing a stream of digital pictures of a second conversation participant by a second picture-capturing device. The method may further include (d) capturing a stream of digital sound samples of the second conversation participant by a second sound-capturing device. The method may further include (e) detecting the first conversation participant's first and second conversational activities from at least one of the stream of digital pictures of the first conversation participant or the stream of digital sound samples of the first conversation participant, the detecting of (e) performed by one or more processor circuits. The method may further include (f) detecting the second conversation participant's first and second conversational activities from at least one of the stream of digital pictures of the second conversation participant or the stream of digital sound samples of the second conversation participant, the detecting of (f) performed by the one or more processor circuits. The method may further include (g) generating a first round of conversational exchange including recordings of the first conversation participant's first and second conversational activities and recordings of the second conversation participant's first and second conversational activity, the generating of (g) performed by the one or more processor circuits. The method may further include (h) storing the first round of conversational exchange into a memory unit, the first round of conversational exchange being part of a stored plurality of rounds of conversational exchange, the storing of (h) caused by the one or more processor circuits.

The operations or steps of the non-transitory computer storage medium and/or the method may be performed by any of the elements of the above described system as applicable. The non-transitory computer storage medium and/or the method may include any of the operations, steps, and embodiments of the above described system as applicable.

In some aspects, the disclosure relates to a system for using artificially intelligent interactive memories. The system may be implemented at least in part on one or more computing devices. In some embodiments, the system comprises a server including one or more processor circuits. The system may further include a memory unit, coupled to the one or more processor circuits, that stores a plurality of rounds of conversational exchange including a first round of conversational exchange, the first round of conversational exchange comprising a recording of a first conversation participant's first conversational activity and a recording of a second conversation participant's first conversational activity. The system may further include a user's computing device including a picture-capturing device configured to capture a stream of digital pictures of the user and include a sound-capturing device configured to capture a stream of digital sound samples of the user, the user's computing device coupled to the server via a network. The one or more processor circuits may be configured to: detect the user's first conversational activity from at least one of the stream of digital pictures of the user or the stream of digital sound samples of the user. The one or more processor circuits may be further configured to: compare at least one portion of a recording of the user's first conversational activity with at least one portion of the recording of the first conversation participant's first conversational activity. The one or more processor circuits may be further configured to: determine that a similarity between at least one portion of the recording of the user's first conversational activity and at least one portion of the recording of the first conversation participant's first conversational activity exceeds a similarity threshold. The one or more processor circuits may be further configured to: cause a display and a sound-producing device of the user's computing device to play at least one portion of the recording of the second conversation participant's first conversational activity.

In certain embodiments, the recording of the first conversation participant's first conversational activity includes the first conversation participant's visual expressions or communication in a first part of a conversation and the first conversation participant's verbal expressions or communication in the first part of the conversation. In further embodiments, the recording of the first conversation participant's first conversational activity includes a first sub-stream of a stream of digital pictures of the first conversation participant and a first sub-stream of a stream of digital sound samples of the first conversation participant. In further embodiments, the first sub-stream of the stream of digital pictures of the first conversation participant comprises the first conversation participant's visual expressions or communication in a first part of a conversation and the first sub-stream of the stream of digital sound samples of the first conversation participant comprises the first conversation participant's verbal expressions or communication in the first part of the conversation. In further embodiments, the recording of the second conversation participant's first conversational activity includes the second conversation participant's visual expressions or communication in a first part of a conversation and the second conversation participant's verbal expressions or communication in the first part of the conversation. In further embodiments, the recording of the second conversation participant's first conversational activity includes a first sub-stream of a stream of digital pictures of the second conversation participant and a first sub-stream of a stream of digital sound samples of the second conversation participant. In further embodiments, the first sub-stream of the stream of digital pictures of the second conversation participant comprises the second conversation participant's visual expressions or communication in a first part of a conversation and the first sub-stream of the stream of digital sound samples of the second conversation participant comprises the second conversation participant's verbal expressions or communication in the first part of the conversation. In further embodiments, the recording of the first conversation participant's first conversational activity or the recording of the second conversation participant's first conversational activity includes or is associated with an extra information, the extra information comprising a time information, a location information, an observed information, or a contextual information.

In some embodiments, the first round of conversational exchange includes a unit of knowledge of how the first conversation participant acted relative to the second conversation participant in a first part of a conversation and how the second conversation participant acted relative to the first conversation participant in the first part of the conversation. In further embodiments, the first round of conversational exchange includes or is associated with an extra information, the extra information comprising a time information, a location information, an observed information, or a contextual information. In further embodiments, the recording of the first conversation participant's first conversational activity is correlated with the recording of the second conversation participant's first conversational activity.

In certain embodiments, the stored plurality of rounds of conversational exchange are organized into at least one of: a neural network, a graph, a collection of sequences, a sequence, a knowledgebase, a knowledge structure, or a data structure. In further embodiments, each round of conversational exchange of the stored plurality of rounds of conversational exchange is included in a neuron, a node, a vertex, or an element of a neural network, a graph, a collection of sequences, a sequence, a knowledgebase, a knowledge structure, or a data structure. In further embodiments, some rounds of conversational exchange of the stored plurality of rounds of conversational exchange are interconnected.

In some embodiments, the picture-capturing device includes a motion picture camera. In further embodiments, the stream of digital pictures of the user includes the user's visual expressions or communication. In further embodiments, the stream of digital pictures of the user includes a digital motion picture. The digital motion picture may include a MPEG motion picture, an AVI motion picture, a FLV motion picture, a MOV motion picture, a RM motion picture, a SWF motion picture, a WMV motion picture, a DivX motion picture, or a digitally encoded motion picture. In further embodiments, the stream of digital pictures of the user includes or is associated with an extra information, the extra information comprising a time information, a location information, an observed information, or a contextual information.

In certain embodiments, the sound-capturing device includes a microphone. In further embodiments, the stream of digital sound samples of the user includes the user's verbal expressions or communication. In further embodiments, the stream of digital sound samples of the user includes a digital sound. The digital sound may include a WAV digital sound, a WMA digital sound, an AIFF digital sound, a MP3 digital sound, a RA digital sound, a OGG digital sound, or a digitally encoded sound. In further embodiments, the stream of digital sound samples of the user includes or is associated with an extra information, the extra information comprising a time information, a location information, an observed information, or a contextual information. In further embodiments, the stream of digital pictures of the user and the stream of digital sound samples of the user are captured simultaneously.

In some embodiments, the user's first conversational activity includes at least one of: a user's speaking, a users silent facial expression, a user's silent body movement, a user's motionless silence, a user's absence from the conversation, or a user's conversational action. In further embodiments, the detecting the user's speaking includes recognizing the users speech in the stream of digital sound samples of the user. In further embodiments, the detecting the user's speaking includes determining a beginning and an end of the user's speaking. The determining the beginning of the user's speaking may include recognizing the user's speech after a threshold period of silence in the stream of digital sound samples of the user. The determining the end of the user's speaking may include recognizing a threshold period of silence after the users speech in the stream of digital sound samples of the user. In further embodiments, the detecting the user's silent facial expression includes recognizing the user's facial expression in the stream of digital pictures of the user and recognizing the user's silence in the stream of digital sound samples of the user. In further embodiments, the detecting the user's silent body movement includes recognizing the user's body movement in the stream of digital pictures of the user and recognizing the user's silence in the stream of digital sound samples of the user. In further embodiments, the detecting the user's motionless silence includes recognizing no motion or a marginal motion of the user in the stream of digital pictures of the user and recognizing the user's silence in the stream of digital sound samples of the user. The marginal motion of the user may include a motion of the user that does not exceed a threshold for motion. In further embodiments, the detecting the user's absence from the conversation includes recognizing the user's absence in the stream of digital pictures of the user. In further embodiments, the detecting the user's first conversational activity includes recognizing the user's visual and verbal expressions or communication in a first part of a simulated conversation. In further embodiments, the detecting the user's first conversational activity includes identifying a first sub-stream of the stream of digital pictures of the user, wherein the first sub-stream of the stream of digital pictures of the user comprises the user's visual expressions or communication in a first part of a simulated conversation. In further embodiments, the detecting the user's first conversational activity includes identifying a first sub-stream of the stream of digital sound samples of the user, wherein the first sub-stream of the stream of digital sound samples of the user comprises the user's verbal expressions or communication in a first part of a simulated conversation.

In certain embodiments, the detecting the user's first conversational activity includes recognizing the user's speech or sound in the stream of digital sound samples of the user. In further embodiments, the detecting the user's first conversational activity includes recognizing the user's face or body part in the stream of digital pictures of the user. In further embodiments, the detecting the user's first conversational activity includes determining a beginning and an end of the user's first conversational activity.

In some embodiments, the recording of the user's first conversational activity includes the user's visual expressions or communication in a first part of a simulated conversation and the user's verbal expressions or communication in the first part of the simulated conversation.

In certain embodiments, the recording of the user's first conversational activity includes a first sub-stream of the stream of digital sound samples of the user and the recording of the first conversation participant's first conversational activity includes a first sub-stream of a stream of digital sound samples of the first conversation participant, wherein the comparing at least one portion of the recording of the user's first conversational activity with at least one portion of the recording of the first conversation participant's first conversational activity includes comparing at least one portion of the first sub-stream of the stream of digital sound samples of the user with at least one portion of the first sub-stream of the stream of digital sound samples of the first conversation participant. In further embodiments, the portion of the first sub-stream of the stream of digital sound samples of the user includes one or more words, one or more features, or one or more sound samples of the first sub-stream of the stream of digital sound samples of the user. In further embodiments, the portion of the first sub-stream of the stream of digital sound samples of the first conversation participant includes one or more words, one or more features, or one or more sound samples of the first sub-stream of a stream of digital sound samples of the first conversation participant.

In some embodiments, In further embodiments, the comparing at least one portion of the recording of the user's first conversational activity with at least one portion of the recording of the first conversation participant's first conversational activity includes comparing at least one word recognized from the recording of the user's first conversational activity with at least one word recognized from the recording of the first conversation participant's first conversational activity. In further embodiments, the comparing at least one portion of the recording of the user's first conversational activity with at least one portion of the recording of the first conversation participant's first conversational activity includes comparing at least one sound feature from the recording of the user's first conversational activity with at least one sound feature from the recording of the first conversation participant's first conversational activity. In further embodiments, the comparing at least one portion of the recording of the user's first conversational activity with at least one portion of the recording of the first conversation participant's first conversational activity includes comparing at least one sound sample from the recording of the user's first conversational activity with at least one sound sample from the recording of the first conversation participant's first conversational activity. In further embodiments, the comparing at least one portion of the recording of the user's first conversational activity with at least one portion of the recording of the first conversation participant's first conversational activity includes performing at least one of: amplitude adjustment, sample rate adjustment, noise reduction, or temporal alignment of one or more sound samples in the recording of the user's first conversational activity or the recording of the first conversation participant's first conversational activity.

In some embodiments, the recording of the user's first conversational activity includes a first sub-stream of the stream of digital sound samples of the user and the recording of the first conversation participant's first conversational activity includes a first sub-stream of a stream of digital sound samples of the first conversation participant, wherein the comparing at least one portion of the recording of the user's first conversational activity with at least one portion of the recording of the first conversation participant's first conversational activity includes performing at least one of: amplitude adjustment, sample rate adjustment, noise reduction, or temporal alignment in the first sub-stream of the stream of digital sound samples of the user or the first sub-stream of the stream of digital sound samples of the first conversation participant. In further embodiments, the recording of the user's first conversational activity includes a first sub-stream of the stream of digital pictures of the user and the recording of the first conversation participant's first conversational activity includes a first sub-stream of a stream of digital pictures of the first conversation participant, wherein the comparing at least one portion of the recording of the user's first conversational activity with at least one portion of the recording of the first conversation participant's first conversational activity includes comparing at least one portion of the first sub-stream of the stream of digital pictures of the user with at least one portion of the first sub-stream of the stream of digital pictures of the first conversation participant. In further embodiments, the portion of the first sub-stream of the stream of digital pictures of the user includes one or more pictures, one or more regions of a picture, one or more features of a picture, or one or more pixels of a picture of the first sub-stream of the stream of digital pictures of the user. In further embodiments, the portion of the first sub-stream of the stream of digital pictures of the first conversation participant includes one or more pictures, one or more regions of a picture, one or more features of a picture, or one or more pixels of a picture of the first sub-stream of the stream of digital pictures of the first conversation participant. In further embodiments, the comparing at least one portion of the recording of the user's first conversational activity with at least one portion of the recording of the first conversation participant's first conversational activity includes comparing at least one picture from the recording of the user's first conversational activity with at least one picture from the recording of the first conversation participant's first conversational activity. In further embodiments, the comparing at least one portion of the recording of the user's first conversational activity with at least one portion of the recording of the first conversation participant's first conversational activity includes comparing at least one region of a picture from the recording of the user's first conversational activity with at least one region of a picture from the recording of the first conversation participant's first conversational activity. In further embodiments, the comparing at least one portion of the recording of the user's first conversational activity with at least one portion of the recording of the first conversation participant's first conversational activity includes comparing at least one picture feature from the recording of the user's first conversational activity with at least one picture feature from the recording of the first conversation participant's first conversational activity. In further embodiments, the comparing at least one portion of a recording of the user's first conversational activity with at least one portion of the recording of the first conversation participant's first conversational activity includes comparing at least one pixel from the recording of the user's first conversational activity with at least one pixel from the recording of the first conversation participant's first conversational activity. In further embodiments, the comparing at least one portion of the recording of the user's first conversational activity with at least one portion of the recording of the first conversation participant's first conversational activity includes performing at least one of: color adjustment, size adjustment, transparency utilization, mask utilization, or temporal alignment of one or more pictures in the recording of the user's first conversational activity or the recording of the first conversation participant's first conversational activity.

In certain embodiments, the recording of the user's first conversational activity includes a first sub-stream of the stream of digital pictures of the user and the recording of the first conversation participant's first conversational activity includes a first sub-stream of a stream of digital pictures of the first conversation participant, wherein the comparing at least one portion of the recording of the user's first conversational activity with at least one portion of the recording of the first conversation participant's first conversational activity includes performing at least one of: color adjustment, size adjustment, transparency utilization, mask utilization, or temporal alignment in the first sub-stream of the stream of digital pictures of the user or the first sub-stream of the stream of digital pictures of the first conversation participant.

In certain embodiments, the comparing at least one portion of the recording of the user's first conversational activity with at least one portion of the recording of the first conversation participant's first conversational activity includes comparing an extra information included in the recording of the user's first conversational activity with an extra information included in the recording of the first conversation participant's first conversational activity. In further embodiments, the extra information includes a time information, a location information, an observed information, or a contextual information.

In some embodiments, the determining that a similarity between at least one portion of the recording of the user's first conversational activity and at least one portion of the recording of the first conversation participant's first conversational activity exceeds a similarity threshold includes determining that a similarity between an extra information included in the recording of the user's first conversational activity and an extra information included in the recording of the first conversation participant's first conversational activity exceeds a similarity threshold. In further embodiments, the extra information includes a time information, a location information, an observed information, or a contextual information.

In certain embodiments, the recording of the user's first conversational activity includes a first sub-stream of the stream of digital sound samples of the user and the recording of the first conversation participant's first conversational activity includes a first sub-stream of a stream of digital sound samples of the first conversation participant, wherein the determining that a similarity between at least one portion of the recording of the user's first conversational activity and at least one portion of the recording of the first conversation participant's first conversational activity exceeds a similarity threshold includes determining that a similarity between at least one portion of the first sub-stream of the stream of digital sound samples of the user and at least one portion of the first sub-stream of the stream of digital sound samples of the first conversation participant exceeds a similarity threshold.

In further embodiments, the portion of the first sub-stream of the stream of digital sound samples of the user includes one or more words, one or more features, or one or more sound samples of the first sub-stream of the stream of digital sound samples of the user. In further embodiments, the portion of the first sub-stream of the stream of digital sound samples of the first conversation participant includes one or more words, one or more features, or one or more sound samples of the first sub-stream of the stream of digital sound samples of the first conversation participant.

In some embodiments, the determining that a similarity between at least one portion of the recording of the user's first conversational activity and at least one portion of the recording of the first conversation participant's first conversational activity exceeds a similarity threshold includes determining that a number or a percentage of matching words recognized from the recording of the user's first conversational activity and from the recording of the first conversation participant's first conversational activity exceeds a threshold. In further embodiments, the matching words recognized from the recording of the user's first conversational activity and from the recording of the first conversation participant's first conversational activity are matched factoring in at least one of an order of a word, a type of a word, an importance of a word, a semantic variation of a word, a concept of a word, or a threshold for a difference in a word. In further embodiments, the determining that a similarity between at least one portion of the recording of the user's first conversational activity and at least one portion of the recording of the first conversation participant's first conversational activity exceeds a similarity threshold includes determining that a number or a percentage of matching sound features from the recording of the user's first conversational activity and from the recording of the first conversation participant's first conversational activity exceeds a threshold. In further embodiments, the matching sound features from the recording of the user's first conversational activity and from the recording of the first conversation participant's first conversational activity are matched factoring in at least one of: an order of a sound feature, a type of a sound feature, an importance of a sound feature, or a threshold for a difference in a sound feature. In further embodiments, the determining that a similarity between at least one portion of the recording of the user's first conversational activity and at least one portion of the recording of the first conversation participant's first conversational activity exceeds a similarity threshold includes determining that a number or a percentage of matching sound samples from the recording of the user's first conversational activity and from the recording of the first conversation participant's first conversational activity exceeds a threshold. In further embodiments, the matching sound samples from the recording of the user's first conversational activity and from the recording of the first conversation participant's first conversational activity are matched factoring in at least one of: an order of a sound sample, an importance of a sound sample, or a threshold for a difference in a sound sample. In further embodiments, the determining that a similarity between at least one portion of the recording of the user's first conversational activity and at least one portion of the recording of the first conversation participant's first conversational activity exceeds a similarity threshold includes recognizing a speech or a sound of a same person in the at least one portion of the recording of the user's first conversational activity and the at least one portion of the recording of the first conversation participant's first conversational activity.

In certain embodiments, the recording of the user's first conversational activity includes a first sub-stream of the stream of digital pictures of the user and the recording of the first conversation participant's first conversational activity includes a first sub-stream of a stream of digital pictures of the first conversation participant, and wherein the determining that a similarity between at least one portion of the recording of the user's first conversational activity and at least one portion of the recording of the first conversation participant's first conversational activity exceeds a similarity threshold includes determining that a similarity between at least one portion of the first sub-stream of the stream of digital pictures of the user and at least one portion of the first sub-stream of the stream of digital pictures of the first conversation participant exceeds a similarity threshold. In further embodiments, the portion of the first sub-stream of the stream of digital pictures of the user includes one or more pictures, one or more regions of a picture, one or more features of a picture, or one or more pixels of a picture of the first sub-stream of the stream of digital pictures of the user. In further embodiments, the portion of the first sub-stream of the stream of digital pictures of the first conversation participant includes one or more pictures, one or more regions of a picture, one or more features of a picture, or one or more pixels of a picture of the first sub-stream of a stream of digital pictures of the first conversation participant.

In some embodiments, the determining that a similarity between at least one portion of the recording of the user's first conversational activity and at least one portion of the recording of the first conversation participant's first conversational activity exceeds a similarity threshold includes determining that a number or a percentage of matching pictures from the recording of the user's first conversational activity and from the recording of the first conversation participant's first conversational activity exceeds a threshold. In further embodiments, the matching pictures from the recording of the user's first conversational activity and from the recording of the first conversation participant's first conversational activity are matched factoring in at least one of: an order of a picture, or a threshold for a difference in a picture. In further embodiments, the determining that a similarity between at least one portion of the recording of the user's first conversational activity and at least one portion of the recording of the first conversation participant's first conversational activity exceeds a similarity threshold includes determining that a number or a percentage of matching regions of pictures from the recording of the user's first conversational activity and from the recording of the first conversation participant's first conversational activity exceeds a threshold. In further embodiments, the matching regions of a picture from the recording of the user's first conversational activity and from the recording of the first conversation participant's first conversational activity are matched factoring in at least one of: a location of a region, or a threshold for a difference in a region. In further embodiments, the determining that a similarity between at least one portion of the recording of the user's first conversational activity and at least one portion of the recording of the first conversation participant's first conversational activity exceeds a similarity threshold includes determining that a number or a percentage of matching picture features from the recording of the user's first conversational activity and from the recording of the first conversation participant's first conversational activity exceeds a threshold. In further embodiments, the matching picture features from the recording of the user's first conversational activity and from the recording of the first conversation participant's first conversational activity are matched factoring in at least one of: a type of a picture feature, an importance of a picture feature, a location of a picture feature in a region of interest, or a threshold for a difference in a picture feature. In further embodiments, the determining that a similarity between at least one portion of the recording of the user's first conversational activity and at least one portion of the recording of the first conversation participant's first conversational activity exceeds a similarity threshold includes determining that a number or a percentage of matching pixels from the recording of the user's first conversational activity and from the recording of the first conversation participant's first conversational activity exceeds a threshold. In further embodiments, the matching pixels from the recording of the user's first conversational activity and from the recording of the first conversation participant's first conversational activity are matched factoring in at least one of: a location of a pixel in a region of interest, or a threshold for a difference in a pixel.

In some embodiments, the determining that a similarity between at least one portion of the recording of the user's first conversational activity and at least one portion of the recording of the first conversation participant's first conversational activity exceeds a similarity threshold includes recognizing a same person or object in the at least one portion of the recording of the user's first conversational activity and the at least one portion of the recording of the first conversation participant's first conversational activity.

In certain embodiments, the playing the at least one portion of the recording of the second conversation participant's first conversational activity is performed concurrently with at least one portion of the user's first conversational activity. In further embodiments, the recording of the second conversation participant's first conversational activity includes a first sub-stream of a stream of digital pictures of the second conversation participant, wherein the playing the at least one portion of the recording of the second conversation participant's first conversational activity includes playing the at least one portion of the first sub-stream of the stream of digital pictures of the second conversation participant. In further embodiments, the recording of the second conversation participant's first conversational activity includes a first sub-stream of a stream of digital sound samples of the second conversation participant, wherein the playing the at least one portion of the recording of the second conversation participant's first conversational activity includes playing the at least one portion of the first sub-stream of the stream of digital sound samples of the second conversation participant.

In some embodiments, the stored plurality of rounds of conversational exchange include a second round of conversational exchange, the second round of conversational exchange comprising a recording of a first conversation participant's second conversational activity and a recording of a second conversation participant's second conversational activity. The one or more processor circuits may be further configured to: detect the user's second conversational activity from at least one of the stream of digital pictures of the user or the stream of digital sound samples of the user. The one or more processor circuits may be further configured to: compare at least one portion of a recording of the user's second conversational activity with at least one portion of the recording of the first conversation participant's second conversational activity. The one or more processor circuits may be further configured to: determine that a similarity between at least one portion of the recording of the user's second conversational activity and at least one portion of the recording of the first conversation participant's second conversational activity exceeds a similarity threshold. The one or more processor circuits may be further configured to: cause the display and the sound-producing device of the users computing device to play at least one portion of the recording of the second conversation participant's second conversational activity. In further embodiments, the first round of conversational exchange is connected to the second round of conversational exchange by a connection. The connection between the first round of conversational exchange and the second round of conversational exchange may include or be associated with at least one of: an occurrence count, a weight, a parameter, or a data. In further embodiments, the stored plurality of rounds of conversational exchange are organized into a neural network, and wherein the first round of conversational exchange is stored into a first node of the neural network and the second round of conversational exchange is stored into a second node of the neural network. The first node and the second node may be connected by a connection. The first node may be part of a first layer of the neural network and the second node may be part of a second layer of the neural network. In further embodiments, the stored plurality of rounds of conversational exchange are organized into a graph, and wherein the first round of conversational exchange is stored into a first node of the graph and the second round of conversational exchange is stored into a second node of the graph. The first node and the second node may be connected by a connection. In further embodiments, the stored plurality of rounds of conversational exchange are organized into a collection of sequences, and wherein the first round of conversational exchange is stored into a first node of a sequence of the collection of sequences and the second round of conversational exchange is stored into a second node of the sequence of the collection of sequences. In further embodiments, the stored plurality of rounds of conversational exchange are organized into a sequence, and wherein the first round of conversational exchange is stored into a first node of the sequence and the second round of conversational exchange is stored into a second node of the sequence.

In some embodiments, the playing the at least one portion of the recording of the second conversation participant's second conversational activity is performed concurrently with the at least one portion of the user's second conversational activity. In further embodiments, the playing the at least one portion of the recording of the second conversation participant's second conversational activity is performed subsequent to the at least one portion of the user's first conversational activity.

In certain embodiments, the playing the at least one portion of the recording of the second conversation participant's second conversational activity includes transitioning from the at least one portion of the recording of the second conversation participant's first conversational activity to the at least one portion of the recording of the second conversation participant's second conversational activity. In further embodiments, the transitioning from the at least one portion of the recording of the second conversation participant's first conversational activity to the at least one portion of the recording of the second conversation participant's second conversational activity includes at least one of: moving, centering, aligning, resizing, or transforming one or more pictures of the recording of the second conversation participant's first conversational activity and one or more pictures of the recording of the second conversation participant's second conversational activity. In further embodiments, the transitioning from the at least one portion of the recording of the second conversation participant's first conversational activity to the at least one portion of the recording of the second conversation participant's second conversational activity includes adjusting a lighting or a color of one or more pictures of the recording of the second conversation participant's first conversational activity and one or more pictures of the recording of the second conversation participant's second conversational activity. In further embodiments, the transitioning from the at least one portion of the recording of the second conversation participant's first conversational activity to the at least one portion of the recording of the second conversation participant's second conversational activity includes a cut or a dissolve between one or more pictures of the recording of the second conversation participant's first conversational activity and one or more pictures of the recording of the second conversation participant's second conversational activity. In further embodiments, the transitioning from the at least one portion of the recording of the second conversation participant's first conversational activity to the at least one portion of the recording of the second conversation participant's second conversational activity includes morphing of one or more pictures of the recording of the second conversation participant's first conversational activity and one or more pictures of the recording of the second conversation participant's second conversational activity.

In some embodiments, the playing the at least one portion of the recording of the second conversation participant's second conversational activity includes bridging between the at least one portion of the recording of the second conversation participant's first conversational activity and the at least one portion of the recording of the second conversation participant's second conversational activity. In further embodiments, the bridging between the at least one portion of the recording of the second conversation participant's first conversational activity and the at least one portion of the recording of the second conversation participant's second conversational activity includes interpolation, inbetweening, extrapolation, or picture generation between one or more pictures of the recording of the second conversation participant's first conversational activity and one or more pictures of the recording of the second conversation participant's second conversational activity. In further embodiments, the bridging between the at least one portion of the recording of the second conversation participant's first conversational activity and the at least one portion of the recording of the second conversation participant's second conversational activity includes playing or replaying one or more pictures of the recording of the second conversation participant's first conversational activity.

In some aspects, the disclosure relates to a non-transitory computer storage medium having a computer program stored thereon, the program comprising instructions that when executed by one or more computing devices cause the one or more computing devices to perform operations comprising: accessing a memory unit of a server that stores a plurality of rounds of conversational exchange including a first round of conversational exchange, the first round of conversational exchange comprising a recording of a first conversation participant's first conversational activity and a recording of a second conversation participant's first conversational activity. The operations may further include capturing a stream of digital pictures of a user by a picture-capturing device of a user's computing device. The operations may further include capturing a stream of digital sound samples of the user by a sound-capturing device of the user's computing device, the user's computing device coupled to the server via a network. The operations may further include detecting the user's first conversational activity from at least one of the stream of digital pictures of the user or the stream of digital sound samples of the user. The operations may further include comparing at least one portion of a recording of the user's first conversational activity with at least one portion of the recording of the first conversation participant's first conversational activity. The operations may further include determining that a similarity between at least one portion of the recording of the user's first conversational activity and at least one portion of the recording of the first conversation participant's first conversational activity exceeds a similarity threshold. The operations may further include playing at least one portion of the recording of the second conversation participant's first conversational activity by a display and a sound-producing device of the user's computing device.

In some aspects, the disclosure relates to a method comprising: (a) accessing a memory unit of a server that stores a plurality of rounds of conversational exchange including a first round of conversational exchange, the first round of conversational exchange comprising a recording of a first conversation participant's first conversational activity and a recording of a second conversation participant's first conversational activity, the accessing of (a) performed by one or more processor circuits of the server. The method may further include (b) capturing a stream of digital pictures of a user by a picture-capturing device of a user's computing device. The method may further include (c) capturing a stream of digital sound samples of the user by a sound-capturing device of the user's computing device, the user's computing device coupled to the server via a network. The method may further include (d) detecting the user's first conversational activity from at least one of the stream of digital pictures of the user or the stream of digital sound samples of the user, the detecting of (d) performed by the one or more processor circuits of the server. The method may further include (e) comparing at least one portion of a recording of the user's first conversational activity with at least one portion of the recording of the first conversation participant's first conversational activity, the comparing of (e) performed by the one or more processor circuits of the server. The method may further include (f) determining that a similarity between at least one portion of the recording of the user's first conversational activity and at least one portion of the recording of the first conversation participant's first conversational activity exceeds a similarity threshold, the determining of (f) performed by the one or more processor circuits of the server. The method may further include (g) playing at least one portion of the recording of the second conversation participant's first conversational activity by a display and a sound-producing device of the user's computing device, the playing of (g) caused by the one or more processor circuits of the server.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In certain embodiments, the recording of the first conversation participant's first conversational activity includes the first conversation participant's visual expressions or communication in a first part of a conversation and the first conversation participant's verbal expressions or communication in the first part of the conversation. In further embodiments, the recording of the first conversation participant's first conversational activity includes a first sub-stream of a stream of digital pictures of the first conversation participant and a first sub-stream of a stream of digital sound samples of the first conversation participant. In further embodiments, the first sub-stream of the stream of digital pictures of the first conversation participant comprises the first conversation participant's visual expressions or communication in a first part of a conversation and the first sub-stream of the stream of digital sound samples of the first conversation participant comprises the first conversation participant's verbal expressions or communication in the first part of the conversation. In further embodiments, the recording of the second conversation participant's first conversational activity includes the second conversation participant's visual expressions or communication in a first part of a conversation and the second conversation participant's verbal expressions or communication in the first part of the conversation. In further embodiments, the recording of the second conversation participant's first conversational activity includes a first sub-stream of a stream of digital pictures of the second conversation participant and a first sub-stream of a stream of digital sound samples of the second conversation participant. In further embodiments, the first sub-stream of the stream of digital pictures of the second conversation participant comprises the second conversation participant's visual expressions or communication in a first part of a conversation and the first sub-stream of the stream of digital sound samples of the second conversation participant comprises the second conversation participant's verbal expressions or communication in the first part of the conversation. In further embodiments, the recording of the first conversation participant's first conversational activity or the recording of the second conversation participant's first conversational activity includes or is associated with an extra information, the extra information comprising a time information, a location information, an observed information, or a contextual information.

In certain embodiments, the first round of conversational exchange includes a unit of knowledge of how the first conversation participant acted relative to the second conversation participant in a first part of a conversation and how the second conversation participant acted relative to the first conversation participant in the first part of the conversation. In further embodiments, the first round of conversational exchange includes or is associated with an extra information, the extra information comprising a time information, a location information, an observed information, or a contextual information. In further embodiments, the recording of the first conversation participant's first conversational activity is correlated with the recording of the second conversation participant's first conversational activity.

In some embodiments, the stored plurality of rounds of conversational exchange are organized into at least one of: a neural network, a graph, a collection of sequences, a sequence, a knowledgebase, a knowledge structure, or a data structure. In further embodiments, each round of conversational exchange of the stored plurality of rounds of conversational exchange is included in a neuron, a node, a vertex, or an element of a neural network, a graph, a collection of sequences, a sequence, a knowledgebase, a knowledge structure, or a data structure. In further embodiments, some rounds of conversational exchange of the stored plurality of rounds of conversational exchange are interconnected.

In certain embodiments, the picture-capturing device includes a motion picture camera. In further embodiments, the stream of digital pictures of the user includes the user's visual expressions or communication. In further embodiments, the stream of digital pictures of the user includes a digital motion picture. The digital motion picture may include a MPEG motion picture, an AVI motion picture, a FLV motion picture, a MOV motion picture, a RM motion picture, a SWF motion picture, a WMV motion picture, a DivX motion picture, or a digitally encoded motion picture. In further embodiments, the stream of digital pictures of the user includes or is associated with an extra information, the extra information comprising a time information, a location information, an observed information, or a contextual information.

In some embodiments, the sound-capturing device includes a microphone. In further embodiments, the stream of digital sound samples of the user includes the user's verbal expressions or communication. In further embodiments, the stream of digital sound samples of the user includes a digital sound. The digital sound may include a WAV digital sound, a WMA digital sound, an AIFF digital sound, a MP3 digital sound, a RA digital sound, a OGG digital sound, or a digitally encoded sound. In further embodiments, the stream of digital sound samples of the user includes or is associated with an extra information, the extra information comprising a time information, a location information, an observed information, or a contextual information. In further embodiments, the stream of digital pictures of the user and the stream of digital sound samples of the user are captured simultaneously.

In certain embodiments, the user's first conversational activity includes at least one of: a user's speaking, a user's silent facial expression, a user's silent body movement, a user's motionless silence, a user's absence from the conversation, or a user's conversational action. In further embodiments, the detecting the user's speaking includes recognizing the user's speech in the stream of digital sound samples of the user. In further embodiments, the detecting the user's speaking includes determining a beginning and an end of the user's speaking. The determining the beginning of the user's speaking may include recognizing the user's speech after a threshold period of silence in the stream of digital sound samples of the user. The determining the end of the user's speaking includes recognizing a threshold period of silence after the user's speech in the stream of digital sound samples of the user. In further embodiments, the detecting the user's silent facial expression includes recognizing the user's facial expression in the stream of digital pictures of the user and recognizing the user's silence in the stream of digital sound samples of the user. In further embodiments, the detecting the user's silent body movement includes recognizing the user's body movement in the stream of digital pictures of the user and recognizing the users silence in the stream of digital sound samples of the user. In further embodiments, the detecting the user's motionless silence includes recognizing no motion or a marginal motion of the user in the stream of digital pictures of the user and recognizing the user's silence in the stream of digital sound samples of the user. The marginal motion of the user includes a motion of the user that does not exceed a threshold for motion. In further embodiments, the detecting the user's absence from the conversation includes recognizing the users absence in the stream of digital pictures of the user.

In some embodiments, In further embodiments, the detecting the user's first conversational activity includes recognizing the user's visual and verbal expressions or communication in a first part of a simulated conversation. In further embodiments, the detecting the user's first conversational activity includes identifying a first sub-stream of the stream of digital pictures of the user, wherein the first sub-stream of the stream of digital pictures of the user comprises the user's visual expressions or communication in a first part of a simulated conversation. In further embodiments, the detecting the user's first conversational activity includes identifying a first sub-stream of the stream of digital sound samples of the user, wherein the first sub-stream of the stream of digital sound samples of the user comprises the user's verbal expressions or communication in a first part of a simulated conversation.

In certain embodiments, the detecting the user's first conversational activity includes recognizing the user's speech or sound in the stream of digital sound samples of the user. In further embodiments, the detecting the user's first conversational activity includes recognizing the user's face or body part in the stream of digital pictures of the user. In further embodiments, the detecting the user's first conversational activity includes determining a beginning and an end of the user's first conversational activity.

In certain embodiments, the recording of the user's first conversational activity includes the user's visual expressions or communication in a first part of a simulated conversation and the user's verbal expressions or communication in the first part of the simulated conversation.

In some embodiments, the recording of the user's first conversational activity includes a first sub-stream of the stream of digital sound samples of the user and the recording of the first conversation participant's first conversational activity includes a first sub-stream of a stream of digital sound samples of the first conversation participant, wherein the comparing at least one portion of the recording of the user's first conversational activity with at least one portion of the recording of the first conversation participant's first conversational activity includes comparing at least one portion of the first sub-stream of the stream of digital sound samples of the user with at least one portion of the first sub-stream of the stream of digital sound samples of the first conversation participant. In further embodiments, the portion of the first sub-stream of the stream of digital sound samples of the user includes one or more words, one or more features, or one or more sound samples of the first sub-stream of the stream of digital sound samples of the user. In further embodiments, the portion of the first sub-stream of the stream of digital sound samples of the first conversation participant includes one or more words, one or more features, or one or more sound samples of the first sub-stream of a stream of digital sound samples of the first conversation participant.

In certain embodiments, the comparing at least one portion of the recording of the user's first conversational activity with at least one portion of the recording of the first conversation participant's first conversational activity includes comparing at least one word recognized from the recording of the user's first conversational activity with at least one word recognized from the recording of the first conversation participant's first conversational activity. In further embodiments, the comparing at least one portion of the recording of the user's first conversational activity with at least one portion of the recording of the first conversation participant's first conversational activity includes comparing at least one sound feature from the recording of the user's first conversational activity with at least one sound feature from the recording of the first conversation participant's first conversational activity. In further embodiments, the comparing at least one portion of the recording of the user's first conversational activity with at least one portion of the recording of the first conversation participant's first conversational activity includes comparing at least one sound sample from the recording of the user's first conversational activity with at least one sound sample from the recording of the first conversation participant's first conversational activity. In further embodiments, the comparing at least one portion of the recording of the user's first conversational activity with at least one portion of the recording of the first conversation participant's first conversational activity includes performing at least one of: amplitude adjustment, sample rate adjustment, noise reduction, or temporal alignment of one or more sound samples in the recording of the user's first conversational activity or the recording of the first conversation participant's first conversational activity.

In some embodiments, the recording of the user's first conversational activity includes a first sub-stream of the stream of digital sound samples of the user and the recording of the first conversation participant's first conversational activity includes a first sub-stream of a stream of digital sound samples of the first conversation participant, wherein the comparing at least one portion of the recording of the user's first conversational activity with at least one portion of the recording of the first conversation participant's first conversational activity includes performing at least one of: amplitude adjustment, sample rate adjustment, noise reduction, or temporal alignment in the first sub-stream of the stream of digital sound samples of the user or the first sub-stream of the stream of digital sound samples of the first conversation participant.

In certain embodiments, the recording of the user's first conversational activity includes a first sub-stream of the stream of digital pictures of the user and the recording of the first conversation participant's first conversational activity includes a first sub-stream of a stream of digital pictures of the first conversation participant, wherein the comparing at least one portion of the recording of the user's first conversational activity with at least one portion of the recording of the first conversation participant's first conversational activity includes comparing at least one portion of the first sub-stream of the stream of digital pictures of the user with at least one portion of the first sub-stream of the stream of digital pictures of the first conversation participant. In further embodiments, the portion of the first sub-stream of the stream of digital pictures of the user includes one or more pictures, one or more regions of a picture, one or more features of a picture, or one or more pixels of a picture of the first sub-stream of the stream of digital pictures of the user. In further embodiments, the portion of the first sub-stream of the stream of digital pictures of the first conversation participant includes one or more pictures, one or more regions of a picture, one or more features of a picture, or one or more pixels of a picture of the first sub-stream of the stream of digital pictures of the first conversation participant.

In some embodiments, the comparing at least one portion of the recording of the user's first conversational activity with at least one portion of the recording of the first conversation participant's first conversational activity includes comparing at least one picture from the recording of the user's first conversational activity with at least one picture from the recording of the first conversation participant's first conversational activity. In further embodiments, the comparing at least one portion of the recording of the user's first conversational activity with at least one portion of the recording of the first conversation participant's first conversational activity includes comparing at least one region of a picture from the recording of the user's first conversational activity with at least one region of a picture from the recording of the first conversation participant's first conversational activity. In further embodiments, the comparing at least one portion of the recording of the user's first conversational activity with at least one portion of the recording of the first conversation participant's first conversational activity includes comparing at least one picture feature from the recording of the user's first conversational activity with at least one picture feature from the recording of the first conversation participant's first conversational activity. In further embodiments, the comparing at least one portion of a recording of the user's first conversational activity with at least one portion of the recording of the first conversation participant's first conversational activity includes comparing at least one pixel from the recording of the user's first conversational activity with at least one pixel from the recording of the first conversation participant's first conversational activity. In further embodiments, the comparing at least one portion of the recording of the user's first conversational activity with at least one portion of the recording of the first conversation participant's first conversational activity includes performing at least one of: color adjustment, size adjustment, transparency utilization, mask utilization, or temporal alignment of one or more pictures in the recording of the user's first conversational activity or the recording of the first conversation participant's first conversational activity.

In certain embodiments, the recording of the user's first conversational activity includes a first sub-stream of the stream of digital pictures of the user and the recording of the first conversation participant's first conversational activity includes a first sub-stream of a stream of digital pictures of the first conversation participant, wherein the comparing at least one portion of the recording of the user's first conversational activity with at least one portion of the recording of the first conversation participant's first conversational activity includes performing at least one of: color adjustment, size adjustment, transparency utilization, mask utilization, or temporal alignment in the first sub-stream of the stream of digital pictures of the user or the first sub-stream of the stream of digital pictures of the first conversation participant.

In some embodiments, the comparing at least one portion of the recording of the user's first conversational activity with at least one portion of the recording of the first conversation participant's first conversational activity includes comparing an extra information included in the recording of the user's first conversational activity with an extra information included in the recording of the first conversation participant's first conversational activity. The extra information may include a time information, a location information, an observed information, or a contextual information.

In certain embodiments, the determining that a similarity between at least one portion of the recording of the user's first conversational activity and at least one portion of the recording of the first conversation participant's first conversational activity exceeds a similarity threshold includes determining that a similarity between an extra information included in the recording of the user's first conversational activity and an extra information included in the recording of the first conversation participant's first conversational activity exceeds a similarity threshold. The extra information may include a time information, a location information, an observed information, or a contextual information.

In some embodiments, the recording of the user's first conversational activity includes a first sub-stream of the stream of digital sound samples of the user and the recording of the first conversation participant's first conversational activity includes a first sub-stream of a stream of digital sound samples of the first conversation participant, wherein the determining that a similarity between at least one portion of the recording of the user's first conversational activity and at least one portion of the recording of the first conversation participant's first conversational activity exceeds a similarity threshold includes determining that a similarity between at least one portion of the first sub-stream of the stream of digital sound samples of the user and at least one portion of the first sub-stream of the stream of digital sound samples of the first conversation participant exceeds a similarity threshold. In further embodiments, the portion of the first sub-stream of the stream of digital sound samples of the user includes one or more words, one or more features, or one or more sound samples of the first sub-stream of the stream of digital sound samples of the user. In further embodiments, the portion of the first sub-stream of the stream of digital sound samples of the first conversation participant includes one or more words, one or more features, or one or more sound samples of the first sub-stream of the stream of digital sound samples of the first conversation participant.

In certain embodiments, the determining that a similarity between at least one portion of the recording of the user's first conversational activity and at least one portion of the recording of the first conversation participant's first conversational activity exceeds a similarity threshold includes determining that a number or a percentage of matching words recognized from the recording of the user's first conversational activity and from the recording of the first conversation participant's first conversational activity exceeds a threshold. In further embodiments, the matching words recognized from the recording of the user's first conversational activity and from the recording of the first conversation participant's first conversational activity are matched factoring in at least one of: an order of a word, a type of a word, an importance of a word, a semantic variation of a word, a concept of a word, or a threshold for a difference in a word. In further embodiments, the determining that a similarity between at least one portion of the recording of the user's first conversational activity and at least one portion of the recording of the first conversation participant's first conversational activity exceeds a similarity threshold includes determining that a number or a percentage of matching sound features from the recording of the user's first conversational activity and from the recording of the first conversation participant's first conversational activity exceeds a threshold. In further embodiments, the matching sound features from the recording of the user's first conversational activity and from the recording of the first conversation participant's first conversational activity are matched factoring in at least one of: an order of a sound feature, a type of a sound feature, an importance of a sound feature, or a threshold for a difference in a sound feature. In further embodiments, the determining that a similarity between at least one portion of the recording of the user's first conversational activity and at least one portion of the recording of the first conversation participant's first conversational activity exceeds a similarity threshold includes determining that a number or a percentage of matching sound samples from the recording of the user's first conversational activity and from the recording of the first conversation participant's first conversational activity exceeds a threshold. In further embodiments, the matching sound samples from the recording of the user's first conversational activity and from the recording of the first conversation participant's first conversational activity are matched factoring in at least one of: an order of a sound sample, an importance of a sound sample, or a threshold for a difference in a sound sample.

In some embodiments, the determining that a similarity between at least one portion of the recording of the user's first conversational activity and at least one portion of the recording of the first conversation participant's first conversational activity exceeds a similarity threshold includes recognizing a speech or a sound of a same person in the at least one portion of the recording of the user's first conversational activity and the at least one portion of the recording of the first conversation participant's first conversational activity.

In certain embodiments, the recording of the user's first conversational activity includes a first sub-stream of the stream of digital pictures of the user and the recording of the first conversation participant's first conversational activity includes a first sub-stream of a stream of digital pictures of the first conversation participant, wherein the determining that a similarity between at least one portion of the recording of the user's first conversational activity and at least one portion of the recording of the first conversation participant's first conversational activity exceeds a similarity threshold includes determining that a similarity between at least one portion of the first sub-stream of the stream of digital pictures of the user and at least one portion of the first sub-stream of the stream of digital pictures of the first conversation participant exceeds a similarity threshold. In further embodiments, the portion of the first sub-stream of the stream of digital pictures of the user includes one or more pictures, one or more regions of a picture, one or more features of a picture, or one or more pixels of a picture of the first sub-stream of the stream of digital pictures of the user. In further embodiments, the portion of the first sub-stream of the stream of digital pictures of the first conversation participant includes one or more pictures, one or more regions of a picture, one or more features of a picture, or one or more pixels of a picture of the first sub-stream of a stream of digital pictures of the first conversation participant.

In some embodiments, the determining that a similarity between at least one portion of the recording of the user's first conversational activity and at least one portion of the recording of the first conversation participant's first conversational activity exceeds a similarity threshold includes determining that a number or a percentage of matching pictures from the recording of the user's first conversational activity and from the recording of the first conversation participant's first conversational activity exceeds a threshold. In further embodiments, the matching pictures from the recording of the user's first conversational activity and from the recording of the first conversation participant's first conversational activity are matched factoring in at least one of: an order of a picture, or a threshold for a difference in a picture. In further embodiments, the determining that a similarity between at least one portion of the recording of the user's first conversational activity and at least one portion of the recording of the first conversation participant's first conversational activity exceeds a similarity threshold includes determining that a number or a percentage of matching regions of pictures from the recording of the user's first conversational activity and from the recording of the first conversation participant's first conversational activity exceeds a threshold. In further embodiments, the matching regions of a picture from the recording of the user's first conversational activity and from the recording of the first conversation participant's first conversational activity are matched factoring in at least one of: a location of a region, or a threshold for a difference in a region. In further embodiments, the determining that a similarity between at least one portion of the recording of the user's first conversational activity and at least one portion of the recording of the first conversation participant's first conversational activity exceeds a similarity threshold includes determining that a number or a percentage of matching picture features from the recording of the user's first conversational activity and from the recording of the first conversation participant's first conversational activity exceeds a threshold. In further embodiments, the matching picture features from the recording of the user's first conversational activity and from the recording of the first conversation participant's first conversational activity are matched factoring in at least one of a type of a picture feature, an importance of a picture feature, a location of a picture feature in a region of interest, or a threshold for a difference in a picture feature. In further embodiments, the determining that a similarity between at least one portion of the recording of the user's first conversational activity and at least one portion of the recording of the first conversation participant's first conversational activity exceeds a similarity threshold includes determining that a number or a percentage of matching pixels from the recording of the user's first conversational activity and from the recording of the first conversation participant's first conversational activity exceeds a threshold. In further embodiments, the matching pixels from the recording of the user's first conversational activity and from the recording of the first conversation participant's first conversational activity are matched factoring in at least one of: a location of a pixel in a region of interest, or a threshold for a difference in a pixel.

In certain embodiments, the determining that a similarity between at least one portion of the recording of the user's first conversational activity and at least one portion of the recording of the first conversation participant's first conversational activity exceeds a similarity threshold includes recognizing a same person or object in the at least one portion of the recording of the user's first conversational activity and the at least one portion of the recording of the first conversation participant's first conversational activity.

In some embodiments, the playing the at least one portion of the recording of the second conversation participant's first conversational activity is performed concurrently with at least one portion of the user's first conversational activity. In further embodiments, the recording of the second conversation participant's first conversational activity includes a first sub-stream of a stream of digital pictures of the second conversation participant, wherein the playing the at least one portion of the recording of the second conversation participant's first conversational activity includes playing the at least one portion of the first sub-stream of the stream of digital pictures of the second conversation participant. In further embodiments, the recording of the second conversation participant's first conversational activity includes a first sub-stream of a stream of digital sound samples of the second conversation participant, wherein the playing the at least one portion of the recording of the second conversation participant's first conversational activity includes playing the at least one portion of the first sub-stream of the stream of digital sound samples of the second conversation participant.

In certain embodiments, the stored plurality of rounds of conversational exchange include a second round of conversational exchange, the second round of conversational exchange comprising a recording of a first conversation participant's second conversational activity and a recording of a second conversation participant's second conversational activity. The non-transitory computer storage medium and/or the method further comprise: detecting the user's second conversational activity from at least one of the stream of digital pictures of the user or the stream of digital sound samples of the user, the detecting performed by the one or more processor circuits of the server. The non-transitory computer storage medium and/or the method further comprise: comparing at least one portion of a recording of the user's second conversational activity with at least one portion of the recording of the first conversation participant's second conversational activity, the comparing performed by the one or more processor circuits of the server. The non-transitory computer storage medium and/or the method further comprise: determining that a similarity between at least one portion of the recording of the user's second conversational activity and at least one portion of the recording of the first conversation participant's second conversational activity exceeds a similarity threshold, the determining performed by the one or more processor circuits of the server. The non-transitory computer storage medium and/or the method further comprise: playing at least one portion of the recording of the second conversation participant's second conversational activity by the display and the sound-producing device of the user's computing device, the playing caused by the one or more processor circuits of the server. In further embodiments, the first round of conversational exchange is connected to the second round of conversational exchange by a connection. The connection between the first round of conversational exchange and the second round of conversational exchange may include or be associated with at least one of: an occurrence count, a weight, a parameter, or a data. In further embodiments, the stored plurality of rounds of conversational exchange are organized into a neural network, and wherein the first round of conversational exchange is stored into a first node of the neural network and the second round of conversational exchange is stored into a second node of the neural network. The first node and the second node may be connected by a connection. The first node may be part of a first layer of the neural network and the second node may be part of a second layer of the neural network. In further embodiments, the stored plurality of rounds of conversational exchange are organized into a graph, and wherein the first round of conversational exchange is stored into a first node of the graph and the second round of conversational exchange is stored into a second node of the graph. In further embodiments, the first node and the second node may be connected by a connection. In further embodiments, the stored plurality of rounds of conversational exchange are organized into a collection of sequences, and wherein the first round of conversational exchange is stored into a first node of a sequence of the collection of sequences and the second round of conversational exchange is stored into a second node of the sequence of the collection of sequences. In further embodiments, the stored plurality of rounds of conversational exchange are organized into a sequence, and wherein the first round of conversational exchange is stored into a first node of the sequence and the second round of conversational exchange is stored into a second node of the sequence.

In some embodiments, the playing the at least one portion of the recording of the second conversation participant's second conversational activity is performed concurrently with the at least one portion of the user's second conversational activity. In further embodiments, the playing the at least one portion of the recording of the second conversation participant's second conversational activity is performed subsequent to the at least one portion of the user's first conversational activity.

In certain embodiments, the playing the at least one portion of the recording of the second conversation participant's second conversational activity includes transitioning from the at least one portion of the recording of the second conversation participant's first conversational activity to the at least one portion of the recording of the second conversation participant's second conversational activity. In further embodiments, the transitioning from the at least one portion of the recording of the second conversation participant's first conversational activity to the at least one portion of the recording of the second conversation participant's second conversational activity includes at least one of: moving, centering, aligning, resizing, or transforming one or more pictures of the recording of the second conversation participant's first conversational activity and one or more pictures of the recording of the second conversation participant's second conversational activity. In further embodiments, the transitioning from the at least one portion of the recording of the second conversation participant's first conversational activity to the at least one portion of the recording of the second conversation participant's second conversational activity includes adjusting a lighting or a color of one or more pictures of the recording of the second conversation participant's first conversational activity and one or more pictures of the recording of the second conversation participant's second conversational activity. In further embodiments, the transitioning from the at least one portion of the recording of the second conversation participant's first conversational activity to the at least one portion of the recording of the second conversation participant's second conversational activity includes a cut or a dissolve between one or more pictures of the recording of the second conversation participant's first conversational activity and one or more pictures of the recording of the second conversation participant's second conversational activity. In further embodiments, the transitioning from the at least one portion of the recording of the second conversation participant's first conversational activity to the at least one portion of the recording of the second conversation participant's second conversational activity includes morphing of one or more pictures of the recording of the second conversation participant's first conversational activity and one or more pictures of the recording of the second conversation participant's second conversational activity.

In some embodiments, the playing the at least one portion of the recording of the second conversation participant's second conversational activity includes bridging between the at least one portion of the recording of the second conversation participant's first conversational activity and the at least one portion of the recording of the second conversation participant's second conversational activity. In further embodiments, the bridging between the at least one portion of the recording of the second conversation participant's first conversational activity and the at least one portion of the recording of the second conversation participant's second conversational activity includes interpolation, inbetweening, extrapolation, or picture generation between one or more pictures of the recording of the second conversation participant's first conversational activity and one or more pictures of the recording of the second conversation participant's second conversational activity. In further embodiments, the bridging between the at least one portion of the recording of the second conversation participant's first conversational activity and the at least one portion of the recording of the second conversation participant's second conversational activity includes playing or replaying one or more pictures of the recording of the second conversation participant's first conversational activity.

In some aspects, the disclosure relates to a system for using artificially intelligent interactive memories. The system may be implemented at least in part on one or more computing devices. In some embodiments, the system comprises one or more processor circuits. The system may further include a memory unit, coupled to the one or more processor circuits, that stores a plurality of rounds of conversational exchange including a first round of conversational exchange, the first round of conversational exchange comprising a recording of a first conversation participant's first conversational activity and a recording of a second conversation participant's first conversational activity. The system may further include a picture-capturing device, coupled to the one or more processor circuits, configured to capture a stream of digital pictures of a user. The system may further include a sound-capturing device, coupled to the one or more processor circuits, configured to capture a stream of digital sound samples of the user The one or more processor circuits may be configured to: detect the user's first conversational activity from at least one of the stream of digital pictures of the user or the stream of digital sound samples of the user. The one or more processor circuits may be further configured to: compare at least one portion of a recording of the user's first conversational activity with at least one portion of the recording of the first conversation participant's first conversational activity. The one or more processor circuits may be further configured to: determine that a similarity between at least one portion of the recording of the user's first conversational activity and at least one portion of the recording of the first conversation participant's first conversational activity exceeds a similarity threshold. The one or more processor circuits may be further configured to: cause a display and a sound-producing device to play at least one portion of the recording of the second conversation participant's first conversational activity.

In certain embodiments, the one or more processor circuits, the memory unit, the picture-capturing device, the sound-capturing device, the display, and the sound-producing device of the system are included in a single device. In further embodiments, at least one of: the one or more processor circuits or the memory unit of the system are included in a server, and wherein the picture-capturing device, the sound-capturing device, the display, and the sound-producing device of the system are included in a user device, the user device coupled to the server via a network.

In some embodiments, the stored plurality of rounds of conversational exchange include a second round of conversational exchange, the second round of conversational exchange comprising a recording of a first conversation participant's second conversational activity and a recording of a second conversation participant's second conversational activity. The one or more processor circuits may be further configured to: detect the user's second conversational activity from at least one of the stream of digital pictures of the user or the stream of digital sound samples of the user. The one or more processor circuits may be further configured to: compare at least one portion of a recording of the user's second conversational activity with at least one portion of the recording of the first conversation participant's second conversational activity. The one or more processor circuits may be further configured to: determine that a similarity between at least one portion of the recording of the user's second conversational activity and at least one portion of the recording of the first conversation participant's second conversational activity exceeds a similarity threshold The one or more processor circuits may be further configured to: cause a display and a sound-producing device to play at least one portion of the recording of the second conversation participant's second conversational activity. In further embodiments, the playing the at least one portion of the recording of the second conversation participant's second conversational activity is performed concurrently with the at least one portion of the user's second conversational activity. In further embodiments, the playing the at least one portion of the recording of the second conversation participant's second conversational activity is performed subsequent to the at least one portion of the user's first conversational activity. In further embodiments, the playing the at least one portion of the recording of the second conversation participant's second conversational activity includes transitioning from the at least one portion of the recording of the second conversation participant's first conversational activity to the at least one portion of the recording of the second conversation participant's second conversational activity. In further embodiments, the playing the at least one portion of the recording of the second conversation participant's second conversational activity includes bridging between the at least one portion of the recording of the second conversation participant's first conversational activity and the at least one portion of the recording of the second conversation participant's second conversational activity.

In some aspects, the disclosure relates to a non-transitory computer storage medium having a computer program stored thereon, the program comprising instructions that when executed by one or more computing devices cause the one or more computing devices to perform operations comprising: accessing a memory unit that stores a plurality of rounds of conversational exchange including a first round of conversational exchange, the first round of conversational exchange comprising a recording of a first conversation participant's first conversational activity and a recording of a second conversation participant's first conversational activity. The operations may further include capturing a stream of digital pictures of a user by a picture-capturing device. The operations may further include capturing a stream of digital sound samples of the user by a sound-capturing device. The operations may further include detecting the user's first conversational activity from at least one of the stream of digital pictures of the user or the stream of digital sound samples of the user. The operations may further include comparing at least one portion of a recording of the user's first conversational activity with at least one portion of the recording of the first conversation participant's first conversational activity. The operations may further include determining that a similarity between at least one portion of the recording of the user's first conversational activity and at least one portion of the recording of the first conversation participant's first conversational activity exceeds a similarity threshold. The operations may further include playing at least one portion of the recording of the second conversation participant's first conversational activity by a display and a sound-producing device.

In some aspects, the disclosure relates to a method comprising: (a) accessing a memory unit that stores a plurality of rounds of conversational exchange including a first round of conversational exchange, the first round of conversational exchange comprising a recording of a first conversation participant's first conversational activity and a recording of a second conversation participant's first conversational activity, the accessing of (a) performed by one or more processor circuits. The method may further include (b) capturing a stream of digital pictures of a user by a picture-capturing device that is coupled to the one or more processor circuits. The method may further include (c) capturing a stream of digital sound samples of the user by a sound-capturing device that is coupled to the one or more processor circuits. The method may further include (d) detecting the user's first conversational activity from at least one of the stream of digital pictures of the user or the stream of digital sound samples of the user, the detecting of (d) performed by the one or more processor circuits. The method may further include (e) comparing at least one portion of a recording of the user's first conversational activity with at least one portion of the recording of the first conversation participant's first conversational activity, the comparing of (e) performed by the one or more processor circuits. The method may further include (f) determining that a similarity between at least one portion of the recording of the user's first conversational activity and at least one portion of the recording of the first conversation participant's first conversational activity exceeds a similarity threshold, the determining of (f) performed by the one or more processor circuits. The method may further include (g) playing at least one portion of the recording of the second conversation participant's first conversational activity by a display and a sound-producing device, the playing of (g) caused by the one or more processor circuits.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In certain embodiments, the one or more processor circuits, the memory unit, the picture-capturing device, the sound-capturing device, the display, and the sound-producing device of the system are included in a single device. In further embodiments, at least one of: the one or more processor circuits or the memory unit of the system are included in a server, and wherein the picture-capturing device, the sound-capturing device, the display, and the sound-producing device of the system are included in a user device, the user device coupled to the server via a network.

In some embodiments, the stored plurality of rounds of conversational exchange include a second round of conversational exchange, the second round of conversational exchange comprising a recording of a first conversation participant's second conversational activity and a recording of a second conversation participant's second conversational activity. The non-transitory computer storage medium and/or the method further comprise: detecting the user's second conversational activity from at least one of the stream of digital pictures of the user or the stream of digital sound samples of the user, the detecting performed by the one or more processor circuits. The non-transitory computer storage medium and/or the method further comprise: comparing at least one portion of a recording of the user's second conversational activity with at least one portion of the recording of the first conversation participant's second conversational activity, the comparing performed by the one or more processor circuits. The non-transitory computer storage medium and/or the method further comprise: determining that a similarity between at least one portion of the recording of the user's second conversational activity and at least one portion of the recording of the first conversation participant's second conversational activity exceeds a similarity threshold, the determining performed by the one or more processor circuits. The non-transitory computer storage medium and/or the method further comprise: playing at least one portion of the recording of the second conversation participant's second conversational activity by the display and the sound-producing device, the playing caused by the one or more processor circuits. In further embodiments, the playing the at least one portion of the recording of the second conversation participant's second conversational activity is performed concurrently with the at least one portion of the user's second conversational activity. In further embodiments, the playing the at least one portion of the recording of the second conversation participant's second conversational activity is performed subsequent to the at least one portion of the user's first conversational activity. In further embodiments, the playing the at least one portion of the recording of the second conversation participant's second conversational activity includes transitioning from the at least one portion of the recording of the second conversation participant's first conversational activity to the at least one portion of the recording of the second conversation participant's second conversational activity. In further embodiments, the playing the at least one portion of the recording of the second conversation participant's second conversational activity includes bridging between the at least one portion of the recording of the second conversation participant's first conversational activity and the at least one portion of the recording of the second conversation participant's second conversational activity.

In some aspects, the disclosure relates to a system for using artificially intelligent interactive memories. The system may be implemented at least in part on one or more computing devices. In some embodiments, the system comprises one or more processor circuits. The system may further include a memory unit, coupled to the one or more processor circuits, that stores a plurality of rounds of conversational exchange including a first round of conversational exchange, the first round of conversational exchange comprising recordings of a first conversation participant's first and second conversational activities and recordings of a second conversation participant's first and second conversational activities. The system may further include a picture-capturing device, coupled to the one or more processor circuits, configured to capture a stream of digital pictures of a user. The system may further include a sound-capturing device, coupled to the one or more processor circuits, configured to capture a stream of digital sound samples of the user. The one or more processor circuits may be configured to: detect the user's first conversational activity from at least one of the stream of digital pictures of the user or the stream of digital sound samples of the user. The one or more processor circuits may be further configured to: compare at least one portion of a recording of the user's first conversational activity with at least one portion of the recording of the first conversation participant's first conversational activity. The one or more processor circuits may be further configured to: determine that a similarity between at least one portion of the recording of the user's first conversational activity and at least one portion of the recording of the first conversation participant's first conversational activity exceeds a similarity threshold. The one or more processor circuits may be further configured to: cause a display and a sound-producing device to play at least one portion of the recording of the second conversation participant's first conversational activity.

In certain embodiments, the first conversation participant's first conversational activity is correlated with the second conversation participant's first conversational activity and the first conversation participant's second conversational activity is correlated with the second conversation participant's second conversational activity.

In some embodiments, the one or more processor circuits may be further configured to: cause the display and the sound-producing device to play at least one portion of the recording of the second conversation participant's second conversational activity. In further embodiments, the playing the at least one portion of the recording of the second conversation participant's second conversational activity is performed concurrently with the at least one portion of the user's second conversational activity. In further embodiments, the playing the at least one portion of the recording of the second conversation participant's second conversational activity is performed subsequent to the at least one portion of the user's first conversational activity.

In some aspects, the disclosure relates to a non-transitory computer storage medium having a computer program stored thereon, the program comprising instructions that when executed by one or more computing devices cause the one or more computing devices to perform operations comprising: accessing a memory unit that stores a plurality of rounds of conversational exchange including a first round of conversational exchange, the first round of conversational exchange comprising recordings of a first conversation participant's first and second conversational activities and recordings of a second conversation participant's first and second conversational activities. The operations may further include capturing a stream of digital pictures of a user by a picture-capturing device. The operations may further include capturing a stream of digital sound samples of the user by a sound-capturing device. The operations may further include detecting the user's first conversational activity from at least one of the stream of digital pictures of the user or the stream of digital sound samples of the user. The operations may further include comparing at least one portion of a recording of the user's first conversational activity with at least one portion of the recording of the first conversation participant's first conversational activity. The operations may further include determining that a similarity between at least one portion of the recording of the user's first conversational activity and at least one portion of the recording of the first conversation participant's first conversational activity exceeds a similarity threshold. The operations may further include playing at least one portion of the recording of the second conversation participant's first conversational activity by a display and a sound-producing device.

In some aspects, the disclosure relates to a method comprising: (a) accessing a memory unit that stores a plurality of rounds of conversational exchange including a first round of conversational exchange, the first round of conversational exchange comprising recordings of a first conversation participant's first and second conversational activities and recordings of a second conversation participant's first and second conversational activities, the accessing of (a) performed by one or more processor circuits The method may further include (b) capturing a stream of digital pictures of a user by a picture-capturing device that is coupled to the one or more processor circuits. The method may further include (c) capturing a stream of digital sound samples of the user by a sound-capturing device that is coupled to the one or more processor circuits. The method may further include (d) detecting the user's first conversational activity from at least one of the stream of digital pictures of the user or the stream of digital sound samples of the user, the detecting of (d) performed by the one or more processor circuits. The method may further include (e) comparing at least one portion of a recording of the user's first conversational activity with at least one portion of the recording of the first conversation participant's first conversational activity, the comparing of (e) performed by the one or more processor circuits. The method may further include (f) determining that a similarity between at least one portion of the recording of the user's first conversational activity and at least one portion of the recording of the first conversation participant's first conversational activity exceeds a similarity threshold, the determining of (f) performed by the one or more processor circuits. The method may further include (g) playing at least one portion of the recording of the second conversation participant's first conversational activity by a display and a sound-producing device, the playing of (g) caused by the one or more processor circuits.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In certain embodiments, the first conversation participant's first conversational activity is correlated with the second conversation participant's first conversational activity and the first conversation participant's second conversational activity is correlated with the second conversation participant's second conversational activity.

In some embodiments, the non-transitory computer storage medium and/or the method further comprise: playing at least one portion of the recording of the second conversation participant's second conversational activity by the display and the sound-producing device, the playing caused by the one or more processor circuits. In further embodiments, the playing the at least one portion of the recording of the second conversation participant's second conversational activity is performed concurrently with the at least one portion of the user's second conversational activity. In further embodiments, the playing the at least one portion of the recording of the second conversation participant's second conversational activity is performed subsequent to the at least one portion of the user's first conversational activity.

Other features and advantages of the disclosure will become apparent from the following description, including the claims and drawings.

Figure 1:
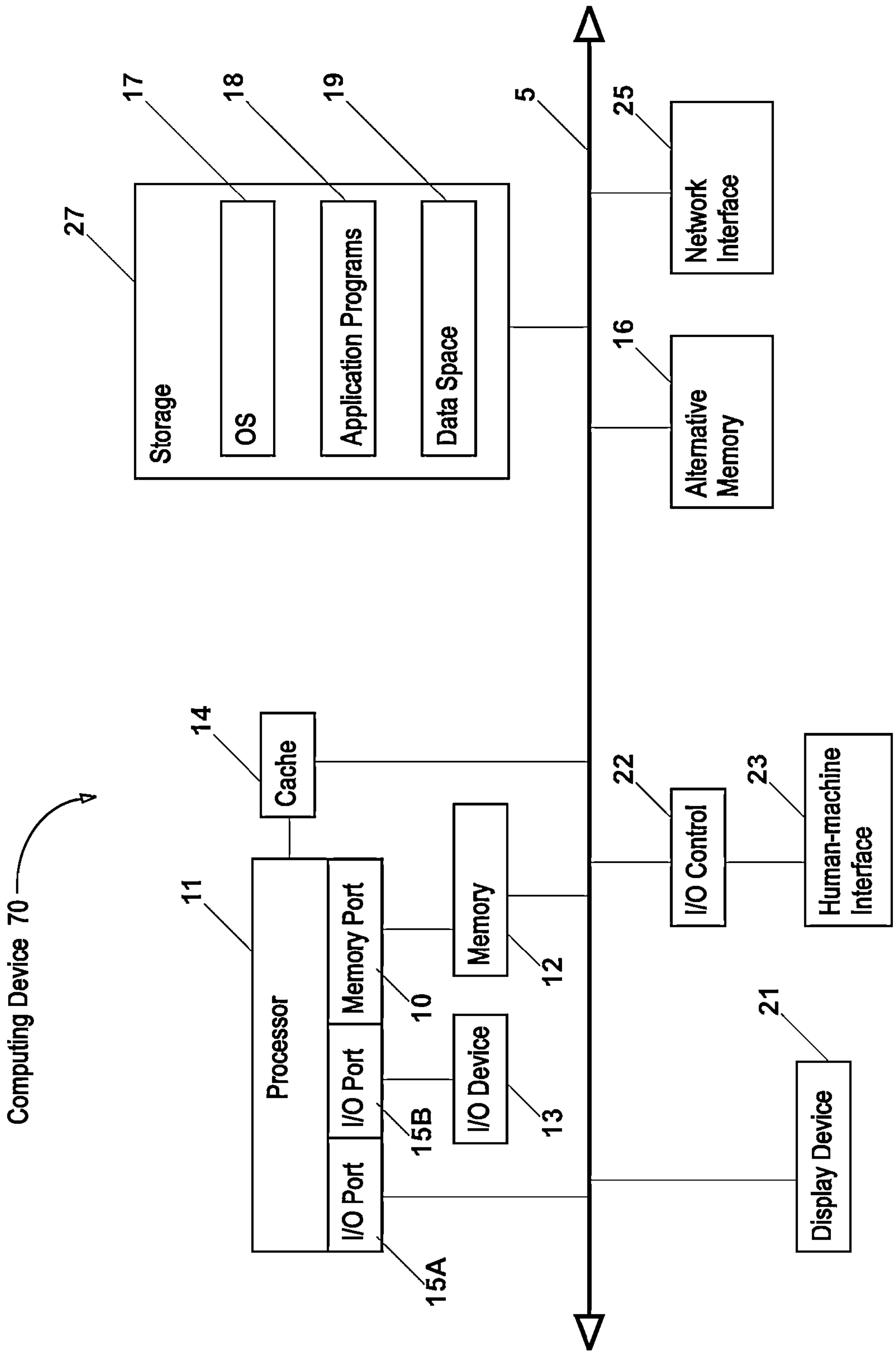
FIG. 1 illustrates a block diagram of Computing Device 70 that can provide processing capabilities used in some of the disclosed embodiments.

Like reference numerals in different figures indicate like elements. Horizontal or vertical " . . . " or other such indicia may be used to indicate additional instances of the same type of element. n, m, or other such letters or indicia represent integers or other sequential numbers that follow the sequence where they are indicated. It should be noted that n, m, and/or other such letters or indicia may represent different numbers in different elements even where the elements are depicted in the same figure. In general, n, m, and/or other such letters or indicia follow the immediate sequence and/or context where they are indicated. Any of these or other such indicia may be used interchangeably according to the context and space available. The drawings are not necessarily to scale, with emphasis instead being placed upon illustrating the embodiments, principles, and concepts of the disclosure. A line or arrow between any of the disclosed elements comprises an interface that enables the coupling, connection, and/or interaction between the elements. Arrows are used for enhanced illustration of the concepts and do not require the indicated directions. Therefore, any arrow can be replaced with an undirected line in alternate embodiments. For clarity of illustration, white colored streams and sub-streams of digital pictures and sound samples are associated with one conversation participant, whereas, gray colored streams and sub-streams of digital pictures and sound samples are associated with another or counterpart conversation participant.

DETAILED DESCRIPTION

The disclosed devices, systems, and methods for learning and using artificially intelligent interactive memories comprise apparatuses, systems, methods, features, functionalities, and/or applications for learning conversations among two or more conversation participants and storing this knowledge in a knowledgebase (i.e. neural network, graph, sequences, etc.). Then, using this stored knowledge, the disclosed devices, systems, and methods enable a user to simulate a conversation with an artificially intelligent conversation participant. The disclosed devices, systems, and methods for learning and using artificially intelligent interactive memories, any of their elements, any of their embodiments, or a combination thereof can generally be referred to as AIIM, AIIM application, or as other similar name or reference.

Referring now to FIG. 1, an embodiment is illustrated of Computing Device 70 (also referred to simply as computing device or other similar name or reference, etc.) that can provide processing capabilities used in some embodiments of the forthcoming disclosure. Later described devices and systems, in combination with processing capabilities of Computing Device 70, enable learning and using artificially intelligent interactive memories and/or other functionalities described herein. Various embodiments of the disclosed devices, systems, and/or methods include hardware, functions, logic, programs, and/or a combination thereof that can be provided or implemented on any type or form of computing or other device such as a mobile device, a computer, a computing capable telephone, a server, a cloud device, a gaming device, a television device, a digital camera, a GPS receiver, a media player, an embedded device, a supercomputer, a wearable device, an implantable device, or any other type or form of computing or other device capable of performing the operations described herein.

In some designs, Computing Device 70 comprises hardware, processing techniques or capabilities, programs, or a combination thereof. Computing Device 70 includes one or more central processing units, which may also be referred to as processors 11. Processor 11 includes one or more memory ports 10 and/or one or more input-output ports, also referred to as I/O ports 15, such as I/O ports 15A and 15B. Processor 11 may be special or general purpose. Computing Device 70 may further include memory 12, which can be connected to the remainder of the components of Computing Device 70 via bus 5. Memory 12 can be connected to processor 11 via memory port 10. Computing Device 70 may also include display device 21 such as a monitor, projector, glasses, and/or other display device. Computing Device 70 may also include Human-machine Interface 23 such as a keyboard, a pointing device, a mouse, a touchscreen, a joystick, and/or other input device that can be connected with the remainder of the Computing Device 70 components via I/O control 22. In some implementations, Human-machine Interface 23 can be connected with bus 5 or directly connected with specific components of Computing Device 70. Computing Device 70 may include additional elements, such as one or more input/output devices 13. Processor 11 may include or be interfaced with cache memory 14. Storage 27 may include memory, which provides an operating system, also referred to as OS 17, additional application programs 18 operating on OS 17, and/or data space 19 in which additional data or information can be stored. Alternative memory device 16 can be connected to the remaining components of Computing Device 70 via bus 5. Network interface 25 can also be connected with bus 5 and be used to communicate with external computing devices via a network. Some or all described elements of Computing Device 70 can be directly or operatively connected or coupled with each other using any other connection means known in art. Other additional elements may be included as needed, or some of the disclosed ones may be excluded, or a combination thereof may be utilized in alternate implementations of Computing Device 70.

Processor 11 includes any logic circuitry that can respond to or process instructions fetched from memory 12 or other element. Processor 11 may also include any combination of hardware and/or processing techniques or capabilities for implementing or executing logic functions or programs. Processor 11 may include a single core or a multi core processor. Processor 11 includes the functionality for loading operating system 17 and operating any application programs 18 thereon. In some embodiments, Processor 11 can be provided in a microprocessing or a processing unit, such as, for example, Snapdragon processor produced by Qualcomm Inc., processor by Intel Corporation of Mountain View, California, processor manufactured by Motorola Corporation of Schaumburg, Ill.; processor manufactured by Transmeta Corporation of Santa Clara, Calif.; the RS/6000 processor, processor manufactured by International Business Machines of White Plains, N.Y.; processor manufactured by Advanced Micro Devices of Sunnyvale, California, or any computing unit for performing similar functions. In other embodiments, processor 11 can be provided in a graphics processor unit (GPU), visual processor unit (VPU), or other highly parallel processing unit or circuit such as, for example, nVidia GeForce line of GPUs, AMD Radeon line of GPUs, and/or others. Such GPUs or other highly parallel processing units may provide superior performance in processing operations on later described neural networks. Computing Device 70 can be based on one or more of these or other processors capable of operating as described herein.

Memory 12 includes one or more memory chips capable of storing data and allowing any storage location to be accessed by processor 11, such as Static random access memory (SRAM), Flash memory, Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), and/or others. Memory 12 can be based on any of the above described memory chips, or any other available memory chips capable of operating as described herein. In some embodiments, processor 11 can communicate with memory 12 via a system bus 5. In other embodiments, processor 11 can communicate directly with memory 12 via a memory port 10.

Processor 11 can communicate directly with cache memory 14 via a connection means such as a secondary bus which may also sometimes be referred to as a backside bus. In some embodiments, processor 11 can communicate with cache memory 14 using the system bus 5. Cache memory 14 may typically have a faster response time than main memory 12 and can include a type of memory which is considered faster than main memory 12, such as for example SRAM, BSRAM, or EDRAM. Cache memory includes any structure such as multilevel caches, for example. In some embodiments, processor 11 can communicate with one or more I/O devices 13 via a system bus 5. Various busses can be used to connect processor 11 to any of the I/O devices 13, such as a VESA VL bus, an ISA bus, an EISA bus, a MicroChannel Architecture (MCA) bus, a PCI bus, a PCI-X bus, a PCI-Express bus, a NuBus, and/or others. In some embodiments, processor 11 can communicate directly with I/O device 13 via HyperTransport, Rapid I/O, or InfiniBand. In further embodiments, local busses and direct communication can be mixed. For example, processor 11 can communicate with an I/O device 13 using a local interconnect bus and communicate with another I/O device 13 directly. Similar configurations can be used for any other components described herein.

Computing Device 70 may further include alternative memory such as a SD memory slot, a USB memory stick, an optical drive such as a CD-ROM drive, a CD-R/RW drive, a DVD-ROM drive or a BlueRay disc, a hard-drive, and/or any other device comprising non-volatile memory suitable for storing data or installing application programs. Computing Device 70 may further include a storage device 27 comprising any type or form of non-volatile memory for storing an operating system (OS) such as any type or form of Windows OS, Mac OS, Unix OS, Linux OS, Android OS, iPhone OS, mobile version of Windows OS, an embedded OS, or any other OS that can operate on Computing Device 70. Computing Device 70 may also include application programs 18, and/or data space 19 for storing additional data or information. In some embodiments, alternative memory 16 can be used as or similar to storage device 27. Additionally, OS 17 and/or application programs 18 can be operable from a bootable medium, such as for example, a flash drive, a micro SD card, a bootable CD or DVD, and/or other bootable medium.

Application Program 18 (also referred to as program, computer program, application, script, code, etc.) comprises instructions that can provide functionality when executed by processor 11. Application program 18 can be implemented in a high-level procedural or object-oriented programming language, or in a low-level machine or assembly language. Any language used can be compiled, interpreted, or otherwise translated into machine language. Application program 18 can be deployed in any form including as a stand-alone program or as a module, component, subroutine, or other unit suitable for use in a computing system. Application program 18 does not necessarily correspond to a file in a file system. A program can be stored in a portion of a file that may hold other programs or data, in a single file dedicated to the program, or in multiple files (i.e. files that store one or more modules, sub programs, or portions of code, etc.). Application program 18 can be deployed to be executed on one computer or on multiple computers (i.e. cloud, distributed, or parallel computing, etc.), or at one site or distributed across multiple sites interconnected by a communication network.

Network interface 25 can be utilized for interfacing Computing Device 70 with other devices via a network through a variety of connections including standard telephone lines, wired or wireless connections, LAN or WAN links (i.e. 802.11, T1, T3, 56 kb, X.25, etc.), broadband connections (i.e. ISDN, Frame Relay, ATM, etc.), or a combination thereof. Examples of networks include the Internet, an intranet, an extranet, a local area network (LAN), a wide area network (WAN), a personal area network (PAN), a home area network (HAN), a campus area network (CAN), a metropolitan area network (MAN), a global area network (GAN), a storage area network (SAN), virtual network, a virtual private network (VPN), Bluetooth network, a wireless network, a wireless LAN, a radio network, a HomePNA, a power line communication network, a G.hn network, an optical fiber network, an Ethernet network, an active networking network, a client-server network, a peer-to-peer network, a bus network, a star network, a ring network, a mesh network, a star-bus network, a tree network, a hierarchical topology network, and/or other networks known in art. Network interface 25 may include a built-in network adapter, network interface card, PCMCIA network card, card bus network adapter, wireless network adapter, Bluetooth network adapter, WiFi network adapter, USB network adapter, modem, and/or any other device suitable for interfacing Computing Device 70 with any type of network capable of communication and/or operations described herein.

Still referring to FIG. 1, I/O devices 13 may be present in various shapes or forms in Computing Device 70. Examples of I/O device 13 capable of input include a joystick, a keyboard, a mouse, a trackpad, a trackpoint, a touchscreen, a trackball, a microphone, a drawing tablet, a glove, a tactile input device, a still or video camera, and/or other input device. Examples of I/O device 13 capable of output include a video display, a touchscreen, a projector, a glasses, a speaker, a tactile output device, and/or other output device. Examples of I/O device 13 capable of input and output include a disk drive, an optical storage device, a modem, a network card, and/or other input/output device. I/O device 13 can be interfaced with processor 11 via an I/O port 15, for example. I/O device 13 can also be controlled by I/O control 22 in some implementations. I/O control 22 may control one or more I/O devices such as Human-machine Interface 23 (i.e. keyboard, pointing device, touchscreen, joystick, mouse, optical pen, etc.). I/O control 22 enables any type or form of a device such as, for example, a video camera or microphone to be interfaced with other components of Computing Device 70. Furthermore, I/O device 13 may also provide storage such as or similar to storage 27, and/or alternative memory such as or similar to alternative memory 16 in some implementations.

An output interface such as a graphical user interface, an acoustical output interface, a tactile output interface, any device driver (i.e. audio, video, or other driver), and/or other output interface or system can be utilized to process output from elements of Computing Device 70 for conveyance on an output device such as Display 21. In some aspects, Display 21 or other output device itself may include an output interface for processing output from elements of Computing Device 70. Further, an input interface such as a keyboard listener, a touchscreen listener, a mouse listener, any device driver (i.e. audio, video, keyboard, mouse, touchscreen, or other driver), a speech recognizer, a video interpreter, and/or other input interface or system can be utilized to process input from Human-machine Interface 23 or other input device for use by elements of Computing Device 70. In some aspects, Human-machine Interface 23 or other input device itself may include an input interface for processing input for use by elements of Computing Device 70.

Computing Device 70 may include or be connected to multiple display devices 21. Display devices 21 can each be of the same or different type or form. Computing Device 70 and/or its elements comprise any type or form of suitable hardware, programs, or a combination thereof to support, enable, or provide for the connection and use of multiple display devices 21. In one example, Computing Device 70 includes any type or form of video adapter, video card, driver, and/or library to interface, communicate, connect, or otherwise use display devices 21. In some aspects, a video adapter may include multiple connectors to interface to multiple display devices 21. In other aspects, Computing Device 70 includes multiple video adapters, with each video adapter connected to one or more display devices 21. In some embodiments, Computing Device's 70 operating system can be configured for using multiple displays 21. In other embodiments, one or more display devices 21 can be provided by one or more other computing devices such as remote computing devices connected to Computing Device 70 via a network.

In some embodiments, I/O device 13 can be a bridge between system bus 5 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Serial Attached small computer system interface bus, and/or other bus.

Computing Device 70 can operate under the control of an operating system 17, which may support Computing Device's 70 basic functions, interface with and manage hardware resources, interface with and manage peripherals, provide common services for application programs, schedule tasks, and/or perform other functionalities. A modern operating system enables features and functionalities such as a high resolution display, graphical user interface (GUI), touchscreen, cellular network connectivity (i.e. mobile operating system, etc.), Bluetooth connectivity, WiFi connectivity, global positioning system (GPS) capabilities, mobile navigation, microphone, speaker, still picture camera, video camera, voice recorder, speech recognition, music player, video player, near field communication, personal digital assistant (PDA), and/or other features, functionalities, or applications. For example, Computing Device 70 can use any conventional operating system, any embedded operating system, any real-time operating system, any open source operating system, any video gaming operating system, any proprietary operating system, any online operating system, any operating system for mobile computing devices, or any other operating system capable of running on Computing Device 70 and performing operations described herein. Typical operating systems include: Windows XP, Windows 7, Windows 8, etc. manufactured by Microsoft Corporation of Redmond, Wash.; Mac OS, iPhone OS, etc. manufactured by Apple Computer of Cupertino, Calif.; OS/2 manufactured by International Business Machines of Armonk, N.Y.; Linux, a freely-available operating system distributed by Caldera Corp. of Salt Lake City, Utah; or any type or form of a Unix operating system, among others. Any operating systems such as the ones for Android devices can similarly be utilized.

Computing Device 70 can be implemented as or be part of various different model architectures such as web services, distributed computing, grid computing, cloud computing, and/or other architectures or environments. For example, in addition to the traditional desktop, server, or mobile operating system architectures, a cloud-based operating system can be utilized to provide the structure on which embodiments of the disclosure can be implemented. Other aspects of Computing Device 70 can also be implemented in the cloud without departing from the spirit and scope of the disclosure. For example, memory, storage, processing, and/or other elements can be hosted in the cloud. In some embodiments, Computing Device 70 can be implemented on multiple devices. For example, a portion of Computing Device 70 can be implemented on a mobile device and another portion can be implemented on wearable electronics.

Computing Device 70 can be, or include, any mobile device, a mobile phone, a smartphone (i.e. iPhone, Windows phone, Blackberry, Android phone, etc.), a tablet, a personal digital assistant (PDA), wearable electronics, implantable electronics, or another mobile device capable of implementing the functionalities described herein. In other embodiments, Computing Device 70 can be, or include, an embedded device, which can be any device or system with a dedicated function within another device or system. Embedded systems range from the simplest ones dedicated to one task with no user interface to complex ones with advanced user interface that may resemble modern desktop computer systems. Examples of devices comprising an embedded device include a mobile telephone, a personal digital assistant (PDA), a gaming device, a media player, a digital still or video camera, a pager, a television device, a set-top box, a personal navigation device, a global positioning system (GPS) receiver, a portable storage device (i.e. a USB flash drive, etc.), a digital watch, a DVD player, a printer, a microwave oven, a washing machine, a dishwasher, a gateway, a router, a hub, an automobile entertainment system, an automobile navigation system, a refrigerator, a washing machine, a factory automation device, an assembly line device, a factory floor monitoring device, a thermostat, an automobile, a factory controller, a telephone, a network bridge, and/or other devices. An embedded device can operate under the control of an operating system for embedded devices such as MicroC/OS-II, QNX, VxWorks, eCos, TinyOS, Windows Embedded, Embedded Linux, and/or other embedded device operating systems.

Various implementations of the disclosed devices, systems, and/or methods can be realized in digital electronic circuitry, integrated circuitry, logic gates, specially designed application specific integrated circuits (ASICs), field programmable gate arrays (FPGAs), computer hardware, firmware, programs, virtual machines, and/or combinations thereof including their structural, logical, and/or physical equivalents.

The disclosed devices, systems, and/or methods may include clients and servers. A client and server are generally remote from each other and typically interact through a network. The relationship of a client and server may arise by virtue of computer programs running on the respective computers and having a client-server relationship to each other.

The disclosed devices, systems, and/or methods can be implemented in a computing system that includes a back end component, a middleware component, a front end component, or any combination thereof. The components of the system can be interconnected by any form or medium of digital data communication such as, for example, a network.

Computing Device 70 may include or be interfaced with a computer program product comprising instructions or logic encoded on a computer-readable medium that, when performed in a computing device, configure a processor to perform the operations and/or functionalities disclosed herein. For example, a computer program can be provided or encoded on a computer-readable medium such as an optical medium (i.e. DVD-ROM, etc.), flash drive, hard drive, any memory, firmware, or other medium. Computer program can be installed onto a computing device to cause the computing device to perform the operations and/or functionalities disclosed herein. As used in this disclosure, machine-readable medium, computer-readable medium, or other such terms may refer to any computer program product, apparatus, and/or device for providing instructions and/or data to a programmable processor. As such, machine-readable medium includes any medium that can send or receive machine instructions as a machine-readable signal. The term machine-readable signal may refer to any signal used for providing instructions and/or data to a programmable processor. Examples of a machine-readable medium include a volatile and/or non-volatile medium, a removable and/or non-removable medium, a communication medium, a storage medium, and/or other medium. A communication medium, for example, can transmit computer readable instructions and/or data in a modulated data signal such as a carrier wave or other transport technique, and may include any other form of information delivery medium known in art. A non-transitory machine-readable medium comprises all machine-readable media except for a transitory, propagating signal.

Where a reference to a specific file or file type is used herein, other files, file types, or formats can be substituted.

Where a reference to a data structure is used herein, it should be understood that any variety of data structures can be used such as, for example, array, list, linked list, doubly linked list, queue, tree, heap, graph, map, grid, matrix, multi-dimensional matrix, table, database, database management system (DBMS), file, neural network, and/or any other type or form of a data structure including a custom one. A data structure may include one or more fields or data fields that are part of or associated with the data structure. A field or data field may include a data, an object, a data structure, and/or any other element or a reference/pointer thereto. A data structure can be stored in one or more memories, files, or other repositories. A data structure and/or any elements thereof, when stored in a memory, file, or other repository, may be stored in a different arrangement than the arrangement of the data structure and/or any elements thereof. For example, a sequence of elements can be stored in an arrangement other than a sequence in a memory, fie, or other repository.

Where a reference to a repository is used herein, it should be understood that a repository may be or include one or more files or file systems, one or more storage locations or structures, one or more storage systems, one or more data structures or objects, one or more memory locations or structures, and/or other storage, memory, or data arrangements.

Where a reference to an interface is used herein, it should be understood that the interface comprises any hardware, device, system, program, method, and/or combination thereof that enable direct or operative coupling, connection, and/or interaction of the elements between which the interface is indicated. A line or arrow shown in the figures between any of the depicted elements comprises such interface. Examples of an interface include a direct connection, an operative connection, a wired connection (i.e. wire, cable, etc.), a wireless connection, a device, a network, a bus, a circuit, a firmware, a driver, a bridge, a program, a combination thereof, and/or others.

Where a reference to an element coupled or connected to a processor is used herein, it should be understood that the element may be part of or operating on the processor. Also, an element coupled or connected to another element may include the element in communication or any other interactive relationship with the other element. Furthermore, an element coupled or connected to another element can be coupled or connected to any other element in alternate implementations. Terms coupled, connected, interfaced, or other such terms may be used interchangeably herein.

Where a mention of a function, method, routine, subroutine, or other such procedure is used herein, it should be understood that the function, method, routine, subroutine, or other such procedure comprises a call, reference, or pointer to the function, method, routine, subroutine, or other such procedure.

Where a mention of data, object, data structure, item, element, or thing is used herein, it should be understood that the data, object, data structure, item, element, or thing comprises a reference or pointer to the data, object, data structure, item, element, or thing.

The term match or matching can refer to total equivalence or similarity.

The term operating or operation can refer to processing, executing, or other such actions, and vice versa.

Therefore, the terms operating, operation, processing, executing, or other such actions may be used interchangeably herein.

The term collection of elements can refer to plurality of elements without implying that the collection is an element itself.

Figure 2A:
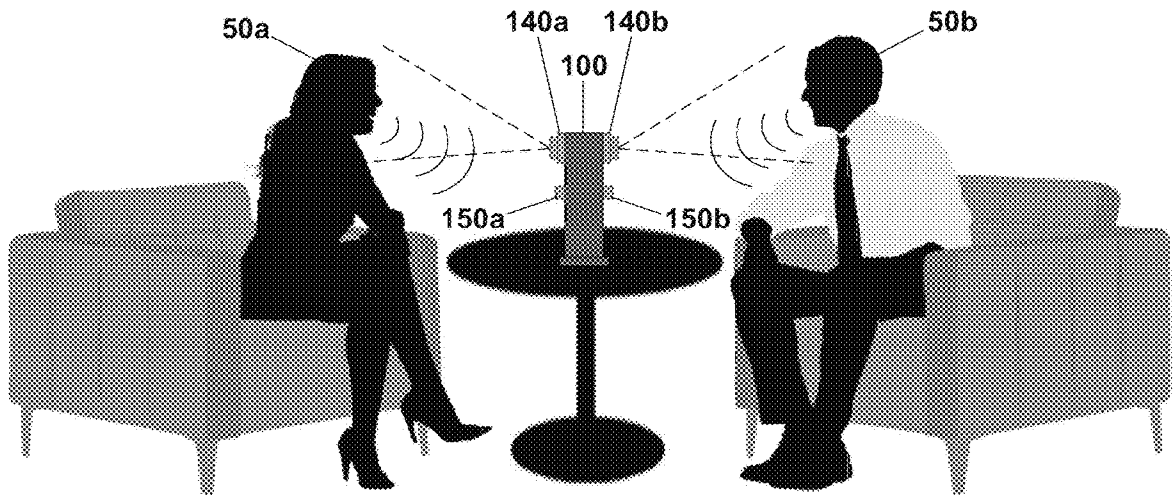
FIG. 2A illustrates an embodiment of utilizing System for Learning AIIMs 100 in a dedicated device.

Referring to FIG. 2A, an embodiment of utilizing System for Learning AIIMs 100 in a dedicated device is illustrated. In some aspects, the device can be placed on a table between Conversation Participants 50*a* and 50*b* as shown. In other aspects, the device can be mounted, attached, or placed on a wall, ceiling, or other convenient object or location.

Figure 2B:
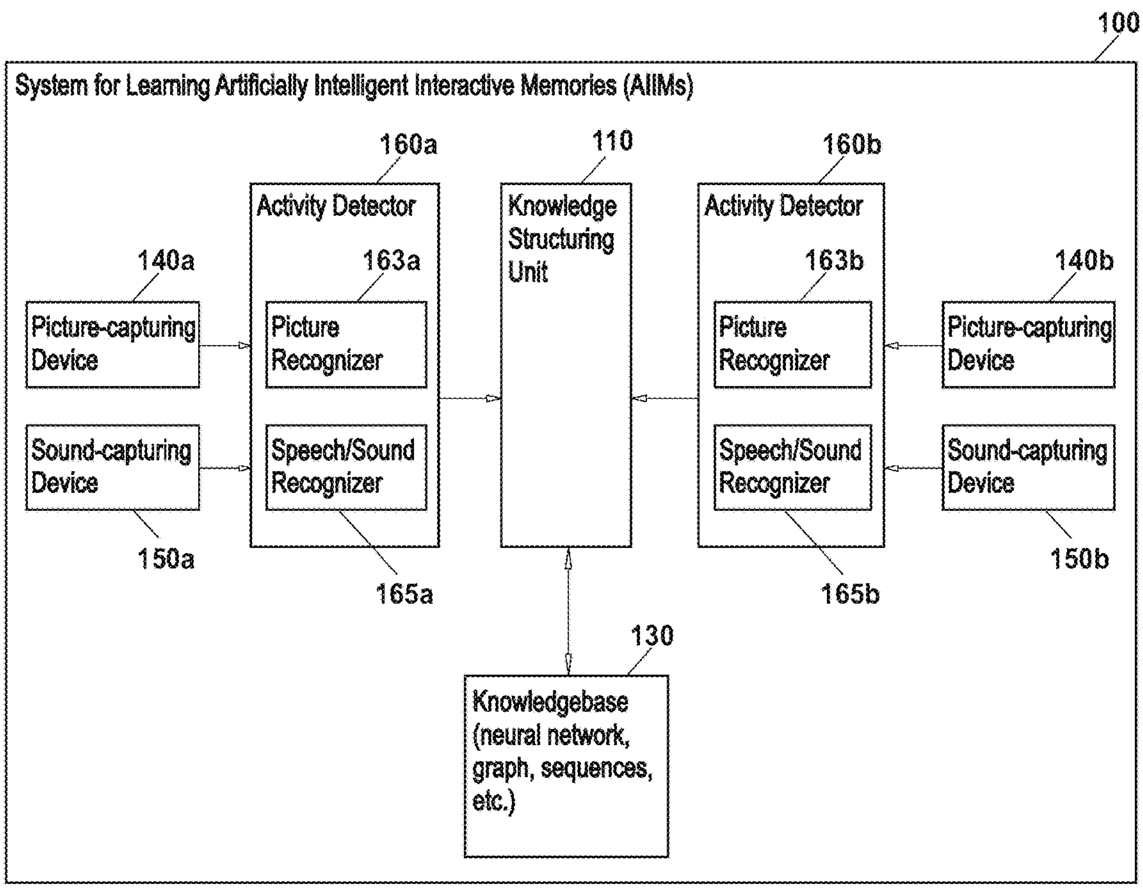
FIG. 2B illustrates an embodiment of internal structure of System for Learning AIIMs 100 in a dedicated device.

Referring to FIG. 2B, an embodiment of internal structure of System for Learning AIIMs 100 in a dedicated device is illustrated. System for Learning AIIMs 100 comprises interconnected Knowledge Structuring Unit 110, Knowledgebase 130, Picture-capturing Devices 140*a* and 140*b*, Sound-capturing Devices 150*a* and 150*b*, and Activity Detectors 160*a* and 160*b*. Some embodiments of Activity Detector 160*a* may include Picture Recognizer 163*a* and Speech/

Sound Recognizer 165*a* whereas some embodiments of Activity Detector 160*b* may include Picture Recognizer 163*b* and Speech/Sound Recognizer 165*b*. Other additional elements can be included as needed, or some of the disclosed ones can be excluded, or a combination thereof can be utilized in alternate embodiments.

System for Learning AIIMs 100 comprises any hardware, programs, or a combination thereof. System for Learning AIIMs 100 comprises the functionality for learning conversations. As the participants in a conversation exchange verbal and visual expressions or communication, System for Learning AIIMs 100 may capture and learn these conversational exchanges. Additionally, System for Learning AIIMs 100 may interconnect, interrelate, or interlink rounds of conversational exchange into a knowledge structure such as Knowledgebase 130, Neural Network 130*a*, Graph 130*b*, Collection of Sequences 130*c*, Sequence 133, and/or other data or knowledge structure. System for Learning AIIMs 100 also comprises the functionality for learning a person's conversational style or character. Knowledge learned by System for Learning AIIMs 100 can be used to simulate a conversation with a person (i.e. AI Conversation Participant 55 [later described], etc.) in the person's absence, after the person is deceased, or in any situation where a conversation may be needed with the person. For example, knowledge learned by System for Learning AIIMs 100 can be used by a System for Using AIIMs 500 (later described) to simulate a conversation with a parent, predecessor (i.e. grandparent, etc.), spouse, friend, historical figure, famous person (i.e. scientist, athlete, actor, musician, politician, etc.), and/or other persons. System for Learning AIIMs 100 comprises other functionalities disclosed herein. Statistical, artificial intelligence, machine learning, and/or other models or techniques are utilized to implement the disclosed devices, systems, and methods.

In some embodiments, the disclosed systems for learning and using AIIMs (i.e. System for Learning AIIMs 100, System for Using AIIMs 500 [later described], etc.), or elements thereof, can be implemented entirely or in part in a device (i.e. microchip, circuitry, logic gates, electronic device, computing device, special or general purpose processor, etc.) or system that comprises (i.e. hard coded, internally stored, etc.) or is provided with (i.e. externally stored, etc.) instructions for implementing AIIM functionalities. As such, the disclosed systems for learning and using AIIMs, or elements thereof, may include the processing, memory, storage, and/or other features, functionalities, and embodiments of Processor 11 and/or other elements of Computing Device 70. Such device or system can operate on its own (i.e. standalone device, etc.), be embedded in another device or system (i.e. a television device, a set-top box, a gaming device, a smartphone, a still or motion picture camera, and/or any other device capable of housing the elements needed for AIIM functionalities), work in combination with other devices or systems, or be available in any other configuration. In other embodiments, the disclosed systems for learning and using AIIMs, or elements thereof, can be implemented entirely or in part as a computer program and executed by one or more Processors 11. Such system, or elements thereof, can be implemented in one or more modules or units of a single or multiple computer programs. In yet other embodiments, the disclosed systems for learning and using AIIMs, or elements thereof, may be included in Alternative Memory 16 that provides instructions for implementing AIIM functionalities to one or more Processors 11. In further embodiments, the disclosed systems for learning and using AIIMs, or elements thereof, can be implemented as a network, web, distributed, cloud, or other such application accessed on one or more remote computing devices (i.e. servers, cloud, etc.) via Network Interface 25, such remote computing devices including processing capabilities and instructions for implementing AIIM functionalities. In some aspects, the disclosed systems for learning and using AIIMs, or elements thereof, can be attached to or interfaced with any computing device or application program, included as a feature of an operating system running on a computing device, built (i.e. hard coded, etc.) into any computing device or application program, and/or available in any other configuration to provide its functionalities.

In one example, the teaching presented by the disclosure can be implemented in a device or system for learning AIIMs. The device or system may include one or more processor circuits coupled to a memory unit. The device or system may further include a first picture-capturing device configured to capture a stream of digital pictures of a first conversation participant and a second picture-capturing device configured to capture a stream of digital pictures of a second conversation participant, the first and the second picture-capturing devices coupled to the one or more processor circuits. The device or system may further include a first sound-capturing device configured to capture a stream of digital sound samples of the first conversation participant and a second sound-capturing device configured to capture a stream of digital sound samples of the second conversation participant, the first and the second sound-capturing devices coupled to the one or more processor circuits. The one or more processor circuits may be configured to detect the first conversation participant's first conversational activity from at least one of the stream of digital pictures of the first conversation participant or the stream of digital sound samples of the first conversation participant, and detect the second conversation participant's first conversational activity from at least one of the stream of digital pictures of the second conversation participant or the stream of digital sound samples of the second conversation participant. The one or more processor circuits may also be configured to generate a first round of conversational exchange including a recording of the first conversation participant's first conversational activity and a recording of the second conversation participant's first conversational activity. The one or more processor circuits may also be configured to cause the memory unit to store the first round of conversational exchange, the first round of conversational exchange being part of a stored plurality of rounds of conversational exchange. Any of the operations of the described elements can be performed repeatedly and/or in different orders in alternate embodiments. In some aspects, the one or more processor circuits, the memory unit, the first picture-capturing device, the second picture-capturing device, the first sound-capturing device, and the second sound-capturing device are part of a single device. In other aspects, at least one of: the one or more processor circuits or the memory unit are part of a server, whereas, the first picture-capturing device and the first sound-capturing device are part of a first computing device, and the second picture-capturing device and the second sound-capturing device are part of a second computing device, the first and the second computing devices coupled to the server via a network. Other additional elements can be included as needed, or some of the disclosed ones can be excluded, or a combination thereof can be utilized in alternate embodiments. The device or system for learning AIIMs may include any actions or operations of any of the disclosed methods such as methods 6100 and/or 6200 (all later described).

In another example, any of the systems disclosed herein (i.e. System for Learning AIIMs 100, System for Using AIIMs 500 [later described], etc.), or elements thereof, can be implemented at least in part as a computer program such as a Java application or program. Java provides a robust and flexible environment for application programs including flexible user interfaces, robust security, built-in network protocols, powerful application programming interfaces, database or DBMS connectivity and interfacing functionalities, file manipulation capabilities, support for networked applications, and/or other features or functionalities. Application programs based on Java can be portable across many devices, yet leverage each device's native capabilities. Java supports the feature sets of most smartphones and a broad range of connected devices while still fitting within their resource constraints. Various Java platforms include virtual machine features comprising a runtime environment for application programs such as some embodiments of the systems disclosed herein (i.e. System for Learning AIIMs 100, System for Using AIIMs 500, etc.), or elements thereof. Java platforms provide a wide range of user-level functionalities that can be implemented in application programs such as an Internet browser, displaying text and graphics, playing and recording audio content, displaying and recording visual content, communicating with another computing device, and/or other functionalities. It should be understood that the systems disclosed herein (i.e. System for Learning AIIMs 100, System for Using AIIMs 500, etc.), or elements thereof, are programming language, platform, and operating system independent. Examples of programming languages that can be used instead of or in addition to Java include C, C++, Cobol, Python, Java Script, Tcl, Visual Basic, Pascal, VB Script, Per, PHP, Ruby, and/or other programming languages capable of implementing the functionalities described herein.

Knowledgebase 130 comprises the functionality for storing the knowledge of one or more conversations, and/or other functionalities. In some embodiments, Knowledgebase 130 may be or include Neural Network 130*a* (later described). In other embodiments, Knowledgebase 130 may be or include Graph 130*b* (later described). In further embodiments, Knowledgebase 130 may be or include Collection of Sequences 130*c* (later described). In further embodiments, Knowledgebase 130 may be or include Sequence 133 (later described). In general, Knowledgebase 130 may be or include any knowledge or data structure capable of storing the knowledge of one or more conversations and/or other data. Knowledgebase 130 may reside locally on System for Learning AIIMs 100 or Computing Device 70, or remotely (i.e. remote Knowledgebase 130, etc.) on a remote computing device (i.e. server, cloud, etc.) accessible over a network.

Picture-capturing Device 140 comprises the functionality for capturing one or more pictures, and/or other functionalities. As such, Picture-capturing Device 140 can be used to capture pictures comprising a Conversation Participant's 50 visual expressions or communication. Most modern computing and mobile devices include Picture-capturing Device 140 as one of the input devices. In some embodiments, Picture-capturing Device 140 may be or comprises a motion or still picture camera or other picture capturing device. In general, Picture-capturing Device 140 may capture any light (i.e. visible light, infrared light, ultraviolet light, x-ray light, etc.) across the electromagnetic spectrum onto a light-sensitive material. In one example, a digital Picture-capturing Device 140 can utilize a charge coupled device (CCD), a CMOS sensor, and/or other electronic image sensor to capture a Stream of Digital Pictures 143 (later described) that can then be stored in a memory, storage, or transmitted to a processing element such as Activity Detector 160, Knowledge Structuring Unit 110, and/or other disclosed elements. In another example, analog Picture-capturing Device 140 can utilize an analog-to-digital converter to produce a Stream of Digital Pictures 143. In some embodiments, Picture-capturing Device 140 can be built, embedded, or integrated in System for Learning AIIMs 100. In other embodiments, Picture-capturing Device 140 can be an external Picture-capturing Device 140 connected with System for Learning AIIMs 100. In further embodiments, Picture-capturing Device 140 comprises Computing Device 70 or elements thereof. In general, Picture-capturing Device 140 can be implemented in any suitable configuration to provide its functionalities.

Sound-capturing Device 150 comprises the functionality for capturing one or more sounds, and/or other functionalities. As such, Sound-capturing Device 150 can be used to capture sounds comprising a Conversation Participant's 50 verbal expressions or communication. Most modern computing and mobile devices include Sound-capturing Device 150 as one of the input devices. In some embodiments, Sound-capturing Device 150 may be or comprises a microphone or other sound capturing device. In some designs, microphone may be a directional microphone that enables capturing sounds from a direction where it is pointed while ignoring or being insensitive to sounds from other directions. Such directional microphone may be used for capturing sounds of a particular Conversation Participant 50 while ignoring or being insensitive to other sounds (i.e. ambient sounds, noise, sounds of other Conversation Participants 50, etc.). In general, Sound-capturing Device 150 may produce electrical signal from air pressure variations. Samples of the electrical signal can then be read to produce a stream of digital sound samples used herein. In one example, a digital Sound-capturing Device 150 may include an integrated analog-to-digital converter to capture a Stream of Digital Sound Samples 153 that can then be stored in a memory, storage, or transmitted to a processing element such as Activity Detector 160, Knowledge Structuring Unit 110, and/or other disclosed elements. In another example, analog Sound-capturing Device 150 may utilize an external analog-to-digital converter to produce a Stream of Digital Sound Samples 153. In some embodiments, Sound-capturing Device 150 can be built, embedded, or integrated in System for Learning AIIMs 100. In other embodiments, Sound-capturing Device 150 can be an external Sound-capturing Device 150 connected with System for Learning AIIMs 100. In further embodiments, Sound-capturing Device 150 comprises Computing Device 70 or elements thereof. In general, Sound-capturing Device 150 can be implemented in any suitable configuration to provide its functionalities.

Stream of Digital Pictures 143 comprises the functionality for storing a plurality of digital pictures, and/or other functionalities. In some aspects, Stream of Digital Pictures 143 comprises a live feed from Picture-capturing Device 140. In other aspects, Stream of Digital Pictures 143 comprises previously captured and stored Stream of Digital Pictures 143. System for Learning AIIMs 100 can use the previously captured and stored Streams of Digital Pictures 143 to implement its learning functionalities in which case Picture-capturing Device 140 can optionally be omitted. Pictures (i.e. frames) in a stream of digital pictures can be time stamped or sequenced. In some embodiments, Stream of Digital Pictures 143 comprises any type or form of digital motion picture such as MPEG, AVI, FLV, MOV, RM, SWF, WMV, DivX, and/or other digitally encoded motion picture. In other embodiments, Stream of Digital Pictures 143 comprises a plurality of any type or form of digital pictures such as digital bitmaps, JPEG pictures, GIF pictures, TIFF pictures, PDF pictures, and/or others. In yet other embodiments, Stream of Digital Pictures 143 comprises any computer-generated pictures such as views of a 3D game, 3D application, or CAD/CAM application captured or rendered as a stream of digital pictures. In further embodiments, Stream of Digital Pictures 143 comprises any application or process that can generate a stream of digital pictures or other visual content. A Stream of Digital Pictures 143 and a Stream of Digital Sound Samples 153 may commonly be included in a fie (i.e. video file, etc.) comprising both the Stream of Digital Pictures 143 and the Stream of Digital Sound Samples 153.

Stream of Digital Pictures 143 includes any features, functionalities, and embodiments of Sub-stream of Digital Pictures 145 (later described), and vice versa. Also, any operations on Stream of Digital Pictures 143 can be similarly performed on Sub-stream of Digital Pictures 145, and vice versa.

Stream of Digital Sound Samples 153 comprises the functionality for storing a plurality of digital sound samples, and/or other functionalities. In some aspects, Stream of Digital Sound Samples 153 comprises a live feed from Sound-capturing Device 150. In other aspects, Stream of Digital Sound Samples 153 comprises previously captured and stored Stream of Digital Sound Samples 153. System for Learning AIIMs 100 can use the previously captured and stored Streams of Digital Sound Samples 153 to implement its learning functionalities in which case Sound-capturing Device 150 can optionally be omitted. Sound samples in a stream of digital sound samples can be time stamped or sequenced. In some embodiments, Stream of Digital Sound Samples 153 comprises any type or form of digital sound such as WAV, WMA, AIFF, MP3, RA, OGG, and/or other digitally encoded sound. In other embodiments, Stream of Digital Sound Samples 153 comprises any computer-generated stream of digital sound samples such as synthesized sound. In further embodiments, Stream of Digital Sound Samples 153 comprises any application or process that can generate a stream of digital sound samples or other audio content. Stream of Digital Sound Samples 153 includes any features, functionalities, and embodiments of Sub-stream of Digital Sound Samples 155 (later described), and vice versa. Also, any operations on Stream of Digital Sound Samples 153 can be similarly performed on Sub-stream of Digital Sound Samples 155, and vice versa.

In some embodiments, Picture-capturing Device 140*a* may capture Stream of Digital Pictures 143*a* comprising Conversation Participant's 50*a* visual expressions or communication. Sound-capturing Device 150*a* may capture Stream of Digital Sound Samples 153*a* comprising Conversation Participant's 50*a* verbal expressions or communication. In some aspects, Stream of Digital Pictures 143*a* is captured simultaneously with Stream of Digital Sound Samples 153*a*. Stream of Digital Pictures 143*a* may therefore be associated with or correspond to Stream of Digital Sound Samples 153*a*. Similarly, Picture-capturing Device 140*b* may capture Stream of Digital Pictures 143*b* comprising Conversation Participant's 50*b* visual expressions or communication. Sound-capturing Device 150*b* may capture Stream of Digital Sound Samples 153*b* comprising Conversation Participant's 50*b* verbal expressions or communication. In some aspects, Stream of Digital Pictures 143*b* is captured simultaneously with Stream of Digital Sound Samples 153*b*. Stream of Digital Pictures 143*b* may therefore be associated with or correspond to Stream of Digital Sound Samples 153*b*.

Activity Detector 160 comprises the functionality for identifying, detecting, or determining conversational activities (also referred to simply as activities, etc.) of a Conversation Participant 50, and/or other functionalities. Examples of conversational activities include speaking, silent facial expressions, silent body movements, motionless silence, absence from the conversation, and/or others. Silent facial expressions, silent body movements, motionless silence, and/or other silent activities may be referred to as observing conversational activities. Some aspects of a conversation may involve exchanging verbal communication (i.e. speech, sounds, etc.) among Conversation Participants 50. Other aspects of a conversation may involve exchanging visual communication (i.e. facial expressions, gestures, body language, etc.) among Conversation Participants 50. These and/or other forms of communication or expressions may also be combined. Activity Detector 160 can detect conversational activities of a Conversation Participant 50 by processing either or both Stream of Digital Pictures 143 comprising the Conversation Participant's 50 visual expressions or communication and/or Stream of Digital Sound Samples 153 comprising the Conversation Participant's 50 verbal expressions or communication. Activity Detector 160 comprises the functionality for identifying Sub-streams of Digital Pictures 145 in a Stream of Digital Pictures 143. A Sub-stream of Digital Pictures 145 may include a Conversation Participant's 50 visual expressions or communication in a part of a conversation. Similarly, Activity Detector 160 comprises the functionality for identifying Sub-streams of Digital Sound Samples 155 in a Stream of Digital Sound Samples 153. A Sub-stream of Digital Sound Samples 155 may include a Conversation Participant's 50 verbal expressions or communication in a part of a conversation. Activity Detector 160 comprises the functionality for creating or generating a Conversational Activity 210 (also referred to as activity, Conv Activity, etc.) and storing one or more Sub-streams of Digital Pictures 145, one or more Sub-streams of Digital Sound Samples 155, and/or other data (i.e. Extra Info 250 [later described], etc.) into the Conversational Activity 210. As such, Conversational Activity 210 comprises the functionality for storing one or more Sub-streams of Digital Pictures 145, one or more Sub-streams of Digital Sound Samples 155, and/or other data. Conversational Activity 210 may therefore include a recording or data structure of a Conversation Participant's 50 conversational activity. Activity Detector 160 also comprises the functionality for extracting or filtering persons and/or objects of interest from Sub-streams of Digital Pictures 145, and extracting or filtering speech and/or sounds of interest from Sub-streams of Digital Sound Samples 155 as later described.

In one example. Activity Detector 160*a* can detect Conversation Participant's 50*a* speaking activity by recognizing Conversation Participant's 50*a* speech in Stream of Digital Sound Samples 153*a*. Specifically, for instance, Activity Detector 160*a* can identify a beginning of Conversation Participant's 50*a* speaking activity by recognizing Conversation Participant's 50*a* speech in Stream of Digital Sound Samples 153*a* after a threshold period of silence (i.e. no speech or sound, etc.). Further, Activity Detector 160 can identify an end of Conversation Participant's 50*a* speaking activity by recognizing a threshold period of silence in Stream of Digital Sound Samples 153*a* after the Conversation Participant's 50*a* speech. Recognizing silence in Stream of Digital Sound Samples 153*a* may mark a beginning of a new activity such as silent facial expressions, silent body movements, motionless silence, absence from the conversation, and/or other activity. In another example, Activity Detector 160*a* can detect Conversation Participant's 50*a* silent facial expressions activity by recognizing Conversation Participant's 50*a* facial expressions (i.e. smiling, lifting eyebrows, etc.) in Stream of Digital Pictures 143*a* and by recognizing Conversation Participant's 50*a* silence (i.e. no speech or sound, etc.) in Stream of Digital Sound Samples 153*a*. In another example, Activity Detector 160*a* can detect Conversation Participant's 50*a* silent body movements activity by recognizing Conversation Participant's 50*a* body movements (i.e. nodding head, shaking head, shrugging shoulders, pointing finger, pointing fist, etc.) in Stream of Digital Pictures 143*a* and by recognizing Conversation Participant's 50*a* silence (i.e. no speech or sound, etc.) in Stream of Digital Sound Samples 153*a*. In a further example, Activity Detector 160*a* can detect Conversation Participant's 50*a* motionless silence activity by recognizing no or marginal motion (i.e. no facial change, no body movement, etc.) of Conversation Participant 50*a* in Stream of Digital Pictures 143*a* and by recognizing Conversation Participant's 50*a* silence (i.e. no speech or sound, etc.) in Stream of Digital Sound Samples 153*a*. For instance, marginal motion of Conversation Participant 50*a* may include comparing one picture of Stream of Digital Pictures 143*a* with another (i.e. subsequent, etc.) picture of Stream of Digital Pictures 143*a* and determining that a number or percentage difference between regions of the two pictures comprising Conversation Participant 50*a* does not exceed a threshold. Other techniques known in art for determining marginal motion can be utilized. In a further example, Activity Detector 160 can detect Conversation Participant's 50*a* absence from the conversation activity by recognizing Conversation Participant's 50*a* absence (i.e. Conversation Participant 50*a* missing from the field of view, etc.) in Stream of Digital Pictures 143*a* and/or by recognizing Conversation Participant's 50*a* silence (i.e. no speech or sound, etc.) in Stream of Digital Sound Samples 153*a*. In some aspects, detecting any new conversational activity may mark an end to a previously detected conversational activity. In other aspects, Conversation Participant's 50*b* conversational activity may affect the determination of Conversation Participant's 50*a* conversational activity (i.e. one conversation participant's conversational activity may be related or depend on another conversation participant's conversational activity, etc.). Activity Detector 160 may identify Sub-stream of Digital Pictures 145*a* in Stream of Digital Pictures 143*a*, the Sub-stream of Digital Pictures 145*a* comprising Conversation Participant's 50*a* visual expressions or communication in a part of a conversation. Similarly, Activity Detector 160 may identify Sub-stream of Digital Sound Samples 155*a* in Stream of Digital Sound Samples 153*a*, the Sub-stream of Digital Sound Samples 155*a* comprising Conversation Participant's 50*a* verbal expressions or communication in a part of a conversation. Activity Detector 160 may then create or generate Conversational Activity 210 comprising Sub-stream of Digital Pictures 145*a*, Sub-stream of Digital Sound Samples 155*a*, and/or other data (i.e. Extra Info 250 [later described], etc.). Activity Detector 160*b* may detect Conversation Participant's 50*b* activities, and create or generate Conversation Participant's 50*b* Conversational Activities 210 using similar techniques as described above.

In some embodiments, Activity Detector 160 can utilize Picture Recognizer 163 to detect persons, objects, and/or their activities in Stream of Digital Pictures 143. Similarly, Activity Detector 160 can utilize Speech/Sound Recognizer 165 to detect speech and/or sounds in Stream of Digital Sound Samples 153. In general, Activity Detector 160 and/or other disclosed elements can use Picture Recognizer 163 and/or Speech/Sound Recognizer 165 for any other operation supported by Picture Recognizer 163 and/or Speech/Sound Recognizer 165.

Picture Recognizer 163 comprises the functionality for detecting or recognizing persons or objects in visual data. Picture Recognizer 163 comprises the functionality for detecting activities in visual data. Picture Recognizer 163 comprises the functionality for tracking persons, objects and/or their activities in visual data. Picture Recognizer 163 comprises other disclosed functionalities. Visual data includes digital motion pictures, digital still pictures (i.e. bitmaps, etc.), and/or other visual data. Examples of file formats that can be utilized to store visual data include AVI, DivX, MPEG, JPEG, GIF, TIFF, PNG, PDF, and/or other file formats. Picture Recognizer 163 may detect or recognize a person and/or his/her activities as well as track the person and/or his/her activities in Stream of Digital Pictures 143. Picture Recognizer 163 may detect or recognize a human head or face, upper body, full body, or portions/combinations thereof. In some aspects, Picture Recognizer 163 may detect or recognize persons, objects, and/or their activities from a picture (i.e. frame, etc.) of Stream of Digital Pictures 143 by comparing regions of pixels from the picture (i.e. frame, etc.) with collections of pixels comprising known persons, objects, and/or their activities. The collections of pixels comprising known persons, objects, and/or their activities can be learned, or manually, programmatically, or otherwise defined. The collections of pixels comprising known persons, objects, and/or their activities can be stored in any data structure or repository (i.e. database, etc.) that resides locally on System for Learning AIIMs 100 or Computing Device 70, or remotely on a remote computing device (i.e. server, cloud, etc.) accessible over a network. In other aspects, Picture Recognizer 163 may detect or recognize persons, objects, and/or their activities from a picture (i.e. frame, etc.) of Stream of Digital Pictures 143 by comparing features (i.e. lines, edges, ridges, corners, blobs, regions, etc.) of the picture (i.e. frame, etc.) with features of known persons, objects, and/or their activities. The features of known persons, objects, and/or their activities can be learned, or manually, programmatically, or otherwise defined. The features of known persons, objects, and/or their activities can be stored in any data structure or repository (i.e. neural network, database, etc.) that resides locally on System for Learning AIIMs 100 or Computing Device 70, or remotely on a remote computing device (i.e. server, cloud, etc.) accessible over a network. Typical steps or elements in a feature oriented picture recognition include pre-processing, feature extraction, detection/segmentation, decision-making, and/or others, or a combination thereof, each of which may include its own sub-steps or sub-elements depending on the application. In further aspects, Picture Recognizer 163 may detect or recognize multiple persons, objects, and/or their activities from a picture (i.e. frame, etc.) of Stream of Digital Pictures 143 using the aforementioned pixel or feature comparisons, and/or other detection or recognition techniques. For example, a picture of Stream of Digital Pictures 143 may depict two persons in two of its regions both of whom Picture Recognizer 163 can detect simultaneously. This functionality can be used in embodiments where Conversation Participants 50 need to be detected or recognized in a single Stream of Digital Pictures 143. In further aspects, where persons, objects, and/or their activities span multiple pictures, Picture Recognizer 163 may detect or recognize persons, objects, and/or their activities by applying the aforementioned pixel or feature comparisons and/or other detection or recognition techniques over a stream or sub-stream of pictures. For example, once a person is detected in a picture of Stream of Digital Pictures 143, the region of pixels comprising the detected person or the person's features can be searched in other pictures of Stream of Digital Pictures 143, thereby tracking the person through the Stream of Digital Pictures 143. In further aspects, Picture Recognizer 163 may detect or recognize a person's activities by identifying and/or analyzing differences between a detected region of pixels of one picture and detected regions of pixels of other pictures in Stream of Digital Pictures 143. For example, a region of pixels comprising a person's face can be detected in multiple consecutive pictures of Stream of Digital Pictures 143. Differences among the detected regions of the consecutive pictures may be identified in the mouth part of the person's face, and determined to be continuous over a time period (i.e. as opposed to a single random mouth movement, etc.) and diverse in variety (i.e. as opposed to a smile, etc.) to indicate a speaking activity. Any technique for recognizing speech from mouth/lip movements can be used in this and other examples. In further aspects, Picture Recognizer 163 may detect or recognize persons, objects, and/or their activities using one or more artificial neural networks, which may include statistical techniques. Examples of artificial neural networks that can be used in Picture Recognizer 163 include convolutional neural networks (CNNs), time delay neural networks (TDNNs), deep neural networks, and/or others. In one example, picture recognition techniques and/or tools involving convolutional neural networks may include identifying and/or analyzing tiled and/or overlapping regions or features of a picture, which may then be used to search for pictures with matching regions or features. In another example, features of different convolutional neural networks responsible for spatial and temporal streams can be fused to detect persons, objects, and/or their activities in motion pictures. In general, Picture Recognizer 163 may include any machine learning, deep learning, and/or other artificial intelligence techniques. Any other techniques known in art can be utilized in Picture Recognizer 163. For, example, thresholds for similarity, statistical, and/or optimization techniques can be utilized to determine a match in any of the above-described detection or recognition techniques. Picture Recognizer 163 comprises any features, functionalities, and embodiments of Substantial Similarity Comparison 125 (later described).

In some exemplary embodiments, facial recognition techniques and/or tools such as OpenCV (Open Source Computer Vision) library, Animetrics FaceR API, Lambda Labs Facial Recognition API, Face++ SDK, Neven Vision (also known as N-Vision) Engine, and/or others can be utilized for detecting or recognizing faces in digital pictures. In some aspects, facial recognition techniques and/or tools involve identifying and/or analyzing facial features such as the relative position, size, and/or shape of the eyes, nose, cheekbones, jaw, etc., which may then be used to search for pictures with matching features. For example, FaceR API can detect a person's face in Stream of Digital Pictures 143 captured by Picture-capturing Device 140 or stored in an electronic repository, which can then be utilized in Activity Detector 160, Knowledge Structuring Unit 110, and/or other elements.

In other exemplary embodiments, object recognition techniques and/or tools such as OpenCV (Open Source Computer Vision) library, CamFind API, Kooaba, 6px API, Dextro API, and/or others can be utilized for detecting or recognizing objects (i.e. objects, animals, people, etc.) in digital pictures. In some aspects, object recognition techniques and/or tools involve identifying and/or analyzing object features such as lines, edges, ridges, corners, blobs, regions, and/or their relative positions, sizes, shapes, etc., which may then be used to search for pictures with matching features. For example, OpenCV library can detect an object (i.e. car, pedestrian, door, building, animal, person, etc.) in Stream of Digital Pictures 143 captured by Picture-capturing Device 140 or stored in an electronic repository, which can then be utilized in Activity Detector 160, Knowledge Structuring Unit 110, and/or other elements.

Speech/Sound Recognizer 165 comprises the functionality for detecting or recognizing speech or sounds in audio data. Speech/Sound Recognizer 165 comprises other disclosed functionalities. Audio data includes digital sound, and/or other audio data. Examples of file formats that can be utilized to store audio data include WAV, WMA, AIFF, MP3, RA, OGG, and/or other file formats. Speech/Sound Recognizer 165 may detect or recognize speech or sounds of a person in Stream of Digital Sound Samples 153. In some aspects, Speech/Sound Recognizer 165 may detect or recognize a person's speech or sounds from Stream of Digital Sound Samples 153 by comparing collections of sound samples from the Stream of Digital Sound Samples 153 with collections of known sound samples. The collections of known sound samples can be learned, or manually, programmatically, or otherwise defined. The collections of known sound samples can be stored in any data structure or repository (i.e. database, etc.) that resides locally on System for Learning AIIMs 100 or Computing Device 70, or remotely on a remote computing device (i.e. server, cloud, etc.) accessible over a network. In other aspects, Speech/Sound Recognizer 165 may detect or recognize a person's speech or sounds from Stream of Digital Sound Samples 153 by comparing features from the Stream of Digital Sound Samples 153 with features of known sounds. The features of known sounds can be learned, or manually, programmatically, or otherwise defined. The features of known sounds can be stored in any data structure or repository (i.e. database, neural network, etc.) that resides locally on System for Learning AIIMs 100 or Computing Device 70, or remotely on a remote computing device (i.e. server, cloud, etc.) accessible over a network. Typical steps or elements in a feature oriented speech or sound recognition include preprocessing, feature extraction, acoustic modeling, language modeling, and/or others, or a combination thereof, each of which may include its own sub-steps or sub-elements depending on the application. Either or both acoustic modeling and/or language modeling can be used in speech or sound recognition. Acoustic features can be used for classification of non-verbal vocal outbursts such as laughter or sighs whereas linguistic features can be used to transcribe the linguistic message such as words, phrases, or sentences. In further aspects, Speech/Sound Recognizer 165 may be implemented as speaker dependent or speaker independent. Speaker dependent speech or sound recognition may identify a speaker in addition to recognizing his/her speech. In further aspects, Speech/Sound Recognizer 165 may detect or recognize speeches or sounds of multiple persons from Stream of Digital Sound Samples 153 using the aforementioned sound sample or feature comparisons, using speaker dependent speech/sound recognition, and/or using other detection or recognition techniques. In one example, speaker dependent speech/sound recognition may involve analyzing characteristics of a person's voice or speech, thereby distinguishing it from other persons' voices or speeches. A person's voice or speech characteristics needed for speaker dependent speech recognition can be learned automatically through the learning of conversations disclosed herein. For instance, such automatic learning of a person's voice or speech characteristics can be accomplished in situations where the person's voice is completely or relatively isolated from other persons' voices (i.e. where conversation participants are remote from one another, in videoconferencing, etc.). In another example, a person's voice or speech characteristics needed for speaker dependent speech recognition can be learned through a training session where a person may read text or isolated vocabulary and the system may analyze the person's voice or speech characteristics to fine-tune the recognition of that person's speech. Speaker dependent speech recognition functionality can be used in embodiments where speeches of multiple Conversation Participants 50 need to be detected or recognized in a single Stream of Digital Sound Samples 153. Speaker dependent speech recognition functionality can also be used in cases where Conversation Participants 50 are in close proximity to one another (i.e. in the same room, etc.) and where al of their voices can be detected by one or more Sound-capturing Devices 150. In further aspects, Speech/Sound Recognizer 165 may detect or recognize a variety of sounds from Stream of Digital Sound Samples 153 using the aforementioned sound sample or feature comparisons and/or other detection or recognition techniques. For example, sound of wind, door closing, car passing, and/or other sounds can be detected and used as extra or contextual information (i.e. Extra Info 250 [later described], etc.) in matching, decision-making, and/or other elements or functionalities herein. In further aspects, Speech/Sound Recognizer 165 may be implemented as keyword spotting or as full speech recognition. Keyword spotting may attempt to find only a select group of words and/or phrases, and because of this limited lexicon consumes fewer resources. Full speech recognition may attempt to find al the words and/or phrases, and because of this broader lexicon consumes significant resources. In further aspects, Speech/Sound Recognizer 165 may detect or recognize speech or sounds using Hidden Markov Models (HMM), Artificial Neural Networks, Dynamic Time Warping (DTW), Gaussian Mixture Models (GMM), and/or other models or techniques, or a combination thereof. Some or all of these models or techniques may include statistical techniques. Examples of artificial neural networks that can be used in Speech/Sound Recognizer 165 include recurrent neural networks, time delay neural networks (TDNNs), deep neural networks, and/or others. In general, Speech/Sound Recognizer 165 may include any machine learning, deep learning, and/or other artificial intelligence techniques. Any other techniques known in art can be utilized in Speech/Sound Recognizer 165. For example, thresholds for similarity, statistical, and/or optimization techniques can be utilized to determine a match in any of the above-described detection or recognition techniques. Speech/Sound Recognizer 165 comprises any features, functionalities, and embodiments of Substantial Similarity Comparison 125 (later described).

In some exemplary embodiments, operating system's speech/sound recognition functionalities such as iOS's Voice Services, Siri, and/or others can be utilized in Speech/Sound Recognizer 165. For example, iOS Voice Services can detect speech/sound in Stream of Digital Sound Samples 153 captured by Sound-capturing Device 150 or stored in an electronic repository, which can then be utilized in Activity Detector 160, Knowledge Structuring Unit 110, and/or other elements.

In other exemplary embodiments, Java Speech API (JSAPI) implementation such as The Cloud Garden, Sphinx, and/or others can be utilized in Speech/Sound Recognizer 165. For example, Cloud Garden JSAPI can detect speech/sound in Stream of Digital Sound Samples 153 captured by Sound-capturing Device 150 or stored in an electronic repository, which can then be utilized in Activity Detector 160, Knowledge Structuring Unit 110, and/or other elements. Any other programming language's or platform's speech or sound processing API can similarly be utilized.

In further exemplary embodiments, applications or engines providing speech/sound recognition functionalities such as HTK (Hidden Markov Model Toolkit), Kaldi, OpenEars, Dragon Mobile, Julius, iSpeech, CeedVocal, and/or others can be utilized in Speech/Sound Recognizer 165. For example, Kaldi SDK can detect speech/sound in Stream of Digital Sound Samples 153 captured by Sound-capturing Device 150 or stored in an electronic repository, which can then be utilized in Activity Detector 160, Knowledge Structuring Unit 110, and/or other elements.

Figure 3A:
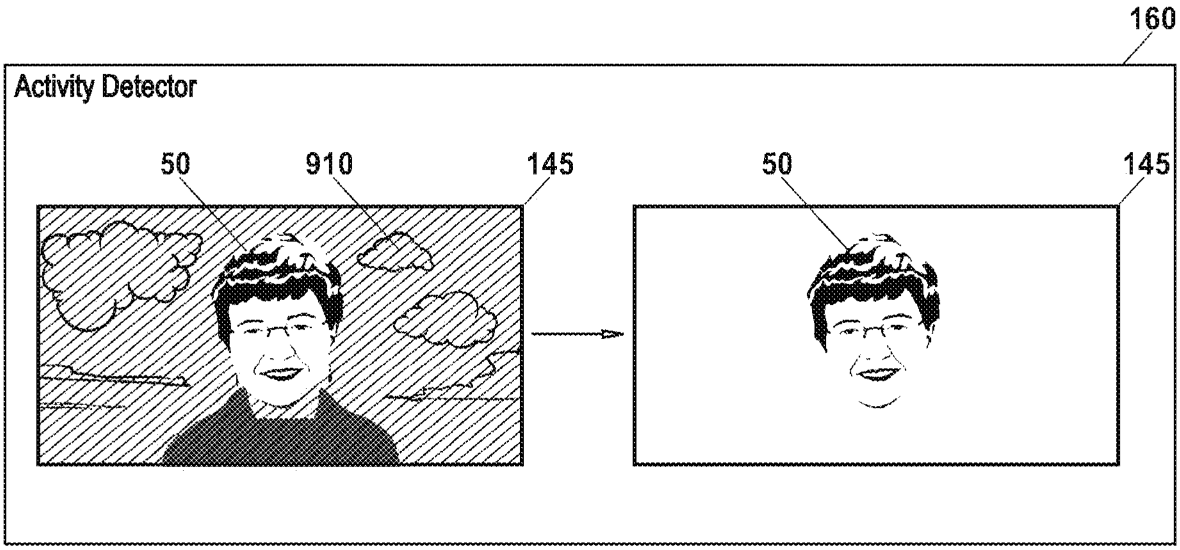
FIG. 3A illustrates an embodiment of Activity Detector 160 extracting or filtering persons and/or objects of interest.

Referring to FIG. 3A, an embodiment of Activity Detector 160 extracting or filtering persons and/or objects of interest is illustrated. This way, learning of conversations can focus on Conversation Participants' 50 visual expressions or communication regardless of and across different visual backgrounds, surrounding objects, and/or other insignificant content. In one example, a picture of Sub-stream of Digital Pictures 145 may include Conversation Participant 50 and background objects such as clouds, sky, and/or other objects (i.e. trees, buildings, vehicles, etc.) as shown. Activity Detector 160 can detect Conversation Participant's 50 face using Picture Recognizer 163 (i.e. facial recognition, etc.) and/or other techniques. Once detected, Activity Detector 160 can change all pixels of the picture, except for the region of pixels comprising Conversation Participant's 50 face, into a uniform color (i.e. white, blue, gray, etc.) so that the region of pixels comprising Conversation Participant's 50 face becomes prominent and Insignificant Content 910 becomes suppressed or removed. Activity Detector 160 can perform similar picture processing on other pictures in Sub-stream of Digital Pictures 145. This way, the processed Sub-stream of Digital Pictures 145 would include only Conversation Participant's 50 face without Insignificant Content 910. In another example, Activity Detector 160 can extract the region of pixels comprising Conversation Participant's 50 face from a picture of the Sub-stream of Digital Pictures 145. The extracted region of pixels can then be stored back into the original picture replacing or overwriting all of its original pixels. The extracted region of pixels can alternatively be stored into a new picture a plurality of which may form a new Sub-stream of Digital Pictures 145 comprising Conversation Participant's 50 face. Activity Detector 160 can perform similar picture processing on other pictures in Sub-stream of Digital Pictures 145. In some aspects, Activity Detector 160 can store the processed pictures into the Sub-stream of Digital Pictures 145 so that both original and processed pictures are available in separate channels or repositories within Sub-stream of Digital Pictures 145. In addition to the previously described Picture Recognizer 163 that itself includes segmentation functionalities, any picture segmentation techniques can be utilized solely, in part, or in combination with other techniques in extracting or filtering persons and/or objects of interest from pictures of Sub-stream of Digital Pictures 145. Examples of picture segmentation techniques include thresholding, clustering, region-growing, edge detection, curve propagation, level sets, graph partitioning, model-based segmentation, trainable segmentation (i.e. artificial neural networks, etc.), and/or others. Extracting or filtering persons and/or objects of interest can optionally be performed within another disclosed element (i.e. Picture-capturing Device 140, etc.) or by an additional element instead of within Activity Detector 160 in alternate embodiments.

Figure 3B:
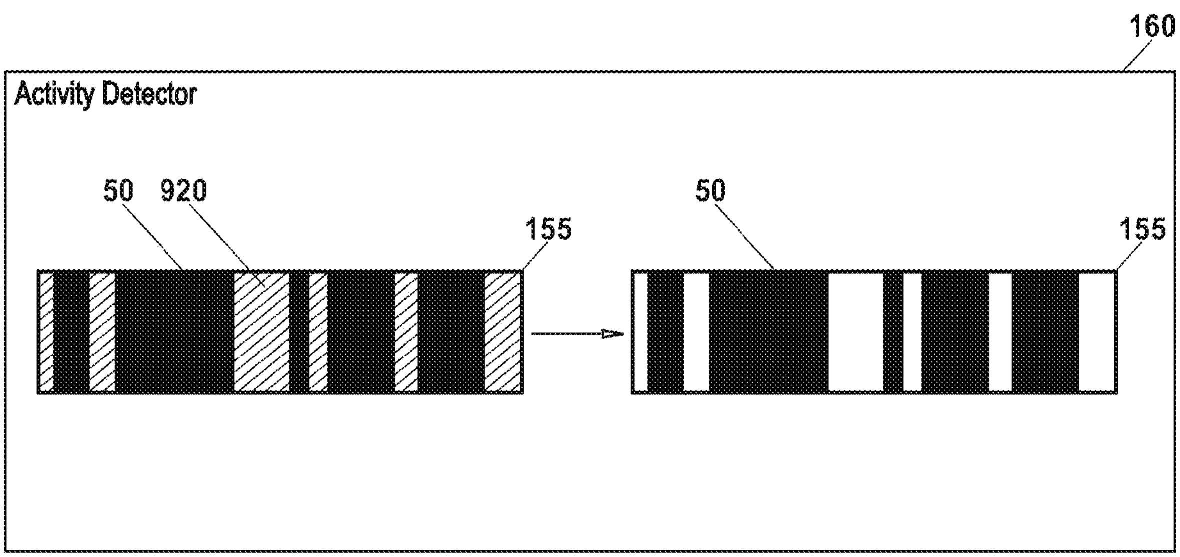
FIG. 3B illustrates an embodiment of Activity Detector 160 extracting or filtering speech and/or sounds of interest.

Referring to FIG. 3B, an embodiment of Activity Detector 160 extracting or filtering speech and/or sounds of interest is illustrated. This way, learning of conversations can focus on Conversation Participants' 50 verbal expressions or communication regardless of and across different acoustic backgrounds, ambient noises, and/or other insignificant sounds. As sound can be captured in various environments, before or as part of the extraction or filtering, Activity Detector 160 can perform denoising of entire Sub-stream of Digital Sound Samples 155. Noise may include any signal that degrades the quality of speech or sounds of interest such as equipment related noise, electrical or electromagnetic noise, or environmental noise. Examples of denoising techniques include Adaptive Wiener Filtering, Spectral Subtraction Methods (i.e. cepstral mean normalization, etc.), Spectral Restoration (i.e. speech enhancement, etc.), Harmonic Decomposition, Nonnegative Matrix Factorization (NMF), and/or others. In one example, Sub-stream of Digital Sound Samples 155 may include Conversation Participant's 50 speech and ambient sounds such as sound of water waves, laughter of nearby persons, music, and/or other sounds as shown. Activity Detector 160 can detect Conversation Participant's 50 speech using Speech/Sound Recognizer 165 and/or other techniques. Once detected, Activity Detector 160 can change all sound samples of Sub-stream of Digital Sound Samples 155, except for the sound samples comprising Conversation Participant's 50 speech, into silence so that Conversation Participant's 50 speech becomes prominent and Insignificant Sounds 920 become suppressed or removed. This way, the processed Sub-stream of Digital Sound Samples 155 would include only speech of Conversation Participant 50 without Insignificant Sounds 920. In some aspects, Activity Detector 160 can change (i.e. reduce, etc.) the intensities of all sound samples of Sub-stream of Digital Sound Samples 155, except for the sound samples comprising Conversation Participant's 50 speech, so that Conversation Participant's 50 speech becomes prominent and Insignificant Sounds 920 become suppressed or removed. In further aspects, since Conversation Participant's 50 sounds may be highest in amplitude, Activity Detector 160 can reduce (i.e. reduce to zero, etc.) the intensities of sound samples that are below a certain amplitude or intensity threshold, so that Conversation Participant's 50 speech becomes prominent and Insignificant Sounds 920 become suppressed or removed. In yet some aspects, since sounds can overlap in time, Activity Detector 160 can change the intensities of all sound samples of Sub-stream of Digital Sound Samples 155, including the sound samples comprising Conversation Participant's 50 speech, so that Conversation Participant's 50 speech becomes prominent and Insignificant Sounds 920 become suppressed or removed. In another example, Activity Detector 160 can extract sound samples comprising Conversation Participant's 50 speech from Sub-stream of Digital Sound Samples 155. The extracted sound samples can then be stored back into Sub-stream of Digital Sound Samples 155 replacing all of its original sound samples. The extracted sound samples can alternatively be stored into a new Sub-stream of Digital Sound Samples 155 comprising Conversation Participant's 50 speech. In some aspects, Activity Detector 160 can store the extracted sound samples into Sub-stream of Digital Sound Samples 155 so that both original and extracted sound samples are available in separate channels or repositories within Sub-stream of Digital Sound Samples 155. In addition to the previously described Speech/Sound Recognizer 165 that itself includes segmentation functionalities, any speech or sound segmentation techniques can be utilized solely, in part, or in combination with other techniques in extracting or filtering speech and/or sounds of interest from Sub-stream of Digital Sound Samples 155. Examples of speech or sound segmentation techniques include whole-word models, subword models, decomposition models, phonotactic models, any of the aforementioned denoising techniques, and/or others. Extracting or filtering speech and/or sounds of interest can optionally be performed within another disclosed element (i.e. Sound-capturing Device 150, etc.) or by an additional element instead of within Activity Detector 160 in alternate embodiments.

Figure 4:
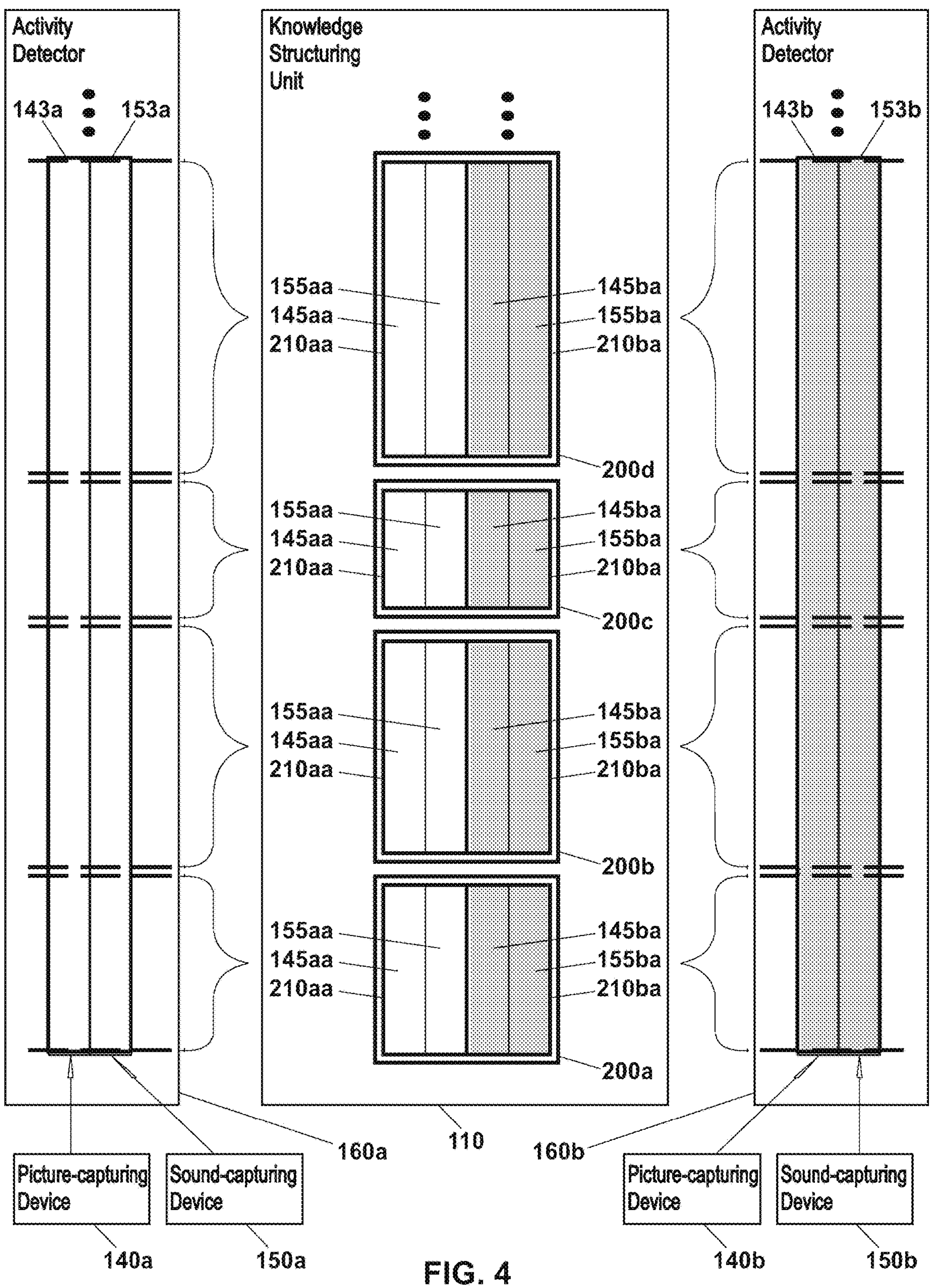
FIG. 4 illustrates an embodiment of Knowledge Structuring Unit 110.

Referring to FIG. 4, an embodiment of Knowledge Structuring Unit 110 is illustrated. Knowledge Structuring Unit 110 comprises the functionality for structuring the knowledge of one or more conversations, and/or other functionalities. Knowledge Structuring Unit 110 comprises the functionality for correlating Conversational Activities 210. Knowledge Structuring Unit 110 comprises the functionality for creating or generating a Round of Conversational Exchange 200 and storing one or more Conversational Activities 210 and/or other data (i.e. Extra Info 250 [later described], etc.) into the Round of Conversational Exchange 200. As such, Round of Conversational Exchange 200 (also referred to as Round of Conv, etc.) comprises the functionality for storing one or more Conversational Activities 210 and/or other data. Once created or generated, Rounds of Conversational Exchange 200 can be used in/as neurons, nodes, vertices, or other elements in any of the knowledge or data structures/arrangements (i.e. neural networks, graphs, sequences, etc.) used for storing the knowledge of conversations and facilitating learning functionalities herein.

In some embodiments, Knowledge Structuring Unit 110 may receive one or more Conversational Activities 210 of Conversation Participants 50*a* and 50*b* from Activity Detectors 160*a* and 160*b*, respectively. Knowledge Structuring Unit 110 may then correlate the one or more Conversational Activities 210 of Conversation Participant 50*a* with the one or more Conversational Activities 210 of Conversation Participant 50*b* and store the correlated Conversational Activities 210 into a Round of Conversational Exchange 200 as shown. In effect, Round of Conversational Exchange 200 includes a unit of knowledge (i.e. correlated Conversational Activities 210, etc.) of how one Conversation Participant 50 acted relative to another Conversation Participant 50, and vice versa, in a part of a conversation. When Conversational Activities 210 with similar content, structure, and/or other properties are detected involving a user in the future, the learned Conversational Activities 210 of one or more Conversation Participants 50 stored in Rounds of Conversational Exchange 200 can be anticipated, thereby simulating a conversation with one or more AI Conversation Participants 55 as later described. In one example, Conversation Participant 50*a* may speak while Conversation Participant 50*b* observes (i.e. silent facial expressions, silent body movements, motionless silence, etc.) in a particular part of a conversation, therefore, a Round of Conversational Exchange 200 may include Conversation Participant's 50*a* speaking Conversational Activity 210 correlated with Conversation Participant's 50*b* silent facial expressions Conversational Activity 210. In another example, both Conversation Participants 50*a* and 50*b* may observe in a particular part of a conversation, therefore, a Round of Conversational Exchange 200 may include Conversation Participant's 50*a* silent body movements Conversational Activity 210 correlated with Conversation Participant's 50*b* silent facial expressions Conversational Activity 210. In a further example, both Conversation Participants 50*a* and 50*b* may speak in a particular part of a conversation, therefore, a Round of Conversational Exchange 200 may include Conversation Participant's 50*a* speaking Conversational Activity 210 correlated with Conversation Participant's 50*b* speaking Conversational Activity 210.

Figure 5:
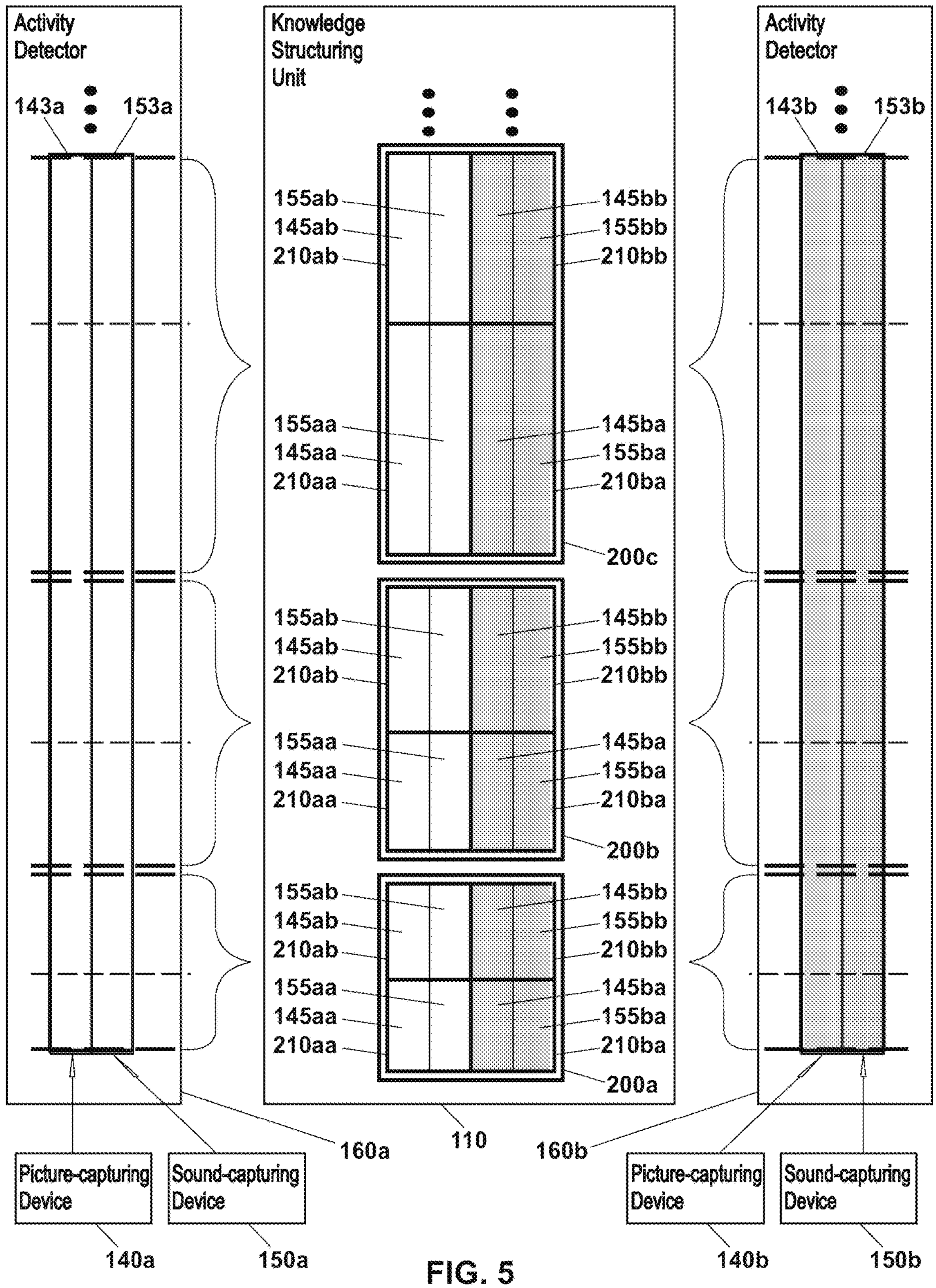
FIG. 5 illustrates another embodiment of Knowledge Structuring Unit 110.

Referring to FIG. 5, another embodiment of Knowledge Structuring Unit 110 is illustrated. In some aspects, the timing of Conversational Activities 210 of different Conversation Participants 50 may coincide. In other aspects, the timing of Conversational Activities 210 of different Conversation Participants 50 can partially coincide or overlap. In further aspects, the number of Conversational Activities 210 of one Conversation Participant 50 may equal the number of Conversational Activities 210 of another Conversation Participant 50. In further aspects, the number of Conversational Activities 210 of one Conversation Participant 50 can differ from the number of Conversational Activities 210 of another Conversation Participant 50. In general, a Round of Conversational Exchange 200 may include any number, types, timing, and/or other properties of Conversational Activities 210 of any number of Conversation Participants 50 arranged in any conceivable combination.

Figure 6A:
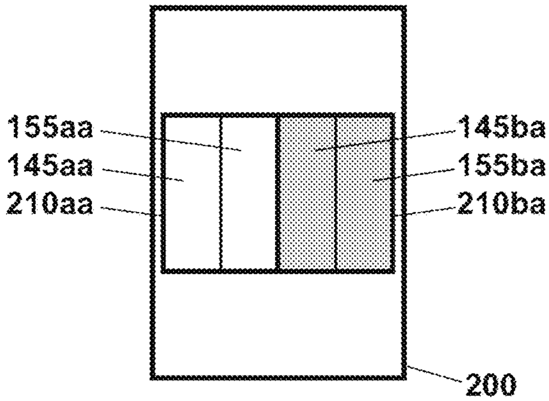
FIG. 6A-6F illustrate variety of possible arrangements of Conversational Activities 210 that can be stored in Rounds of Conversational Exchange 200.

Referring to FIG. 6A, an exemplary embodiment of Round of Conversational Exchange 200 comprising one Conversational Activity 210 of Conversation Participant 50*a* and one Conversational Activity 210 of Conversation Participant 50*b* that temporally coincide (i.e. Conversational Activities 210 of both Conversation Participants 50 may start and end at the same time, etc.) is illustrated. For example, speaking Conversational Activity 210 of Conversation Participant 50*a* correlated with silent body movements Conversational Activity 210 of Conversation Participant 50*b* can be stored in a Round of Conversational Exchange 200.

Figure 6B:
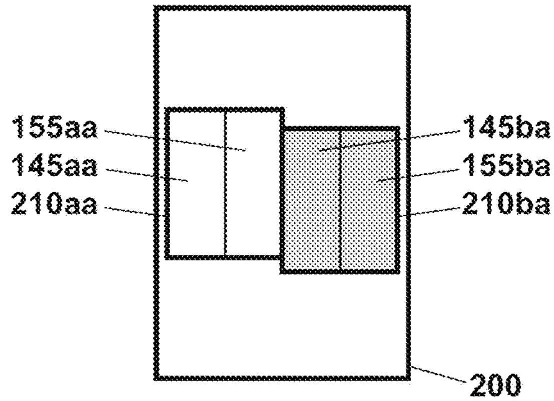

Referring to FIG. 6B, an exemplary embodiment of Round of Conversational Exchange 200 comprising one Conversational Activity 210 of Conversation Participant 50*a* and one Conversational Activity 210 of Conversation Participant 50*b* that temporally partially coincide is illustrated.

Figure 6C:
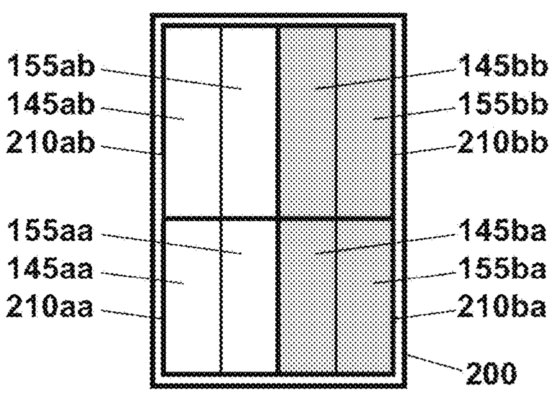

Referring to FIG. 6C, an exemplary embodiment of Round of Conversational Exchange 200 comprising two Conversational Activities 210 of Conversation Participant 50*a* and two Conversational Activities 210 of Conversation Participant 50*b* that temporally coincide (i.e. Conversational Activities 210 of both Conversation Participants 50 may start and end at same times, etc.) is illustrated. For example, speaking Conversational Activity 210 of Conversation Participant 50*a* correlated with silent facial expressions Conversational Activity 210 of Conversation Participant 50*b* and subsequent motionless silence Conversational Activity 210 of Conversation Participant 50*a* correlated with subsequent speaking Conversational Activity 210 of Conversation Participant 50*b* can be stored in a Round of Conversational Exchange 200.

Figure 6D:
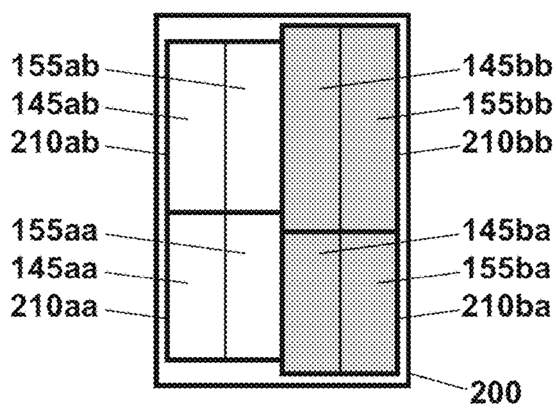

Referring to FIG. 6D, an exemplary embodiment of Round of Conversational Exchange 200 comprising two Conversational Activities 210 of Conversation Participant 50*a* and two Conversational Activities 210 of Conversation Participant 50*b* that temporally partially coincide is illustrated.

Figure 6E:
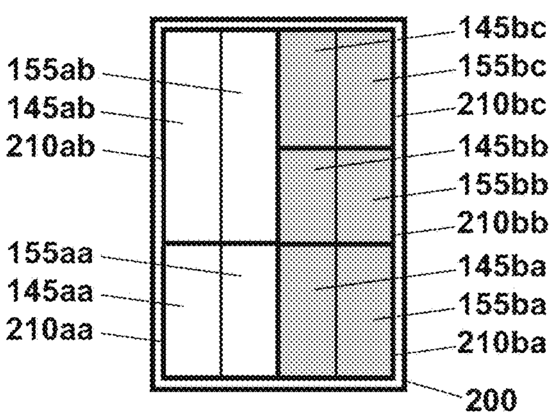

Referring to FIG. 6E, an exemplary embodiment of Round of Conversational Exchange 200 comprising two or more Conversational Activities 210 of Conversation Participant 50*a* and two or more Conversational Activities 210 of Conversation Participant 50*b* is illustrated. Some of the Conversational Activities 210 may temporally coincide as shown. In one example, two Conversational Activities 210 of Conversation Participant 50*a* correlated with three Conversational Activities 210 of Conversation Participant 50*b* can be stored in a Round of Conversational Exchange 200. Specifically, in this example, speaking and silent body movements Conversational Activities 210 of Conversation Participant 50*a* correlated with silent facial expressions, silent body movements, and speaking Conversational Activities 210 of Conversation Participant 50*b* can be stored in a Round of Conversational Exchange 200. In another example, two Conversational Activities 210 of Conversation Participant 50*a* correlated with one Conversational Activity 210 of Conversation Participant 50*b* can be stored in a Round of Conversational Exchange 200.

Figure 6F:
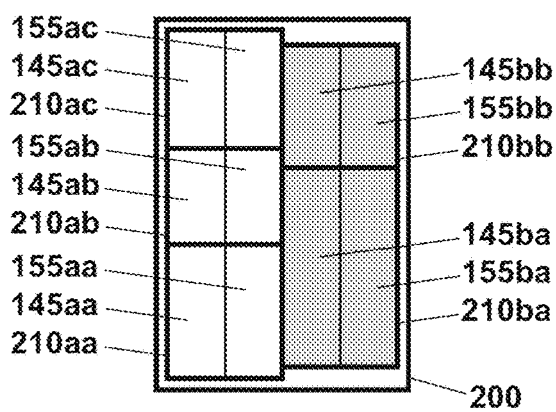

Referring to FIG. 6F, another exemplary embodiment of Round of Conversational Exchange 200 comprising two or more Conversational Activities 210 of Conversation Participant 50*a* and two or more Conversational Activities 210 of Conversation Participant 50*b* is illustrated. Some of the Conversational Activities 210 may temporally partially coincide as shown.

Figure 7A:
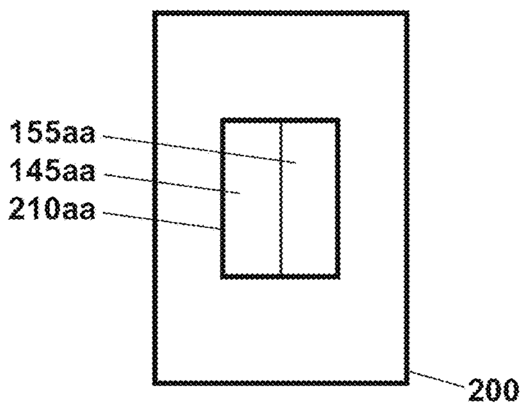
FIG. 7A-7E illustrate additional variety of possible arrangements of Conversational Activities 210 that can be stored in Rounds of Conversational Exchange 200.
Figure 7B:
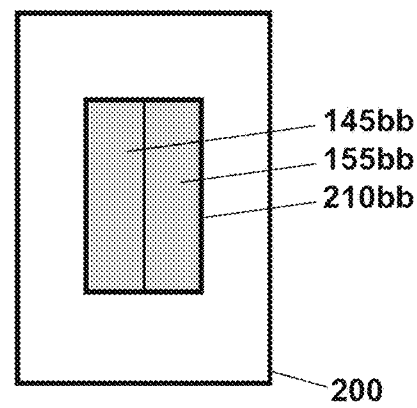

Referring to FIGS. 7A and 7B, exemplary embodiments of Round of Conversational Exchange 200 comprising one Conversational Activity 210 of Conversation Participant 50*a* or 50*b* is illustrated. Such Rounds of Conversational Exchange 200 can be used to store some Conversational Activities 210 of Conversation Participants 50*a* and 50*b* while omitting others. For example, speaking Conversational Activities 210 of Conversation Participants 50*a* and 50*b* can be stored in Rounds of Conversational Exchange 200 while observing Conversational Activities 210 (i.e. silent facial expressions, silent body movements, motionless silence, etc.) can be omitted. In some aspects, Rounds of Conversational Exchange 200 comprising a single Conversational Activity 210 may themselves be correlated or interconnected indicating their relationships.

Figure 7C:
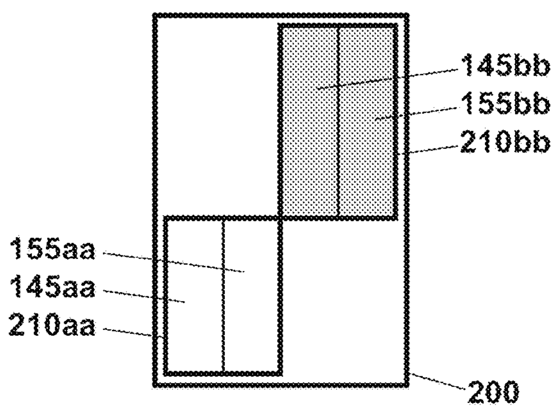

Referring to FIG. 7C, an exemplary embodiment of Round of Conversational Exchange 200 comprising one Conversational Activity 210 of Conversation Participant 50*a* and one Conversational Activity 210 of Conversation Participant 50*b* that temporally extend (i.e. Conversational Activity 210 of one Conversation Participant 50 starts where Conversational Activity 210 of another Conversation Participant 50 ends, etc.) one another is illustrated. Such Rounds of Conversational Exchange 200 can be used to store some Conversational Activities 210 of Conversation Participants 50*a* and 50*b* while omitting others. For example, speaking Conversational Activities 210 of Conversation Participants 50*a* and 50*b* can be stored in a Round of Conversational Exchange 200 while observing Conversational Activities 210 (i.e. silent facial expressions, silent body movements, motionless silence, etc.) can be omitted.

Figure 7D:
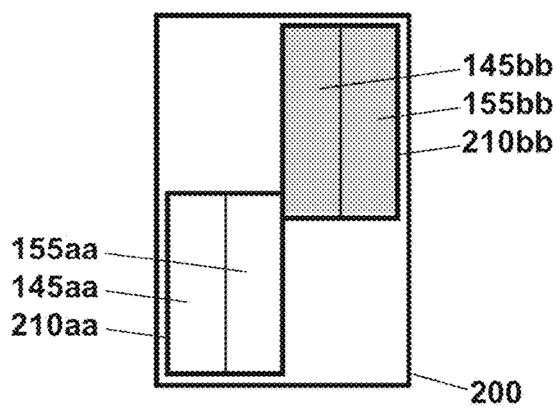

Referring to FIG. 7D, an exemplary embodiment of Round of Conversational Exchange 200 comprising one Conversational Activity 210 of Conversation Participant 50*a* and one Conversational Activity 210 of Conversation Participant 50*b* that temporally extend one another and overlap is illustrated.

Figure 7E:
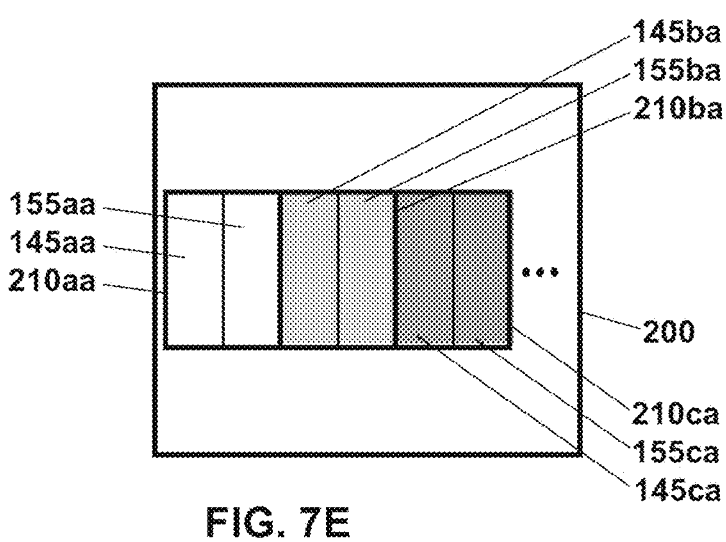

Referring to FIG. 7E, an exemplary embodiment of Round of Conversational Exchange 200 comprising one Conversational Activity 210 of Conversation Participant 50*a*, one Conversational Activity 210 of Conversation Participant 50*b*, and one Conversational Activity 210 of Conversation Participant 50*c* (not shown) that temporally coincide (i.e. Conversational Activities 210 of all Conversation Participants 50 may start and end at the same time, etc.) is illustrated. Round of Conversational Exchange 200 may include Conversational Activities 210 of any number of Conversation Participants 50. For example, speaking Conversational Activity 210 of Conversation Participant 50*a* correlated with silent body movements Conversational Activity 210 of Conversation Participant 50*b* and silent facial expressions Conversational Activity 210 of Conversation Participant 50*c* can be stored in a Round of Conversational Exchange 200. Any of the previously described partially coinciding, overlapping, and/or extending Conversational Activities 210 can similarly be used in Round of Conversational Exchange 200 comprising Conversational Activities 210 of more than two Conversation Participants 50. Round of Conversational Exchange 200 comprising Conversational Activities 210 of more than two Conversation Participants 50 can be used to learn conversations among more than two persons. As such, Round of Conversational Exchange 200 comprising Conversational Activities 210 of more than two Conversation Participants 50 may include a unit of knowledge (i.e. correlated Conversational Activities 210, etc.) of how multiple Conversation Participants 50 acted relative to other Conversation Participants 50 in a part of a conversation.

One of ordinary skill in art will understand that Rounds of Conversational Exchange 200 in the preceding figures are described merely as examples of a variety of possible implementations and that any number or arrangement of Conversational Activities 210 can be used in a Round of Conversational Exchange 200 in alternate embodiments. Also, it should be understood that the various data structures such as Conversational Activity 210, Round of Conversational Exchange 200, and/or others are used to organize the disclosed elements in particular embodiments, and that other additional data structures can be included as needed, or some of the disclosed ones can be excluded, or a combination thereof can be utilized in alternate embodiments. In one example, Rounds of Conversational Exchange 200 as containers for Conversational Activities 210 can be omitted in which case Conversational Activities 210 can be stored directly into nodes of neural network, graph, sequence, and/or other knowledge or data structure. In another example, Conversational Activities 210 as containers for Sub-streams of Digital Pictures 145 and/or Sub-streams of Digital Sound Samples 155 can be omitted in which case Sub-streams of Digital Pictures 145 and/or Sub-streams of Digital Sound Samples 155 can be stored directly into Rounds of Conversational Exchange 200 or into nodes of neural network, graph, sequence, and/or other knowledge or data structure.

Figure 8A:
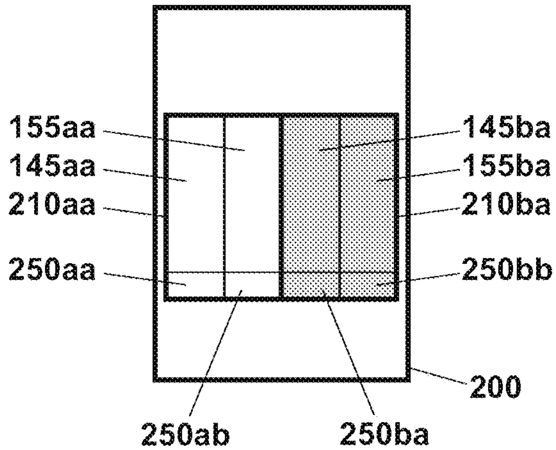
FIG. 8A-8C illustrate some embodiments of Extra Information 250.
Figure 8B:
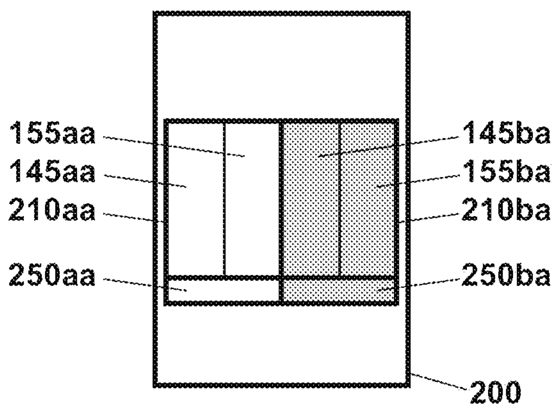
Figure 8C:
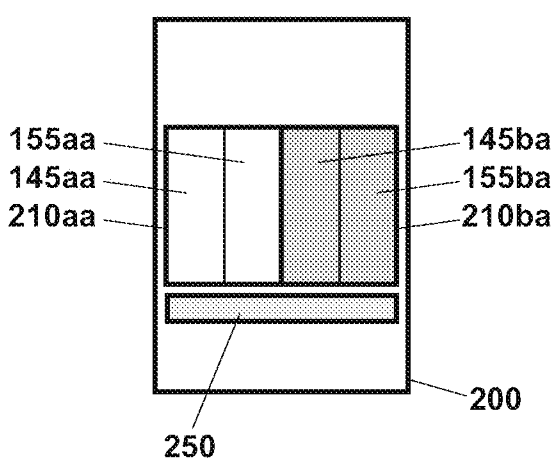

Referring to FIG. 8A-8C, embodiments of Extra Information 250 (also referred to as Extra Info 250) are illustrated. Extra Info 250 comprises the functionality for storing any information useful in simulating AI Conversation Participant 55 (later described), and/or other functionalities. In one example, Extra Info 250 can be stored in or associated with a Sub-stream of Digital Pictures 145 or Sub-stream of Digital Sound Samples 155 as shown in FIG. 8A. In another example, Extra Info 250 can be stored in or associated with Conversational Activity 210 as shown in FIG. 8B. In a further example, Extra Info 250 can be stored in or associated with a Round of Conversational Exchange 200 as shown in FIG. 8C. In general, Extra Info 250 related to any other element can similarly be stored in or associated with that element. In some embodiments, Knowledge Structuring Unit 110 can obtain and/or store Extra Info 250 in its creation of Round of Conversational Exchange 200. In other embodiments, Activity Detector 160 can obtain and/or store Extra Info 250 in its creation of Conversational Activity 210. Examples of Extra Info 250 include time information, location information, observed information, contextual information, and/or other information. Any information can be utilized that can provide additional information for enhanced simulation of AI Conversation Participant 55 (later described). Which information is stored in Extra Info 250 can be set by a user, by AIIM system administrator, or automatically by the system. Extra Info 250 may include or be referred to as contextual information, and vice versa. Therefore, these terms may be used interchangeably herein. In some aspects, time information (i.e. time stamp, etc.) stored in Extra Info 250 can be useful in anticipating AI Conversation Participant's 55 Conversational Activities 210 related to a specific time period as people sometimes talk specific topics at certain parts of day, month, year, and/or other time periods. Time information can be obtained from the system clock or other time source. In one example, people may speak about how nice or bad a morning is early in the day and how sleepy or tired they are late in the day. In another example, people may speak about how expensive the monthly mortgage payment is in the beginning of the month. In a further example, people may speak about sun and sunny days in the summer, about falling leaves and rain in the fall, and about snow and ice in the winter. In a further example, people may speak about specific holiday topics on particular dates of the year. In other aspects, location information (i.e. latitude/longitude/altitude coordinates, address, etc.) stored in Extra Info 250 can be useful in anticipating AI Conversation Participant's 55 Conversational Activities 210 related to a specific place as people sometimes talk about specific topics at certain places (i.e. frequently visited or other places, etc.). Location information can be obtained from a positioning system (i.e. radio signal triangulation in smartphones or tablets, GPS capabilities in some high-end digital cameras, etc.) if one is available. For example, people may speak about school related topics at school, work related topics at work, religious topics at a house of worship, and/or other topics related to other places. In further aspects, observed information stored in Extra Info 250 can be useful in anticipating AI Conversation Participant's 55 Conversational Activities 210 related to a specific object or environment as people sometimes talk about proximal objects or environments. An object or environment can be recognized by processing Sub-stream of Digital Pictures 145 and/or Sub-stream of Digital Sound Samples 155. For example, the system may recognize a specific object or environment such as library, park, beach, gym, and/or others in Sub-stream of Digital Pictures 145 and/or in Sub-stream of Digital Sound Samples 155. Any features, functionalities, and embodiments of Picture Recognizer 163 and/or Speech/Sound Recognizer 165 can be utilized for such recognizing. For example, book shelves recognized in the background of Sub-stream of Digital Pictures 145 may indicate a library or book store, trees recognized in the background of Sub-stream of Digital Pictures 145 may indicate a park, sound of waves recognized in Sub-stream of Digital Sound Samples 155 may indicate a beach, and/or others.

Figure 9A:
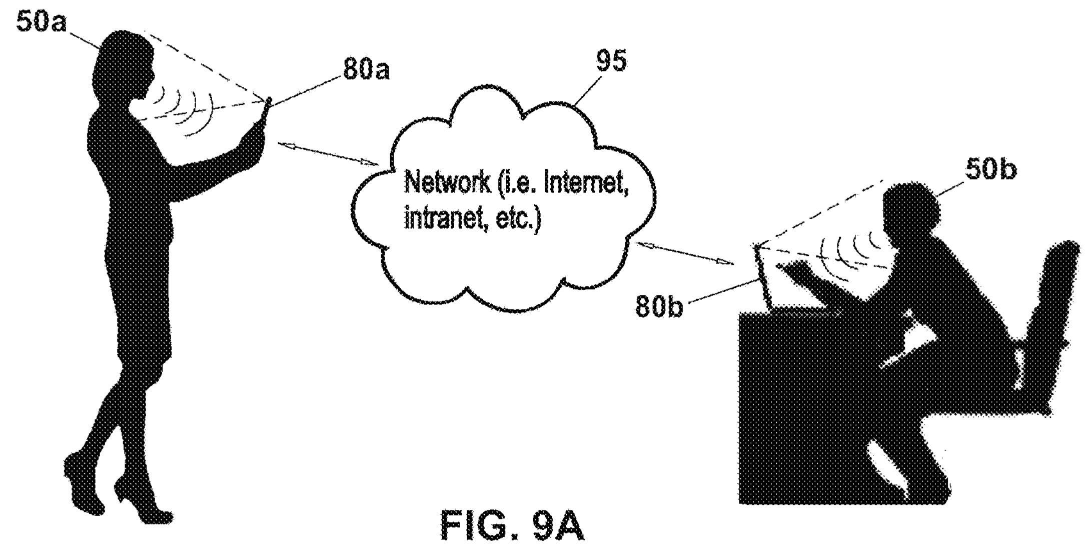
FIG. 9A illustrates an embodiment of utilizing System for Learning AIIMs 100 implemented as a network service.

Referring to FIG. 9A, an embodiment of utilizing System for Learning AIIMs 100 implemented as a network service is illustrated.

Figure 9B:
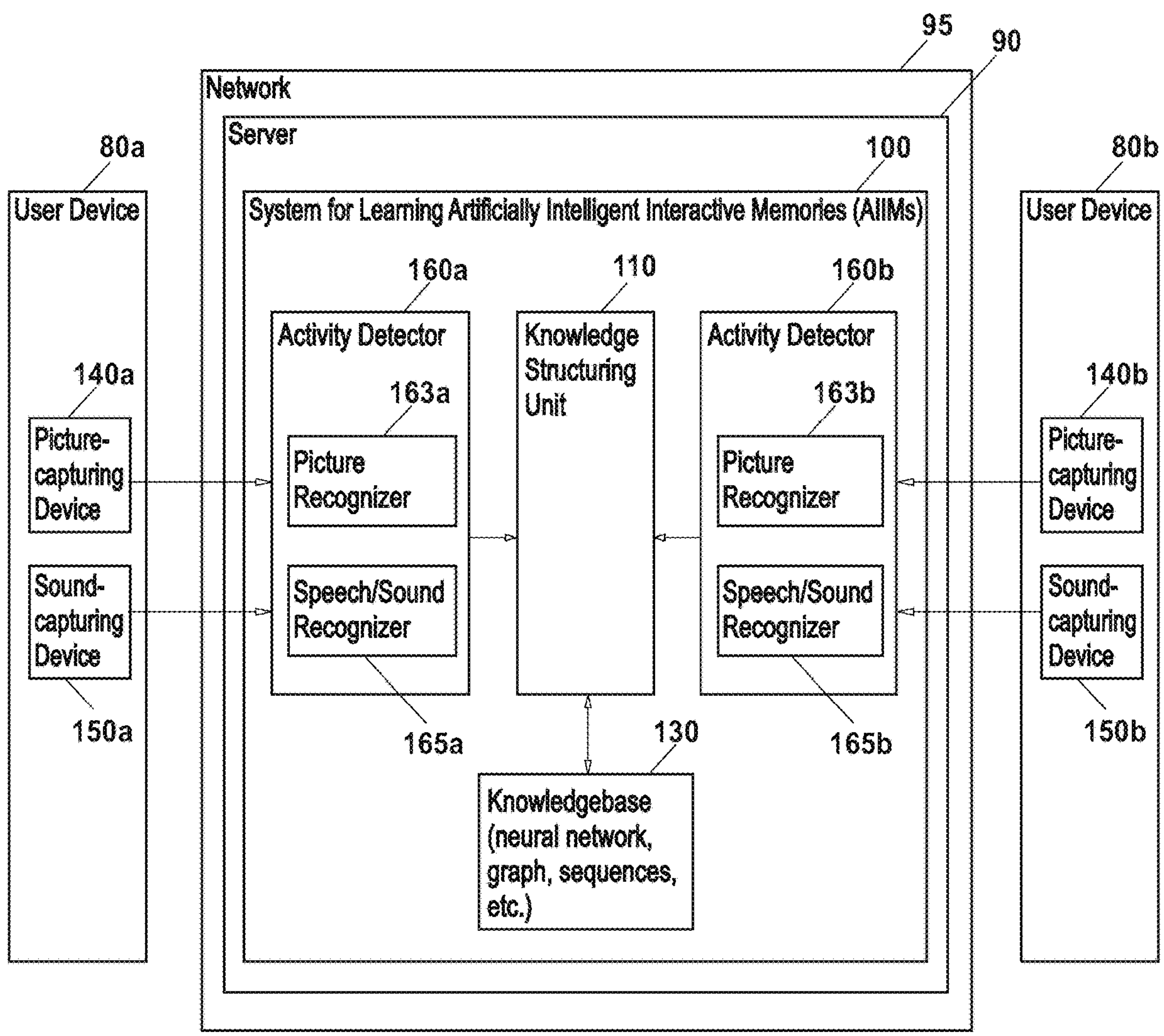
FIG. 9B illustrates an embodiment of internal structure of System for Learning AIIMs 100 implemented as a network service.

Referring to FIG. 9B, an embodiment of internal structure of System for Learning AIIMs 100 implemented as a network service is illustrated. System for Learning AIIMs 100 comprises interconnected Knowledge Structuring Unit 110, Knowledgebase 130, and Activity Detectors 160*a* and 160*b*. Some embodiments of Activity Detector 160*a* may include Picture Recognizer 163*a* and Speech/Sound Recognizer 165*a* whereas some embodiments of Activity Detector 160*b* may include Picture Recognizer 163*b* and Speech/Sound Recognizer 165*b*. System for Learning AIIMs 100 or any element thereof may reside or operate on Server 90 (i.e. also referred to as remote computing device, etc.), which is accessible by User Devices 80*a* and 80*b* over Network 95. User Devices 80*a* and 80*b* comprise Picture-capturing Devices 140*a* and 140*b*, respectively, and Sound-capturing Devices 150*a* and 150*b*, respectively. Server 90, and User Devices 80*a* and 80*b* may include any features, functionalities, and embodiments of the previously described Computing Device 70. Other additional elements can be included as needed, or some of the disclosed ones can be excluded, or a combination thereof can be utilized in alternate embodiments.

In some embodiments, System for Learning AIIMs 100 can learn conversations among Conversation Participants 50 in a video call. A video call may be facilitated by services or applications such as Apple FaceTime, Google Hangouts, Skype, Viber, and/or other video call services or applications. Such services commonly use one or more Servers 90 accessible over Network 95 (i.e. Internet, intranet, etc.) to facilitate video calls for their users. Server 90 may be or include any type or form of a remote computing device such as an application server, a network service server, a cloud server, a cloud, and/or other remote computing device. In addition to traditional networks (i.e. Internet, intranet, etc.), Network 95 may include any type or form of direct connection among User Devices 80 such as wired or wireless (i.e. Bluetooth, WiFi, etc.) direct connection. Two or more Conversation Participants 50 may engage in a video call using their respective User Devices 80. User Device 80 comprises any computing, mobile, telecommunication, electronic, and/or other device that can facilitate AIIM functionalities. Examples of User Device 80 include a smartphone, a personal computer, a mobile computer (i.e. tablet, laptop, etc.), and/or others. User Device 80 may include any features, functionalities, and embodiments of the previously described Computing Device 70. Most modern User Devices 80 comprise Picture-capturing Device 140 (i.e. built-in camera, etc.) and Sound-capturing Device 150 (i.e. built-in microphone, etc.). It should be understood that Server 90 does not have to be a separate or central computing device in between User Devices 80*a* and 80*b*, and that Server 90 or portions thereof can be implemented on one or more of User Devices 80*a* and/or 80*b*. In some designs, Server 90 may indeed be omitted, in which case all of its elements and functionalities would be distributed or performed on User Devices 80*a* and/or 80*b*. In such implementations, Knowledge Structuring Unit 110, Knowledgebase 130, Activity Detectors 160*a* and 160*b*, and/or other elements of System for Learning AIIMs 100 can reside on User Devices 80*a* and/or 80*b* depending on design.

In other embodiments, System for Learning AIIMs 100 can learn conversations among Conversation Participants 50 in a text messaging or textual chat. System for Learning AIIMs 100 may include a text input device (i.e. keyboard, keypad, touch screen, etc.) instead of or in addition to Picture-capturing Device 140 and/or Sound-capturing Device 150. The text input device can be used for exchanging textual expressions or communication among Conversation Participants 50. In such implementations, System for Learning AIIMs 100 can learn textual expressions or communication instead of visual and/or verbal expressions or communication. For example, Conversation Participants 50 may engage in text messaging or textual chat using their respective User Devices 80. Text messaging or textual chat may be facilitated by services or applications such as Apple iMessage, Google Messenger, Skype Instant Messaging, Textra SMS, IRC, and/or others. Such services commonly use one or more Servers 90 accessible over Network 95 (i.e. Internet, intranet, etc.) to facilitate text messaging or textual chat for their users, although, text messaging or textual chat can be peer-to-peer without a server. As Conversation Participants 50 exchange textual expressions or communication, System for Learning AIIMs 100 can learn the textual conversations among the Conversation Participants 50 as described herein with respect to learning visual and verbal expressions or communication. Specifically, Conversational Activity 210 would include text instead of Stream of Digital Pictures 143 and/or Stream of Digital Sound Samples 153. In some aspects, learning textual expressions or communication may be easier to implement since it is easier or even apparent to detect conversational activities in textual communication (i.e. a conversational activity may include a single or group of text messages, etc.). Also, less processing is required for text relative to visual and verbal data. Stream of Digital Pictures 143, Stream of Digital Sound Samples 153, some parts of Activity Detector 160, and/or other elements can be optionally omitted in System for Learning AIIMs 100 that learns textual conversations.

Figure 10A:
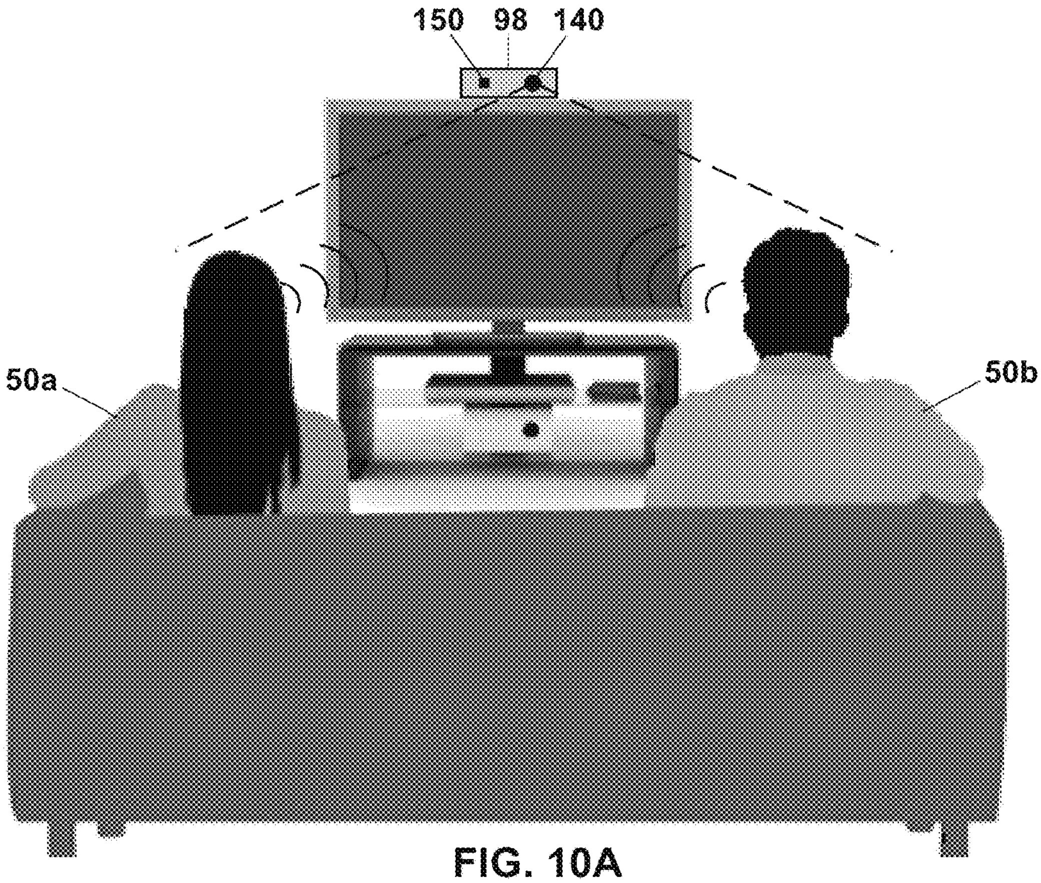
FIG. 10A illustrates an embodiment of utilizing System for Learning AIIMs 100 embedded in Host Device 98.

Referring to FIG. 10A, an embodiment of utilizing System for Learning AIIMs 100 embedded in Host Device 98 is illustrated.

Figure 10B:
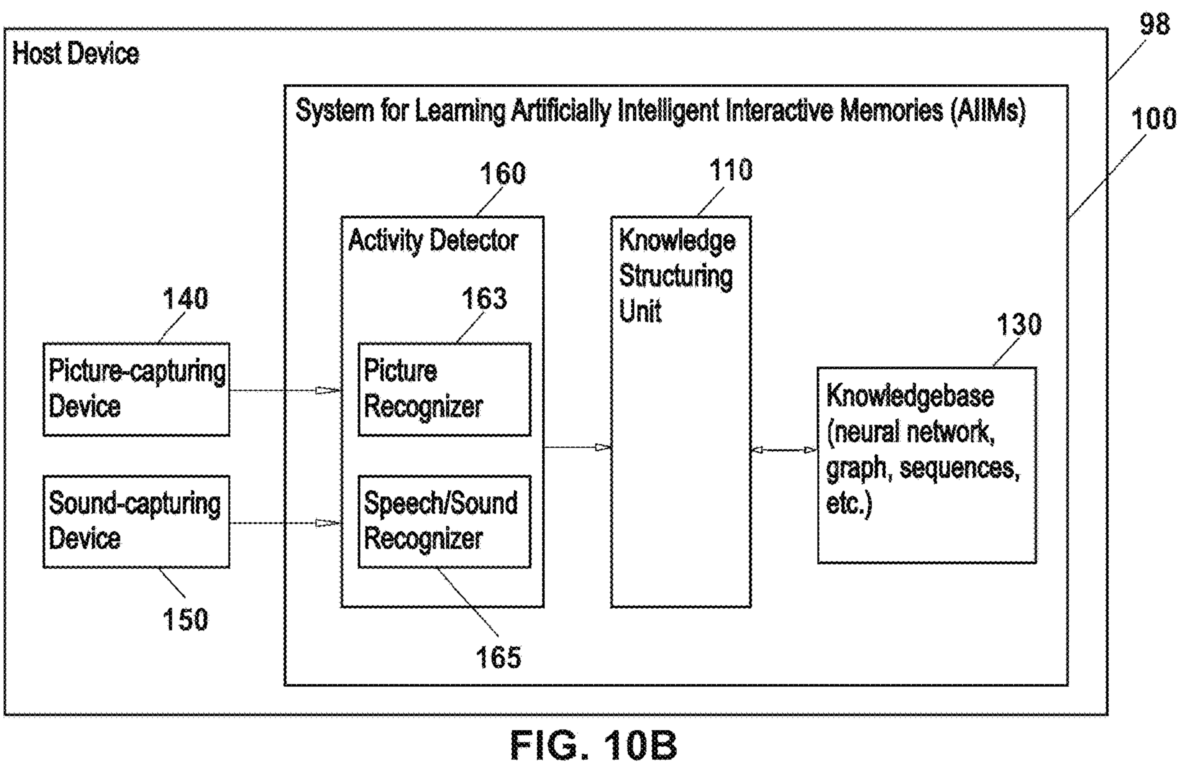
FIG. 10B illustrates an embodiment of internal structure of System for Learning AIIMs 100 embedded in Host Device 98.

Referring to FIG. 10B, an embodiment of internal structure of System for Learning AIIMs 100 embedded in Host Device 98 is illustrated. System for Learning AIIMs 100 comprises interconnected Knowledge Structuring Unit 110, Knowledgebase 130, and Activity Detector 160. Some embodiments of Activity Detector 160 may include Picture Recognizer 163 and Speech/Sound Recognizer 165. System for Learning AIIMs 100 may reside or operate on Host Device 98. System for Learning AIIMs 100 may utilize Host Device's 98 Picture-capturing Device 140 and Sound-capturing Device 150 to implement its functionalities. Host Device 98 may include any features, functionalities, and embodiments of the previously described Computing Device 70. Other additional elements can be included as needed, or some of the disclosed ones can be excluded, or a combination thereof can be utilized in alternate embodiments.

In some aspects, System for Learning AIIMs 100 can learn conversations among Conversation Participants 50 engaged in a conversation near Host Device 98. Host Device 98 comprises any computing, mobile, telecommunication, electronic, and/or other device that can facilitate AIIM functionalities. Examples of Host Devices 98 include a television device, a set-top box, a disc or other media player (i.e. DVD or Blue-ray player, etc.), a gaming device (i.e. Microsoft Xbox, Sony PlayStation, etc.), a smartphone (i.e. Apple iPhone, Samsung Galaxy, etc.), a mobile computer (i.e. tablet or laptop computer, etc.), a still or motion picture camera, and/or others. Host Device 98 may include one or more Picture-capturing Devices 140 (i.e. built-in cameras, etc.) and Sound-capturing Devices 150 (i.e. built-in microphones, etc.). In the case of more than one Picture-capturing Device 140 and Sound-capturing Device 150, each Conversation Participant 50 may have a dedicated Picture-capturing Device 140 and Sound-capturing Device 150, and System for Learning AIIMs 100 may operate as previously described. In the case of a single Picture-capturing Device 140 and a single Sound-capturing Device 150, Activity Detector 160 can detect a plurality (i.e. one for each Conversation Participant 50, etc.) of parallel Sub-streams of Digital Pictures 145 from a single Stream of Digital Pictures 143 captured by the single Picture-capturing Device 140. Similarly, Activity Detector 160 can detect a plurality (i.e. one for each Conversation Participant 50, etc.) of parallel Sub-streams of Digital Sound Samples 155 from a single Stream of Digital Sound Samples 153 captured by the single Sound-capturing Device 150. A parallel Sub-stream of Digital Pictures 145 may include visual expressions or communication of one of the Conversation Participants 50 in the single Stream of Digital Pictures 143. A parallel Sub-stream of Digital Sound Samples 155 may include verbal expressions or communication of one of the Conversation Participants 50 in the single Stream of Digital Sound Samples 153. Activity Detector 160 can utilize the previously described functionalities of Picture Recognizer 163 (i.e. facial recognition, etc.) to recognize and/or track multiple Conversation Participants 50 in a single Stream of Digital Pictures 143. Similarly, Activity Detector 160 can utilize the previously described functionalities of Speech/Sound Recognizer 165 (i.e. speaker dedicated recognition, etc.) to recognize and/or track multiple Conversation Participants' 50 speeches or sounds in a single Stream of Digital Sound Samples 153.

In some designs, instead of being captured by Picture-capturing Device 140 in real time, the single Stream of Digital Pictures 143 may be or include any stored stream of digital pictures captured by any picture-capturing device. Similarly, instead of being captured by Sound-capturing Device 150 in real time, the single Stream of Digital Sound Samples 153 may be or include any stored stream of digital sound samples captured by any sound-capturing device. As such, Activity Detector 160 can detect a plurality (i.e. one for each Conversation Participant 50, etc.) of parallel Sub-streams of Digital Pictures 145 from a single stored Stream of Digital Pictures 143 and a plurality (i.e. one for each Conversation Participant 50, etc.) of parallel Sub-streams of Digital Sound Samples 155 from a single stored Stream of Digital Sound Samples 153. The single stored Stream of Digital Pictures 143 and/or the single stored Stream of Digital Sound Samples 153 may commonly be included in a file (i.e. video file, etc.) comprising the Stream of Digital Pictures 143 and/or the Stream of Digital Sound Samples 153. Examples of such files include family videos, recorded video or phone conversations, news interviews, video databases (i.e. Youtube, Yahoo Video Search, Google Videos, etc.), and/or any other material comprising a recording of a conversation among two or more conversation participants. In one example, System for Learning AIIMs 100 can learn conversations from one or more family videos selected by a user. In another example, System for Learning AIIMs 100 can traverse Youtube videos to learn conversations involving a particular person. The videos involving the person may be found by searching for the person's name or other information. In a further example, System for Learning AIIMs 100 can traverse Youtube videos to learn conversations involving some or all persons depicted in some or all Youtube videos.

Figure 11:
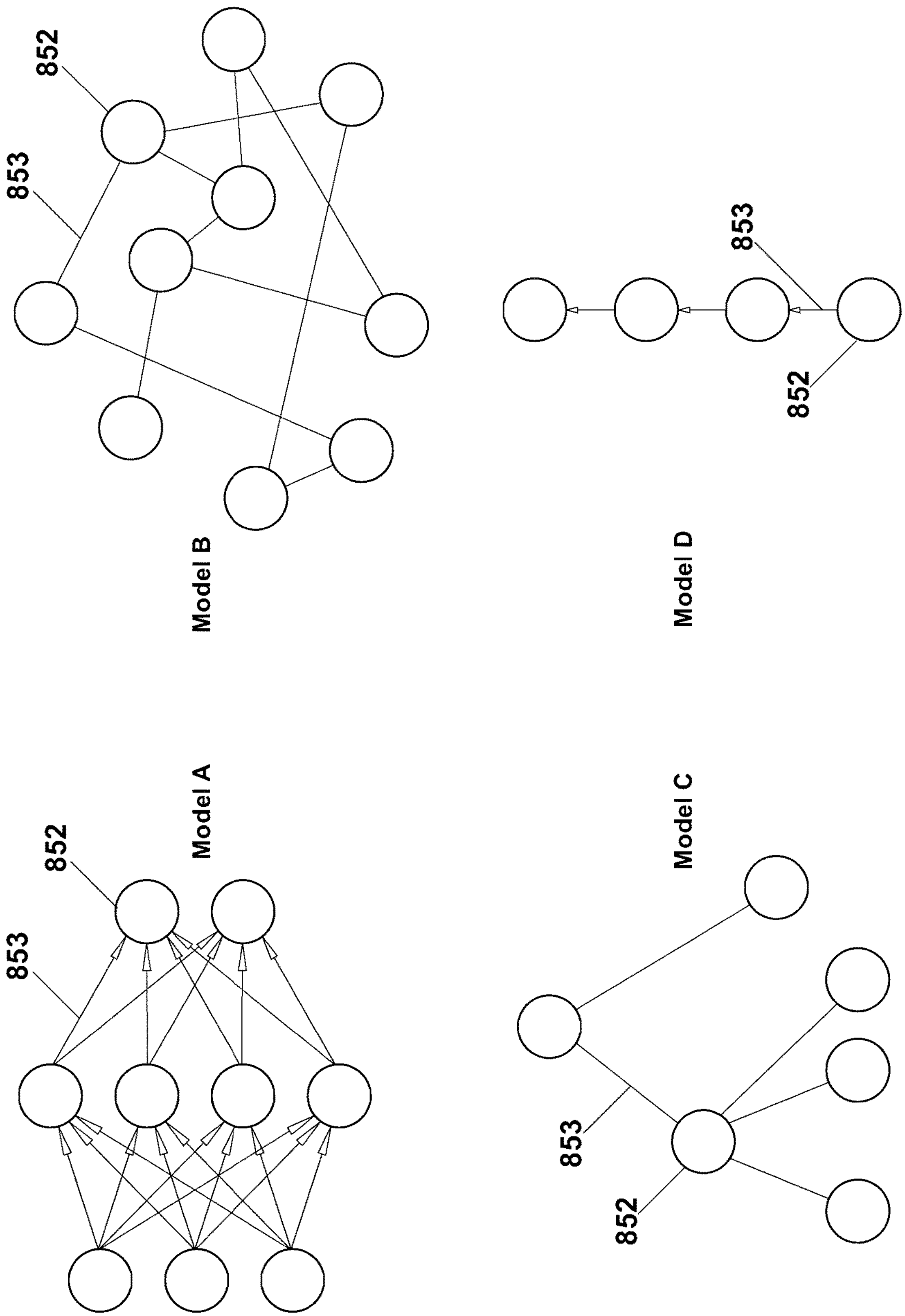
FIG. 11 illustrates various artificial intelligence methods, systems, and/or models that can be utilized in AIIM embodiments.

Referring to FIG. 11, the teaching presented by the disclosure can be implemented to include various artificial intelligence models and/or techniques. The disclosed devices, systems, and methods for learning and using AIIMs are independent of the artificial intelligence model and/or technique used and any model and/or technique can be utilized to facilitate the functionalities described herein. Examples of these models and/or techniques include deep learning, supervised learning, unsupervised learning, neural networks (i.e. convolutional neural network, recurrent neural network, deep neural network, etc.), search-based, logic and/or fuzzy logic-based, optimization-based, tree/graph/other data structure-based, hierarchical, symbolic and/or sub-symbolic, evolutionary, genetic, multi-agent, deterministic, probabilistic, statistical, and/or other models and/or techniques.

In one example shown in Model A, the disclosed devices, systems, and methods for learning and using AIIMs may include a neural network (also referred to as artificial neural network, etc.). As such, machine learning, knowledge representation or structure, pattern recognition, decision making, and/or other artificial intelligence functionalities may include a network of Nodes 852 (also referred to as neurons in the context of neural networks, etc.) and Connections 853 similar to that of a brain. Node 852 can store any data, object, data structure, and/or other item, or reference thereto. Node 852 may also include a function for transforming or manipulating any data, object, data structure, and/or other item. Examples of such transformation functions include mathematical functions (i.e. addition, subtraction, multiplication, division, sin, cos, log, derivative, integral, etc.), object manipulation functions (i.e. creating an object, modifying an object, deleting an object, appending objects, etc.), data structure manipulation functions (i.e. creating a data structure, modifying a data structure, deleting a data structure, creating a data field, modifying a data field, deleting a data field, etc.), and/or other transformation functions. Connection 853 can store or be associated with a value such as a symbolic label or numeric attribute (i.e. weight, cost, capacity, length, etc.). A neural network can be utilized as a predictive modeling approach in machine learning. A computational model can be utilized to compute values from inputs based on a pre-programmed or learned function or method. For example, a neural network may include one or more input neurons that can be activated by inputs. Activations of these neurons can then be passed on, weighted, and transformed by a function to other neurons. Neural networks may range from those with only one layer of single direction logic to multi-layer of multi-directional feedback loops. A neural network can use weights to change the parameters of the network's throughput. A neural network can learn by input from its environment or from self-teaching using written-in rules. An exemplary embodiment of a neural network (i.e. Neural Network 130*a*, etc.) is described later.

In another example shown in Model B, the disclosed devices, systems, and methods for learning and using AIIMs may include a graph or graph-like data structure. As such, machine learning, knowledge representation or structure, pattern recognition, decision making, and/or other artificial intelligence functionalities may include Nodes 852 (i.e. vertices, points, etc.) and Connections 853 (i.e. edges, arrows, lines, arcs, etc.) organized as a graph. A graph can be utilized as a predictive modeling approach in machine learning. In general, any Node 852 in a graph can be connected to any other Node 852. A Connection 853 may include unordered pair of Nodes 852 in an undirected graph or ordered pair of Nodes 852 in a directed graph. Nodes 852 can be part of the graph structure or external entities represented by indices or references. Nodes 852, Connections 853, and/or operations of a graph may include any features, functionalities, and embodiments of the aforementioned Nodes 852, Connections 853, and/or operations of a neural network, and vice versa. An exemplary embodiment of a graph (i.e. Graph 130*b*, etc.) is described later.

In a further example shown in Model C, the disclosed devices, systems, and methods for learning and using AIIMs may include a tree or tree-like structure. As such, machine learning, knowledge representation or structure, pattern recognition, decision making, and/or other artificial intelligence functionalities may include Nodes 852 and Connections 853 (i.e. references, edges, etc.) organized as a tree. A tree can be utilized as a predictive modeling approach in machine learning. In general, a Node 852 in a tree can be connected to any number (i.e. including zero, etc.) of children Nodes 852 (i.e. similar to a tree, etc.). In some aspects, a collection of trees can be utilized where each tree may represent a set of related conversational paths such as, for example, paths concerning a topic or concept. Nodes 852, Connections 853, and/or operations of a tree may include any features, functionalities, and embodiments of the aforementioned Nodes 852, Connections 853, and/or operations of a neural network and/or graph, and vice versa.

In a further example shown in Model D, the disclosed devices, systems, and methods for learning and using AIIMs may include a sequence or sequence-like structure. As such, machine learning, knowledge representation or structure, pattern recognition, decision making, and/or other artificial intelligence functionalities may include a structure of Nodes 852 and Connections 853 organized as a sequence. In some aspects, Connections 853 may be optionally omitted from a sequence. A sequence can be utilized as a predictive modeling approach in machine learning. In some aspects, a sequence can be used to store a single conversation. In other aspects, a sequence can be used to store multiple concatenated conversations. Nodes 852, Connections 853, and/or operations of a sequence may include any features, functionalities, and embodiments of the aforementioned Nodes 852, Connections 853, and/or operations of a neural network, graph, and/or tree, and vice versa. An exemplary embodiment of a sequence (i.e. Collection of Sequences 130*c*, Sequence 133, etc.) is described later.

In yet another example the disclosed devices, systems, and methods for learning and using AIIMs may include a search-based model and/or technique. As such, machine learning, knowledge representation or structure, pattern recognition, decision making, and/or other artificial intelligence functionalities may include searching through a collection of possible solutions. For example, a search method can search through a neural network, graph, tree, list, or other data structure that includes data elements of interest. A search may use heuristics to limit the search for solutions by eliminating choices that are unlikely to lead to the goal. Heuristic techniques may provide a best guess solution. A search can also include optimization. For example, a search may begin with a guess and then refine the guess incrementally until no more refinements can be made. In a further example, the disclosed devices, systems, and methods for learning and using AIIMs may include logic-based model and/or technique. As such, machine learning, knowledge representation or structure, pattern recognition, decision making, and/or other artificial intelligence functionalities can use formal or other type of logic. Logic based models may involve making inferences or deriving conclusions from a set of premises. As such, a logic based system can extend existing knowledge or create new knowledge automatically using inferences. Examples of the types of logic that can be utilized include propositional or sentential logic that comprises logic of statements which can be true or false; first-order logic that allows the use of quantifiers and predicates and that can express facts about objects, their properties, and their relations with each other; fuzzy logic that allows degrees of truth to be represented as a value between 0 and 1 rather than simply 0 (false) or 1 (true), which can be used for uncertain reasoning; subjective logic that comprises a type of probabilistic logic that may take uncertainty and belief into account, which can be suitable for modeling and analyzing situations involving uncertainty, incomplete knowledge and different world views; and/or other types of logic. In a further example the disclosed devices, systems, and methods for learning and using AIIMs may include a probabilistic model and/or technique. As such, machine learning, knowledge representation or structure, pattern recognition, decision making, and/or other artificial intelligence functionalities can be implemented to operate with incomplete or uncertain information where probabilities may affect outcomes. Bayesian network, among other models, is an example of a probabilistic tool used for purposes such as reasoning, learning, planning, perception, and/or others. One of ordinary skill in art will understand that the aforementioned artificial intelligence models and/or techniques are described merely as examples of a variety of possible implementations, and that while all possible artificial intelligence models and/or techniques are too voluminous to describe, other artificial intelligence models and/or techniques known in art are within the scope of this disclosure. One of ordinary skill in art will also recognize that an intelligent system may solve a specific problem by using any model and/or technique that works such as, for example, some systems can be symbolic and logical, some can be sub-symbolic neural networks, some can be deterministic or probabilistic, some can be hierarchical, some may include searching techniques, some may include optimization techniques, while others may use other or a combination of models and/or techniques. In general, any artificial intelligence model and/or technique can be utilized that can support AIIM functionalities.

Figure 12A:
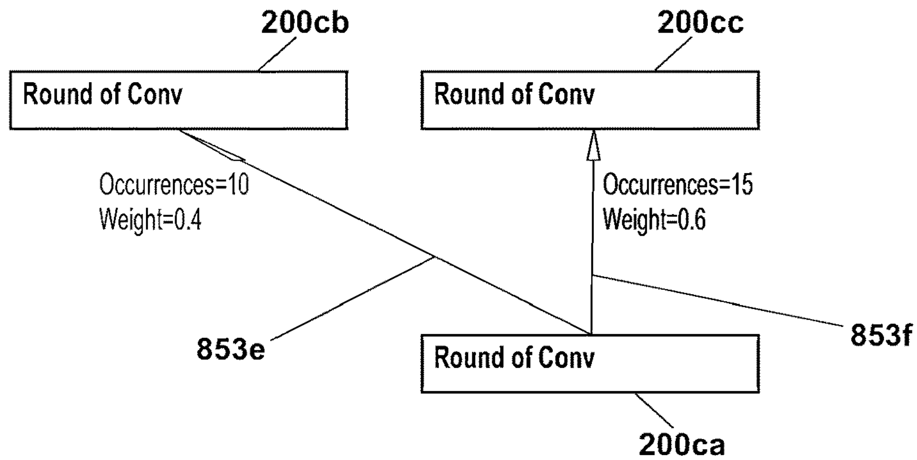
FIG. 12A-12C illustrate examples of interconnected Rounds of Conversational Exchange 200 and updating weights of Connections 853.
Figure 12B:
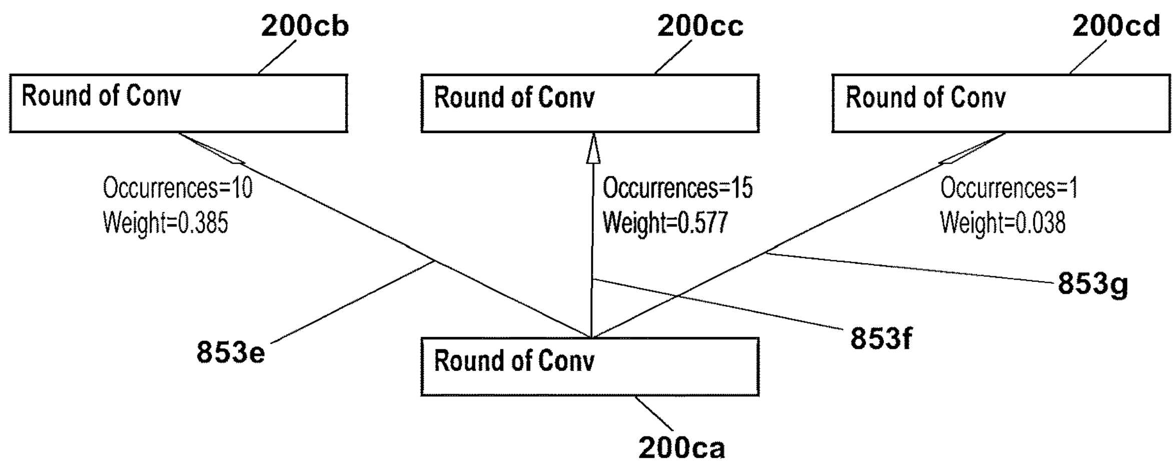
Figure 12C:
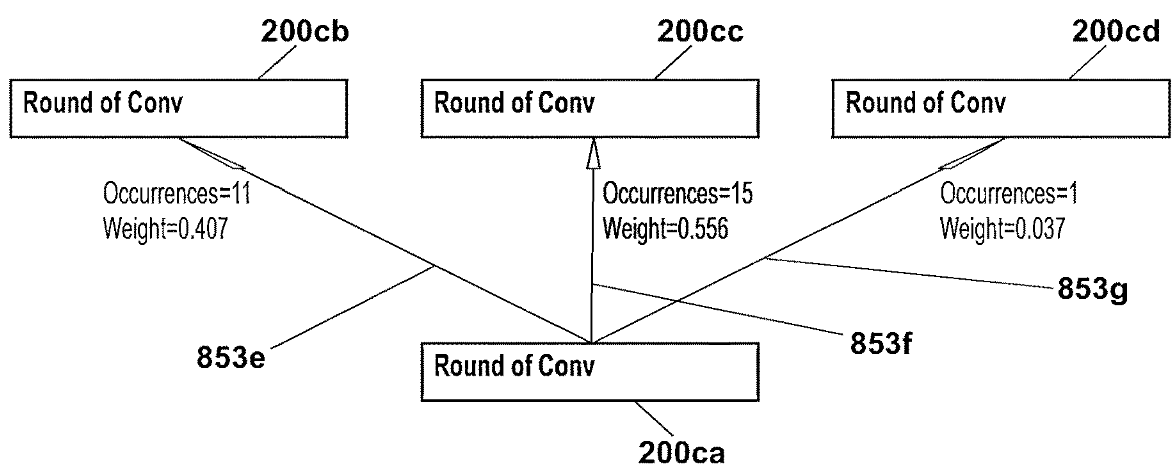

Referring to FIG. 12A-12C, exemplary embodiments of interconnected Rounds of Conversational Exchange 200 and updating weights of Connections 853 are illustrated. As shown for example in FIG. 12A, Round of Conversational Exchange 200*ca* is connected to Round of Conversational Exchange 200*cb* and Round of Conversational Exchange 200*cc* by Connection 853*e* and Connection 853*f*, respectively. Each of Connection 853*e* and Connection 853*f* may include or be associated with occurrence count, weight, any parameter, and/or other data. The number of occurrences may track or store the number of observations that a Round of Conversational Exchange 200 was followed by another Round of Conversational Exchange 200 indicating a connection or relationship between them. For example, Round of Conversational Exchange 200*ca* was followed by Round of Conversational Exchange 200*cb* 10 times as indicated by the number of occurrences of Connection 853*e*. Also, Round of Conversational Exchange 200*ca* was followed by Round of Conversational Exchange 200*cc* 15 times as indicated by the number of occurrences of Connection 853*f*. The weight of Connection 853*e* can be calculated or determined as the number of occurrences of Connection 853*e* divided by the sum of occurrences of all connections (i.e. Connection 853*e* and Connection 853*f*, etc.) originating from Round of Conversational Exchange 200*ca*. Therefore, the weight of Connection 853*e* can be calculated or determined as 10/(10+15) =0.4, for example. Also, the weight of Connection 853*f* can be calculated or determined as 15/(10+15)=0.6, for example. Therefore, the sum of weights of Connection 853*e*, Connection 853*f*, and/or any other Connections 853 originating from Round of Conversational Exchange 200*ca* may equal to 1 or 100%. As shown for example in FIG. 12B, in the case that Round of Conversational Exchange 200*cd* is inserted and an observation is made that Round of Conversational Exchange 200*cd* follows Round of Conversational Exchange 200*ca*, Connection 853*g* can be created between Round of Conversational Exchange 200*ca* and Round of Conversational Exchange 200*cd*. The occurrence count of Connection 853*g* can be set to 1 and weight determined as 1/(10+15+1)=0.038. The weights of al other connections (i.e. Connection 853*e*, Connection 853*f*, etc.) originating from Round of Conversational Exchange 200*ca* may be updated to account for the creation of Connection 853*g*. Therefore, the weight of Connection 853*e* can be updated as 10/(10+15+1)=0.385. The weight of Connection 853*f* can also be updated as 15/(10+15+1)=0.577. As shown for example in FIG. 12C, in the case that an additional occurrence of Connection 853*e* is observed (i.e. Round of Conversational Exchange 200*cb* followed Round of Conversational Exchange 200*ca*, etc.), occurrence count of Connection 853*e* and weights of al connections (i.e. Connection 853*e*, Connection 853*f*, and Connection 853*g*, etc.) originating from Round of Conversational Exchange 200*ca* may be updated to account for this observation. The occurrence count of Connection 853*e* can be increased by 1 and its weight updated as 11/(11+15+1)=0.407. The weight of Connection 853*f* can also be updated as 15/(11+15+1) =0.556. The weight of Connection 853*g* can also be updated as 1/(11+15+1)=0.037.

In some embodiments, Connection 853 may connect not only Rounds of Conversational Exchange 200, but also Conversational Activities 210 and/or other elements. For example, a Conversational Activity 210 in one Round of Conversational Exchange 200 may be connected by Connection 853 to a Conversational Activity 210 in another Round of Conversational Exchange 200. In general, Connections 853 can connect any Rounds of Conversational Exchange 200, any Conversational Activities 210, and/or other elements.

Figure 13:
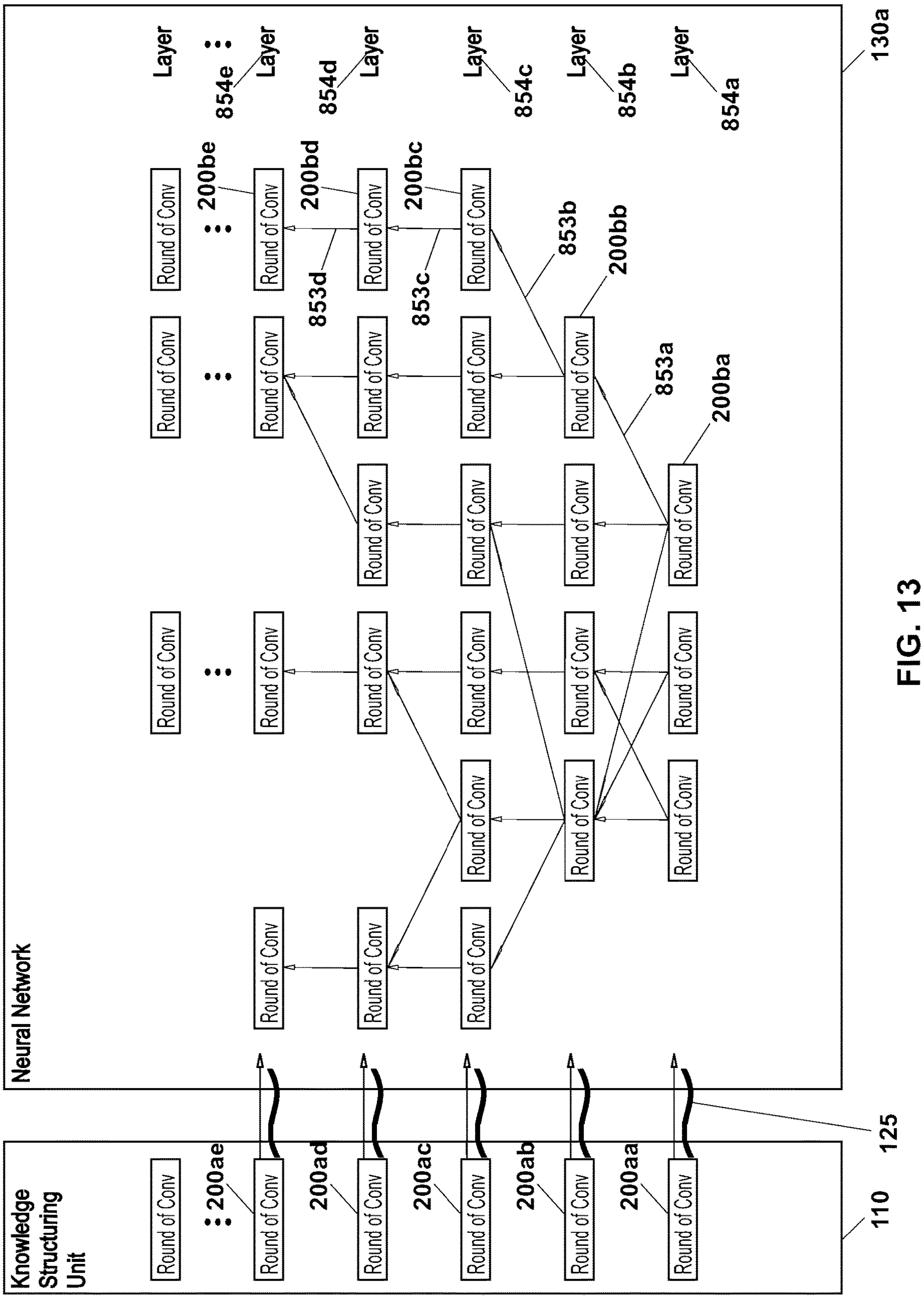
FIG. 13 illustrates an example of learning Rounds of Conversational Exchange 200 using Neural Network 130*a*.

Referring to FIG. 13, an exemplary embodiment of learning Rounds of Conversational Exchange 200 using Neural Network 130*a* is illustrated. Neural Network 130*a* includes a number of neurons or Nodes 852 interconnected by Connections 853 as previously described. Rounds of Conversational Exchange 200 are shown instead of Nodes 852 to simplify the illustration as Node 852 includes a Round of Conversational Exchange 200, for example. Therefore, Rounds of Conversational Exchange 200 and Nodes 852 can be used interchangeably herein depending on context. It should be noted that Node 852 may include other elements and/or functionalities instead of or in addition to Round of Conversational Exchange 200. Rounds of Conversational Exchange 200 may be applied onto Neural Network 130*a* individually or collectively in a learning or training process. In some designs, Neural Network 130*a* comprises a number of Layers 854 each of which may include one or more Rounds of Conversational Exchange 200. Rounds of Conversational Exchange 200 in successive Layers 854 can be connected by Connections 853. Connection 853 may include or be associated with occurrence count, weight, any parameter, and/or other data as previously described. Neural Network 130*a* may include any number of Layers 854 to accommodate conversations comprising any number of Rounds of Conversational Exchange 200. In effect, Neural Network 130*a* may store Rounds of Conversational Exchange 200 interconnected by Connections 853 where following a path through the Neural Network 130*a* can later be used to simulate a conversation. It should be understood that, in some embodiments, Rounds of Conversational Exchange 200 in one Layer 854 of Neural Network 130*a* need not be connected only with Rounds of Conversational Exchange 200 in a successive Layer 854, but also in any other Layer 854, thereby creating shortcuts (i.e. shortcut Connections 853, etc.) through Neural Network 130*a*. A Round of Conversational Exchange 200 can also be connected to itself such as, for example, in recurrent neural networks. In general, any Round of Conversational Exchange 200 can be connected with any other Round of Conversational Exchange 200 anywhere else in Neural Network 130*a*. In further embodiments, back-propagation of any data or information can be implemented. In one example, back-propagation of similarity (i.e. similarity index, etc.) of compared Rounds of Conversational Exchange 200 in a path through Neural Network 130*a* can be implemented. In another example, back-propagation of errors can be implemented. Such back-propagations can then be used to adjust occurrence counts and/or weights of Connections 853 for better future predictions, for example. Any other back-propagation can be implemented for other purposes. Any combination of Nodes 852 (i.e. Nodes 852 comprising Round of Conversational Exchange 200, etc.), Connections 853, Layers 854, and/or other elements or techniques can be implemented in alternate embodiments. Neural Network 130*a* may include any type or form of a neural network known in art such as a feed-forward neural network, a back-propagating neural network, a recurrent neural network, a convolutional neural network, deep neural network, and/or others including a custom neural network.

In some embodiments, Knowledge Structuring Unit 110 creates or generates Rounds of Conversational Exchange 200 and the system applies them onto Neural Network 130*a*, thereby implementing learning of Rounds of Conversational Exchange 200. The term apply or applying may refer to storing, copying, inserting, updating, or other similar action, therefore, these terms may be used interchangeably herein depending on context. The system can perform Substantial Similarity Comparisons 125 (later described) of a Round of Conversational Exchange 200 from Knowledge Structuring Unit 110 with Rounds of Conversational Exchange 200 in a corresponding Layer 854 of Neural Network 130*a*. If a substantially similar Round of Conversational Exchange 200 is not found in the corresponding Layer 854 of Neural Network 130*a*, the system may insert (i.e. copy, store, etc.) the Round of Conversational Exchange 200 from Knowledge Structuring Unit 110 into the corresponding Layer 854 of Neural Network 130*a*, and create a Connection 853 to the inserted Round of Conversational Exchange 200 from a Round of Conversational Exchange 200 in a prior Layer 854 including assigning an occurrence count to the new Connection 853, calculating a weight of the new Connection 853, and updating any other Connections 853 originating from the Round of Conversational Exchange 200 in the prior Layer 854. On the other hand, if a substantially similar Round of Conversational Exchange 200 is found in the corresponding Layer 854 of Neural Network 130*a*, the system may update occurrence count and weight of Connection 853 to that Round of Conversational Exchange 200 from a Round of Conversational Exchange 200 in a prior Layer 854, and update any other Connections 853 originating from the Round of Conversational Exchange 200 in the prior Layer 854.

For example, the system can perform Substantial Similarity Comparisons 125 of Round of Conversational Exchange 200*aa* from Knowledge Structuring Unit 110 with Rounds of Conversational Exchange 200 in a corresponding Layer 854*a* of Neural Network 130*a*. In the case that a substantially similar match is found between Round of Conversational Exchange 200*aa* and Round of Conversational Exchange 200*ba*, the system may perform no action since Round of Conversational Exchange 200*ba* is the initial Round of Conversational Exchange 200. The system can then perform Substantial Similarity Comparisons 125 of Round of Conversational Exchange 200*ab* from Knowledge Structuring Unit 110 with Rounds of Conversational Exchange 200 in a corresponding Layer 854*b* of Neural Network 130*a*. In the case that a substantially similar match is found between Round of Conversational Exchange 200*ab* and Round of Conversational Exchange 200*bb*, the system may update occurrence count and weight of Connection 853*a* between Round of Conversational Exchange 200*ba* and Round of Conversational Exchange 200*bb*, and update weights of other Connections 853 originating from Round of Conversational Exchange 200*ba* as previously described. The system can then perform Substantial Similarity Comparisons 125 of Round of Conversational Exchange 200*ac* from Knowledge Structuring Unit 110 with Rounds of Conversational Exchange 200 in a corresponding Layer 854*c* of Neural Network 130*a*. In the case that a substantially similar match is not found, the system may insert Round of Conversational Exchange 200*bc* into Layer 854*c* and copy Round of Conversational Exchange 200*ac* into the inserted Round of Conversational Exchange 200*bc*. The system may also create Connection 853*b* between Round of Conversational Exchange 200*bb* and Round of Conversational Exchange 200*bc* with occurrence count of 1 and weight calculated based on the occurrence count as previously described.

The system may also update weights of other Connections 853 (one in this example) originating from Round of Conversational Exchange 200*bb* as previously described. The system can then perform Substantial Similarity Comparisons 125 of Round of Conversational Exchange 200*ad* from Knowledge Structuring Unit 110 with Rounds of Conversational Exchange 200 in a corresponding Layer 854*d* of Neural Network 130*a*. In the case that a substantially similar match is not found, the system may insert Round of Conversational Exchange 200*bd* into Layer 854*d* and copy Round of Conversational Exchange 200*ad* into the inserted Round of Conversational Exchange 200*bd*. The system may also create Connection 853*c* between Round of Conversational Exchange 200*bc* and Round of Conversational Exchange 200*bd* with occurrence count of 1 and weight of 1. The system can then perform Substantial Similarity Comparisons 125 of Round of Conversational Exchange 200*ae* from Knowledge Structuring Unit 110 with Rounds of Conversational Exchange 200 in a corresponding Layer 854*e* of Neural Network 130*a*. In the case that a substantially similar match is not found, the system may insert Round of Conversational Exchange 200*be* into Layer 854*e* and copy Round of Conversational Exchange 200*ae* into the inserted Round of Conversational Exchange 200*be*. The system may also create Connection 853*d* between Round of Conversational Exchange 200*bd* and Round of Conversational Exchange 200*be* with occurrence count of 1 and weight of 1. Applying any additional Rounds of Conversational Exchange 200 from Knowledge Structuring Unit 110 onto Neural Network 130*a* follows similar logic or process as the above-described.

Substantial Similarity Comparison 125 (also referred to simply as similarity comparison or other similar reference) comprises the functionality for comparing or matching Rounds of Conversational Exchange 200 or portions thereof, and/or other functionalities. Substantial Similarity Comparison 125 comprises the functionality for comparing or matching Conversational Activities 210 or portions thereof. Substantial Similarity Comparison 125 comprises the functionality for comparing or matching Sub-streams of Digital Pictures 145 or portions thereof. Substantial Similarity Comparison 125 comprises the functionality for comparing or matching Sub-streams of Digital Sound Samples 155 or portions thereof. Substantial Similarity Comparison 125 comprises the functionality for comparing or matching text (i.e. characters, words, phrases, etc.), pictures, sounds, data, and/or other elements or portions thereof. Substantial Similarity Comparison 125 may include functions, rules, and/or logic for performing matching or comparisons and for determining that while a perfect match is not found, a similar or substantially similar match has been found. While substantial similarity may imply a substantial level of similarity, substantial similarity may also, depending on context, include any similarity, however high or low, as defined by the rules for substantial similarity. The rules for substantial similarity or substantially similar match can be defined by a user, by AIIM system administrator, or automatically by the system based on experience, testing, inquiry, analysis, synthesis, or other techniques, knowledge, or input. In some designs, Substantial Similarity Comparison 125 comprises the functionality to automatically define appropriately strict rules for determining substantial similarity of the compared elements. Substantial Similarity Comparison 125 can therefore set, reset, and/or adjust the strictness of the rules for finding or determining substantial similarity between the compared elements, thereby fine tuning Substantial Similarity Comparison 125 so that the rules for determining substantial similarity are appropriately strict. In some aspects, Substantial Similarity Comparison 125 can determine substantial similarity of compared elements if their similarity exceeds a threshold (i.e. similarity threshold, etc.). In other aspects, Substantial Similarity Comparison 125 can determine substantial similarity of compared elements if their difference is lower than a threshold (i.e. difference threshold, etc.).

In determining substantial similarity of Rounds of Conversational Exchange 200, Substantial Similarity Comparison 125 may compare one or more Conversational Activities 210 or portions thereof of one Round of Conversational Exchange 200 with one or more Conversational Activities 210 or portions thereof of another Round of Conversational Exchange 200. In some embodiments, total equivalence is achieved when al Conversational Activities 210 or portions thereof of the compared Rounds of Conversational Exchange 200 match. If total equivalence is not found, Substantial Similarity Comparison 125 may attempt to determine substantial similarity. In some aspects, substantial similarity can be achieved when most of the Conversational Activities 210 or portions (i.e. Sub-streams of Digital Pictures 145, Sub-streams of Digital Sound Samples 155, etc.) thereof of the compared Rounds of Conversational Exchange 200 match or substantially match. In other aspects, substantial similarity can be achieved when at least a threshold number or percentage of Conversational Activities 210 or portions thereof of the compared Rounds of Conversational Exchange 200 match or substantially match. Similarly, substantial similarity can be achieved when a number or percentage of matching or substantially matching Conversational Activities 210 or portions thereof of the compared Rounds of Conversational Exchange 200 exceeds a threshold. In further aspects, substantial similarity can be achieved when all but a threshold number or percentage of Conversational Activities 210 or portions thereof of the compared Rounds of Conversational Exchange 200 match or substantially match. Such thresholds can be defined by a user, by AIIM system administrator, or automatically by the system based on experience, testing, inquiry, analysis, synthesis, or other techniques, knowledge, or input. In one example, substantial similarity can be achieved when at least 1, 2, 3, 4, or any other threshold number of Conversational Activities 210 or portions thereof of the compared Rounds of Conversational Exchange 200 match or substantially match. Similarly, substantial similarity can be achieved when the number of matching or substantially matching Conversational Activities 210 or portions thereof of the compared Rounds of Conversational Exchange 200 exceeds 1, 2, 3, 4, or any other threshold number. In another example, substantial similarity can be achieved when at least 10%, 21%, 30%, 49%, 66%, 89%, 93%, or any other percentage of Conversational Activities 210 or portions thereof of the compared Rounds of Conversational Exchange 200 match or substantially match. Similarly, substantial similarity can be achieved when the percentage of matching or substantially matching Conversational Activities 210 or portions thereof of the compared Rounds of Conversational Exchange 200 exceeds 10%, 21%, 30%, 49%, 66%, 89%, 93%, or any other threshold percentage. In other embodiments, substantial similarity of the compared Rounds of Conversational Exchange 200 can be achieved in terms of matches or substantial matches in more important (i.e. as indicated by importance index [later described], etc.) Conversational Activities 210 or portions thereof, thereby tolerating mismatches in less important Conversational Activities 210 or portions thereof. In one example, substantial similarity can be achieved when matches or substantial matches are found in speaking Conversational Activities 210 or portions thereof of the compared Rounds of Conversational Exchange 200, thereby tolerating mismatches in observing Conversational Activities 210 (i.e. silent facial expressions, silent body movements, motionless silence, etc.) or portions thereof. In some designs, Substantial Similarity Comparison 125 can be configured to omit any Conversational Activity 210 or portions thereof from the comparison. In one example, some or all motionless silence Conversational Activities 210 or portions thereof can be omitted. In another example, some or al absence from the conversation Conversational Activities 210 or portions thereof, or other Conversational Activities 210 or portions thereof can be omitted. In further embodiments, substantial similarity can be achieved taking into account duration, type, and/or other features of Conversational Activities 210 of the compared Rounds of Conversational Exchange 200. In one example, substantial similarity can be achieved if the durations of one or more Conversational Activities 210 of the compared Rounds of Conversational Exchange 200 match or substantially match. In another example, substantial similarity can be achieved if the types (i.e. speaking, silent facial expressions, silent body movements, motionless silence, absence from the conversation, etc.) of one or more Conversational Activities 210 of the compared Rounds of Conversational Exchange 200 match or substantially match. In some aspects, Substantial Similarity Comparison 125 can compare durations, types, and/or other features of Conversational Activities 210 as an initial check before proceeding to further detailed comparisons.

Substantial Similarity Comparison 125 can automatically adjust (i.e. increase or decrease) the strictness of the rules for determining substantial similarity of Rounds of Conversational Exchange 200. In some aspects, such adjustment in strictness can be done by Substantial Similarity Comparison 125 in response to determining that total equivalence match had not been found. In other aspects, an adjustment in strictness can be done by Substantial Similarity Comparison 125 in response to determining that substantially similar match had not been found. Substantial Similarity Comparison 125 can keep adjusting the strictness of the rules until a substantially similar match is found. All the rules or settings of substantial similarity can be set, reset, or adjusted by Substantial Similarity Comparison 125 in response to another strictness level determination. For example, Substantial Similarity Comparison 125 may attempt to find a match in a certain percentage (i.e. 95%, etc.) of Conversational Activities 210 or portions thereof from the compared Rounds of Conversational Exchange 200. If the comparison does not provide a substantially similar match, Substantial Similarity Comparison 125 may decide to decrease the strictness of the rules to find a substantially similar match. In response, Substantial Similarity Comparison 125 may attempt to find fewer matching Conversational Activities 210 or portions thereof than in the previous attempt using stricter rules. If the comparison still does not provide a substantially similar match, Substantial Similarity Comparison 125 may determine to further decrease (i.e. down to a certain minimum strictness or threshold, etc.) the strictness by requiring fewer Conversational Activities 210 or portions thereof to match, thereby further increasing a chance of finding a substantially similar match. In further aspects, an adjustment in strictness can be done by Substantial Similarity Comparison 125 in response to determining that multiple substantially similar matches had been found. Substantial Similarity Comparison 125 can keep adjusting the strictness of the rules until a best of the substantially similar matches is found. For example, Substantial Similarity Comparison 125 may attempt to find a match in a certain percentage (i.e. 70%, etc.) of Conversational Activities 210 or portions thereof from the compared Rounds of Conversational Exchange 200. If the comparison provides a number of substantially similar matches, Substantial Similarity Comparison 125 may decide to increase the strictness of the rules to decrease the number of substantially similar matches. In response, Substantial Similarity Comparison 125 may attempt to find more matching Conversational Activities 210 or portions thereof in addition to the earlier found Conversational Activities 210 or portions thereof to limit the number of substantially similar matches. If the comparison still provides more than one substantially similar match, Substantial Similarity Comparison 125 may determine to further increase the strictness by requiring additional Conversational Activities 210 or portions thereof to match, thereby further narrowing the number of substantially similar matches until a best substantially similar match is found.

In determining substantial similarity of Conversational Activities 210 or portions thereof, Substantial Similarity Comparison 125 may compare Sub-stream of Digital Pictures 145 or portions thereof of one Conversational Activity 210 with Sub-stream of Digital Pictures 145 or portions thereof of another Conversational Activity 210. Also, in determining substantial similarity of Conversational Activities 210 or portions thereof, Substantial Similarity Comparison 125 may compare Sub-stream of Digital Sound Samples 155 or portions thereof of one Conversational Activity 210 with Sub-stream of Digital Sound Samples 155 or portions thereof of another Conversational Activity 210. In some embodiments, total equivalence is achieved when Sub-streams of Digital Pictures 145 or portions thereof and Sub-streams of Digital Sound Samples 155 or portions thereof of the compared Conversational Activities 210 match. If total equivalence is not found, Substantial Similarity Comparison 125 may attempt to determine substantial similarity. In some aspects, substantial similarity can be achieved when most of the portions (i.e. pictures, features, regions of pixels, pixels, etc.) of Sub-streams of Digital Pictures 145 and/or portions (i.e. words, features, sound samples, etc.) of Sub-streams of Digital Sound Samples 155 of the compared Conversational Activities 210 match or substantially match. In other aspects, substantial similarity can be achieved when at least a threshold number or percentage of portions of Sub-streams of Digital Pictures 145 and/or portions of Sub-streams of Digital Sound Samples 155 of the compared Conversational Activities 210 match or substantially match. Similarly, substantial similarity can be achieved when the number or percentage of matching or substantially matching portions of Sub-streams of Digital Pictures 145 and/or portions of Sub-streams of Digital Sound Samples 155 of the compared Conversational Activities 210 exceeds a threshold. In further aspects, substantial similarity can be achieved when all but a threshold number or percentage of portions of Sub-streams of Digital Pictures 145 and/or portions of Sub-streams of Digital Sound Samples 155 of the compared Conversational Activities 210 match or substantially match. Such thresholds can be defined by a user, by AIIM system administrator, or automatically by the system based on experience, testing, inquiry, analysis, synthesis, or other techniques, knowledge, or input. In one example, substantial similarity can be achieved when at least 1, 2, 17, 38, 124, 4299, or any other threshold number of portions of Sub-streams of Digital Pictures 145 and/or portions of Sub-streams of Digital Sound Samples 155 of the compared Conversational Activities 210 match or substantially match. Similarly, substantial similarity can be achieved when the number of matching or substantially matching portions of Sub-streams of Digital Pictures 145 and/or portions of Sub-streams of Digital Sound Samples 155 of the compared Conversational Activities 210 exceeds 1, 2, 17, 38, 124, 4299, or any other threshold number. In another example, substantial similarity can be achieved when at least 9%, 23%, 29%, 41%, 63%, 79%, 92%, or any other percentage of portions of Sub-streams of Digital Pictures 145 and/or portions of Sub-streams of Digital Sound Samples 155 of the compared Conversational Activities 210 match or substantially match. Similarly, substantial similarity can be achieved when the percentage of matching or substantially matching portions of Sub-streams of Digital Pictures 145 and/or portions of Sub-streams of Digital Sound Samples 155 of the compared Conversational Activities 210 exceeds 9%, 23%, 29%, 41%, 63%, 79%, 92%, or any other threshold percentage. In other embodiments, weights can be assigned to Sub-streams of Digital Pictures 145 or portions thereof and/or Sub-streams of Digital Sound Samples 155 or portions thereof indicating their importance in the comparison. In one example, 1 (i.e. 100%, etc.) can be assigned to Sub-streams of Digital Sound Samples 155 or portions thereof and 0 (i.e. 0%, etc.) can be assigned to Sub-streams of Digital Pictures 145 or portions thereof indicating that Substantial Similarity Comparison 125 relies solely on comparison of Sub-streams of Digital Sound Samples 155 or portions thereof in which case comparison of Sub-streams of Digital Pictures 145 or portions thereof can be omitted. In another example, 0.8 (i.e. 80%, etc.) can be assigned to Sub-streams of Digital Sound Samples 155 or portions thereof and 0.2 (i.e. 20%, etc.) can be assigned to Sub-streams of Digital Pictures 145 or portions thereof indicating that Substantial Similarity Comparison 125 relies mostly on comparison of Sub-streams of Digital Sound Samples 155 or portions thereof. In a further example, 0 (i.e. 0%, etc.) can be assigned to Sub-streams of Digital Sound Samples 155 or portions thereof and 1 (i.e. 100%, etc.) can be assigned to Sub-streams of Digital Pictures 145 or portions thereof indicating that Substantial Similarity Comparison 125 relies solely on comparison of Sub-streams of Digital Pictures 145 or portions thereof in which case comparison of Sub-streams of Digital Sound Samples 155 or portions thereof can be omitted. Any weight or importance can be assigned to any of the Sub-streams of Digital Sound Samples 155 or portions thereof, Sub-streams of Digital Pictures 145 or portions thereof, and/or other elements herein. Similar weights can be utilized for any of the elements described herein. In further embodiments, substantial similarity can be achieved taking into account the type and/or other features of Conversational Activities 210. For example, any observing Conversational Activity 210 (i.e. silent facial expressions, silent body movements, motionless silence, etc.) may be found to match another observing Conversational Activity 210.

Substantial Similarity Comparison 125 can automatically adjust (i.e. increase or decrease) the strictness of the rules for determining substantial similarity of Conversational Activities 210. In some aspects, such adjustment in strictness can be done by Substantial Similarity Comparison 125 in response to determining that total equivalence match had not been found. In other aspects, an adjustment in strictness can be done by Substantial Similarity Comparison 125 in response to determining that substantially similar match had not been found. Substantial Similarity Comparison 125 can keep adjusting the strictness of the rules until a substantially similar match is found. All the rules or settings of substantial similarity can be set, reset, or adjusted by Substantial Similarity Comparison 125 in response to another strictness level determination. For example, Substantial Similarity Comparison 125 may attempt to find a match in a certain percentage (i.e. 88%, etc.) of the portions of Sub-streams of Digital Pictures 145 and/or portions of Sub-streams of Digital Sound Samples 155 of the compared Conversational Activities 210. If the comparison does not provide a substantially similar match, Substantial Similarity Comparison 125 may decide to decrease the strictness of the rules to find a substantially similar match. In response, Substantial Similarity Comparison 125 may attempt to find fewer matching portions of Sub-streams of Digital Pictures 145 and/or portions of Sub-streams of Digital Sound Samples 155 than in the previous attempt using stricter rules. If the comparison still does not provide a substantially similar match, Substantial Similarity Comparison 125 may determine to further decrease the strictness (i.e. down to a certain minimum strictness or threshold, etc.) by requiring fewer portions of Sub-streams of Digital Pictures 145 and/or portions of Sub-streams of Digital Sound Samples 155 to match, thereby further increasing a chance of finding a substantially similar match. In further aspects, an adjustment in strictness can be done by Substantial Similarity Comparison 125 in response to determining that multiple substantially similar matches had been found. Substantial Similarity Comparison 125 can keep adjusting the strictness of the rules until a best of the substantially similar matches is found. For example, Substantial Similarity Comparison 125 may attempt to find a match in a certain percentage (i.e. 74%, etc.) of portions of Sub-streams of Digital Pictures 145 and/or portions of Sub-streams of Digital Sound Samples 155 of the compared Conversational Activities 210. If the comparison provides a number of substantially similar matches, Substantial Similarity Comparison 125 may decide to increase the strictness of the rules to decrease the number of substantially similar matches. In response, Substantial Similarity Comparison 125 may attempt to find more matching portions of Sub-streams of Digital Pictures 145 and/or portions of Sub-streams of Digital Sound Samples 155 in addition to the earlier found portions to limit the number of substantially similar matches. If the comparison still provides more than one substantially similar match, Substantial Similarity Comparison 125 may determine to further increase the strictness by requiring additional portions of Sub-streams of Digital Pictures 145 and/or portions of Sub-streams of Digital Sound Samples 155 to match, thereby further narrowing the number of substantially similar matches until a best substantially similar match is found.

In determining substantial similarity of Sub-streams of Digital Pictures 145 or portions thereof and/or Sub-streams of Digital Sound Samples 155 or portions thereof, Substantial Similarity Comparison 125 can use various techniques examples of which are described below.

In some embodiments, in determining substantial similarity of Sub-streams of Digital Sound Samples 155 or portions thereof, Substantial Similarity Comparison 125 may compare one or more words recognized from one Sub-stream of Digital Sound Samples 155 with one or more words recognized from another Sub-stream of Digital Sound Samples 155. Any features, functionalities, and embodiments of the previously described Speech/Sound Recognizer 165 can be used in such word or speech recognition. In some aspects, total equivalence is found when all words recognized from one Sub-stream of Digital Sound Samples 155 match all words recognized from another Sub-stream of Digital Sound Samples 155. In other aspects, if total equivalence is not found, Substantial Similarity Comparison 125 may attempt to determine substantial similarity. In one example, substantial similarity can be achieved when most of the words recognized from the compared Sub-streams of Digital Sound Samples 155 match. In another example, substantial similarity can be achieved when at least a threshold number (i.e. 1, 2, 4, 7, 34, etc.) or percentage (i.e. 33%, 58%, 72%, 99%, etc.) of words of the compared Sub-streams of Digital Sound Samples 155 match. Similarly, substantial similarity can be achieved when the number or percentage of matching words of the compared Sub-streams of Digital Sound Samples 155 exceeds a threshold number (i.e. 1, 2, 4, 7, 34, etc.) or a threshold percentage (i.e. 33%, 58%, 72%, 99%, etc.). In a further example, substantial similarity can be achieved when all but a threshold number or percentage of words of the compared Sub-streams of Digital Sound Samples 155 match. Such thresholds can be defined by a user, by AIIM system administrator, or automatically by the system based on experience, testing, inquiry, analysis, synthesis, and/or other techniques, knowledge or input. In further aspects, Substantial Similarity Comparison 125 can utilize the order of words for determining substantial similarity of Sub-streams of Digital Sound Samples 155. For example, substantial similarity can be achieved when matches are found with respect to front-most words, thereby tolerating mismatches in later words. Any order of words can be favored in alternate implementations. In further aspects, Substantial Similarity Comparison 125 can utilize the type of words for determining substantial similarity of Sub-streams of Digital Sound Samples 155. For example, substantial similarity can be achieved when matches are found with respect to substantive or longer words such as nouns, verbs, adjectives, and/or others, thereby tolerating mismatches in less-substantive or shorter words such as definite and indefinite articles (i.e. the, a, an, etc.), demonstratives (i.e. this, that, etc.), possessive determiners (i.e. my, your, their, etc.), quantifiers (i.e. many, few, several, etc.), distributive determiners (i.e. each, any, etc.), and/or others. In further aspects, Substantial Similarity Comparison 125 can utilize the importance (i.e. as indicated by importance index [ater described], etc.) of words for determining substantial similarity of Sub-streams of Digital Sound Samples 155. For example, substantial similarity can be achieved when matches are found with respect to more important words such as the above-described substantive, longer, and/or other words, thereby tolerating mismatches in less important words such as less-substantive, shorter, and/or other words. In further aspects, Substantial Similarity Comparison 125 can omit some of the words from the comparison in determining substantial similarity of Sub-streams of Digital Sound Samples 155. In one example, less-substantive or shorter words can be omitted from comparison. In another example, later or rear-most words can be omitted from comparison. In general, any word can be omitted from comparison. In further aspects, Substantial Similarity Comparison 125 can utilize semantic conversion to account for variations of words in determining substantial similarity of Sub-streams of Digital Sound Samples 155. In one example, Sub-stream of Digital Sound Samples 155 may include a word "home". In addition to searching for the exact word in a compared Sub-stream of Digital Sound Samples 155, Substantial Similarity Comparison 125 can employ semantic conversion and attempt to match "house", "residence", "dwelling", "place", or other semantically similar variations of the word with a meaning "home". In another example, Sub-stream of Digital Sound Samples 155 may include a word "buy". In addition to searching for the exact word in a compared Sub-stream of Digital Sound Samples 155, Substantial Similarity Comparison 125 can employ semantic conversion and attempt to match "buying", "bought", or other semantically similar variations of the word with a meaning "buy" in different tenses. Any other grammatical analysis or transformation can be utilized to cover the full scope of word variations. In some designs, semantic conversion can be implemented using a thesaurus or dictionary. In another example, semantic conversion can be implemented using a table where each row comprises semantically similar variations of a word. In further aspects, Substantial Similarity Comparison 125 can utilize a language model for understanding or interpreting the concepts contained in the words and compare the concepts instead of or in addition to the words in determining substantial similarity of Sub-streams of Digital Sound Samples 155. A language model may also provide context to distinguish among words and phrases that sound similar. Examples of language models include unigram model, n-gram model, neural network language model, bag of words model, and/or others. Any of the techniques for matching of words can similarly be used for matching of concepts.

Substantial Similarity Comparison 125 can automatically adjust (i.e. increase or decrease) the strictness of the rules for determining substantial similarity of Sub-streams of Digital Sound Samples 155 using words. In some aspects, such adjustment in strictness can be done by Substantial Similarity Comparison 125 in response to determining that total equivalence match had not been found. In other aspects, an adjustment in strictness can be done by Substantial Similarity Comparison 125 in response to determining that substantially similar match had not been found. Substantial Similarity Comparison 125 can keep adjusting the strictness of the rules until a substantially similar match is found. All the rules or settings of substantial similarity can be set, reset, or adjusted by Substantial Similarity Comparison 125 in response to another strictness level determination. For example, Substantial Similarity Comparison 125 may attempt to find a match in a certain percentage (i.e. 95%, etc.) of the recognized words from the compared Sub-streams of Digital Sound Samples 155. If the comparison does not provide a substantially similar match using such strictness, Substantial Similarity Comparison 125 may decide to decrease the strictness of the rules to find a substantially similar match. In response, Substantial Similarity Comparison 125 may attempt to find fewer matching words than in the previous attempt using stricter rules. If the comparison still does not provide a substantially similar match, Substantial Similarity Comparison 125 may determine to further decrease the strictness (i.e. down to a certain minimum strictness or threshold, etc.) by requiring fewer words to match, thereby further increasing a chance of finding a substantially similar match.

Where a reference to a word is used herein it should be understood that a portion of a word or a collection of words can be used instead of or in addition to the word. In one example, instead of or in addition to words, individual characters (i.e. letters, digits, symbols, etc.) and/or other portions of a word can be compared. In another example, instead of or in addition to words, phrases, sentences, and/or other collections of words can be compared. As such, any operations, rules, logic, and/or functions operating on words similarly apply to any portion of a word and/or any collection of words. In a further example, where one or more front-most words are used in the comparison as previously described, one or more front-most characters and/or other portions of a word can be used in an alternate implementation of the comparison involving portions of a word. In a further example, where comparison strictness is increased by using one or more additional words in the comparison as previously described, additional one or more characters and/or other portions of a word can be used in an alternate implementation of the comparison involving portions of a word. In general, whole words, portions of a word, and/or collections of words, including any operations thereon, can be combined to arrive at desired results. Some or all of the above-described rules, logic, and/or techniques can be utilized alone or in combination with each other or with other rules, logic, and/or techniques. One of ordinary skill in art will recognize that other techniques known in art for determining similarity of streams of digital sound samples and/or other data sequences that would be too voluminous to describe are within the scope of this disclosure.

In other embodiments, in determining substantial similarity of Sub-streams of Digital Sound Samples 155 or portions thereof, Substantial Similarity Comparison 125 can compare one or more features from one Sub-stream of Digital Sound Samples 155 with one or more features from another Sub-stream of Digital Sound Samples 155. A feature (also referred to as sound feature or other similar reference, etc.) may include a collection of sound samples of a stream of digital sound samples. For example, a feature may include sound samples in time frames of 5, 10, 15, 20, 25, 30, etc. milliseconds. In general, any collection of sound samples covering any time frame can be utilized. Some of the steps or elements in a typical feature oriented system include pre-processing, feature extraction, acoustic modeling, language modeling, and/or others, or a combination thereof, each of which may include its own sub-steps or sub-elements depending on the application. Acoustic features can be used for classification of non-verbal vocal outbursts such as laughter or sighs whereas linguistic features can be used to transcribe the linguistic message such as words, phrases, or sentences. Examples of feature extraction techniques include Mel-Frequency Cepstral Coefficients, Wavelet Based Features, Non-Negative Matrix Factorization, and/or others. Once features of the compared Sub-streams of Digital Sound Samples 155 are known, Substantial Similarity Comparison 125 can compare the features to determine substantial similarity. Some of the previously described comparison techniques for determining substantial similarity of Sub-streams of Digital Sound Samples 155 using words can similarly be used for features. In some aspects, total equivalence is found when all features from one Sub-stream of Digital Sound Samples 155 match all features from another Sub-stream of Digital Sound Samples 155. In other aspects, if total equivalence is not found, Substantial Similarity Comparison 125 may attempt to determine substantial similarity. In one example, substantial similarity can be achieved when most of the features from the compared Sub-streams of Digital Sound Samples 155 match. In another example, substantial similarity can be achieved when at least a threshold number (i.e. 1, 5, 17, 33, 68, 114, etc.) or percentage (i.e. 31%, 59%, 82%, 98%, etc.) of features from the compared Sub-streams of Digital Sound Samples 155 match. Similarly, substantial similarity can be achieved when the number or percentage of matching features from the compared Sub-streams of Digital Sound Samples 155 exceeds a threshold number (i.e. 1, 5, 17, 33, 68, 114, etc.) or a threshold percentage (i.e. 31%, 59%, 82%, 98%, etc.). In a further example, substantial similarity can be achieved when all but a threshold number or percentage of features from the compared Sub-streams of Digital Sound Samples 155 match. Such thresholds can be defined by a user, by AIIM system administrator, or automatically by the system based on experience, testing, inquiry, analysis, synthesis, and/or other techniques, knowledge or input. In further aspects, Substantial Similarity Comparison 125 can utilize the order of features for determining substantial similarity of Sub-streams of Digital Sound Samples 155. For example, substantial similarity can be achieved when matches are found with respect to front-most features, thereby tolerating mismatches in later features. Any order of features can be favored in alternate implementations. In further aspects, Substantial Similarity Comparison 125 can utilize the type of features for determining substantial similarity of Sub-streams of Digital Sound Samples 155. For example, substantial similarity can be achieved when matches are found with respect to substantive or longer features, thereby tolerating mismatches in less-substantive or shorter features. In further aspects, Substantial Similarity Comparison 125 can utilize the importance (i.e. as indicated by importance index [later described], etc.) of features for determining substantial similarity of Sub-streams of Digital Sound Samples 155. For example, substantial similarity can be achieved when matches are found with respect to more important features such the above-described substantive, longer, and/or other features, thereby tolerating mismatches in less important features such as less-substantive, shorter, and/or other features. In further aspects, Substantial Similarity Comparison 125 can omit some of the features from the comparison in determining substantial similarity of Sub-streams of Digital Sound Samples 155. In one example, less-substantive or shorter features can be omitted from comparison. In another example, later or rear-most features can be omitted from comparison. In general, any feature can be omitted from comparison.

The previously described functionality of Substantial Similarity Comparison 125 for automatically adjusting (i.e. increasing or decreasing) the strictness of the rules for determining substantial similarity of Sub-streams of Digital Sound Samples 155 using words can similarly be used with features. In some aspects, such adjustment in strictness can be done by Substantial Similarity Comparison 125 in response to determining that total equivalence match had not been found. In other aspects, an adjustment in strictness can be done by Substantial Similarity Comparison 125 in response to determining that substantially similar match had not been found. For example, if the comparison does not provide a substantially similar match using certain strictness, Substantial Similarity Comparison 125 may decide to decrease the strictness (i.e. down to a certain minimum strictness or threshold, etc.) and attempt to find fewer matching features than in the previous attempt using stricter rules.

Where a reference to a feature is used herein it should be understood that a portion of a feature or a collection of features can be used instead of or in addition to the feature. In one example, instead of or in addition to features, individual sound samples that constitute the feature can be compared. In another example, instead of or in addition to features, collections of features can be compared. In a further example, levels of features where a feature on one level includes one or more features from another level (i.e. prior level, etc.) can be compared. As such, any operations, rules, logic, and/or functions operating on features similarly apply to any portion of a feature and/or any collection of features. In general, whole features, portions of a feature, and/or collections of features, including any operations thereon, can be combined to arrive at desired results. Some or all of the above-described rules, logic, and/or techniques can be utilized alone or in combination with each other or with other rules, logic, and/or techniques. Any of the previously described features, functionalities, and embodiments of Substantial Similarity Comparison 125 for determining substantial similarity of Sub-streams of Digital Sound Samples 155 using words can similarly be used for features. One of ordinary skill in art will recognize that other techniques known in art for determining similarity of streams of digital sound samples and/or other data sequences that would too voluminous to describe are within the scope of this disclosure.

In further embodiments, in determining substantial similarity of Sub-streams of Digital Sound Samples 155 or portions thereof, Substantial Similarity Comparison 125 can compare sound samples from one Sub-stream of Digital Sound Samples 155 with sound samples from another Sub-stream of Digital Sound Samples 155. In some aspects, total equivalence is found when all sound samples from one Sub-stream of Digital Sound Samples 155 match all sound samples from another Sub-stream of Digital Sound Samples 155. In other aspects, if total equivalence is not found, Substantial Similarity Comparison 125 may attempt to determine substantial similarity. In one example, substantial similarity can be achieved when most of the sound samples from the compared Sub-streams of Digital Sound Samples 155 match. In another example, substantial similarity can be achieved when at least a threshold number (i.e. 21, 85, 154, 297, 422, 699, etc.) or percentage (i.e. 29%, 48%, 69%, 96%, etc.) of sound samples from the compared Sub-streams of Digital Sound Samples 155 match. Similarly, substantial similarity can be achieved when the number or percentage of matching sound samples from the compared Sub-streams of Digital Sound Samples 155 exceeds a threshold number (i.e. 21, 85, 154, 297, 422, 699, etc.) or a threshold percentage (i.e. 29%, 48%, 69%, 96%, etc.). In a further example, substantial similarity can be achieved when all but a threshold number or percentage of sound samples from the compared Sub-streams of Digital Sound Samples 155 match. Such thresholds can be defined by a user, by AIIM system administrator, or automatically by the system based on experience, testing, inquiry, analysis, synthesis, and/or other techniques, knowledge, or input. In further aspects, Substantial Similarity Comparison 125 can utilize the order of sound samples for determining substantial similarity of Sub-streams of Digital Sound Samples 155. For example, substantial similarity can be achieved when matches are found with respect to front-most sound samples, thereby tolerating mismatches in later sound samples. Any order of sound samples can be favored in alternate implementations. In further aspects. Substantial Similarity Comparison 125 can utilize the importance (i.e. as indicated by importance index [later described], etc.) of sound samples for determining substantial similarity of Sub-streams of Digital Sound Samples 155. For example, substantial similarity can be achieved when matches are found with respect to more important sound samples such the above-described front-most and/or other sound samples, thereby tolerating mismatches in less important sound samples such as later and/or other sound samples. In further aspects, Substantial Similarity Comparison 125 can omit some of the sound samples from the comparison in determining substantial similarity of Sub-streams of Digital Sound Samples 155. In one example, later or rear-most sound samples can be omitted from comparison. In another example, every other sound sample can be omitted from comparison (i.e. to reduce processing time, etc.). In general, any sound sample can be omitted from comparison. In further aspects, Substantial Similarity Comparison 125 can generally compare one or more sound samples from one Sub-stream of Digital Sound Samples 155 with one or more corresponding (i.e. similarly positioned, temporally related, etc.) sound samples from another Sub-stream of Digital Sound Samples 155. In one example, a $78^{th}$ sound sample from one Sub-stream of Digital Sound Samples 155 can be compared with a $78^{th}$ sound sample from another Sub-stream of Digital Sound Samples 155. In another example, the $78^{th}$ sound sample from one Sub-stream of Digital Sound Samples 155 can be compared with a number of samples around (i.e. preceding and/or following) the $78^{th}$ sound sample from another Sub-stream of Digital Sound Samples 155. This way, flexibility can be implemented in finding a matching sound sample if the samples in the compared Sub-streams of Digital Sound Samples 155 are not perfectly aligned. In some designs, adjustments can be made in selecting one or more corresponding sound samples. In one example, Substantial Similarity Comparison 125 can make adjustments to account for variable lengths of silence periods in the compared Sub-streams of Digital Sound Samples 155. In another example, Substantial Similarity Comparison 125 can utilize Dynamic Time Warping (DTW) and/or other techniques for comparing and/or aligning temporal sequences (i.e. Sub-stream of Digital Sound Samples 155, etc.) that may vary in time or speed in order to account for different speaking speeds. In further aspects, Substantial Similarity Comparison 125 can utilize collections or frames of sound samples in determining substantial similarity of Sub-streams of Digital Sound Samples 155. For instance, a frame may include sound samples in time periods of 5, 10, 15, 20, 25, 30, etc. milliseconds. In general, a frame may include any number of sound samples covering any time period. In one example, substantial similarity can be achieved when most of the frames of the compared Sub-streams of Digital Sound Samples 155 match. In another example, substantial similarity can be achieved when at least a threshold number (i.e. 37, 111, 228, 433, etc.) or percentage (i.e. 39%, 48%, 68%, 75%, 99%, etc.) of frames of the compared Sub-streams of Digital Sound Samples 155 match.

The previously described functionality of Substantial Similarity Comparison 125 for automatically adjusting (i.e. increasing or decreasing) the strictness of the rules for determining substantial similarity of Sub-streams of Digital Sound Samples 155 using words and/or features can similarly be used with sound samples. In some aspects, such adjustment in strictness can be done by Substantial Similarity Comparison 125 in response to determining that total equivalence match had not been found. In other aspects, an adjustment in strictness can be done by Substantial Similarity Comparison 125 in response to determining that a substantially similar match had not been found. For example, if the comparison does not provide a substantially similar match using certain strictness, Substantial Similarity Comparison 125 may decide to decrease the strictness (i.e. down to a certain minimum strictness or threshold, etc.) and attempt to find fewer matching sound samples than in the previous attempt using stricter rules.

Where a reference to a sound sample is used herein it should be understood that a collection (i.e. frame, etc.) of sound samples can be used instead of or in addition to the sound sample. For example, instead of or in addition to sound samples, collections of sound samples can be compared. As such, any operations, rules, logic, and/or functions operating on sound samples similarly apply to any collection of sound samples. In general, sound samples and/or collections of sound samples, including any operations thereon, can be combined to arrive at desired results. Some or all of the above-described rules, logic, and/or techniques can be utilized alone or in combination with each other or with other rules, logic, and/or techniques. Any of the previously described features, functionalities, and embodiments of Substantial Similarity Comparison 125 for determining substantial similarity of Sub-streams of Digital Sound Samples 155 using words and/or features can similarly be used for sound samples. One of ordinary skill in art will recognize that other techniques known in art for determining similarity of streams of digital sound samples and/or other data sequences that would too voluminous to describe are within the scope of this disclosure.

Other aspects or properties of digital sound or sound samples can be taken into account by Substantial Similarity Comparison 125 in sound comparisons. Examples of such aspects or properties include amplitude adjustment, sample rate or frequency adjustment, noise reduction, and/or others. In some implementations, as digital sound can be captured by various sound sensing equipment, from various distances, and under various conditions, Substantial Similarity Comparison 125 can adjust values or levels of sound samples or otherwise manipulate the samples before or during comparison. Such adjustment may include amplifying or reducing the values of one or more sound samples. For example, Substantial Similarity Comparison 125 can amplify all samples of one Sub-stream of Digital Sound Samples 155 to make it more comparable to another Sub-stream of Digital Sound Samples 155. Substantial Similarity Comparison 125 can also incrementally adjust the sound samples such as amplifying or reducing the samples by a certain amount in each cycle of comparisons in order to find a substantially similar match at one of the incremental adjustment levels. In other implementations, Substantial Similarity Comparison 125 can re-sample (i.e. up-sample or down-sample) or otherwise transform a digital sound before or during comparison. Such re-sampling or transformation may include increasing or decreasing the number of sound samples. For example, Substantial Similarity Comparison 125 can increase or decrease the number of samples of a Sub-stream of Digital Sound Samples 155 to equate its sample rate or frequency with sample rate or frequency of another Sub-stream of Digital Sound Samples 155. Any publically available, custom, or other re-sampling technique or program can be utilized such as converting a stream of sound samples to an analog signal and re-sampling at a new rate, calculating the values of the new samples directly from the old samples using interpolation (i.e. constant, linear, polynomial, spline, etc.) or decimation (i.e. by an integer or rational factor, etc.), and/or others. In further implementations, as digital sound can be captured in various environments, Substantial Similarity Comparison 125 can perform denoising of the compared Sub-streams of Digital Sound Samples 155. Noise may include any signal that degrades the quality of sound such as equipment related noise, electrical or electromagnetic noise, environmental noise, and/or other noise. Any of the publically available, custom, or other denoising techniques or programs can be utilized such as Adaptive Wiener Filtering, Spectral Subtraction Methods (i.e. cepstral mean normalization), Spectral Restoration (i.e. speech enhancement), Harmonic Decomposition, Nonnegative Matrix Factorization (NMF), and/or others. Substantial Similarity Comparison 125 can perform any other pre-processing or manipulation of digital sound or sound samples before or during comparison.

In any of the comparisons involving digital sound or sound samples, Substantial Similarity Comparison 125 can utilize a threshold for acceptable number or percentage difference in determining a match for each compared sound sample. A sound sample can be encoded using various techniques such as binary value (i.e. 8 bit, 16 bit, 24 bit, etc.), hexadecimal value, numerical value, and/or others. For instance, in a 16 bit encoding scheme, each sound sample is encoded with a value or level of 0-65536 or its binary equivalent. In one example, a threshold for acceptable difference (i.e. absolute difference, etc.) can be set at 1000 for each of the sound samples. Therefore, a sample encoded with a value of 30100 matches or is sufficiently similar to a compared sample encoded with a value of 30883 because the difference in the samples falls within the acceptable difference threshold (i.e. 1000 in this example, etc.). Furthermore, a sample encoded with a value of 30100 does not match or is not sufficiently similar to a compared pixel encoded with a value of 31155 because the difference in the samples falls outside the acceptable difference threshold. Any other number threshold can be used such as 1, 8, 82, 492, 1195, 5004, 13883, 33841, 57112, and/or others. A threshold for acceptable percentage difference can similarly be utilized such as 0.38%, 4%, 11%, 24%, 31%, 46%, 78%, and/or others. A similar difference determination can be utilized in samples encoded in any other encoding scheme. The aforementioned thresholds can be defined by a user, by AIIM system administrator, or automatically by the system based on experience, testing, inquiry, analysis, synthesis, or other techniques, knowledge, or input.

In some designs, in determining substantial similarity of Sub-streams of Digital Pictures 145 or portions thereof, Substantial Similarity Comparison 125 can compare pictures from one Sub-stream of Digital Pictures 145 with pictures from another Sub-stream of Digital Pictures 145. Any features, functionalities, and embodiments of the previously described Picture Recognizer 163 can be used in determining substantial similarity of Sub-streams of Digital Pictures 145. In some aspects, Substantial Similarity Comparison 125 can compare pictures from one Sub-stream of Digital Pictures 145 with corresponding (i.e. similarly positioned, temporally related, etc.) pictures from another Sub-stream of Digital Pictures 145. In one example, a $67^{th}$ picture from one Sub-stream of Digital Pictures 145 can be compared with a $67^{th}$ picture from another Sub-stream of Digital Pictures 145. In another example, the $67^{th}$ picture from one Sub-stream of Digital Pictures 145 can be compared with a number of pictures around (i.e. preceding and/or following) the $67^{th}$ picture from another Sub-stream of Digital Pictures 145. This way, flexibility can be implemented in finding a substantially similar picture if the pictures in the compared Sub-streams of Digital Pictures 145 are not perfectly aligned. In other aspects, Substantial Similarity Comparison 125 can utilize Dynamic Time Warping (DTW) and/or other techniques know in art for comparing and/or aligning temporal sequences (i.e. Sub-streams of Digital Pictures 145, etc.) that may vary in time or speed. Once the corresponding (i.e. similarly positioned, temporally related, time warped/aligned, etc.) pictures of Sub-streams of Digital Pictures 145 are compared and their substantial similarity determined using comparison techniques for individual pictures described below, Substantial Similarity Comparison 125 can utilize a threshold for the number or percentage of matching pictures for determining substantial similarity of the compared Sub-streams of Digital Pictures 145. In one example, substantial similarity can be achieved when most of the pictures of the compared Sub-streams of Digital Pictures 145 match or substantially match. In another example, substantial similarity of Sub-streams of Digital Pictures 145 can be achieved when at least a threshold number (i.e. 28, 74, 283, 322, 995, 874, 8028, etc.) or percentage (i.e. 29%, 33%, 58%, 72%, 99%, etc.) of pictures of the compared Sub-streams of Digital Pictures 145 match or substantially match. Similarly, substantial similarity can be achieved when the number or percentage of matching or substantially matching pictures of the compared Sub-streams of Digital Pictures 145 exceeds a threshold number (i.e. 28, 74, 283, 322, 995, 874, 8028, etc.) or a threshold percentage (i.e. 29%, 33%, 58%, 72%, 99%, etc.). In a further example, substantial similarity of Sub-streams of Digital Pictures 145 can be achieved when all but a threshold number or percentage of pictures of the compared Sub-streams of Digital Pictures 145 match or substantially match. Such thresholds can be defined by a user, by AIIM system administrator, or automatically by the system based on experience, testing, inquiry, analysis, synthesis, or other techniques, knowledge, or input. In some aspects, Substantial Similarity Comparison 125 can omit some of the pictures from the comparison in determining substantial similarity of Sub-streams of Digital Pictures 145.

In some embodiments, in determining substantial similarity of individual pictures (i.e. pictures from the compared Sub-streams of Digital Pictures 145, etc.), Substantial Similarity Comparison 125 can compare one or more features of one picture with one or more features of another picture. A feature (also referred to as picture feature or other similar reference, etc.) may include a collection or region of pixels of a picture. Some of the steps or elements in a typical feature oriented system include pre-processing, feature extraction, detection/segmentation, decision-making, and/or others, or a combination thereof, each of which may include its own sub-steps or sub-elements depending on the application. Examples of features that can be used include lines, edges, ridges, corners, blobs, regions, and/or others. Examples of feature extraction techniques include Canny, Sobe, Kayyali, Harris & Stephens et al, SUSAN, Level Curve Curvature, FAST, Laplacian of Gaussian, Difference of Gaussians, Determinant of Hessian, MSER, PCBR, Grey-level Blobs, and/or others. Once features of the compared pictures are known, Substantial Similarity Comparison 125 can compare the features to determine substantial similarity. In some aspects, total equivalence is found when all features of one picture match all features of another picture. In other aspects, if total equivalence is not found, Substantial Similarity Comparison 125 may attempt to determine substantial similarity. In one example, substantial similarity can be achieved when most of the features of the compared pictures match. In another example, substantial similarity can be achieved when at least a threshold number (i.e. 3, 22, 47, 93, 128, 431, etc.) or percentage (i.e. 49%, 53%, 68%, 72%, 95%, etc.) of features of the compared pictures match. Similarly, substantial similarity can be achieved when the number or percentage of matching features of the compared pictures exceeds a threshold number (i.e. 3, 22, 47, 93, 128, 431, etc.) or a threshold percentage (i.e. 49%, 53%, 68%, 72%, 95%, etc.). In a further example, substantial similarity can be achieved when all but a threshold number or percentage of features of the compared pictures match. Such thresholds can be defined by a user, by AIIM system administrator, or automatically by the system based on experience, testing, inquiry, analysis, synthesis, and/or other techniques, knowledge, or input. In further aspects, Substantial Similarity Comparison 125 can utilize the type of features for determining substantial similarity of pictures. In one example, substantial similarity can be achieved when matches are found with respect to edges, thereby tolerating mismatches in blobs. In another example, substantial similarity can be achieved when matches are found with respect to more-substantive, larger, and/or other features, thereby tolerating mismatches in less-substantive, smaller, and/or other features. In further aspects, Substantial Similarity Comparison 125 can utilize the importance (i.e. as indicated by importance index [later described], etc.) of features for determining substantial similarity of pictures. For example, substantial similarity can be achieved when matches are found with respect to more important features such as the above described more-substantive, larger, and/or other features, thereby tolerating mismatches in less important features such as less-substantive, smaller, and/or other features. In further aspects, Substantial Similarity Comparison 125 can omit some of the features from the comparison in determining substantial similarity of pictures. In one example, isolated features can be omitted from comparison. In another example, less-substantive or smaller features can be omitted from comparison. In general, any feature can be omitted from comparison. In further aspects, Substantial Similarity Comparison 125 can focus on features in certain regions of interest of the compared pictures. For example, substantial similarity can be achieved when matches are found with respect to features in regions comprising the face or parts (i.e. mouth, eyes, etc.) thereof, thereby tolerating mismatches in features of regions comprising other body parts, the background, and/or other regions. In further aspects, Substantial Similarity Comparison 125 can detect or recognize persons or objects in the compared pictures. Any features, functionalities, and embodiments of the previously described Picture Recognizer 163 can be used in such detection or recognition. Once a person or object is detected in a picture, Substantial Similarity Comparison 125 may attempt to detect the person or object in the compared picture. In one example, substantial similarity can be achieved when the compared pictures comprise the same person or object. In another example concerning Sub-streams of Digital Pictures 143, substantial similarity can be achieved when the compared Sub-streams of Digital Pictures 143 comprise a detected person or object in at least a threshold number or percentage of their pictures. In further aspects, Substantial Similarity Comparison 125 may include identifying and/or analyzing tiled and/or overlapping features, which can then be combined (i.e. similar to some process steps in convolutional neural networks, etc.) and compared to determine substantial similarity of pictures.

Substantial Similarity Comparison 125 can automatically adjust (i.e. increase or decrease) the strictness of the rules for determining substantial similarity of pictures using features. In some aspects, such adjustment in strictness can be done by Substantial Similarity Comparison 125 in response to determining that total equivalence match had not been found. In other aspects, an adjustment in strictness can be done by Substantial Similarity Comparison 125 in response to determining that a substantially similar match had not been found. Substantial Similarity Comparison 125 can keep adjusting the strictness rules until a substantially similar match is found. All the rules or settings of substantial similarity can be set, reset, or adjusted by Substantial Similarity Comparison 125 in response to another strictness level determination. For example, Substantial Similarity Comparison 125 may attempt to find a match in a certain percentage (i.e. 95%, etc.) of features from the compared pictures. If the comparison does not provide a substantially similar match, Substantial Similarity Comparison 125 may decide to decrease the strictness of the rules to find a substantially similar match. In response, Substantial Similarity Comparison 125 may attempt to find fewer matching features than in the previous attempt using stricter rules. If the comparison still does not provide a substantially similar match, Substantial Similarity Comparison 125 may determine to further decrease the strictness (i.e. down to a certain minimum strictness or threshold, etc.) by requiring fewer features to match, thereby further increasing a chance of finding a substantially similar match.

Where a reference to a feature is used herein it should be understood that a portion of a feature or a collection of features can be used instead of or in addition to the feature. In one example, instead of or in addition to features, individual pixels that constitute the feature can be compared. In another example, instead of or in addition to features, collections of features can be compared. In a further example, levels of features where a feature on one level includes one or more features from another level (i.e. prior level, etc.), can be compared. As such, any operations, rules, logic, and/or functions operating on features similarly apply to any portion of a feature and/or any collection of features. In general, whole features, portions of a feature, and/or collections of features, including any operations thereon, can be combined to arrive at desired results. Some or all of the above-described rules, logic, and/or techniques can be utilized alone or in combination with each other or with other rules, logic, and/or techniques. One of ordinary skill in art will recognize that other techniques known in art for determining similarity of digital pictures, streams thereof, and/or other data sequences that would be too voluminous to describe are within the scope of this disclosure.

In other embodiments, in determining substantial similarity of individual pictures (i.e. pictures from the compared Sub-streams of Digital Pictures 145, etc.), Substantial Similarity Comparison 125 can compare pixels of one picture with pixels of another picture. In some aspects, total equivalence is found when all pixels of one picture match all pixels of another picture. In other aspects, if total equivalence is not found, Substantial Similarity Comparison 125 may attempt to determine substantial similarity. In one example, substantial similarity can be achieved when most of the pixels from the compared pictures match. In another example, substantial similarity can be achieved when at least a threshold number (i.e. 449, 2219, 92229, 442990, 1000028, etc.) or percentage (i.e. 39%, 45%, 58%, 72%, 92%, etc.) of pixels from the compared pictures match. Similarly, substantial similarity can be achieved when the number or percentage of matching pixels from the compared pictures exceeds a threshold number (i.e. 449, 2219, 92229, 442990, 1000028, etc.) or a threshold percentage (i.e. 39%, 45%, 58%, 72%, 92%, etc.). In a further example, substantial similarity can be achieved when all but a threshold number or percentage of pixels from the compared pictures match. Such thresholds can be defined by a user, by AIIM system administrator, or automatically by the system based on experience, testing, inquiry, analysis, synthesis, and/or other techniques, knowledge, or input. In further aspects, Substantial Similarity Comparison 125 can omit some of the pixels from the comparison in determining substantial similarity of pictures. In one example, pixels composing the background or any insignificant content can be omitted from comparison. In general, any pixel can be omitted from comparison. In further aspects, Substantial Similarity Comparison 125 can utilize collections or regions of pixels in determining substantial similarity of pictures. A region may include any number of pixels. For example, substantial similarity can be achieved when at least a threshold number (i.e. 1, 2, 4, 9, 11, 28, etc.) or percentage (i.e. 19%, 32%, 55%, 62%, 94%, etc.) of regions of the compared pictures match or substantially match. Similarly, substantial similarity can be achieved when the number or percentage of matching regions of the compared pictures exceeds a threshold number (i.e. 1, 2, 4, 9, 11, 28, etc.) or a threshold percentage (i.e. 19%, 32%, 55%, 62%, 94%, etc.). In further aspects, Substantial Similarity Comparison 125 can focus on pixels in certain regions of interest in determining substantial similarity of pictures. For example, substantial similarity can be achieved when matches are found with respect to pixels in regions comprising the face or parts (i.e. mouth, eyes, etc.) thereof, thereby tolerating mismatches in pixels of regions comprising other body parts, the background, and/or other regions.

The previously described functionality of Substantial Similarity Comparison 125 for automatically adjusting (i.e. increasing or decreasing) the strictness of the rules for determining substantial similarity of pictures using features can similarly be used with pixels. In some aspects, such adjustment in strictness can be done by Substantial Similarity Comparison 125 in response to determining that total equivalence match had not been found. In other aspects, an adjustment in strictness can be done by Substantial Similarity Comparison 125 in response to determining that a substantially similar match had not been found. For example, if the comparison does not provide a substantially similar match using certain strictness, Substantial Similarity Comparison 125 may decide to decrease the strictness (i.e. down to a certain minimum strictness or threshold, etc.) and attempt to find fewer matching pixels than in the previous attempt using stricter rules.

Where a reference to a pixel is used herein it should be understood that a collection (i.e. region, etc.) of pixels can be used instead of or in addition to the pixel. For example, instead of or in addition to pixels, collections of pixels can be compared. As such, any operations, rules, logic, and/or functions operating on pixels similarly apply to any collection of pixels. In general, pixels and/or collections of pixels, including any operations thereon, can be combined to arrive at desired results. Some or all of the above-described rules, logic, and/or techniques can be utilized alone or in combination with each other or with other rules, logic, and/or techniques. Any of the previously described features, functionalities, and embodiments of Substantial Similarity Comparison 125 for determining substantial similarity of pictures using features can similarly be used for pixels. One of ordinary skill in art will recognize that other techniques known in art for determining similarity of digital pictures, streams thereof, and/or other data sequences that would be too voluminous to describe are within the scope of this disclosure.

Other aspects or properties of digital pictures or pixels can be taken into account by Substantial Similarity Comparison 125 in picture comparisons. Examples of such aspects or properties include color adjustment, size adjustment, transparency (i.e. alpha channel, etc.), use of mask, and/or others. In some implementations, as digital pictures can be captured by various picture taking equipment, in various environments, and under various lighting conditions, Substantial Similarity Comparison 125 can adjust lighting or color of pixels or otherwise manipulate pixels before or during comparison. Lighting or color adjustment (also referred to as gray balance, neutral balance, white balance, etc.) may generally include manipulating or rebalancing the intensities of the colors (i.e. red, green, and/or blue if RGB color model is used, etc.) of one or more pixels. For example, Substantial Similarity Comparison 125 can adjust lighting or color of all pixels of one picture to make it more comparable to another picture. Substantial Similarity Comparison 125 can also incrementally adjust the pixels such as increasing or decreasing the red, green, and/or blue pixel values by a certain amount in each cycle of comparisons in order to find a substantially similar match at one of the incremental adjustment levels. Any of the publically available, custom, or other lighting or color adjustment techniques or programs can be utilized such as color filters, color balancing, color correction, and/or others. In other implementations, Substantial Similarity Comparison 125 can resize or otherwise transform a digital picture before or during comparison. Such resizing or transformation may include increasing or decreasing the number of pixels. For example, Substantial Similarity Comparison 125 can increase or decrease the size of a picture proportionally (i.e. increase or decrease length and/or width keeping aspect ratio constant, etc.) to equate its size with the size of another picture. Substantial Similarity Comparison 125 can also incrementally resize a picture such as increasing or decreasing the size of the picture proportionally by a certain amount in each cycle of comparisons in order to find a substantially similar match at one of the incremental sizes. Any of the publically available, custom, or other digital picture resizing techniques or programs can be utilized such as nearest-neighbor interpolation, bilinear interpolation, bicubic interpolation, and/or others. In further implementations, in digital pictures comprising transparency features or functionalities, Substantial Similarity Comparison 125 can utilize a threshold for acceptable number or percentage transparency difference similar to the below-described threshold for the acceptable color difference. Alternatively, transparency can be applied to one or more pixels of a picture and color difference may then be determined between compared pixels taking into account the transparency related color effect. Alternatively, transparent pixels can be excluded from comparison. In further implementations, certain regions or subsets of pixels can be ignored during comparison using a mask to define the region or subset of pixels excluded from comparison. In general, any region or subset of a picture determined to contain no content of interest can be excluded from comparison using a mask. Examples of such regions or subsets include background, transparent or partially transparent regions, regions comprising insignificant content, or any arbitrary region or subset. Substantial Similarity Comparison 125 can perform any other pre-processing or manipulation of digital pictures or pixels before or during comparison.

In any of the comparisons involving digital pictures or pixels, Substantial Similarity Comparison 125 can utilize a threshold for acceptable number or percentage difference in determining a match for each compared pixel. A pixel in a digital picture can be encoded using various techniques such as RGB (i.e. red, green, blue), CMYK (i.e. cyan, magenta, yellow, and key [black]), binary value, hexadecimal value, numerical value, and/or others. For instance, in RGB color scheme, each of red, green, and blue colors is encoded with a value 0-255 or its binary equivalent. In one example, a threshold for acceptable difference (i.e. absolute difference, etc.) can be set at 10 for each of the three colors. Therefore, a pixel encoded as R130, G240, B50 matches or is sufficiently similar to a compared pixel encoded as R135, G231, B57 because the differences in all three colors fall within the acceptable difference threshold (i.e. 10 in this example, etc.). Furthermore, a pixel encoded as R130, G240, B50 does not match or is not sufficiently similar to a compared pixel encoded as R143, G231, B57 because the difference in red value falls outside the acceptable difference threshold. Any other number threshold can be used such as 1, 3, 8, 15, 23, 77, 132, 197, 243, and/or others. A threshold for acceptable percentage difference can similarly be utilized such as 0.12%, 2%, 7%, 14%, 23%, 36%, 65%, and/or others. In some aspects, a threshold for acceptable number or percentage difference in red, green, and blue can be set to be different for each color. A similar difference determination can be utilized in pixels encoded in any other color scheme. The aforementioned thresholds can be defined by a user, by AIIM system administrator, or automatically by the system based on experience, testing, inquiry, analysis, synthesis, or other techniques, knowledge, or input.

In some embodiments, the previously described Extra Info 250 can be used to enhance any of the aforementioned substantial similarity determinations. Extra Info 250 may include any contextual or other information that can be useful in determining similarity between any compared elements. In one example, Extra Info 250 includes time stamp (i.e. time information, etc.) of a Sub-stream of Digital Pictures 145, Sub-stream of Digital Sound Samples 155, Conversational Activity 210, Round of Conversational Exchange 200, and/or other element. In another example, Extra Info 250 includes location (i.e. location information, etc.) of the Conversation Participant 50 while engaged in a conversation. In a further example, Extra Info 250 includes objects or environments (i.e. observed information, etc.) recognized from Sub-stream of Digital Pictures 145 and/or Sub-stream of Digital Sound Samples 155. In some aspects, in determining substantial similarity of Sub-streams of Digital Pictures 145, Substantial Similarity Comparison 125 can compare one or more Extra Info 250 (i.e. time stamp, location information, observed information, etc.) in addition to or instead of comparing pictures (i.e. frames, etc.), features, pixels, and/or other elements. Extra Info 250 can be set to be less, equally, or more important (i.e. as indicated by importance index [later described], etc.) than pictures, features, pixels, and/or other elements in the comparison. In other aspects, in determining substantial similarity of Sub-streams of Digital Sound Samples 155, Substantial Similarity Comparison 125 can compare one or more Extra Info 250 in addition to or instead of comparing words, features, sound samples, and/or other elements. Extra Info 250 can be set to be less, equally, or more important than words, features, sound samples, and/or other elements in the comparison. In further aspects, in determining substantial similarity of Conversational Activities 210, Substantial Similarity Comparison 125 can compare one or more Extra Info 250 in addition to or instead of comparing Sub-streams of Digital Pictures 145, Sub-streams of Digital Sound Samples 155, and/or other elements. Extra Info 250 can be set to be less, equally, or more important than any Sub-stream of Digital Pictures 145, Sub-stream of Digital Sound Samples 155, and/or other elements in the comparison. In further aspects, in determining substantial similarity of Rounds of Conversational Exchange 200, Substantial Similarity Comparison 125 can compare one or more Extra Info 250 in addition to or instead of comparing Conversational Activities 210 and/or other elements. Extra Info 250 can be set to be less, equally, or more important than any Conversational Activity 210 and/or other elements in the comparison.

In some embodiments, an importance index (not shown) or other importance ranking technique can be used in any of the previously described comparisons or other processing involving elements of different importance. Importance index indicates importance of the element to or with which the index is assigned or associated. For example, importance index may indicate importance of Round of Conversational Exchange 200, Conversational Activity 210, Sub-stream of Digital Pictures 145, Sub-stream of Digital Sound Samples 155, word, feature, and/or other element to or with which the index is assigned or associated. In some aspects, importance index on a scale from 0 to 1 can be utilized, although, any other range can also be utilized. Importance index can be stored in or associated with the element to which the index pertains. Association of importance indexes can be implemented using a table where one column comprises elements and another column comprises their associated importance indexes, for example. Importance indexes of various elements can be defined by a user, by AIIM system administrator, or automatically by the system based on experience, testing, inquiry, analysis, synthesis, or other techniques, knowledge, or input. In one example, a higher Importance index can be assigned to speaking Conversational Activities 210. In another example, a higher Importance index can be assigned to Extra Info 250. In a further example, a higher importance index can be assigned to front-most words recognized from a Sub-stream of Digital Sound Samples 155. Any importance index can be assigned to or associated with any element described herein. Any importance ranking technique can be utilized as or instead of importance index in alternate embodiments.

In some embodiments, Substantial Similarity Comparison 125 may generate a similarity index (not shown) for any compared elements. Similarity index indicates how well an element is matched with another element. For example, similarity index indicates how well a Round of Conversational Exchange 200, Conversational Activity 210, Sub-stream of Digital Pictures 145, Sub-stream of Digital Sound Samples 155, word, feature, and/or other element is matched with a compared element. In some aspects, similarity index on a scale from 0 to 1 can be utilized, although, any other range can also be utilized. Similarity index can be generated by Substantial Similarity Comparison 125 whether substantial similarity between the compared elements is achieved or not. In one example, similarity index can be determined for a Sub-stream of Digital Sound Samples 155 based on a ratio/percentage of matched words and/or Extra Info 250 relative to the number of al words and/or Extra Info 250 in the Sub-stream of Digital Sound Samples 155. Specifically, similarity index of 0.46 is determined if 46% of words and/or Extra Info 250 match. In some designs, importance (i.e. as indicated by importance index, etc.) of one or more words and/or Extra Info 250 can be included in the calculation of a weighted similarity index. Similar determination of similarity index can be implemented with features, sound samples, and/or other elements of Sub-stream of Digital Sound Samples 155. In a further example, similarity index can be determined for a Sub-stream of Digital Pictures 145 based on a ratio/percentage of matched pictures (i.e. frames, etc.) and/or Extra Info 250 relative to the number of all pictures (i.e. frames, etc.) and/or Extra Info 250 in the Sub-stream of Digital Pictures 145. Specifically, similarity index of 0.93 is determined if 93% of pictures (i.e. frames, etc.) and/or Extra Info 250 match or substantially match. In some designs, importance (i.e. as indicated by importance index, etc.) of one or more pictures (i.e. frames, etc.) and/or Extra Info 250 can be included in the calculation of a weighted similarity index. Similar determination of similarity index can be implemented with features, pixels, and/or other elements of Sub-stream of Digital Pictures 145. In another example, similarity index can be determined for a Conversational Activity 210 based on similarities or similarity indexes of Sub-streams of Digital Pictures 145, Sub-streams of Digital Sound Samples 155, and/or Extra Info 250 in the compared Conversational Activities 210. In some designs, an average or weighted average of similarities or similarity indexes of Sub-streams of Digital Pictures 145, Sub-streams of Digital Sound Samples 155, and/or Extra Info 250 can be used to calculate a weighted similarity index for a Conversational Activity 210. In another example, similarity index can be determined for a Round of Conversational Exchange 120 based on similarities or similarity indexes of Conversational Activities 210 and/or Extra Info 250 in the compared Rounds of Conversational Exchange 120. In some designs, an average or weighted average of similarities or similarity indexes of Conversational Activities 210 and/or Extra Info 250 can be used in calculating a weighted similarity index for a Round of Conversational Exchange 120. Any combination of the aforementioned similarity index determinations or calculations can be utilized in alternate embodiments. Any similarity ranking technique can be utilized to determine or calculate similarity index in alternate embodiments.

Figure 14:
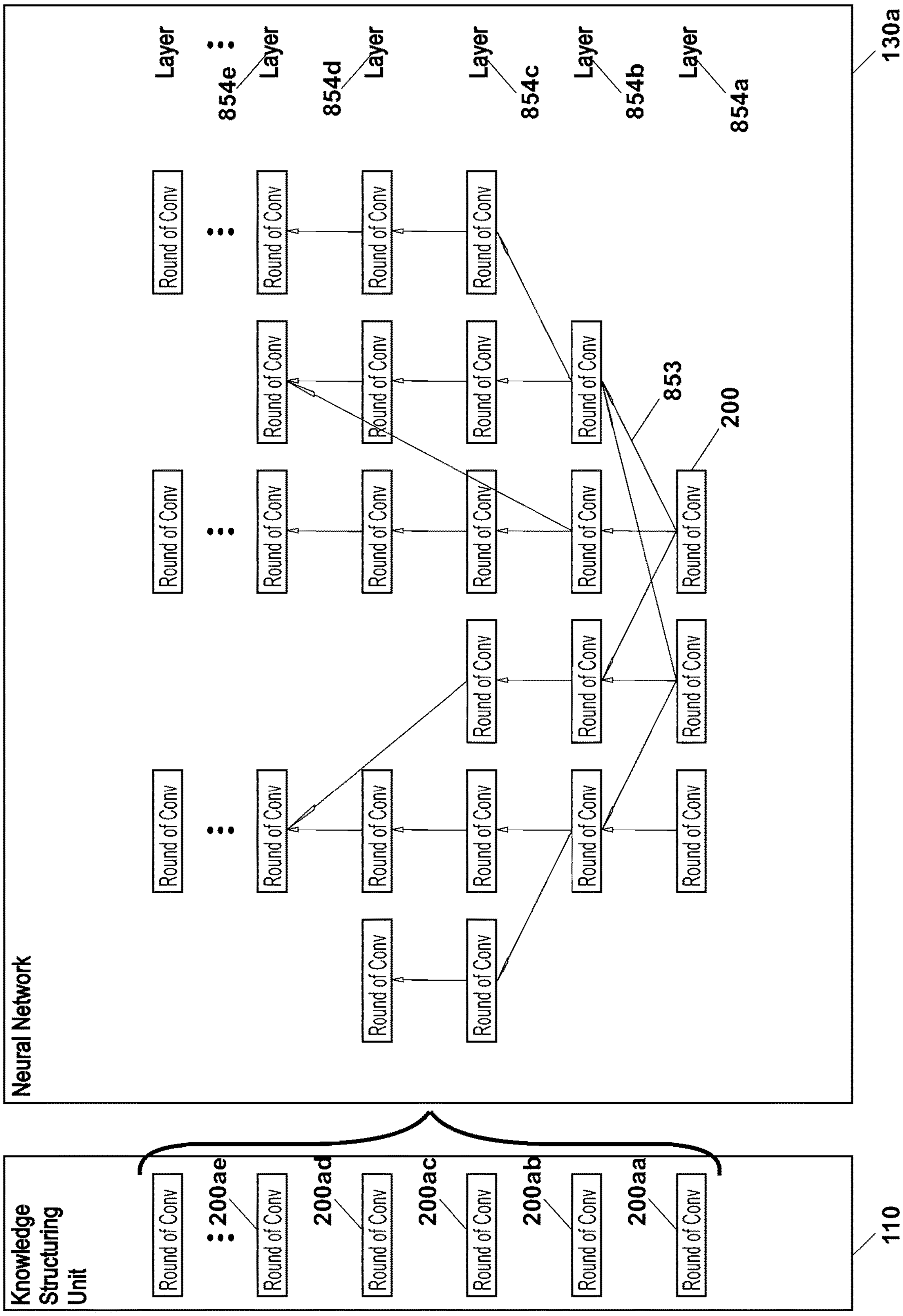
FIG. 14 illustrates an example of learning Rounds of Conversational Exchange 200 using Neural Network 130*a* comprising shortcut Connections 853.

Referring to FIG. 14, an exemplary embodiment of learning Rounds of Conversational Exchange 200 using Neural Network 130*a* comprising shortcut Connections 853 is illustrated. In some aspects, Rounds of Conversational Exchange 200 in one Layer 854 can be connected with Rounds of Conversational Exchange 200 in any Layer 854, not only in a successive Layer 854, thereby creating shortcuts (i.e. shortcut Connections 853, etc.) through Neural Network 130*a*. Creating a shortcut Connection 853 can be implemented by performing Substantial Similarity Comparisons 125 of a Round of Conversational Exchange 200 from Knowledge Structuring Unit 110 with Rounds of Conversational Exchange 200 in any Layer 854 when applying (i.e. storing, copying, etc.) the Round of Conversational Exchange 200 from Knowledge Structuring Unit 110 onto Neural Network 130*a*. Once created, shortcut Connections 853 enable a wider variety of Rounds of Conversational Exchange 200 to be considered when selecting a path through Neural Network 130*a*. In some embodiments, Knowledge Structuring Unit 110 creates or generates Rounds of Conversational Exchange 200 and the system applies them onto Neural Network 130*a*, thereby implementing learning of Rounds of Conversational Exchange 200. The system can perform Substantial Similarity Comparisons 125 of a Round of Conversational Exchange 200 from Knowledge Structuring Unit 110 with Rounds of Conversational Exchange 200 in a corresponding and/or other Layers 854 of Neural Network 130*a*. If a substantially similar Round of Conversational Exchange 200 is not found in the corresponding or other Layers 854 of Neural Network 130*a*, the system may insert (i.e. copy, store, etc.) the Round of Conversational Exchange 200 from Knowledge Structuring Unit 110 into the corresponding (or another) Layer 854 of Neural Network 130*a*, and create a Connection 853 to the inserted Round of Conversational Exchange 200 from a prior Round of Conversational Exchange 200 including assigning an occurrence count to the new Connection 853, calculating a weight of the new Connection 853, and updating any other Connections 853 originating from the prior Round of Conversational Exchange 200. On the other hand, if a substantially similar Round of Conversational Exchange 200 is found in the corresponding or other Layers 854 of Neural Network 130*a*, the system may update occurrence count and weight of Connection 853 to that Round of Conversational Exchange 200 from a prior Round of Conversational Exchange 200, and update any other Connections 853 originating from the prior Round of Conversational Exchange 200. Any of the previously described and/or other techniques for comparing, inserting, updating, and/or other operations on Rounds of Conversational Exchange 200, Connections 853, Layers 854, and/or other elements can similarly be utilized in Neural Network 130*a* that comprises shortcut Connections 853.

Figure 15:
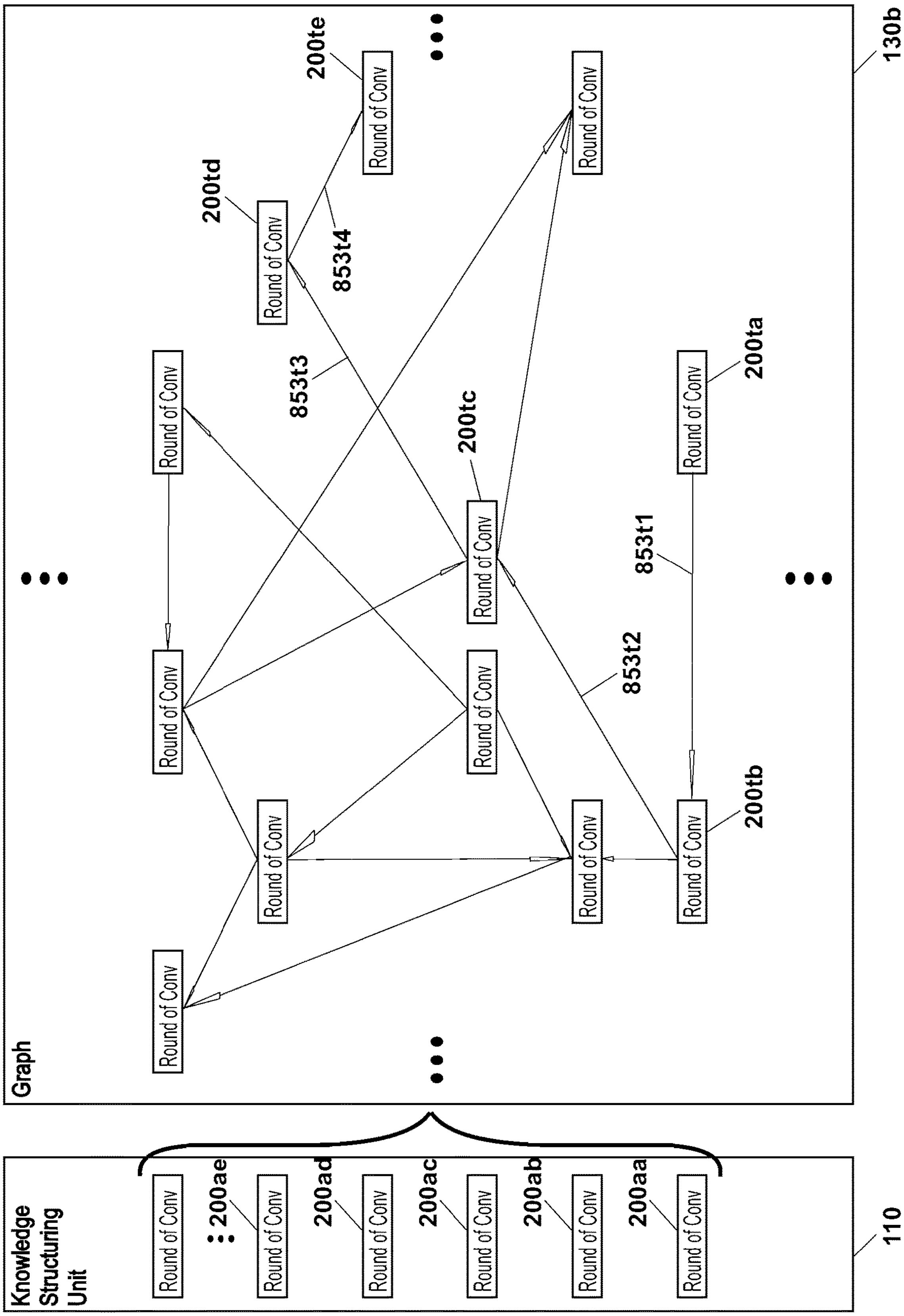
FIG. 15 illustrates an example of learning Rounds of Conversational Exchange 200 using Graph 130*b*.

Referring to FIG. 15, an exemplary embodiment of learning Rounds of Conversational Exchange 200 using Graph 130*b* is illustrated. In some aspects, any Round of Conversational Exchange 200 can be connected with any other Round of Conversational Exchange 200 in Graph 130*b*. In other aspects, any Round of Conversational Exchange 200 can be connected with itself and/or any other Round of Conversational Exchange 200 in Graph 130*b*. In some embodiments, Knowledge Structuring Unit 110 creates or generates Rounds of Conversational Exchange 200 and the system applies them onto Graph 130*b*, thereby implementing learning of Rounds of Conversational Exchange 200. The system can perform Substantial Similarity Comparisons 125 of a Round of Conversational Exchange 200 from Knowledge Structuring Unit 110 with Rounds of Conversational Exchange 200 in Graph 130*b*. If a substantially similar Round of Conversational Exchange 200 is not found in Graph 130*b*, the system may insert (i.e. copy, store, etc.) the Round of Conversational Exchange 200 from Knowledge Structuring Unit 110 into Graph 130*b*, and create a Connection 853 to the inserted Round of Conversational Exchange 200 from a prior Round of Conversational Exchange 200 including assigning an occurrence count to the new Connection 853, calculating a weight of the new Connection 853, and updating any other Connections 853 originating from the prior Round of Conversational Exchange 200. On the other hand, if a substantially similar Round of Conversational Exchange 200 is found in Graph 130*b*, the system may update occurrence count and weight of Connection 853 to that Round of Conversational Exchange 200 from a prior Round of Conversational Exchange 200, and update any other Connections 853 originating from the prior Round of Conversational Exchange 200. Any of the previously described and/or other techniques for comparing, inserting, updating, and/or other operations on Rounds of Conversational Exchange 200, Connections 853, and/or other elements can similarly be utilized in Graph 130*b*.

For example, the system can perform Substantial Similarity Comparisons 125 of Round of Conversational Exchange 200*aa* from Knowledge Structuring Unit 110 with Rounds of Conversational Exchange 200 in Graph 130*b*. In the case that a substantially similar match is not found, the system may insert Round of Conversational Exchange 200*ta* into Graph 130*b* and copy Round of Conversational Exchange 200*aa* into the inserted Round of Conversational Exchange 200*ta*. The system can then perform Substantial Similarity Comparisons 125 of Round of Conversational Exchange 200*ab* from Knowledge Structuring Unit 110 with Rounds of Conversational Exchange 200 in Graph 130*b*. In the case that a substantially similar match is found between Round of Conversational Exchange 200*ab* and Round of Conversational Exchange 200*tb*, the system may create Connection 853*t*1 between Round of Conversational Exchange 200*ta* and Round of Conversational Exchange 200*tb* with occurrence count of 1 and weight of 1. The system can then perform Substantial Similarity Comparisons 125 of Round of Conversational Exchange 200*ac* from Knowledge Structuring Unit 110 with Rounds of Conversational Exchange 200 in Graph 130*b*.

In the case that a substantially similar match is found between Round of Conversational Exchange 200*ac* and Round of Conversational Exchange 200*tc*, the system may update occurrence count and weight of Connection 853*t*2 between Round of Conversational Exchange 200*tb* and Round of Conversational Exchange 200*tc*, and update weights of other outgoing Connections 853 (one in this example) originating from Round of Conversational Exchange 200*tb* as previously described. The system can then perform Substantial Similarity Comparisons 125 of Round of Conversational Exchange 200*ad* from Knowledge Structuring Unit 110 with Rounds of Conversational Exchange 200 in Graph 130*b*. In the case that a substantially similar match is not found, the system may insert Round of Conversational Exchange 200*td* into Graph 130*b* and copy Round of Conversational Exchange 200*ad* into the inserted Round of Conversational Exchange 200*td*. The system may also create Connection 853*t*3 between Round of Conversational Exchange 200*tc* and Round of Conversational Exchange 200*td* with occurrence count of 1 and weight calculated based on the occurrence count as previously described. The system may also update weights of other outgoing Connections 853 (one in this example) originating from Round of Conversational Exchange 200*tc* as previously described. The system can then perform Substantial Similarity Comparisons 125 of Round of Conversational Exchange 200*ae* from Knowledge Structuring Unit 110 with Rounds of Conversational Exchange 200 in Graph 130*b*. In the case that a substantially similar match is not found, the system may insert Round of Conversational Exchange 200*te* into Graph 130*b* and copy Round of Conversational Exchange 200*ae* into the inserted Round of Conversational Exchange 200*te*. The system may also create Connection 853*t*4 between Round of Conversational Exchange 200*td* and Round of Conversational Exchange 200*te* with occurrence count of 1 and weight of 1. Applying any additional Rounds of Conversational Exchange 200 from Knowledge Structuring Unit 110 onto Graph 130*b* follows similar logic or process as the above-described.

Figure 16:
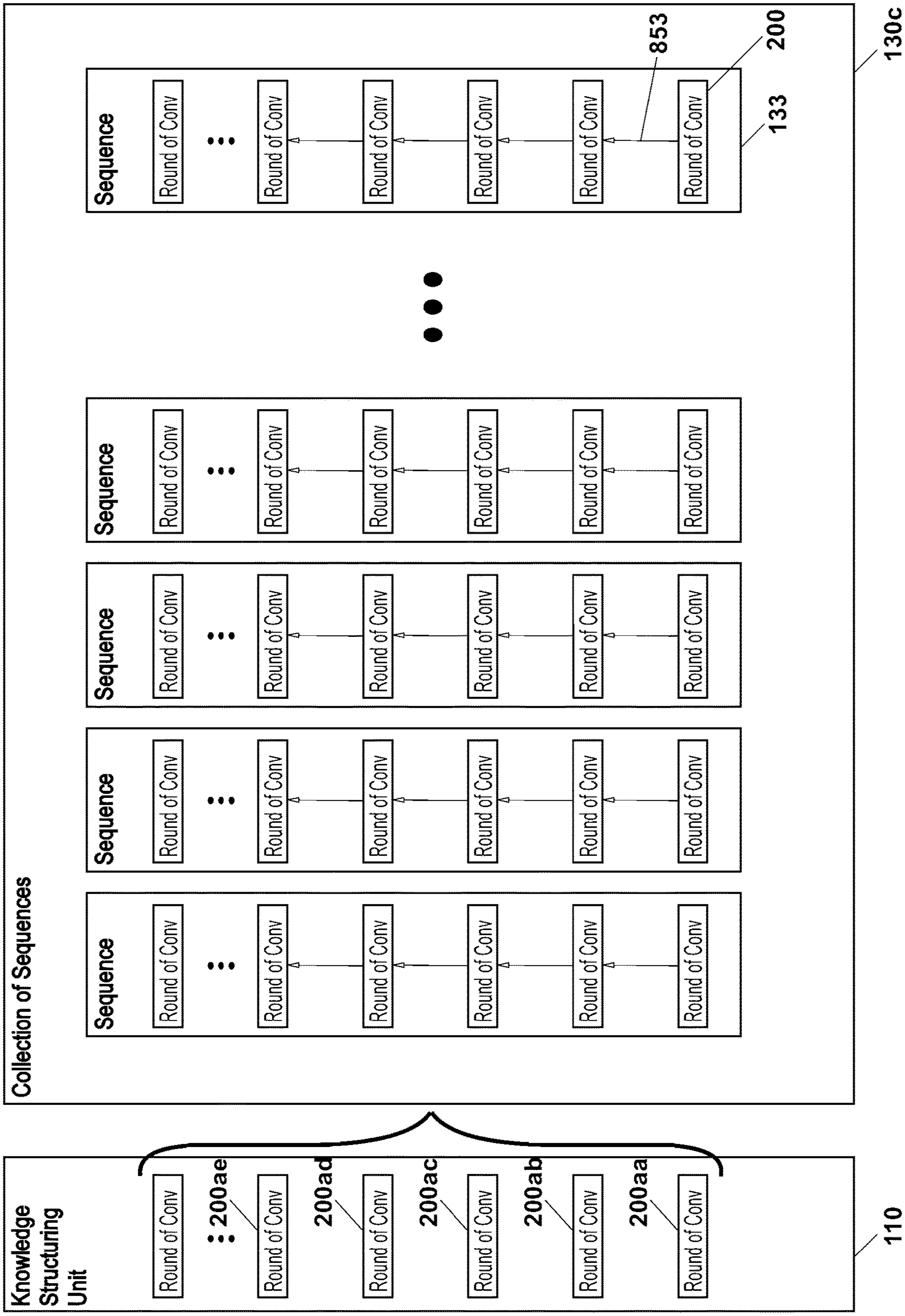
FIG. 16 illustrates an example of learning Rounds of Conversational Exchange 200 using Collection of Sequences 130*c*.

Referring to FIG. 16, an exemplary embodiment of learning Rounds of Conversational Exchange 200 using Collection of Sequences 130*c* is illustrated. Collection of Sequences 130*c* comprises the functionality for storing one or more Sequences 133. Sequence 133 comprises the functionality for storing multiple Rounds of Conversational Exchange 200 and/or other elements. Connections 853 can be used to link Rounds of Conversational Exchange 200 or can be optionally omitted in some implementations of Sequence 133. In some aspects, each Sequence 133 in a Collection of Sequences 130*c* may include Rounds of Conversational Exchange 200 of an entire conversation. For example, Knowledge Structuring Unit 110 creates or generates Rounds of Conversational Exchange 200 and the system applies them onto Collection of Sequences 130*c*, thereby implementing learning of Rounds of Conversational Exchange 200. The system can perform Substantial Similarity Comparisons 125 of Rounds of Conversational Exchange 200 from Knowledge Structuring Unit 110 with corresponding Rounds of Conversational Exchange 200 in Sequences 133 stored in Collection of Sequences 130*c* to find a Sequence 133 comprising Rounds of Conversational Exchange 200 that are substantially similar to the Rounds of Conversational Exchange 200 from Knowledge Structuring Unit 110. If Sequence 133 comprising such substantially similar Rounds of Conversational Exchange 200 is not found in Collection of Sequences 130*c*, the system may create a new Sequence 133 comprising the Rounds of Conversational Exchange 200 from Knowledge Structuring Unit 110 and insert (i.e. copy, store, etc.) the new Sequence 133 into Collection of Sequences 130*c*. On the other hand, if Sequence 133 comprising substantially similar Rounds of Conversational Exchange 200 is found in Collection of Sequences 130*c*, the system may optionally omit inserting the Rounds of Conversational Exchange 200 from Knowledge Structuring Unit 110 into Collection of Sequences 130*c* as inserting a similar Sequence 133 may not add much or any additional knowledge. This approach can save storage resources and limit the number of Rounds of Conversational Exchange 200 that may later need to be processed or compared. In other aspects, each Sequence 133 in a Collection of Sequences 130*c* may include Rounds of Conversational Exchange 200 of a part of a conversation. A similar learning process as the above described can be utilized in such implementations. In further aspects, one or more long Sequences 133 each including Rounds of Conversational Exchange 200 of multiple conversations can be utilized. In one example, Rounds of Conversational Exchange 200 of all conversations can be stored in a single long Sequence 133 in which case Collection of Sequences 130*c* as a separate element can be omitted. In another example, Rounds of Conversational Exchange 200 of multiple conversations can be included in a plurality of long Sequences 133 such as daily, weekly, monthly, yearly, or other periodic or other Sequences 133. Substantial Similarity Comparisons 125 can be performed by traversing the one or more long Sequences 133 to find a match or substantially similar match. For example, the system can perform Substantial Similarity Comparisons 125 of Rounds of Conversational Exchange 200 from Knowledge Structuring Unit 110 with corresponding Rounds of Conversational Exchange 200 in subsequences of a long Sequence 133 in incremental or other traversing pattern to find a subsequence comprising Rounds of Conversational Exchange 200 that are substantially similar to the Rounds of Conversational Exchange 200 from Knowledge Structuring Unit 110. The incremental traversing pattern may start from one end of a long Sequence 133 and move the comparison subsequence up or down one (i.e. or any amount, etc.) incremental Round of Conversational Exchange 200 at a time. Other traversing patterns or methods can be employed such as starting from the middle of the Sequence 133 and subdividing the resulting subsequences in a recursive pattern, or any other traversing pattern or method. If a subsequence comprising substantially similar Rounds of Conversational Exchange 200 is not found in the long Sequence 133, Knowledge Structuring Unit 110 may concatenate or append the Rounds of Conversational Exchange 200 from Knowledge Structuring Unit 110 to the long Sequence 133. In further aspects, a Round of Conversational Exchange 200 in a single Sequence 133 can be connected not only with a next Round of Conversational Exchange 200 in the Sequence 133, but also with any other Round of Conversational Exchange 200, thereby creating alternate routes or shortcuts through the Sequence 133. Any number of Connections 853 connecting any Rounds of Conversational Exchange 200 can be utilized. For example, Knowledge Structuring Unit 110 creates or generates Rounds of Conversational Exchange 200 and the system applies them onto a single Sequence 133, thereby implementing learning of Rounds of Conversational Exchange 200. The system can perform Substantial Similarity Comparisons 125 of a Round of Conversational Exchange 200 from Knowledge Structuring Unit 110 with Rounds of Conversational Exchange 200 in Sequence 133. If a substantially similar Round of Conversational Exchange 200 is not found in Sequence 133, the system may concatenate or append the Round of Conversational Exchange 200 from Knowledge Structuring Unit 110 to the Sequence 133 and create (i.e. including assigning occurrence count and weight, etc.) a Connection 853 to that Round of Conversational Exchange 200 from a prior Round of Conversational Exchange 200. On the other hand, if a substantially similar Round of Conversational Exchange 200 is found in Sequence 133, the system may create (i.e. including assigning occurrence count and weight, etc.) a Connection 853 to that Round of Conversational Exchange 200 from a prior Round of Conversational Exchange 200 if the Connection 853 did not exist. Otherwise, the system may update (i.e. update occurrence count and weight, etc.) the Connection 853 if the Connection 853 existed. Any of the previously described and/or other techniques for comparing, inserting, updating, and/or other operations on Rounds of Conversational Exchange 200, Connections 853, and/or other elements can similarly be utilized in Sequences 133.

Any of the previously described arrangements of Rounds of Conversational Exchange 200 such as Neural Network 130*a*, Graph 130*b*, Collection of Sequences 130*c*, Sequence 133, and/or others can be used alone or in combination with each other or with other elements in alternate embodiments. In one example, a path in Neural Network 130*a* or Graph 130*b* may include its own separate sequence of Rounds of Conversational Exchange 200 that are not interconnected with Rounds of Conversational Exchange 200 in other paths. In another example, a portion of a path in Neural Network 130*a* or Graph 130*b* may include a sequence of Rounds of Conversational Exchange 200 interconnected with Rounds of Conversational Exchange 200 in other paths, whereas, another portion of the path may include its own separate sequence of Rounds of Conversational Exchange 200 that are not interconnected with Rounds of Conversational Exchange 200 in other paths. Any other combinations or arrangements of Rounds of Conversational Exchange 200 can be implemented.

Referring now to some embodiments of System for Learning AIIMs 100, System for Learning AIIMs 100 can be implemented to learn only speech or sounds of Conversation Participants 50 in which case the elements for processing pictures can be omitted. Such System for Learning AIIMs 100 that learns only speech or sounds can be utilized in any situation where a Picture-capturing Device 140 may not be available or where visual input is undesirable. Examples of such situations include situations where people prefer not to be visually recorded, situations involving verbal communication systems with no visual input (i.e. telephone systems, etc.), and/or others.

Referring to some embodiments of System for Learning AIIMs 100, one or more Conversation Participants 50 may be non-human Conversation Participants 50. A non-human Conversation Participant 50 may include any device, apparatus, or system comprising conversational functionalities such as a humanoid or other robot, conversation participant simulated on a computing device, and/or others. System for Learning AIIMs 100 can learn conversations among a human Conversation Participant 50 and a non-human Conversation Participant 50. As the human Conversation Participant 50 and the non-human Conversation Participant 50 exchange verbal and visual expressions or communication in a conversation, System for Learning AIIMs 100 may capture and learn these conversational exchanges as previously described. In some aspects, a non-human Conversation Participant 50 may be configured to guide a conversation with a human Conversation Participant 50 to enhance the learning effectiveness of System for Learning AIIMs 100. For example, the non-human Conversation Participant 50 may perform specific conversational activities (i.e. ask specific questions, make specific facial expressions, etc.) to cause desired conversational activities (i.e. specific statements, specific facial expressions, etc.) to be performed by the human Conversation Participant 50. This way, System for Learning AIIMs 100 can learn or be trained to learn targeted or desirable verbal and visual expressions or communication of the human Conversation Participant 50 in a controlled process. A similar process can be implemented with a human Conversation Participant 50 who is instructed to guide a conversation with another human Conversation Participant 50.

Figure 17:
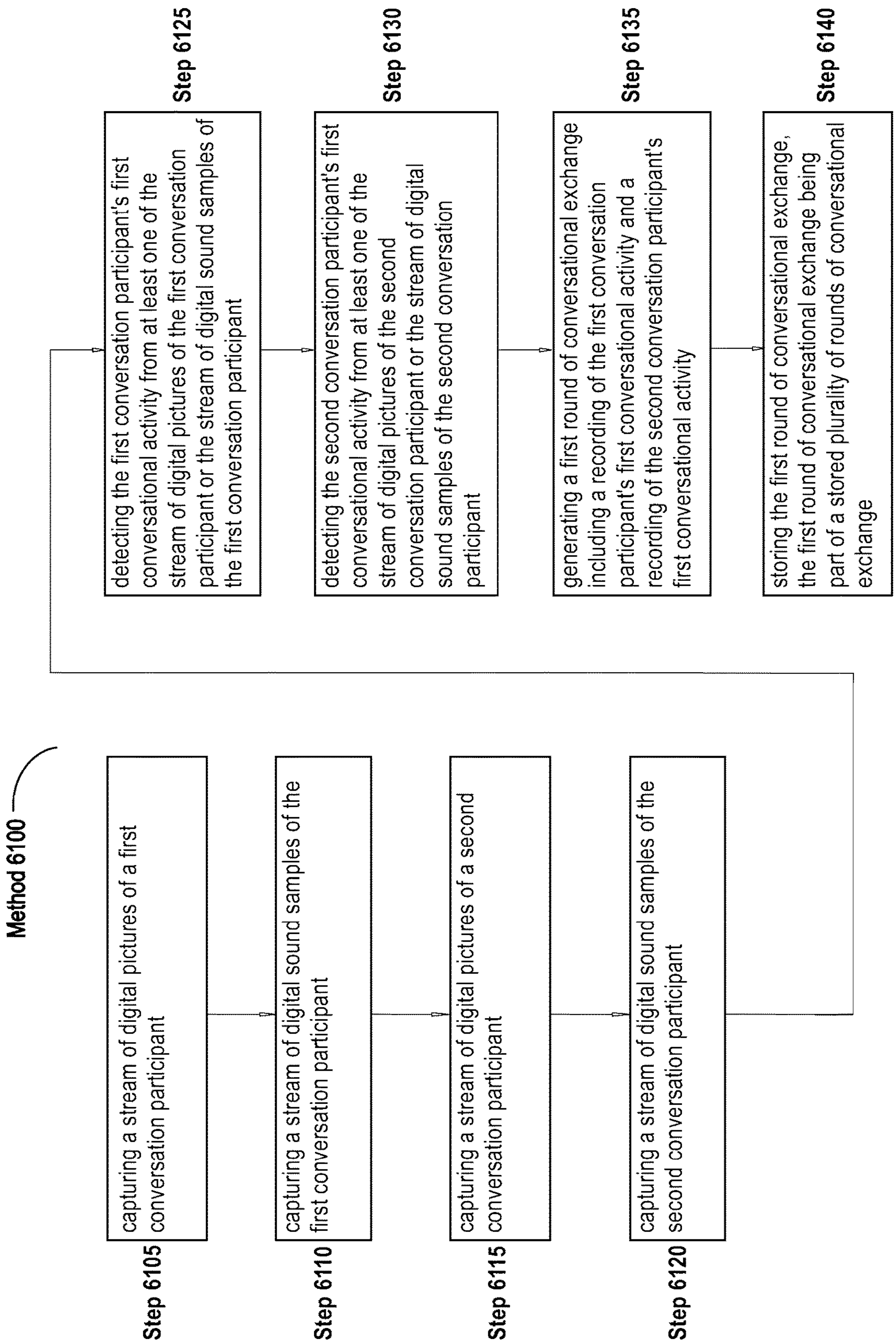
FIG. 17 illustrates a flow chart diagram of an embodiment of a method 6100 for learning AIIMs.

Referring to FIG. 17, the illustration shows an embodiment of a method 6100 for learning AIIMs. The method can be used on a computing device or system to enable learning of conversations among two or more conversation participants. The computing device or system may include a dedicated device, a user device (i.e. User Device 80, etc.), a server (i.e. Server 90, etc.), a host device (i.e. Host Device 98, etc.) or an embedded element thereof, and/or others. Method 6100 may include any action or operation of any of the disclosed methods such as method 6200 and/or others. Other additional steps, actions, or operations can be included as needed, or some of the disclosed ones can be optionally omitted, or a different combination or order thereof can be implemented in alternate embodiments of method 6100.

At step 6105, a stream of digital pictures of a first conversation participant is captured. A stream of digital pictures (i.e. Stream of Digital Pictures 143, etc.) may include a conversation participant's (i.e. Conversation Participant's 50, etc.) visual expressions or communication. In some embodiments, a stream of digital pictures comprises any type or form of digital motion picture such as MPEG, AVI, FLV, MOV, RM, SWF, WMV, DivX, and/or other digitally encoded motion picture. In other embodiments, a stream of digital pictures comprises any type or form of digital pictures such as digital bitmaps, JPEG pictures, GIF pictures, TIFF pictures, PDF pictures, and/or other digitally encoded pictures. In yet other embodiments, a stream of digital pictures comprises any computer-generated pictures such as views of a 3D game, 3D application, or CAD/CAM application captured or rendered as a stream of digital pictures. In further embodiments, a stream of digital pictures comprises any application or process that can generate a stream of digital pictures, or other visual content. A stream of digital pictures comprising a conversation participant's visual expressions or communication can be captured by a picture-capturing device (i.e. Picture-capturing Device 140, etc.) such as a motion or still picture camera, or other picture capturing device. In some aspects, a picture-capturing device may be part of a device dedicated to implementing AIIM learning functionalities. In other aspects, a picture-capturing device may be part of a user device that is connected via a network to a server implementing AIIM learning functionalities. In further aspects, a picture-capturing device may be part of a host device whose embedded element implements AIIM learning functionalities. Picture-capturing device may be provided in any other device, system, or configuration. In some aspects, a plurality of picture-capturing devices can be utilized each dedicated to capturing visual expressions or communication of a single conversation participant. In other aspects, a single picture-capturing device may capture visual expressions or communication of a plurality of conversation participants. Capturing comprises any action or operation by or for a Picture-capturing Device 140, Stream of Digital Pictures 143, and/or other disclosed elements.

At step 6110, a stream of digital sound samples of the first conversation participant is captured. A stream of digital sound samples (i.e. Stream of Digital Sound Samples 153, etc.) may include a conversation participant's verbal expressions or communication. In some embodiments, a stream of digital sound samples comprises any type or form of digital sound such as WAV, WMA, AIFF, MP3, RA, OGG, and/or other digitally encoded sound. In other embodiments, a stream of digital sound samples comprises any computer-generated stream of digital sound samples such as synthesized sound. In further embodiments, a stream of digital sound samples comprises any application or process that can generate a stream of digital sound samples, or other audio content. In some designs, stream of digital sound samples is captured simultaneously with the aforementioned stream of digital pictures, and vice versa. Stream of digital sound samples may therefore be associated with or correspond to a stream of digital pictures. A stream of digital sound samples comprising a conversation participant's verbal expressions or communication can be captured by a sound-capturing device (i.e. Sound-capturing Device 150, etc.)

such as a microphone or other sound capturing device. In some aspects, a sound-capturing device may be part of a device dedicated to implementing AIIM learning functionalities. In other aspects, a sound-capturing device may be part of a user device that is connected via a network to a server implementing AIIM learning functionalities. In further aspects, a sound-capturing device may be part of a host device whose embedded element implements AIIM learning functionalities. Sound-capturing device may be provided in any other device, system, or configuration. In some aspects, a plurality of sound-capturing devices can be utilized each dedicated to capturing verbal expressions or communication of a single conversation participant. In other aspects, a single sound-capturing device may capture verbal expressions or communication of a plurality of conversation participants. Capturing comprises any action or operation by or for a Sound-capturing Device 150, Stream of Digital Sound Samples 153, and/or other disclosed elements.

At step 6115, a stream of digital pictures of a second conversation participant is captured. Step 6115 may include any action or operation described in Step 6105 as applicable. Step 6115 may be performed concurrently with Step 6105 and/or 6110.

At step 6120, a stream of digital sound samples of the second conversation participant is captured. Step 6120 may include any action or operation described in Step 6110 as applicable. Step 6120 may be performed concurrently with Step 6105 and/or 6110.

At step 6125, the first conversation participant's first conversational activity is detected from at least one of the stream of digital pictures of the first conversation participant or the stream of digital sound samples of the first conversation participant. Examples of conversational activities include speaking, silent facial expressions, silent body movements, motionless silence, absence from the conversation, and/or others. Detecting conversational activities of a conversation participant may include processing either or both a stream of digital pictures comprising the conversation participant's visual expressions or communication and/or a stream of digital sound samples comprising the conversation participant's verbal expressions or communication. A stream of digital pictures may include visual expressions or communication of a single conversation participant or a plurality of conversation participants. Similarly, a stream of digital sound samples may include verbal expressions or communication of a single conversation participant or a plurality of conversation participants. In one example, a conversation participant's speaking activity can be detected by recognizing the conversation participant's speech in a stream of digital sound samples. Specifically, for instance, a beginning of a conversation participant's speaking activity can be determined by recognizing the conversation participant's speech in a stream of digital sound samples after a threshold period of silence (i.e. no speech or sound, etc.). Further, an end of a conversation participant's speaking activity can be determined by recognizing a threshold period of silence in a stream of digital sound samples after the conversation participant's speech. In another example, a conversation participant's silent facial expressions activity can be detected by recognizing the conversation participant's facial expressions (i.e. smiling, lifting eyebrows, etc.) in a stream of digital pictures and by recognizing the conversation participant's silence (i.e. no speech or sound, etc.) in a stream of digital sound samples. In another example, a conversation participant's silent body movements activity can be detected by recognizing the conversation participant's body movements (i.e. nodding head, shaking head, shrugging shoulders, pointing finger, pointing fist, etc.) in a stream of digital pictures and by recognizing the conversation participant's silence (i.e. no speech or sound, etc.) in a stream of digital sound samples. In a further example, a conversation participant's motionless silence activity can be detected by recognizing no or marginal motion (i.e. no facial change, no body movement, etc.) of the conversation participant in a stream of digital pictures and by recognizing the conversation participant's silence (i.e. no speech or sound, etc.) in a stream of digital sound samples. For instance, marginal motion of a conversation participant may include comparing one picture of a stream of digital pictures with another (i.e. subsequent, etc.) picture of the stream of digital pictures and determining that a number or percentage difference between regions of the two pictures comprising the conversation participant does not exceed a threshold. In a further example, a conversation participant's absence from the conversation activity can be detected by recognizing the conversation participant's absence (i.e. conversation participant missing from the field of view, etc.) in a stream of digital pictures and/or by recognizing the conversation participant's silence (i.e. no speech or sound, etc.) in a stream of digital sound samples. In some aspects, detecting a conversational activity may include comparing collections of sound samples of a stream of digital sound samples with collections of known sound samples. In further aspects, detecting a conversational activity may include comparing features of a stream of digital sound samples with features of known sounds. For example, acoustic features can be used for classification of non-verbal vocal outbursts such as laughter or sighs whereas linguistic features can be used to transcribe the linguistic message such as words, phrases, or sentences. In other aspects, detecting a conversational activity may include comparing regions of pixels from one or more pictures (i.e. frames, etc.) of a stream of digital pictures with collections of pixels comprising known persons, objects, and/or their activities. In other aspects, detecting a conversational activity may include comparing features (i.e. lines, edges, ridges, corners, blobs, regions, etc.) from one or more pictures (i.e. frames, etc.) of a stream of digital pictures with features of known persons, objects, and/or their activities. In one example, facial recognition involves identifying and/or analyzing facial features such as the relative position, size, and/or shape of the eyes, nose, cheekbones, jaw, etc., which may then be used to search for pictures with matching features. In further aspects, detecting any new conversational activity may mark an end to a previously detected conversational activity. In some designs, detecting a conversational activity of a conversation participant may include recognizing the conversation participant's visual expressions or communication in a part of a conversation. Similarly, detecting a conversational activity of a conversation participant may include recognizing the conversation participant's verbal expressions or communication in a part of a conversation. In other designs, detecting a conversational activity of a conversation participant may include identifying a sub-stream of digital pictures (i.e. Sub-stream of Digital Pictures 145, etc.) in a stream of digital pictures, the sub-stream of digital pictures comprising the conversation participant's visual expressions or communication in a part of a conversation. Similarly, detecting a conversational activity of a conversation participant may include identifying a sub-stream of digital sound samples (i.e. Sub-stream of Digital Sound Samples 155, etc.) in a stream of digital sound samples, the sub-stream of digital sound samples comprising the conversation participant's verbal expressions or communication in a part of a conversation. Detecting a conversational activity of a conversation participant may also include creating or generating a recording or data structure of the conversational activity (i.e. Conversational Activity 210, also sometimes referred to simply as conversational activity, etc.) that comprises one or more sub-streams of digital pictures, one or more sub-streams of digital sound samples, and/or other data (i.e. Extra Info 250, etc.). In further designs, detecting a conversational activity of a conversation participant may include extracting or filtering persons and/or objects of interest (i.e. conversation participant's face, etc.) from a stream of digital pictures or sub-stream of digital pictures. Similarly, detecting a conversational activity of a conversation participant may include extracting or filtering speech and/or sounds of interest (i.e. conversation participant's speech and/or sounds, etc.) from a stream of digital sound samples or sub-stream of digital sound samples. Such extractions or filtering can optionally be performed as part of another step or in their own separate steps in alternate embodiments. Detecting comprises any action or operation by or for an Activity Detector 160, Picture Recognizer 163, Speech/Sound Recognizer 165, Sub-stream of Digital Pictures 145, Sub-stream of Digital Sound Samples 155, Conversational Activity 210, and/or other disclosed elements.

At step 6130, the second conversation participant's first conversational activity is detected from at least one of the stream of digital pictures of the second conversation participant or the stream of digital sound samples of the second conversation participant. Step 6130 may include any action or operation described in Step 6125 as applicable.

At step 6135, a first round of conversational exchange including a recording of the first conversation participant's first conversational activity and a recording of the second conversation participant's first conversational activity is generated. A round of conversational exchange (i.e. Round of Conversational Exchange 200, etc.) may include one or more recordings of one conversation participant's conversational activities (i.e. Conversational Activities 210, etc.) and one or more recordings of another conversation participants conversational activities. A round of conversational exchange may also include one or more recordings of additional conversation participant's conversational activities. A recording of one conversation participant's conversational activity may be correlated with a recording of another conversation participant's conversational activity. In effect, a round of conversational exchange includes a unit of knowledge of how one conversation participant acted relative to another conversation participant, and vice versa, in a part of a conversation. In one example, the first conversation participant may speak while the second conversation participant observes (i.e. silent facial expressions, silent body movements, motionless silence, etc.) in a part of a conversation, therefore, a round of conversational exchange may include a recording of the first conversation participants speaking conversational activity correlated with a recording of the second conversation participant's silent facial expressions conversational activity. In another example, both conversation participants may observe in a part of a conversation, therefore, a round of conversational exchange may include a recording of the first conversation participant's silent body movements conversational activity correlated with a recording of the second conversation participant's silent facial expressions conversational activity. In a further example, both conversation participants may speak in a part of a conversation, therefore, a round of conversational exchange may include a recording of the first conversation participant's speaking conversational activity correlated with a recording of the second conversation participant's speaking conversational activity. A variety of arrangements of recordings of conversational activities and/or other data (i.e. Extra Info 250, etc.) can be stored in rounds of conversational exchange. In some aspects, the timing of recordings of conversational activities of different conversation participants may coincide, partially coincide, or overlap. In further aspects, the number of recordings of conversational activities of one conversation participant may equal or differ from the number of recordings of conversational activities of another conversation participant. In general, a round of conversational exchange may include any number, types, timing, and/or other properties of recordings of conversational activities of any number of conversation participants arranged in any conceivable combination. Generating comprises any action or operation by or for a Knowledge Structuring Unit 110, and/or other disclosed elements.

At step 6140, the first round of conversational exchange is stored, the first round of conversational exchange being part of a stored plurality of rounds of conversational exchange. Rounds of conversational exchange can be stored in a memory unit or other repository. Once created or generated, rounds of conversational exchange can be used in/as neurons, nodes, vertices, or other elements in any of the data or knowledge structures/arrangements (i.e. neural networks, graphs, sequences, etc.) used for facilitating learning functionalities herein. Rounds of conversational exchange may be connected, interrelated, or interlinked into knowledge structures using statistical, artificial intelligence, machine learning, and/or other models or techniques. Such interconnected or interrelated rounds of conversational exchange can be used for simulating a conversation with a person (i.e. artificially intelligent conversation participant, etc.) in the person's absence, after the person is deceased, or in any situation where a simulation of a conversation with the person may be needed. The interconnected rounds of conversational exchange may be stored or organized into a knowledgebase (i.e. Knowledgebase 130, etc.). In some embodiments, knowledgebase may be or include a neural network (i.e. Neural Network 130*a*, etc.). In other embodiments, knowledgebase may be or include a graph (i.e. Graph 130*b*, etc.). In further embodiments, knowledgebase may be or include a collection of sequences (i.e. Collection of Sequences 130*c*, etc.). In further embodiments, knowledgebase may be or include a sequence (i.e. Sequence 133, etc.). In general, knowledgebase may be or include any data structure, knowledge structure, or repository capable of storing the knowledge of one or more conversations and/or other data. Storing comprises any action or operation by or for a Knowledgebase 130, Neural Network 130*a*, Graph 130*b*, Collection of Sequences 130*c*, Sequence 133, Node 852, Layer 854, Connection 853, Substantial Similarity Comparison 125, and/or other disclosed elements.

Figure 18A:
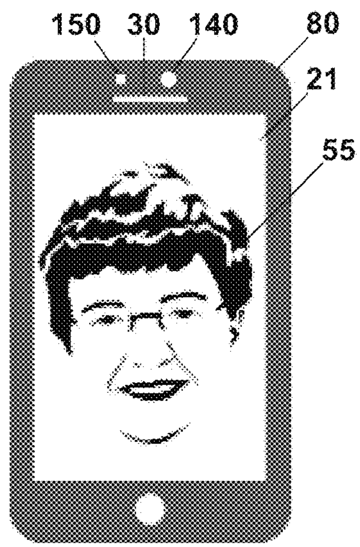
FIG. 18A illustrates an embodiment of System for Using AIIMs 500 implemented on User Device 80.
Figure 18B:
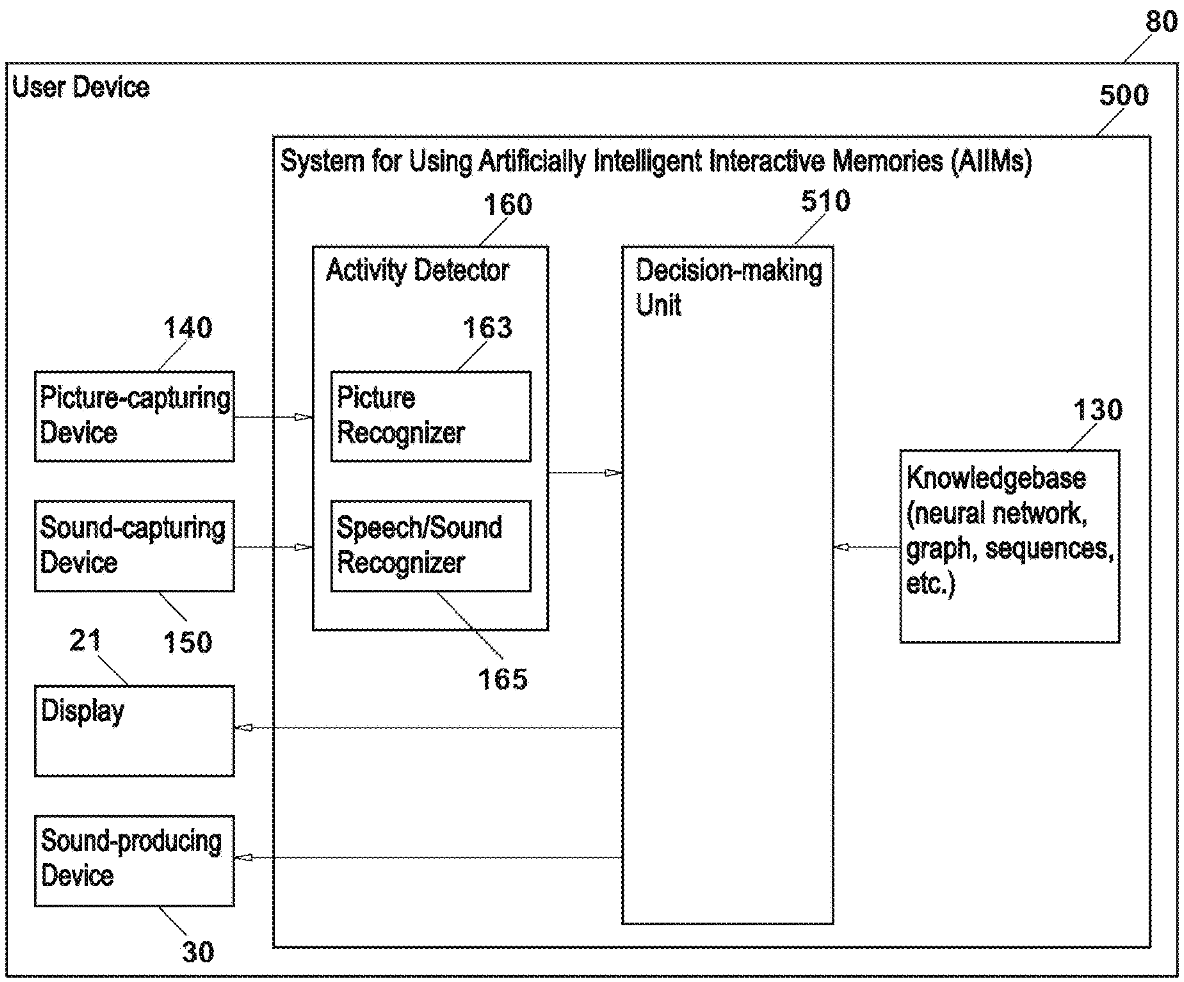
FIG. 18B illustrates an embodiment of internal structure of System for Using AIIMs 500 implemented on User Device 80.

Referring to FIG. 18A, an embodiment of System for Using AIIMs 500 implemented on User Device 80 is illustrated. System for Using AIIMs 500 can also be implemented in any computing device or system instead of or in addition to User Device 80. In one example, System for Using AIIMs 500 can be implemented in a dedicated device that can be owned by someone or given as a present to someone to simulate conversations with his/her favorite person. In another example, System for Using AIIMs 500 can be embedded into Host Device 98 such as a television device, a set-top box, a disc or other media player (i.e. DVD or Blue-ray player, etc.), a gaming device (i.e. Microsoft Xbox, Sony PlayStation, etc.), a smartphone (i.e. Apple iPhone, Samsung Galaxy, etc.), a mobile computer (i.e. tablet or laptop computer, etc.), a still or motion picture camera, and/or others.

Referring to FIG. 188, an embodiment of internal structure of System for Using AIIMs 500 implemented on User Device 80 is illustrated. System for Using AIIMs 500 comprises interconnected Decision-making Unit 510, Knowledgebase 130, and Activity Detector 160. Some embodiments of Activity Detector 160 may include Picture Recognizer 163 and/or Speech/Sound Recognizer 165. System for Using AIIMs 500 may be part of User Device 80. System for Using AIIMs 500 may utilize User Device's 80 Picture-capturing Device 140, Sound-capturing Device 150, Display 21, and Sound-producing Device 30 to implement its functionalities. Other additional elements can be included as needed, or some of the disclosed ones can be excluded, or a combination thereof can be utilized in alternate embodiments.

System for Using AIIMs 500 comprises any hardware, programs, or a combination thereof. System for Using AIIMs 500 comprises the functionality for simulating a conversation. System for Using AIIMs 500 comprises the functionality for simulating a conversation based on knowledge of one or more conversations stored in Knowledgebase 130, Neural Network 130*a*, Graph 130*b*, Collection of Sequences 130*c*, Sequence 133, and/or other data structure, knowledge structure, or repository. System for Using AIIMs 500 comprises the functionality for simulating verbal, visual, and/or other expressions or communication that resemble a person's conversational style or character. System for Using AIIMs 500 comprises the functionality for simulating a conversation with one or more simulated persons. As such, System for Using AIIMs 500 enables a simulation of a conversation among User 60 and one or more Artificially Intelligent Conversation Participants 55 (also referred to as AI Conversation Participants 55, etc.). System for Using AIIMs 500 can therefore be used to simulate a conversation with a person in the person's absence, after the person is deceased, or in any situation where a simulation of a conversation with the person may be needed. For example, System for Using AIIMs 500 can be used to simulate a conversation with a parent, predecessor (i.e. grandparent, etc.), spouse, friend, historical figure, famous person (i.e. scientist, athlete, actor, musician, politician, etc.), and/or other persons. A person can even talk to an artificially intelligent interactive version of him/herself. System for Using AIIMs 500 also comprises other functionalities disclosed herein.

In one example, the teaching presented by the disclosure can be implemented in a device or system for using AIIMs. The device or system may include one or more processor circuits. The device or system may further include a memory unit, coupled to the one or more processor circuits, that stores a plurality of rounds of conversational exchange including a first round of conversational exchange, the first round of conversational exchange comprising a recording of a first conversation participant's first conversational activity and a recording of a second conversation participant's first conversational activity. The device or system may further include a picture-capturing device, coupled to the one or more processor circuits, configured to capture a stream of digital pictures of a user. The device or system may further include a sound-capturing device, coupled to the one or more processor circuits, configured to capture a stream of digital sound samples of the user. The one or more processor circuits may be configured to detect the user's first conversational activity from at least one of the stream of digital pictures of the user or the stream of digital sound samples of the user. The one or more processor circuits may also be configured to compare at least one portion of a recording of the user's first conversational activity with at least one portion of the recording of the first conversation participant's first conversational activity. The one or more processor circuits may also be configured to determine that a similarity between at least one portion of the recording of the user's first conversational activity and at least one portion of the recording of the first conversation participant's first conversational activity exceeds a similarity threshold. The one or more processor circuits may also be configured to cause a display and a sound-producing device to play at least one portion of the recording of the second conversation participant's first conversational activity. Any of the operations of the described elements can be performed repeatedly and/or in different orders in alternate embodiments. In some aspects, the one or more processor circuits, the memory unit, the picture-capturing device, the sound-capturing device, the display, and the sound-producing device are part of a single device. In other aspects, at least one of: the one or more processor circuits or the memory unit are part of a server, whereas, the picture-capturing device, the sound-capturing device, the display, and the sound-producing device are part of a user device, the user device coupled to the server via a network. Other additional elements can be included as needed, or some of the disclosed ones can be excluded, or a combination thereof can be utilized in alternate embodiments. The device or system for using AIIMs can also include any actions or operations of any of the disclosed methods such as methods 6100 and/or 6200 (later described).

User 60 (also referred to simply as user, etc.) can be a human user. In one example, User 60 can be Conversation Participant 50*a* whose conversations with Conversation Participant 50*b* have been learned by System for Learning AIIMs 100 and who wishes to simulate a conversation with Conversation Participant 50*b* via System for Using AIIMs 500. In another example, User 60 can be any person who wishes to simulate a conversation via System for Using AIIMs 500. In some aspects, User 60 can be a non-human User 60. The non-human User 60 may include any device, apparatus, or system comprising conversational functionalities such as a humanoid or other robot, user simulated on a computing device, and/or others.

Display 21 comprises the functionality for displaying visual information, and/or other functionalities. Examples of a typical Display 21 include a liquid crystal display (LCD), cathode ray tube (CRT) display, and/or other display. In some aspects, Display 21 may include a projector, a hologram producing device, and/or other device for displaying visual information. In further aspects, Display 21 may be placed on the front of a robot's head to simulate a face. In further aspects, instead using Display 21, the learned verbal and/or visual information can be transformed into physical movements of a robot's face (i.e. mouth, eyes, etc.) and/or other robot's body parts, thereby simulating a conversation with a physical artificially intelligent conversation participant. Such movements can be implemented by engaging motors or actuators in the robot's face or other robot's body parts.

Sound-producing Device 30 comprises the functionality for producing sound, and/or other functionalities. Examples of Sound-producing Device 30 include a built-in or an external speaker, headphone, and/or other sound producing device.

Decision-making Unit 510 comprises the functionality for determining activities (i.e. Conversational Activities 210, etc.) of AI Conversation Participant 55, and/or other functionalities. Decision-making Unit 510 comprises functions, rules, and/or logic to determine or anticipate which Conversational Activity 210 is most suitable or likely to be used or implemented by AI Conversation Participant 55 in a simulated conversation. Similarly, Decision-making Unit 510 comprises the functionality to determine which Conversational Activity 210 is second most suitable or likely to be used or implemented, which Conversational Activity 210 is third most suitable or likely to be used or implemented, and so on. Furthermore, Decision-making Unit 510 comprises the functionality to determine a sequence or order in which Conversational Activities 210 are most suitable or likely to be used or implemented by AI Conversation Participant 55 in a simulated conversation. In some aspects, Decision-making Unit 510 may determine Conversational Activities 210 of AI Conversation Participant 55 by performing Substantial Similarity Comparisons 125 of Conversational Activities 210 from Activity Detector 160 with Conversational Activities 210 from Rounds of Conversational Exchange 200 stored in Knowledgebase 130, Neural Network 130*a*, Graph 130*b*, Collection of Sequences 130*c*, Sequence 133, and/or other data structure, knowledge structure, or repository. A Round of Conversational Exchange 200 includes a unit of knowledge (i.e. correlated Conversational Activities 210, etc.) of how one Conversation Participant 50 acted relative to another Conversation Participant 50, and vice versa, in a part of a conversation as previously described. When Conversational Activities 210 with similar content, structure, and/or other properties are detected involving User 60 in the future, the learned Conversational Activities 210 of one or more Conversation Participants 50 stored in Rounds of Conversational Exchange 200 can be determined or anticipated by Decision-making Unit 510, thereby simulating a conversation with one or more AI Conversation Participants 55.

In some embodiments, Decision-making Unit 510 can perform Substantial Similarity Comparisons 125 of User's 60 Conversational Activity 210 or portion thereof from Activity Detector 160 with Conversational Activities 210 or portions thereof from Rounds of Conversational Exchange 200 in Knowledgebase 130, Neural Network 130*a*, Graph 130*b*, Collection of Sequences 130*c*, Sequence 133, and/or other data structure, knowledge structure, or repository (also referred to as Knowledgebase 130, etc.). In some implementations where Rounds of Conversational Exchange 200 similar to the one shown in FIG. 6A are used, if a substantially or otherwise similar Conversational Activity 210 or portion thereof is found in a Round of Conversational Exchange 200 from Knowledgebase 130, a concurrent Conversational Activity 210 or portion thereof of AI Conversation Participant 55 can be anticipated in a correlated Conversational Activity 210 or portion thereof from the Round of Conversational Exchange 200. Also, subsequent Conversational Activity 210 or portion thereof of AI Conversation Participant 55 can be anticipated in a Conversational Activity 210 or portion thereof from Round of Conversational Exchange 200 connected with the prior Round of Conversational Exchange 200. In some implementations where Rounds of Conversational Exchange 200 similar to the one shown in FIG. 6C are used, if a substantially or otherwise similar Conversational Activity 210 or portion thereof is found in a Round of Conversational Exchange 200 from Knowledgebase 130, a concurrent Conversational Activity 210 or portion thereof of AI Conversation Participant 55 can be anticipated in a correlated Conversational Activity 210 or portion thereof from the Round of Conversational Exchange 200. Also, subsequent Conversational Activity 210 or portion thereof of AI Conversation Participant 55 can be anticipated in a subsequent Conversational Activity 210 or portion thereof from the Round of Conversational Exchange 200.

Decision-making Unit 510 can utilize various elements and/or techniques for selecting a path of Rounds of Conversational Exchange 200 (or Conversational Activities 210 therein) through Neural Network 130*a*, for example. Although, these elements and/or techniques are described using Neural Network 130*a* below, they can similarly be used in any Knowledgebase 130, Graph 130*b*, Collection of Sequences 130*c*, Sequence 133, and/or other data structure or repository.

In some embodiments, Decision-making Unit 510 can utilize similarity index in selecting Rounds of Conversational Exchange 200 (or Conversational Activities 210 therein) in a path through Neural Network 130*a*. Similarity index may indicate how well a Conversational Activity 210 or portion thereof is matched with another Conversational Activity 210 or portion thereof as previously described. Substantial Similarity Comparison 125 can be used to generate a similarity index whether substantial or other similarity of the compared Conversational Activities 210 or portions thereof is achieved or not as previously described. In one example, Decision-making Unit 510 may select a Round of Conversational Exchange 200 comprising Conversational Activity 210 with the highest similarity index even if Connection 853 pointing to that Round of Conversational Exchange 200 has less than the highest weight. Therefore, similarity index or other such element or parameter can override or disregard the weight of a Connection 853 or other element. In another example, Decision-making Unit 510 may select a Round of Conversational Exchange 200 comprising Conversational Activity 210 whose similarity index is higher than or equal to a weight of Connection 853 pointing to that Round of Conversational Exchange 200. In a further example, Decision-making Unit 510 may select a Round of Conversational Exchange 200 comprising Conversational Activity 210 whose similarity index is lower than or equal to a weight of Connection 853 pointing to that Round of Conversational Exchange 200. Therefore, similarity index can be set to be more, less, or equally important than a weight of a Connection 853. In some aspects, a minimum similarity index or threshold can be set for a Conversational Activity 210. In other aspects, different minimum similarity indexes or thresholds can be set for different Conversational Activities 210. Minimum similarity indexes or thresholds can also be set for any other elements such as Rounds of Conversational Exchange 200, Layers 854, and/or other elements. For example, a higher minimum similarity index or threshold can be set for lower numbered Layers 854 and decreased for the remaining Layers 854. Any other settings of a minimum similarity index can be utilized in alternate embodiments.

In other embodiments, Decision-making Unit 510 can utilize Connections 853 in selecting Rounds of Conversational Exchange 200 (or Conversational Activities 210 therein) in a path through Neural Network 130*a*. Decision-making Unit 510 can take into account weights of Connections 853 among the interconnected Rounds of Conversational Exchange 200 in choosing from which Round of Conversational Exchange 200 to compare a Conversational Activity 210 first, second, third, and so on. Specifically, for instance, Decision-making Unit 510 can perform Substantial Similarity Comparison 125 with Conversational Activity 210 from Round of Conversational Exchange 200 pointed to by the highest weight Connection 853 first, Conversational Activity 210 from Round of Conversational Exchange 200 pointed to by the second highest weight Connection 853 second, and so on. In some aspects, Decision-making Unit 510 can stop performing Substantial Similarity Comparisons 125 in a particular Layer 854 as soon as it finds a substantially similar Conversational Activity 210 from an interconnected Round of Conversational Exchange 200. In other aspects, Decision-making Unit 510 may only follow the highest weight Connection 853 to arrive at a Round of Conversational Exchange 200 comprising Conversational Activity 210 to be compared, thereby disregarding Connections 853 with less than the highest weight.

In further embodiments, Decision-making Unit 510 can utilize a bias to adjust similarity index, weight of a Connection 853, and/or other element or parameter used in selecting Rounds of Conversational Exchange 200 (or Conversational Activities 210 therein) in a path through Neural Network 130*a*. In one example, Decision-making Unit 510 may select a Round of Conversational Exchange 200 comprising Conversational Activity 210 whose similarity index multiplied by or adjusted for a bias is higher than or equal to a weight of Connection 853 pointing to that Round of Conversational Exchange 200. In another example, Decision-making Unit 510 may select a Round of Conversational Exchange 200 comprising Conversational Activity 210 whose similarity index multiplied by or adjusted for a bias is lower than or equal to a weight of Connection 853 pointing to that Round of Conversational Exchange 200. In a further example, bias can be used to resolve deadlock situations where similarity index is equal to a weight of a Connection 853. In some aspects, bias can be expressed in percentages such as 0.3 percent, 1.2 percent, 25.7 percent, 79.8 percent, 99.9 percent, 100.1 percent, 155.4 percent, 298.6 percent, 1105.5 percent, and so on. For example, a bias below 100 percent decreases an element or parameter to which it is applied, a bias equal to 100 percent does not change the element or parameter to which it is applied, and a bias higher than 100 percent increases the element or parameter to which it is applied. In general, any amount of bias can be utilized. Bias can be applied to one or more of a weight of a Connection 853, similarity index, any other element or parameter, and/or all or any combination of them. Also, different biases can be applied to each of a weight of a Connection 853, similarity index, or any other element or parameter. For example, 30 percent bias can be applied to similarity index and 15 percent bias can be applied to a weight of a Connection 853. Also, different biases can be applied to various Layers 854 of Neural Network 130*a*, and/or other disclosed elements. Bias can be defined by a user, by AIIM system administrator, or automatically by the system based on experience, testing, inquiry, analysis, synthesis, or other techniques, knowledge, or input.

Any other element and/or technique can be utilized in selecting Rounds of Conversational Exchange 200 (or Conversational Activities 210 therein) in a path through Neural Network 130*a*.

Figure 19:
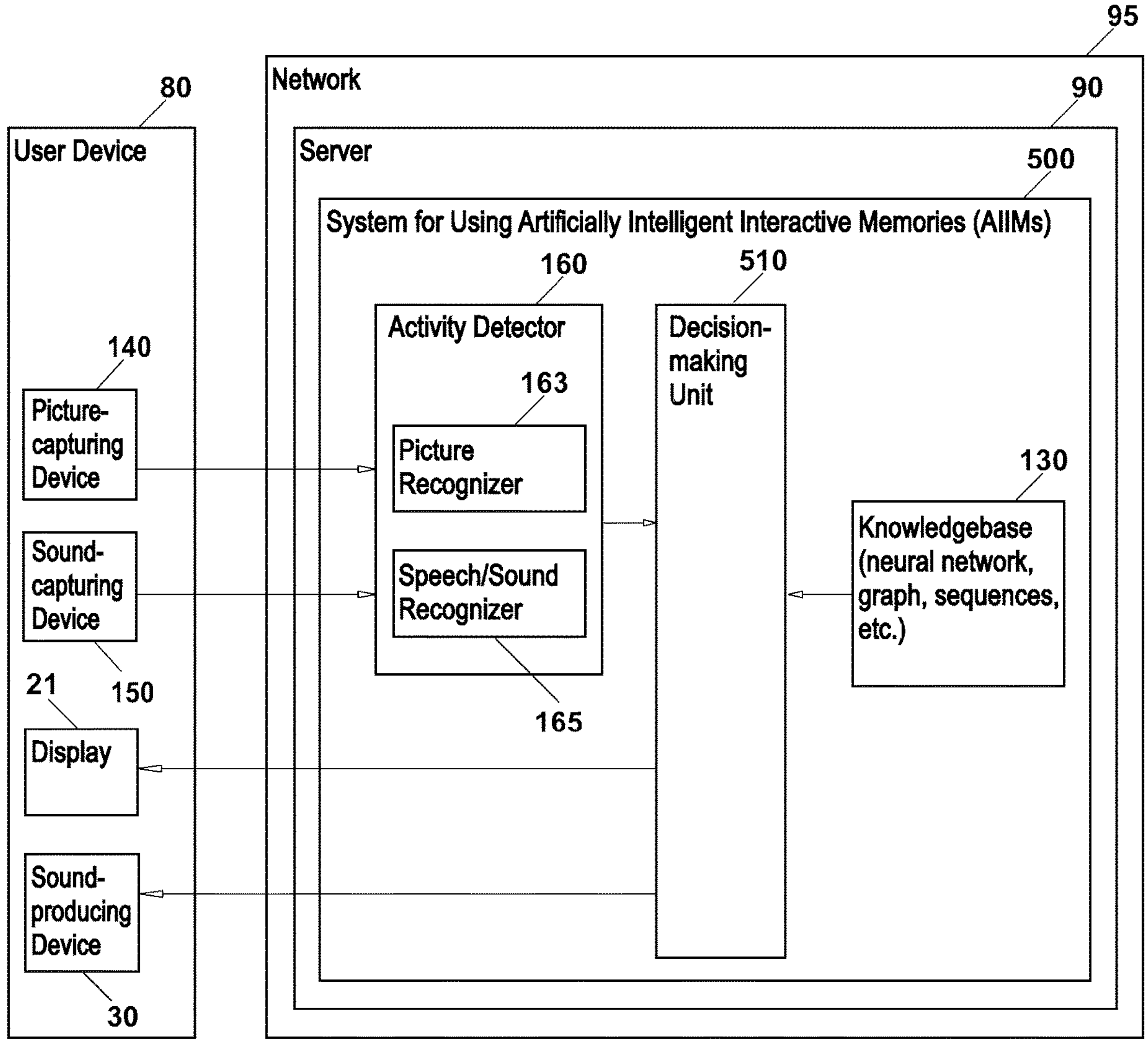
FIG. 19 illustrates an embodiment of internal structure of System for Using AIIMs 500 implemented as a network service.

Referring to FIG. 19, an embodiment of internal structure of System for Using AIIMs 500 implemented as a network service is illustrated. System for Using AIIMs 500 comprises interconnected Decision-making Unit 510, Knowledgebase 130, and Activity Detector 160. Some embodiments of Activity Detector 160 may include Picture Recognizer 163 and/or Speech/Sound Recognizer 165. System for Using AIIMs 500 or any element thereof may reside or operate on Server 90, which is accessible by User Device 80 over Network 95. User Device 80 comprises Picture-capturing Device 140, Sound-capturing Device 150, Display 21, and Sound-producing Device 30. Other additional elements can be included as needed, or some of the disclosed ones can be excluded, or a combination thereof can be utilized in alternate embodiments.

In some embodiments, System for Using AIIMs 500 operating on Server 90 can use knowledge (i.e. Knowledgebase 130, etc.) of conversations among Conversation Participants 50 learned by System for Learning AIIMs 100 that itself may be operating on Server 90 as previously described. Conversation Participant 50 or any other user can utilize System for Using AIIMs 500 operating on Server 90 to simulate a conversation with AI Conversation Participant 55 on his/her User Device 80 via Network 95. As such, System for Using AIIMs 500 implemented as a network service may be available to members of the network service (i.e. membership or subscription based network service, etc.) or to all the world's Users 60 (i.e. freely available network service, etc.) who wish to simulate conversations.

Figure 20:
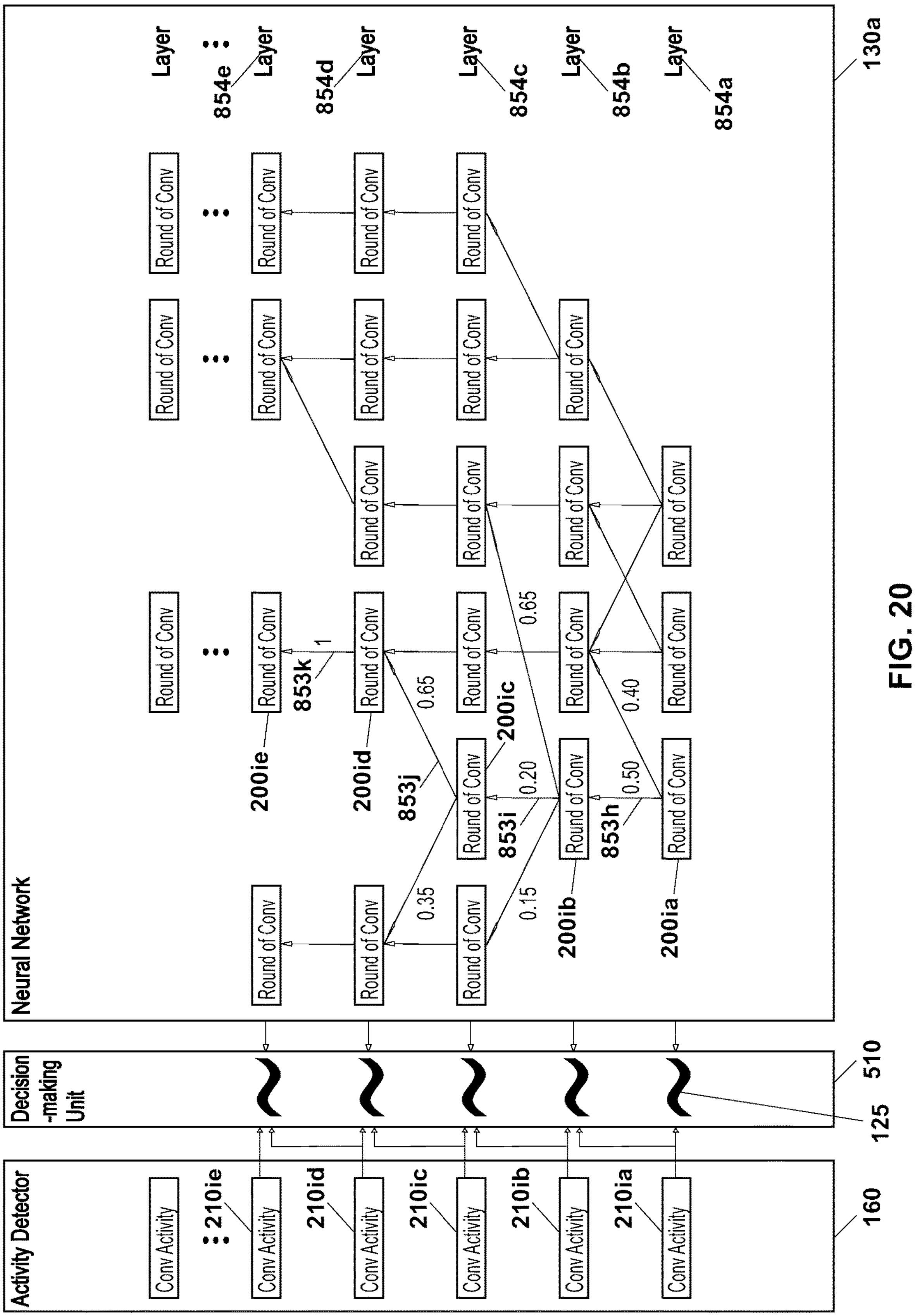
FIG. 20 illustrates an example of selecting a path of Rounds of Conversational Exchange 200 (or Conversational Activities 210 therein) through Neural Network 130*a*.

Referring to FIG. 20, an exemplary embodiment of selecting a path of Rounds of Conversational Exchange 200 (or Conversational Activities 210 therein) through Neural Network 130*a* is illustrated. Neural Network 130*a* may include knowledge (i.e. interconnected Rounds of Conversational Exchange 200, etc.) of one or more conversations between Conversation Participants 50*a* and 50*b*. In this example, Round of Conversational Exchange 200 comprises a Conversational Activity 210 of Conversation Participant 50*a* correlated with a Conversational Activity 210 of Conversation Participant 50*b* similar to the one shown in FIG. 6A. User 60 may be the same person as Conversation Participant 50*a* or any other person. The conversation is simulated with AI Conversation Participant 55 who uses knowledge of Conversation Participant 50*b* stored in Neural Network 130*a* to resemble Conversation Participant 50*b*. Substantial Similarity Comparison 125 can be used to determine substantial similarity of the compared Conversational Activities 210 or portions thereof. Such substantial similarity, if achieved, may be used primarily for selecting a path through Neural Network 130*a*, whereas, weight of any Connection 853 and/or other elements may be used secondarily, for example. Optional ancillary Substantial Similarity Comparisons 125 can be selectively performed where applicable (i.e. with speaking Conversational Activities 210 or portions thereof, etc.) to enhance decision making (i.e. narrow down choices, etc.) as later described. As the simulated conversation progresses, Decision-making Unit 510 can receive User's 60 Conversational Activities 210 or portions thereof from Activity Detector 160.

For example, Decision-making Unit 510 can perform Substantial Similarity Comparisons 125 of User's 60 Conversational Activity 210*ia* (i.e. speaking, etc.) or portion thereof from Activity Detector 160 with Conversation Participant's 50*a* Conversational Activities 210 or portions thereof from one or more Rounds of Conversational Exchange 200 in Layer 854*a* (or any other one or more Layers 854, etc.). Conversation Participant's 50*a* Conversational Activity 210 or portion thereof from Round of Conversational Exchange 200*ia* may be found substantially similar with the highest similarity. Decision-making Unit 510 can play Sub-stream of Digital Pictures 145 and Sub-stream of Digital Sound Samples 155 of Conversation Participant's 50*b* Conversational Activity 210 from Round of Conversational Exchange 200*ia*, thereby simulating AI Conversation Participant's 55 activity (i.e. motionless silence, etc.) during User's 60 Conversational Activity 210*ia* (i.e. speaking, etc.). Playing Sub-stream of Digital Pictures 145 and Sub-stream of Digital Sound Samples 155 of Conversation Participant's 50*b* Conversational Activity 210 from Round of Conversational Exchange 200*ia* can start at any time during Substantial Similarity Comparisons 125 such as when an initial similarity is reached as later described. Decision-making Unit 510 can then perform Substantial Similarity Comparisons 125 of User's 60 Conversational Activity 210*ib* (i.e. silent facial expressions, etc.) or portion thereof from Activity Detector 160 with Conversation Participant's 50*a* Conversational Activities 210 or portions thereof from one or more Rounds of Conversational Exchange 200 in corresponding Layer 854*b* interconnected with Round of Conversational Exchange 200*ia*. Conversation Participant's 50*a* Conversational Activities 210 or portions thereof from multiple Rounds of Conversational Exchange 200 may be found substantially similar. To enhance decision making (i.e. narrow down choices, etc.), Decision-making Unit 510 can also perform ancillary Substantial Similarity Comparisons 125 of User's 60 Conversational Activity 210*ia* (i.e. speaking, etc.) or portion thereof from Activity Detector 160 with Conversation Participant's 50*b* Conversational Activities 210 (i.e. speaking, etc.) or portions thereof from the Rounds of Conversational Exchange 200 comprising substantially similar Conversation Participant's 50*a* Conversational Activities 210 or portions thereof. Conversation Participant's 50*b* Conversational Activity 210 or portion thereof from Round of Conversational Exchange 200*ib* may be found at least partially similar. Decision-making Unit 510 may follow Connection 853*h*, and play Sub-stream of Digital Pictures 145 and Sub-stream of Digital Sound Samples 155 of Conversation Participant's 50*b* Conversational Activity 210 from Round of Conversational Exchange 200*ib*, thereby simulating AI Conversation Participant's 55 activity (i.e. speaking, etc.) during User's 60 Conversational Activity 210*ib* (i.e. silent facial expressions, etc.). Playing Sub-stream of Digital Pictures 145 and Sub-stream of Digital Sound Samples 155 of Conversation Participant's 50*b* Conversational Activity 210 from Round of Conversational Exchange 200*ib* can start at any time during Substantial Similarity Comparisons 125 such as when an initial similarity is reached as later described. Decision-making Unit 510 can then perform Substantial Similarity Comparisons 125 of User's 60 Conversational Activity 210*ic* (i.e. speaking, etc.) or portion thereof from Activity Detector 160 with Conversation Participant's 50*a* Conversational Activities 210 or portions thereof from one or more Rounds of Conversational Exchange 200 in corresponding Layer 854*c* interconnected with Round of Conversational Exchange 200*ib*. Conversation Participant's 50*a* Conversational Activity 210 or portion thereof from Round of Conversational Exchange 200*ic* may be found substantially similar. Decision-making Unit 510 may follow Connection 853*i* disregarding its less than highest weight, and play Sub-stream of Digital Pictures 145 and Sub-stream of Digital Sound Samples 155 of Conversation Participant's 50*b* Conversational Activity 210 from Round of Conversational Exchange 200*ic*, thereby simulating AI Conversation Participant's 55 activity (i.e. motionless silence, etc.) during User's 60 Conversational Activity 210*ic* (i.e. speaking, etc.). Playing Sub-stream of Digital Pictures 145 and Sub-stream of Digital Sound Samples 155 of Conversation Participant's 50*b* Conversational Activity 210 from Round of Conversational Exchange 200*ic* can start at any time during Substantial Similarity Comparisons 125 such as when an initial similarity is reached as later described. Decision-making Unit 510 can then perform Substantial Similarity Comparisons 125 of User's 60 Conversational Activity 210*id* (i.e. silent body movements, etc.) or portion thereof from Activity Detector 160 with Conversation Participant's 50*a* Conversational Activities 210 or portions thereof from one or more Rounds of Conversational Exchange 200 in corresponding Layer 854*d* interconnected with Round of Conversational Exchange 200*ic*. None of Conversation Participant's 50*a* Conversational Activities 210 or portions thereof from one or more Rounds of Conversational Exchange 200 in Layer 854*d* interconnected with Round of Conversational Exchange 200*ic* may be found substantially similar. Decision-making Unit 510 may follow the highest weight Connection 853*j*, and play Sub-stream of Digital Pictures 145 and Sub-stream of Digital Sound Samples 155 of Conversation Participant's 50*b* Conversational Activity 210 from Round of Conversational Exchange 200*id*, thereby simulating AI Conversation Participant's 55 activity (i.e. speaking, etc.) during User's 60 Conversational Activity 210*id* (i.e. silent body movements, etc.). Playing Sub-stream of Digital Pictures 145 and Sub-stream of Digital Sound Samples 155 of Conversation Participant's 50*b* Conversational Activity 210 from Round of Conversational Exchange 200*id* can start at any time during Substantial Similarity Comparisons 125 such as when a determination is made that an initial similarity has not been reached as later described. Since Connection 853*k* is the only connection from Round of Conversational Exchange 200*id*, Decision-making Unit 510 may follow Connection 853*k*, and play Sub-stream of Digital Pictures 145 and Sub-stream of Digital Sound Samples 155 of Conversation Participant's 50*b* Conversational Activity 210 from Round of Conversational Exchange 200*ie*, thereby simulating AI Conversation Participant's 55 activity (i.e. silent body movements, etc.) during User's 60 Conversational Activity 210*ie* (i.e. speaking, etc.). Decision-making Unit 510 can implement similar logic or process for any additional Conversational Activities 210 from Activity Detector 160, and so on.

In some aspects, Decision-making Unit 510 may perform the aforementioned ancillary Substantial Similarity Comparisons 125 to narrow down the choice of Rounds of Conversational Exchange 200 comprising Conversational Activities 210 found to be substantially or otherwise similar by the main Substantial Similarity Comparisons 125, thereby enabling a more accurate decision making. For example, Decision-making Unit 510 can perform ancillary Substantial Similarity Comparisons 125 of User's 60 prior Conversational Activities 210 (i.e. speaking, etc.) or portions thereof from Activity Detector 160 with Conversational Activities 210 (i.e. speaking, etc.) or portions thereof from one or more Rounds of Conversational Exchange 200 currently being processed as described in the example above. Ancillary Substantial Similarity Comparisons 125 may be especially useful in comparing speaking Conversational Activities 210 as Conversation Participants 50 may repeat some of each other's words in subsequent speaking Conversational Activities 210. In other aspects, Decision-making Unit 510 may perform ancillary Substantial Similarity Comparisons 125 to look forward and identify subsequent similar Conversational Activities 210 even before User's 60 current Conversational Activity 210 is fully received. For example, while performing main Substantial Similarity Comparisons 125 of Conversational Activities 210 in a current Layer 854, Decision-making Unit 510 may perform ancillary Substantial Similarity Comparisons 125 of Conversational Activities 210 or portions thereof from Rounds of Conversational Exchange 200 in a subsequent Layer 854 interconnected with Round of Conversational Exchange 200 currently being processed. Ancillary Substantial Similarity Comparisons 125 can be performed concurrently with main Substantial Similarity Comparisons 125. Concurrent and/or forward-looking ancillary Substantial Similarity Comparisons 125 may enhance real time performance of AI Conversation Participant 55 in a simulated conversation. Ancillary Substantial Similarity Comparisons 125 can also be omitted.

The foregoing exemplary embodiment provides an example of utilizing a combination of Substantial Similarity Comparisons 125, ancillary comparisons, weights of Connections 853, and/or other elements and/or techniques. It should be understood that any of these elements and/or techniques can be omitted, used in a different combination, or used in combination with other elements and/or techniques, in which case the path of Rounds of Conversational Exchange 200 (or Conversational Activities 210 therein) through Neural Network 130*a* would be affected accordingly. In one example, Substantial Similarity Comparisons 125 can be omitted, in which case weights of Connections 853 can be primarily utilized for deciding which Rounds of Conversational Exchange 200 (or Conversational Activities 210 therein) to select in a path through Neural Network 130*a*. In another example, weights of Connections 853 can be omitted, in which case Substantial Similarity Comparisons 125 can be primarily utilized for deciding which Rounds of Conversational Exchange 200 (or Conversational Activities 210 therein) to select in a path through Neural Network 130*a*. These elements and/or techniques can similarly be utilized in Graph 130*b*, Collections of Sequences 130*c*, Sequence 133, and/or other data structures or repositories. Any of the previously described arrangements of Conversational Activities 210 in a Round of Conversational Exchange 200, and/or other elements can be utilized as well. One of ordinary skill in art will understand that this exemplary embodiment is described merely as an example of a variety of possible implementations, and that while all of its variations are too voluminous to describe, they are within the scope of this disclosure.

Figure 21:
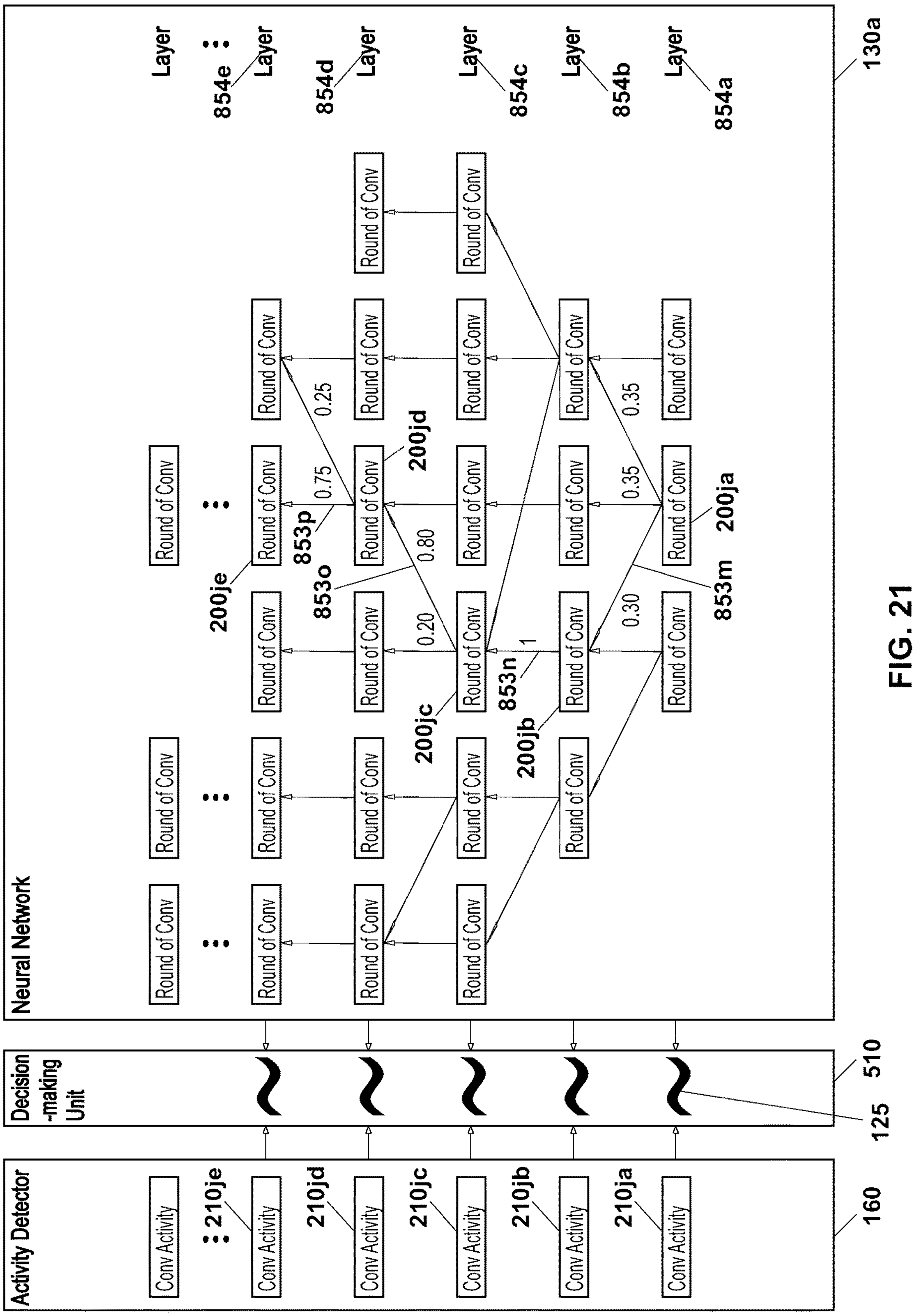
FIG. 21 illustrates another example of selecting a path of Rounds of Conversational Exchange 200 (or Conversational Activities 210 therein) through Neural Network 130*a*.

Referring to FIG. 21, an exemplary embodiment of selecting a path of Rounds of Conversational Exchange 200 (or Conversational Activities 210 therein) through Neural Network 130*a* is illustrated. Neural Network 130*a* may include knowledge (i.e. interconnected Rounds of Conversational Exchange 200, etc.) of one or more conversations between Conversation Participants 50*a* and 50*b*. In this example, Round of Conversational Exchange 200 comprises a Conversational Activity 210 of Conversation Participant 50*a* correlated with Conversational Activity 210 of Conversation Participant 50*b* and a subsequent Conversational Activity 210 of Conversation Participant 50*a* correlated with a subsequent Conversational Activity 210 of Conversation Participant 50*b* similar to the one shown in FIG. 6C. User 60 may be the same person as Conversation Participant 50*a* or any other person. The conversation is simulated with AI Conversation Participant 55 who uses knowledge of Conversation Participant 50*b* stored in Neural Network 130*a* to resemble Conversation Participant 50*b*. Substantial Similarity Comparison 125 can be used to determine substantial similarity of the compared Conversational Activities 210 or portions thereof. Such substantial similarity, if achieved, may be used primarily for selecting a path through Neural Network 130*a*, whereas, weight of any Connection 853 and/or other elements may be used secondarily, for example. In this example, as the simulated conversation progresses, Decision-making Unit 510 can be setup to receive User's 60 speaking Conversational Activities 210 or portions thereof from Activity Detector 160 while other Conversational Activities 210 from Activity Detector 160 may be omitted.

For example, Decision-making Unit 510 can perform Substantial Similarity Comparisons 125 of User's 60 Conversational Activity 210*ja* (i.e. speaking, etc.) or portion thereof from Activity Detector 160 with Conversation Participant's 50*a* Conversational Activities 210 (i.e. speaking, etc.) or portions thereof from one or more Rounds of Conversational Exchange 200 in Layer 854*a* (or any other one or more Layers 854, etc.). Conversation Participant's 50*a* Conversational Activity 210 or portion thereof from Round of Conversational Exchange 200*ja* may be found substantially similar with highest similarity. Decision-making Unit 510 may play Sub-stream of Digital Pictures 145 and Sub-stream of Digital Sound Samples 155 of a correlated Conversation Participant's 50*b* Conversational Activity 210 from Round of Conversational Exchange 200*ja*, thereby simulating AI Conversation Participant's 55 activity (i.e. silent facial expressions, etc.) during User's 60 Conversational Activity 210*ja* (i.e. speaking, etc.). Playing Sub-stream of Digital Pictures 145 and Sub-stream of Digital Sound Samples 155 of the correlated Conversation Participant's 50*b* Conversational Activity 210 from Round of Conversational Exchange 200*ja* can start at any time during Substantial Similarity Comparisons 125 such as when an initial similarity is reached as later described. Decision-making Unit 510 may also play Sub-stream of Digital Pictures 145 and Sub-stream of Digital Sound Samples 155 of a subsequent Conversation Participant's 50*b* Conversational Activity 210 from Round of Conversational Exchange 200*ja*, thereby simulating AI Conversation Participant's 55 activity (i.e. speaking, etc.) subsequent to User's 60 Conversational Activity 210*ja* (i.e. speaking, etc.). Decision-making Unit 510 can then perform Substantial Similarity Comparisons 125 of User's 60 Conversational Activity 210*jb* (i.e. speaking, etc.) or portion thereof from Activity Detector 160 with Conversation Participant's 50*a* Conversational Activities 210 (i.e. speaking, etc.) or portions thereof from one or more Rounds of Conversational Exchange 200 in corresponding Layer 854*b* interconnected with Round of Conversational Exchange 200*ja*. Conversation Participant's 50*a* Conversational Activity 210 or portion thereof from Round of Conversational Exchange 200*jb* may be found substantially similar with highest similarity. Decision-making Unit 510 may follow Connection 853*m* disregarding its less than highest weight, and play Sub-stream of Digital Pictures 145 and Sub-stream of Digital Sound Samples 155 of a correlated Conversation Participant's 50*b* Conversational Activity 210 from Round of Conversational Exchange 200*jb*, thereby simulating AI Conversation Participant's 55 activity (i.e. silent body movements, etc.) during User's 60 Conversational Activity 210*jb* (i.e. speaking, etc.). Playing Sub-stream of Digital Pictures 145 and Sub-stream of Digital Sound Samples 155 of the correlated Conversation Participant's 50*b* Conversational Activity 210 from Round of Conversational Exchange 200*jb* can start at any time during Substantial Similarity Comparisons 125 such as when an initial similarity is reached as later described. Decision-making Unit 510 may also play Sub-stream of Digital Pictures 145 and Sub-stream of Digital Sound Samples 155 of a subsequent Conversation Participant's 50*b* Conversational Activity 210 from Round of Conversational Exchange 200*jb*, thereby simulating AI Conversation Participant's 55 activity (i.e. speaking, etc.) subsequent to User's 60 Conversational Activity 210*jb* (i.e. speaking, etc.). Since Connection 853*n* is the only connection from Round of Conversational Exchange 200*jb*, Decision-making Unit 510 may follow Connection 853*n*, and play Sub-stream of Digital Pictures 145 and Sub-stream of Digital Sound Samples 155 of a correlated Conversation Participant's 50*b* Conversational Activity 210 from Round of Conversational Exchange 200*jc*, thereby simulating AI Conversation Participant's 55 activity (i.e. motionless silence, etc.) during User's 60 Conversational Activity 210*jc* (i.e. speaking, etc.). Decision-making Unit 510 may also play Sub-stream of Digital Pictures 145 and Sub-stream of Digital Sound Samples 155 of a subsequent Conversation Participant's 50*b* Conversational Activity 210 from Round of Conversational Exchange 200*jc*, thereby simulating AI Conversation Participant's 55 activity (i.e. speaking, etc.) subsequent to User's 60 Conversational Activity 210*jc* (i.e. speaking, etc.). Decision-making Unit 510 can then perform Substantial Similarity Comparisons 125 of User's 60 Conversational Activity 210*jd* (i.e. speaking, etc.) or portion thereof from Activity Detector 160 with Conversation Participant's 50*a* Conversational Activities 210 (i.e. speaking, etc.) or portions thereof from one or more Rounds of Conversational Exchange 200 in corresponding Layer 854*d* interconnected with Round of Conversational Exchange 200*jc*. None of Conversation Participant's 50*a* Conversational Activities 210 (i.e. speaking, etc.) or portions thereof from Rounds of Conversational Exchange 200 in Layer 854*d* interconnected with Round of Conversational Exchange 200*jc* may be found substantially similar. Decision-making Unit 510 may follow the highest weight Connection 853*o*, and play Sub-stream of Digital Pictures 145 and Sub-stream of Digital Sound Samples 155 of a correlated Conversation Participant's 50*b* Conversational Activity 210 from Round of Conversational Exchange 200*jd*, thereby simulating AI Conversation Participant's 55 activity (i.e. silent facial expressions, etc.) during User's 60 Conversational Activity 210*jd* (i.e. speaking, etc.). Playing Sub-stream of Digital Pictures 145 and Sub-stream of Digital Sound Samples 155 of the correlated Conversation Participant's 50*b* Conversational Activity 210 from Round of Conversational Exchange 200*jd* can start at any time during Substantial Similarity Comparisons 125 such as when a determination is made that an initial similarity has not been reached as later described. Decision-making Unit 510 may also play Sub-stream of Digital Pictures 145 and Sub-stream of Digital Sound Samples 155 of a subsequent Conversation Participant's 50*b* Conversational Activity 210 from Round of Conversational Exchange 200*jd*, thereby simulating AI Conversation Participant's 55 activity (i.e. speaking, etc.) subsequent to User's 60 Conversational Activity 210*jd* (i.e. speaking, etc.). Decision-making Unit 510 can then perform Substantial Similarity Comparisons 125 of User's 60 Conversational Activity 210*je* (i.e. speaking, etc.) or portion thereof from Activity Detector 160 with Conversation Participant's 50*a* Conversational Activities 210 (i.e. speaking, etc.) or portions thereof from one or more Rounds of Conversational Exchange 200 in corresponding Layer 854*e* interconnected with Round of Conversational Exchange 200*jd*. Conversation Participant's 50*a* Conversational Activity 210 or portion thereof from Round of Conversational Exchange 200*je* may be found substantially similar with highest similarity. Decision-making Unit 510 may follow Connection 853*p*, and play Sub-stream of Digital Pictures 145 and Sub-stream of Digital Sound Samples 155 of a correlated Conversation Participant's 50*b* Conversational Activity 210 from Round of Conversational Exchange 200*je*, thereby simulating AI Conversation Participant's 55 activity (i.e. silent body movements, etc.) during User's 60 Conversational Activity 210*je* (i.e. speaking, etc.). Playing Sub-stream of Digital Pictures 145 and Sub-stream of Digital Sound Samples 155 of the correlated Conversation Participant's 50*b* Conversational Activity 210 from Round of Conversational Exchange 200*je* can start at any time during Substantial Similarity Comparisons 125 such as when an initial similarity is reached as later described. Decision-making Unit 510 may also play Sub-stream of Digital Pictures 145 and Sub-stream of Digital Sound Samples 155 of a subsequent Conversation Participant's 50*b* Conversational Activity 210 from Round of Conversational Exchange 200*je*, thereby simulating AI Conversation Participant's 55 activity (i.e. speaking, etc.) subsequent to User's 60 Conversational Activity 210*je* (i.e. speaking, etc.). Decision-making Unit 510 can implement similar logic or process for any additional Conversational Activities 210 from Activity Detector 160, and so on.

In both of the above described and/or other exemplary embodiments, any time that substantial similarity or other similarity threshold is not achieved in any of the compared Conversational Activities 210 or portions thereof, instead of following the highest weight Connection 853 or the only Connection 853, Decision-making Unit 510 can decide to look for a substantially or otherwise similar Conversational Activity 210 or portion thereof elsewhere in Neural Network 130*a* such as in any Layer 854 subsequent to a current Layer 854, in the first Layer 854, in the entire Neural Network 130*a*, and/or others.

In both of the above described and/or other exemplary embodiments, as the simulated conversation progresses, a history (i.e. sequence, etc.) of User's 60 Conversational Activities 210 or portions thereof becomes available, which can then be collectively compared with Conversational Activities 210 or portions thereof from Rounds of Conversational Exchange 200 in paths of Neural Network 130*a*. Collectively comparing Conversational Activities 210 or portions thereof may enable Decision-making Unit 510 to more accurately determine or anticipate AI Conversation Participant's 55 activities in the simulated conversation. For example, Decision-making Unit 510 can perform collective Substantial Similarity Comparisons 125 of a history of User's 60 Conversational Activities 210 or portions thereof from Activity Detector 160 with Conversational Activities 210 or portions thereof from Rounds of Conversational Exchange 200 in one or more paths of Neural Network 130*a*. As additional User's 60 Conversational Activities 210 or portions thereof from Activity Detector 160 become available, Decision-making Unit 510 can use a longer history of User's 60 Conversational Activities 210 or portions thereof to compare with corresponding Conversational Activities 210 or portions thereof from Rounds of Conversational Exchange 200 in paths of Neural Network 130*a*. In each cycle of comparisons, Decision-making Unit 510 may choose the most similar of the compared paths and switch to a more suitable path based on such collective similarity determinations.

The foregoing exemplary embodiment provides an example of utilizing a combination of Substantial Similarity Comparisons 125, weights of Connections 853, and/or other elements and/or techniques. It should be understood that any of these elements and/or techniques can be omitted, used in a different combination, or used in combination with other elements and/or techniques, in which case the path of Rounds of Conversational Exchange 200 (or Conversational Activities 210 therein) through Neural Network 130*a* would be affected accordingly. Also, any of the elements and/or techniques utilized in other examples or embodiments described herein such as ancillary comparisons, concurrent comparisons, various arrangements of Conversational Activities 210 in a Round of Conversational Exchange 200, and/or others can similarly be utilized in this exemplary embodiment. One of ordinary skill in art will understand that this exemplary embodiment is described merely as an example of a variety of possible implementations, and that while all of its variations are too voluminous to describe, they are within the scope of this disclosure.

Figure 22:
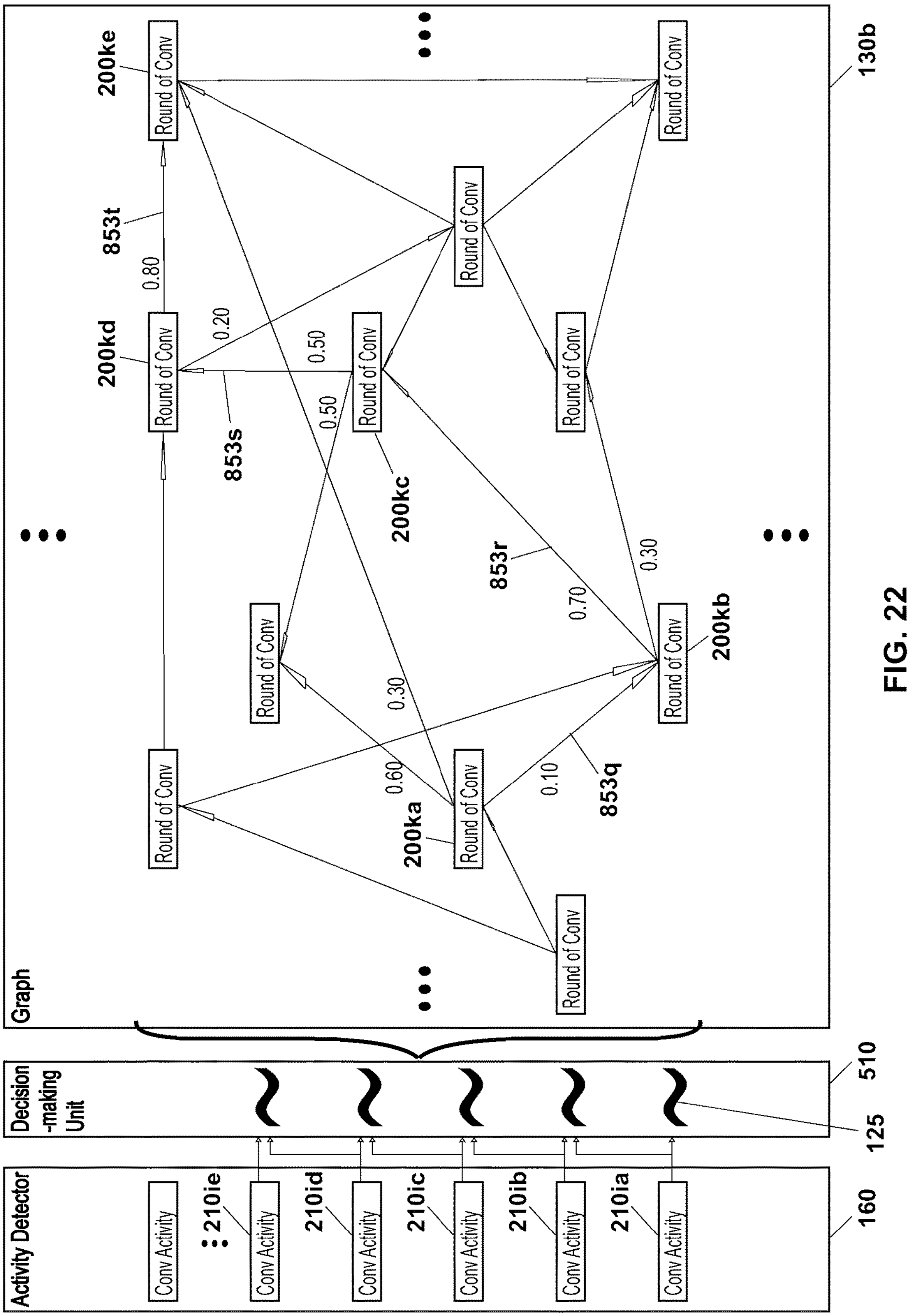
FIG. 22 illustrates an example of selecting a path of Rounds of Conversational Exchange 200 (or Conversational Activities 210 therein) through Graph 130*b*.

Referring to FIG. 22, an exemplary embodiment of selecting a path of Rounds of Conversational Exchange 200 (or Conversational Activities 210 therein) through Graph 130*b* is illustrated. Graph 130*b* may include knowledge (i.e. interconnected Rounds of Conversational Exchange 200, etc.) of one or more conversations between Conversation Participants 50*a* and 50*b*. In this example, Round of Conversational Exchange 200 comprises a Conversational Activity 210 of Conversation Participant 50*a* correlated with a Conversational Activity 210 of Conversation Participant 50*b* similar to the one shown in FIG. 6A. User 60 may be the same person as Conversation Participant 50*a* or any other person. The conversation is simulated with AI Conversation Participant 55 who uses knowledge of Conversation Participant 50*b* stored in Graph 130*b* to resemble Conversation Participant 50*b*. Substantial Similarity Comparison 125 can be used to determine substantial similarity of the compared Conversational Activities 210 or portions thereof. Such substantial similarity, if achieved, may be used primarily for selecting a path through Graph 130*b*, whereas, weight of any Connection 853 and/or other elements may be used secondarily, for example. Optional ancillary Substantial Similarity Comparisons 125 can be selectively performed where applicable (i.e. with speaking Conversational Activities 210 or portions thereof, etc.) to enhance decision making (i.e. narrow down choices, etc.) as later described. As the simulated conversation progresses, Decision-making Unit 510 can receive User's 60 Conversational Activities 210 or portions thereof from Activity Detector 160.

For example, Decision-making Unit 510 can perform Substantial Similarity Comparisons 125 of User's 60 Conversational Activity 210*ia* (i.e. speaking, etc.) or portion thereof from Activity Detector 160 with Conversation Participant's 50*a* Conversational Activities 210 or portions thereof from one or more Rounds of Conversational Exchange 200 in Graph 130*b*. Conversation Participant's 50*a* Conversational Activity 210 or portion thereof from Round of Conversational Exchange 200*ka* may be found substantially similar with the highest similarity. Decision-making Unit 510 can play Sub-stream of Digital Pictures 145 and Sub-stream of Digital Sound Samples 155 of Conversation Participant's 50*b* Conversational Activity 210 from Round of Conversational Exchange 200*ka*, thereby simulating AI Conversation Participant's 55 activity (i.e. silent body movements, etc.) during User's 60 Conversational Activity 210*ia* (i.e. speaking, etc.). Playing Sub-stream of Digital Pictures 145 and Sub-stream of Digital Sound Samples 155 of Conversation Participant's 50*b* Conversational Activity 210 from Round of Conversational Exchange 200*ka* can start at any time during Substantial Similarity Comparisons 125 such as when an initial similarity is reached as later described. Decision-making Unit 510 can then perform Substantial Similarity Comparisons 125 of User's 60 Conversational Activity 210*ib* (i.e. motionless silence, etc.) or portion thereof from Activity Detector 160 with Conversation Participant's 50*a* Conversational Activities 210 or portions thereof from one or more Rounds of Conversational Exchange 200 in Graph 130*b* interconnected with Round of Conversational Exchange 200*ka* by outgoing Connections 853. Conversation Participant's 50*a* Conversational Activity 210 or portion thereof from Round of Conversational Exchange 200*kb* may be found substantially similar. Decision-making Unit 510 may follow Connection 853*q* disregarding its less than highest weight, and play Sub-stream of Digital Pictures 145 and Sub-stream of Digital Sound Samples 155 of Conversation Participant's 50*b* Conversational Activity 210 from Round of Conversational Exchange 200*kb*, thereby simulating AI Conversation Participant's 55 activity (i.e. speaking, etc.) during User's 60 Conversational Activity 210*ib* (i.e. motionless silence, etc.). Playing Sub-stream of Digital Pictures 145 and Sub-stream of Digital Sound Samples 155 of Conversation Participant's 50*b* Conversational Activity 210 from Round of Conversational Exchange 200*kb* can start at any time during Substantial Similarity Comparisons 125 such as when an initial similarity is reached as later described. Decision-making Unit 510 can then perform Substantial Similarity Comparisons 125 of User's 60 Conversational Activity 210*ic* (i.e. speaking, etc.) or portion thereof from Activity Detector 160 with Conversation Participant's 50*a* Conversational Activities 210 or portions thereof from one or more Rounds of Conversational Exchange 200 in Graph 130*b* interconnected with Round of Conversational Exchange 200*kb* by outgoing Connections 853. None of Conversation Participant's 50*a* Conversational Activities 210 or portions thereof from one or more Rounds of Conversational Exchange 200 interconnected with Round of Conversational Exchange 200*kb* may be found substantially similar. Decision-making Unit 510 may follow the highest weight Connection 853*r*, and play Sub-stream of Digital Pictures 145 and Sub-stream of Digital Sound Samples 155 of Conversation Participant's 50*b* Conversational Activity 210 from Round of Conversational Exchange 200*kc*, thereby simulating AI Conversation Participant's 55 activity (i.e. silent facial expressions, etc.) during User's 60 Conversational Activity 210*ic* (i.e. speaking, etc.). Playing Sub-stream of Digital Pictures 145 and Sub-stream of Digital Sound Samples 155 of Conversation Participant's 50*b* Conversational Activity 210 from Round of Conversational Exchange 200*kc* can start at any time during Substantial Similarity Comparisons 125 such as when a determination is made that an initial similarity has not been reached as later described. Decision-making Unit 510 can then perform Substantial Similarity Comparisons 125 of User's 60 Conversational Activity 210*id* (i.e. silent facial expressions, etc.) or portion thereof from Activity Detector 160 with Conversation Participant's 50*a* Conversational Activities 210 or portions thereof from one or more Rounds of Conversational Exchange 200 in Graph 130*b* interconnected with Round of Conversational Exchange 200*kc* by outgoing Connections 853. Conversation Participant's 50*a* Conversational Activities 210 or portions thereof from multiple Rounds of Conversational Exchange 200 may be found substantially similar. To enhance decision making (i.e. narrow down choices, etc.), Decision-making Unit 510 can also perform ancillary Substantial Similarity Comparisons 125 of User's 60 Conversational Activity 210*ic* (i.e. speaking, etc.) or portion thereof from Activity Detector 160 with Conversation Participant's 50*b* Conversational Activities 210 (i.e. speaking, etc.) or portions thereof from the Rounds of Conversational Exchange 200 in Graph 130*b* comprising substantially similar Conversation Participant's 50*a* Conversational Activities 210 or portions thereof. Conversation Participant's 50*b* Conversational Activity 210 or portion thereof from Round of Conversational Exchange 200*kd* may be found at least partially similar. Decision-making Unit 510 may follow Connection 853*s*, and play Sub-stream of Digital Pictures 145 and Sub-stream of Digital Sound Samples 155 of Conversation Participant's 50*b* Conversational Activity 210 from Round of Conversational Exchange 200*kd*, thereby simulating AI Conversation Participant's 55 activity (i.e. speaking, etc.) during User's 60 Conversational Activity 210*id* (i.e. silent facial expressions, etc.). Playing Sub-stream of Digital Pictures 145 and Sub-stream of Digital Sound Samples 155 of Conversation Participant's 50*b* Conversational Activity 210 from Round of Conversational Exchange 200*kd* can start at any time during Substantial Similarity Comparisons 125 such as when an initial similarity is reached as later described. Decision-making Unit 510 can then perform Substantial Similarity Comparisons 125 of User's 60 Conversational Activity 210*ie* (i.e. speaking, etc.) or portion thereof from Activity Detector 160 with Conversation Participant's 50*a* Conversational Activities 210 or portions thereof from one or more Rounds of Conversational Exchange 200 in Graph 130*b* interconnected with Round of Conversational Exchange 200*kd* by outgoing Connections 853. Conversation Participant's 50*a* Conversational Activity 210 or portion thereof from Round of Conversational Exchange 200*ke* may be found substantially similar. Decision-making Unit 510 may follow Connection 853*t*, and play Sub-stream of Digital Pictures 145 and Sub-stream of Digital Sound Samples 155 of Conversation Participant's 50*b* Conversational Activity 210 from Round of Conversational Exchange 200*ke*, thereby simulating AI Conversation Participant's 55 activity (i.e. motionless silence, etc.) during User's 60 Conversational Activity 210*ie* (i.e. speaking, etc.). Playing Sub-stream of Digital Pictures 145 and Sub-stream of Digital Sound Samples 155 of Conversation Participant's 50*b* Conversational Activity 210 from Round of Conversational Exchange 200*ke* can start at any time during Substantial Similarity Comparisons 125 such as when an initial similarity is reached as later described. Decision-making Unit 510 can implement similar logic or process for any additional Conversational Activities 210 from Activity Detector 160, and so on.

The foregoing exemplary embodiment provides an example of utilizing a combination of Substantial Similarity Comparisons 125, ancillary comparisons, weights of Connections 853, and/or other elements and/or techniques. It should be understood that any of these elements and/or techniques can be omitted, used in a different combination, or used in combination with other elements and/or techniques, in which case the path of Rounds of Conversational Exchange 200 (or Conversational Activities 210 therein) through Graph 130*b* would be affected accordingly. Also, any of the elements and/or techniques utilized in other examples or embodiments described herein such as concurrent comparisons, various arrangements of Conversational Activities 210 in a Round of Conversational Exchange 200, and/or others can similarly be utilized in this exemplary embodiment. One of ordinary skill in art will understand that this exemplary embodiment is described merely as an example of a variety of possible implementations, and that while all of its variations are too voluminous to describe, they are within the scope of this disclosure.

Figure 23:
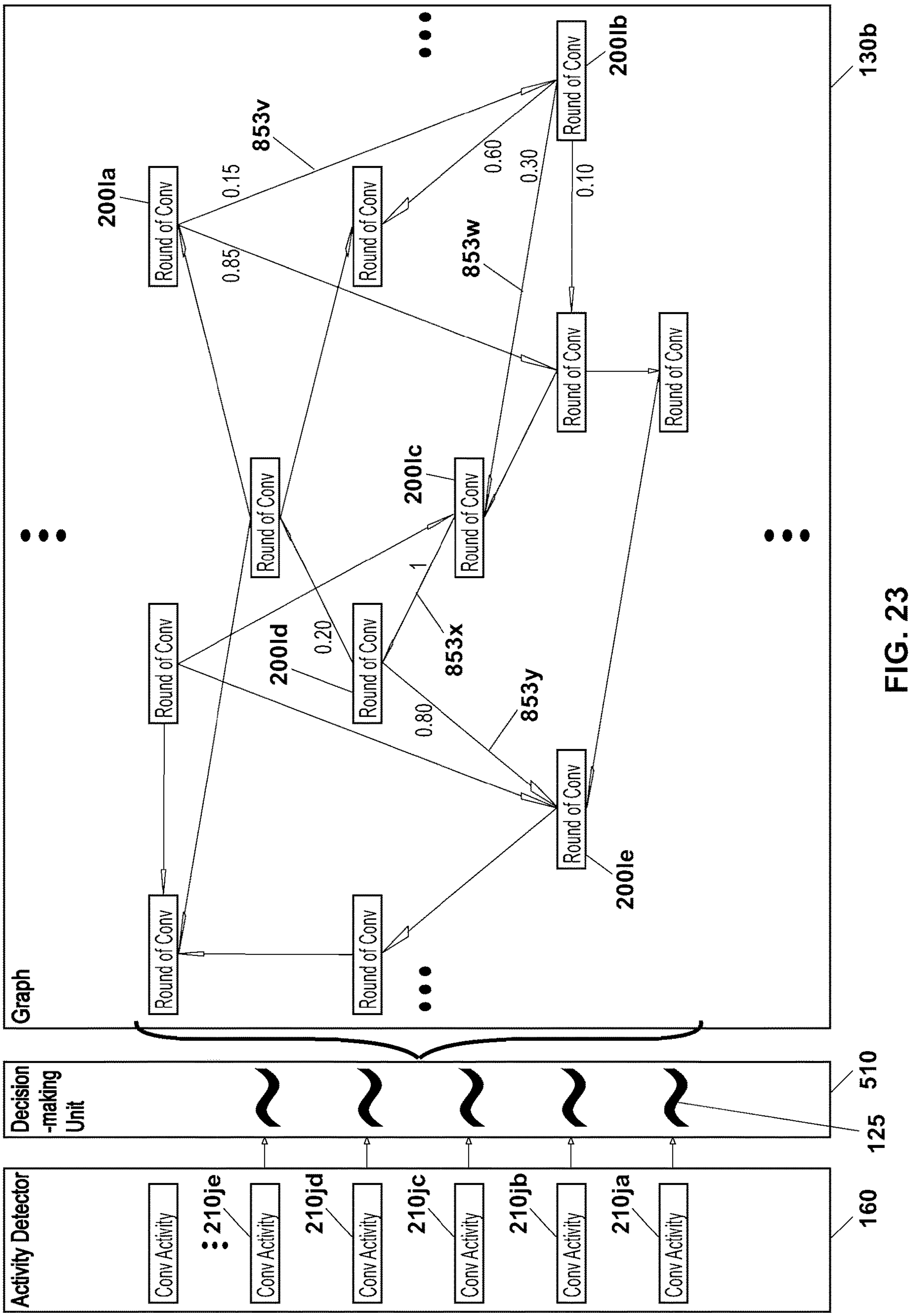
FIG. 23 illustrates another example of selecting a path of Rounds of Conversational Exchange 200 (or Conversational Activities 210 therein) through Graph 130*b*.

Referring to FIG. 23, an exemplary embodiment of selecting a path of Rounds of Conversational Exchange 200 (or Conversational Activities 210 therein) through Graph 130*b* is illustrated. Graph 130*b* may include knowledge (i.e. interconnected Rounds of Conversational Exchange 200, etc.) of one or more conversations between Conversation Participants 50*a* and 50*b*. In this example, Round of Conversational Exchange 200 comprises a Conversational Activity 210 of Conversation Participant 50*a* correlated with Conversational Activity 210 of Conversation Participant 50*b* and a subsequent Conversational Activity 210 of Conversation Participant 50*a* correlated with a subsequent Conversational Activity 210 of Conversation Participant 50*b* similar to the one shown in FIG. 6C. User 60 may be the same person as Conversation Participant 50*a* or any other person. The conversation is simulated with AI Conversation Participant 55 who uses knowledge of Conversation Participant 50*b* stored in Graph 130*b* to resemble Conversation Participant 50*b*. Substantial Similarity Comparison 125 can be used to determine substantial similarity of the compared Conversational Activities 210 or portions thereof. Such substantial similarity, if achieved, may be used primarily for selecting a path through Graph 130*b*, whereas, weight of any Connection 853 and/or other elements may be used secondarily, for example. In this example, as the simulated conversation progresses, Decision-making Unit 510 can be setup to receive User's 60 speaking Conversational Activities 210 or portions thereof from Activity Detector 160 while other Conversational Activities 210 from Activity Detector 160 may be omitted.

For example, Decision-making Unit 510 can perform Substantial Similarity Comparisons 125 of User's 60 Conversational Activity 210*ja* (i.e. speaking, etc.) or portion thereof from Activity Detector 160 with Conversation Participant's 50*a* Conversational Activities 210 or portions thereof from one or more Rounds of Conversational Exchange 200 in Graph 130*b*. Conversation Participant's 50*a* Conversational Activity 210 or portion thereof from Round of Conversational Exchange 2001*a* may be found substantially similar with highest similarity. Decision-making Unit 510 may play Sub-stream of Digital Pictures 145 and Sub-stream of Digital Sound Samples 155 of a correlated Conversation Participant's 50*b* Conversational Activity 210 from Round of Conversational Exchange 2001*a*, thereby simulating AI Conversation Participant's 55 activity (i.e. silent facial expressions, etc.) during User's 60 Conversational Activity 210*ja* (i.e. speaking, etc.). Playing Sub-stream of Digital Pictures 145 and Sub-stream of Digital Sound Samples 155 of the correlated Conversation Participant's 50*b* Conversational Activity 210 from Round of Conversational Exchange 2001*a* can start at any time during Substantial Similarity Comparisons 125 such as when an initial similarity is reached as later described. Decision-making Unit 510 may also play Sub-stream of Digital Pictures 145 and Sub-stream of Digital Sound Samples 155 of a subsequent Conversation Participant's 50*b* Conversational Activity 210 from Round of Conversational Exchange 2001*a*, thereby simulating AI Conversation Participant's 55 activity (i.e. speaking, etc.) subsequent to User's 60 Conversational Activity 210*ja* (i.e. speaking, etc.). Decision-making Unit 510 can then perform Substantial Similarity Comparisons 125 of User's 60 Conversational Activity 210*jb* (i.e. speaking, etc.) or portion thereof from Activity Detector 160 with Conversation Participant's 50*a* Conversational Activities 210 (i.e. speaking, etc.) or portions thereof from one or more Rounds of Conversational Exchange 200 in Graph 130*b* interconnected with Round of Conversational Exchange 2001*a* by outgoing Connections 853. Conversation Participant's 50*a* Conversational Activity 210 or portion thereof from Round of Conversational Exchange 200*lb* may be found substantially similar with highest similarity. Decision-making Unit 510 may follow Connection 853*v* disregarding its less than highest weight, and play Sub-stream of Digital Pictures 145 and Sub-stream of Digital Sound Samples 155 of a correlated Conversation Participant's 50b Conversational Activity 210 from Round of Conversational Exchange 200lb, thereby simulating AI Conversation Participant's 55 activity (i.e. silent body movements, etc.) during User's 60 Conversational Activity 210jb (i.e. speaking, etc.). Playing Sub-stream of Digital Pictures 145 and Sub-stream of Digital Sound Samples 155 of the correlated Conversation Participant's 50b Conversational Activity 210 from Round of Conversational Exchange 200lb can start at any time during Substantial Similarity Comparisons 125 such as when an initial similarity is reached as later described. Decision-making Unit 510 may also play Sub-stream of Digital Pictures 145 and Sub-stream of Digital Sound Samples 155 of a subsequent Conversation Participant's 50b Conversational Activity 210 from Round of Conversational Exchange 200lb, thereby simulating AI Conversation Participant's 55 activity (i.e. speaking, etc.) subsequent to User's 60 Conversational Activity 210jb (i.e. speaking, etc.). Decision-making Unit 510 can then perform Substantial Similarity Comparisons 125 of User's 60 Conversational Activity 210jc (i.e. speaking, etc.) or portion thereof from Activity Detector 160 with Conversation Participant's 50a Conversational Activities 210 (i.e. speaking, etc.) or portions thereof from one or more Rounds of Conversational Exchange 200 in Graph 130b interconnected with Round of Conversational Exchange 200lb by outgoing Connections 853. Conversation Participant's 50a Conversational Activity 210 or portion thereof from Round of Conversational Exchange 200lc may be found substantially similar with highest similarity. Decision-making Unit 510 may follow Connection 853w disregarding its less than highest weight, and play Sub-stream of Digital Pictures 145 and Sub-stream of Digital Sound Samples 155 of a correlated Conversation Participant's 50b Conversational Activity 210 from Round of Conversational Exchange 200lc, thereby simulating AI Conversation Participant's 55 activity (i.e. motionless silence, etc.) during User's 60 Conversational Activity 210jc (i.e. speaking, etc.). Playing Sub-stream of Digital Pictures 145 and Sub-stream of Digital Sound Samples 155 of the correlated Conversation Participant's 50b Conversational Activity 210 from Round of Conversational Exchange 200lc can start at any time during Substantial Similarity Comparisons 125 such as when an initial similarity is reached as later described. Decision-making Unit 510 may also play Sub-stream of Digital Pictures 145 and Sub-stream of Digital Sound Samples 155 of a subsequent Conversation Participant's 50b Conversational Activity 210 from Round of Conversational Exchange 200lc, thereby simulating AI Conversation Participant's 55 activity (i.e. speaking, etc.) subsequent to User's 60 Conversational Activity 210jc (i.e. speaking, etc.). Since Connection 853x is the only outgoing connection from Round of Conversational Exchange 200lc, Decision-making Unit 510 may follow Connection 853x, and play Sub-stream of Digital Pictures 145 and Sub-stream of Digital Sound Samples 155 of a correlated Conversation Participant's 50b Conversational Activity 210 from Round of Conversational Exchange 200ld, thereby simulating AI Conversation Participant's 55 activity (i.e. silent body movements, etc.) during User's 60 Conversational Activity 210jd (i.e. speaking, etc.). Decision-making Unit 510 may also play Sub-stream of Digital Pictures 145 and Sub-stream of Digital Sound Samples 155 of a subsequent Conversation Participant's 50b Conversational Activity 210 from Round of Conversational Exchange 200ld, thereby simulating AI Conversation Participant's 55 activity (i.e. speaking, etc.) subsequent to User's 60 Conversational Activity 210jd (i.e. speaking, etc.). Decision-making Unit 510 can then perform Substantial Similarity Comparisons 125 of User's 60 Conversational Activity 210je (i.e. speaking, etc.) or portion thereof from Activity Detector 160 with Conversation Participant's 50a Conversational Activities 210 (i.e. speaking, etc.) or portions thereof from one or more Rounds of Conversational Exchange 200 in Graph 130b interconnected with Round of Conversational Exchange 200ld by outgoing Connections 853. None of the Conversational Activities 210 or portions thereof from one or more Rounds of Conversational Exchange 200 in Graph 130b interconnected with Round of Conversational Exchange 200ld by outgoing Connections 853 may be found substantially similar. Decision-making Unit 510 may follow the highest weight Connection 853y, and play Sub-stream of Digital Pictures 145 and Sub-stream of Digital Sound Samples 155 of a correlated Conversation Participant's 50b Conversational Activity 210 from Round of Conversational Exchange 200le, thereby simulating AI Conversation Participant's 55 activity (i.e. motionless silence, etc.) during User's 60 Conversational Activity 210je (i.e. speaking, etc.). Playing Sub-stream of Digital Pictures 145 and Sub-stream of Digital Sound Samples 155 of the correlated Conversation Participant's 50b Conversational Activity 210 from Round of Conversational Exchange 200le can start at any time during Substantial Similarity Comparisons 125 such as when a determination is made that an initial similarity has not been reached as later described. Decision-making Unit 510 may also play Sub-stream of Digital Pictures 145 and Sub-stream of Digital Sound Samples 155 of a subsequent Conversation Participant's 50b Conversational Activity 210 from Round of Conversational Exchange 200le, thereby simulating AI Conversation Participant's 55 activity (i.e. speaking, etc.) subsequent to User's 60 Conversational Activity 210je (i.e. speaking, etc.). Decision-making Unit 510 can implement similar logic or process for any additional Conversational Activities 210 from Activity Detector 160, and so on.

In both of the above described and/or other exemplary embodiments, any time that substantial similarity or other similarity threshold is not achieved in any of the compared Conversational Activities 210 or portions thereof, instead of following the highest weight Connection 853 or the only Connection 853, Decision-making Unit 510 can decide to look for a substantially or otherwise similar Conversational Activity 210 or portion thereof elsewhere in Graph 130b.

In both of the above described and/or other exemplary embodiments, as the simulated conversation progresses, a history (i.e. sequence, etc.) of User's 60 Conversational Activities 210 or portions thereof becomes available, which can then be collectively compared with Conversational Activities 210 or portions thereof from Rounds of Conversational Exchange 200 in paths of Graph 130b. Collectively comparing Conversational Activities 210 or portions thereof may enable Decision-making Unit 510 to more accurately determine or anticipate AI Conversation Participant's 55 activities in the simulated conversation. For example, Decision-making Unit 510 can perform collective Substantial Similarity Comparisons 125 of a history of User's 60 Conversational Activities 210 or portions thereof from Activity Detector 160 with Conversational Activities 210 or portions thereof from Rounds of Conversational Exchange 200 in one or more paths of Graph 130b. As additional User's 60 Conversational Activities 210 or portions thereof from Activity Detector 160 become available, Decision-making Unit 510 can use a longer history of User's 60 Conversational Activities 210 or portions thereof to compare with corresponding Conversational Activities 210 or portions thereof from Rounds of Conversational Exchange 200 in paths of Graph 130*b*. In each cycle of comparisons, Decision-making Unit 510 may choose the most similar of the compared paths and switch to a more suitable path based on such collective similarity determinations.

The foregoing exemplary embodiment provides an example of utilizing a combination of Substantial Similarity Comparisons 125, weights of Connections 853, and/or other elements and/or techniques. It should be understood that any of these elements and/or techniques can be omitted, used in a different combination, or used in combination with other elements and/or techniques, in which case the path of Rounds of Conversational Exchange 200 (or Conversational Activities 210 therein) through Graph 130*b* would be affected accordingly. Also, any of the elements and/or techniques utilized in other examples or embodiments described herein such as ancillary comparisons, concurrent comparisons, various arrangements of Conversational Activities 210 in a Round of Conversational Exchange 200, and/or others can similarly be utilized in this exemplary embodiment. One of ordinary skill in art will understand that this exemplary embodiment is described merely as an example of a variety of possible implementations, and that while all of its variations are too voluminous to describe, they are within the scope of this disclosure.

Figure 24:
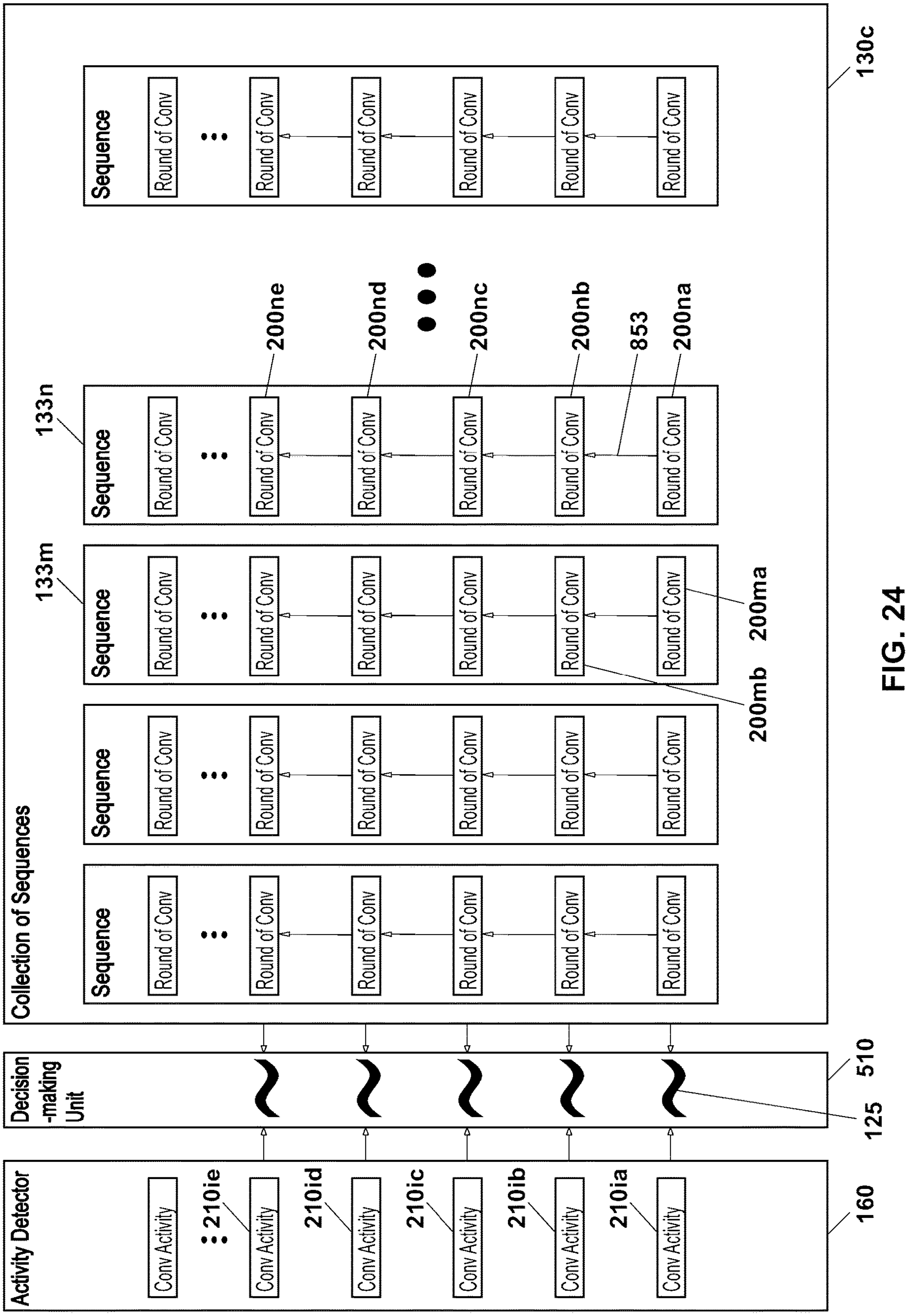
FIG. 24 illustrates an example of selecting a Sequence 133 of Rounds of Conversational Exchange 200 (or Conversational Activities 210 therein) in Collection of Sequences 130*c*.

Referring to FIG. 24, an exemplary embodiment of selecting a Sequence 133 of Rounds of Conversational Exchange 200 (or Conversational Activities 210 therein) in Collection of Sequences 130*c* is illustrated. Collection of Sequences 130*c* may include knowledge (i.e. Sequences 133 of Rounds of Conversational Exchange 200, etc.) of one or more conversations between Conversation Participants 50*a* and 50*b*. A Sequence 133 may include Rounds of Conversational Exchange 200 of one or more conversations or parts thereof. In this example, Round of Conversational Exchange 200 comprises a Conversational Activity 210 of Conversation Participant 50*a* correlated with a Conversational Activity 210 of Conversation Participant 50*b* similar to the one shown in FIG. 6A. User 60 may be the same person as Conversation Participant 50*a* or any other person. The conversation is simulated with AI Conversation Participant 55 who uses knowledge of Conversation Participant 50*b* stored in Collection of Sequences 130*c* to resemble Conversation Participant 50*b*. Collective substantial similarity of the compared Conversational Activities 210 or portions thereof, if achieved, may be used primarily for selecting a Sequence 133 in Collection of Sequences 130*c*. As the simulated conversation progresses, Decision-making Unit 510 can receive User's 60 Conversational Activities 210 or portions thereof from Activity Detector 160.

For example, Decision-making Unit 510 can perform Substantial Similarity Comparisons 125 of User's 60 Conversational Activity 210*ia* (i.e. speaking, etc.) or portion thereof from Activity Detector 160 with Conversation Participant's 50*a* Conversational Activities 210 or portions thereof from corresponding Rounds of Conversational Exchange 200 in Collection of Sequences 130*c*. Conversation Participant's 50*a* Conversational Activity 210 or portion thereof from Round of Conversational Exchange 200*ma* in Sequence 133*m* may be found substantially similar with highest similarity. Decision-making Unit 510 may play Sub-stream of Digital Pictures 145 and Sub-stream of Digital Sound Samples 155 of Conversation Participant's 50*b* Conversational Activity 210 from Round of Conversational Exchange 200*ma*, thereby simulating AI Conversation Participant's 55 activity (i.e. silent body movements, etc.) during User's 60 Conversational Activity 210*ia* (i.e. speaking, etc.). Playing Sub-stream of Digital Pictures 145 and Sub-stream of Digital Sound Samples 155 of Conversation Participant's 50*b* Conversational Activity 210 from Round of Conversational Exchange 200*ma* can start at any time during Substantial Similarity Comparisons 125 such as when an initial similarity is reached as later described. Decision-making Unit 510 can then perform collective Substantial Similarity Comparisons 125 of User's 60 Conversational Activities 210*ia*-210*ib* or portions thereof from Activity Detector 160 with Conversation Participant's 50*a* Conversational Activities 210 or portions thereof from corresponding Rounds of Conversational Exchange 200 in Collection of Sequences 130*c*. Conversation Participant's 50*a* Conversational Activities 210 or portions thereof from Rounds of Conversational Exchange 200*ma*-200*mb* in Sequence 133*m* may be found substantially similar with highest similarity. Decision-making Unit 510 may play Sub-stream of Digital Pictures 145 and Sub-stream of Digital Sound Samples 155 of Conversation Participant's 50*b* Conversational Activity 210 from Round of Conversational Exchange 200*mb*, thereby simulating AI Conversation Participant's 55 activity (i.e. speaking, etc.) during User's 60 Conversational Activity 210*ib* (i.e. motionless silence, etc.). Playing Sub-stream of Digital Pictures 145 and Sub-stream of Digital Sound Samples 155 of Conversation Participant's 50*b* Conversational Activity 210 from Round of Conversational Exchange 200*mb* can start at any time during Substantial Similarity Comparisons 125 such as when an initial similarity is reached as later described. Decision-making Unit 510 can then perform collective Substantial Similarity Comparisons 125 of User's 60 Conversational Activities 210*ia*-210*ic* or portions thereof from Activity Detector 160 with Conversation Participant's 50*a* Conversational Activities 210 or portions thereof from corresponding Rounds of Conversational Exchange 200 in Collection of Sequences 130*c*. Conversation Participant's 50*a* Conversational Activities 210 or portions thereof from Rounds of Conversational Exchange 200*na*-200*nc* in Sequence 133*n* may be found substantially similar with highest similarity. Decision-making Unit 510 may play Sub-stream of Digital Pictures 145 and Sub-stream of Digital Sound Samples 155 of Conversation Participant's 50*b* Conversational Activity 210 from Round of Conversational Exchange 200*nc*, thereby simulating AI Conversation Participant's 55 activity (i.e. silent facial expressions, etc.) during User's 60 Conversational Activity 210*ic* (i.e. speaking, etc.). Playing Sub-stream of Digital Pictures 145 and Sub-stream of Digital Sound Samples 155 of Conversation Participant's 50*b* Conversational Activity 210 from Round of Conversational Exchange 200*nc* can start at any time during Substantial Similarity Comparisons 125 such as when an initial similarity is reached as later described. Decision-making Unit 510 can then perform collective Substantial Similarity Comparisons 125 of User's 60 Conversational Activities 210*ia*-210*id* or portions thereof from Activity Detector 160 with Conversation Participant's 50*a* Conversational Activities 210 or portions thereof from corresponding Rounds of Conversational Exchange 200 in Collection of Sequences 130*c*. Conversation Participant's 50*a* Conversational Activities 210 or portions thereof from Rounds of Conversational Exchange 200*na*-200*nd* in Sequence 133*n* may be found substantially similar with highest similarity. Decision-making Unit 510 may play Sub-stream of Digital Pictures 145 and Sub-stream of Digital Sound Samples 155 of Conversation Participant's 50*b* Conversational Activity 210 from Round of Conversational Exchange 200*nd*, thereby simulating AI Conversation Participant's 55 activity (i.e. speaking, etc.) during User's 60 Conversational Activity 210*id* (i.e. silent facial expressions, etc.). Playing Sub-stream of Digital Pictures 145 and Sub-stream of Digital Sound Samples 155 of Conversation Participant's 50*b* Conversational Activity 210 from Round of Conversational Exchange 200*nd* can start at any time during Substantial Similarity Comparisons 125 such as when an initial similarity is reached as later described. Decision-making Unit 510 can then perform collective Substantial Similarity Comparisons 125 of User's 60 Conversational Activities 210*ia*-210*ie* or portions thereof from Activity Detector 160 with Conversation Participant's 50*a* Conversational Activities 210 or portions thereof from corresponding Rounds of Conversational Exchange 200 in Collection of Sequences 130*c*. Conversation Participant's 50*a* Conversational Activities 210 or portions thereof from Rounds of Conversational Exchange 200*na*-200*ne* in Sequence 133*n* may be found substantially similar with highest similarity. Decision-making Unit 510 may play Sub-stream of Digital Pictures 145 and Sub-stream of Digital Sound Samples 155 of Conversation Participant's 50*b* Conversational Activity 210 from Round of Conversational Exchange 200*ne*, thereby simulating AI Conversation Participant's 55 activity (i.e. silent facial expressions, etc.) during User's 60 Conversational Activity 210*ie* (i.e. speaking, etc.). Playing Sub-stream of Digital Pictures 145 and Sub-stream of Digital Sound Samples 155 of Conversation Participant's 50*b* Conversational Activity 210 from Round of Conversational Exchange 200*ne* can start at any time during Substantial Similarity Comparisons 125 such as when an initial similarity is reached as later described. Decision-making Unit 510 can implement similar logic or process for any additional Conversational Activities 210 from Activity Detector 160, and so on.

In some embodiments, various elements and/or techniques can be utilized in the aforementioned collective substantial similarity determinations. In some aspects, collective substantial similarity of the compared Conversational Activities 210 can be determined based on similarities or similarity indexes of the individually compared Conversational Activities 210. For example, an average or weighted average of similarities or similarity indexes of individually compared Conversational Activities 210 can be used to determine collective similarity of the compared Conversational Activities 210. For instance, to affect the weighting of the collective similarity, a higher weight or importance (i.e. importance index, etc.) can be assigned to the similarities or similarity indexes of the current and/or recent Conversational Activities 210 and decreased for Conversational Activities 210 in the past. In another instance, a higher weight or importance (i.e. importance index, etc.) can be assigned to the similarities or similarity indexes of speaking Conversational Activities 210 while lower weight or importance (i.e. importance index, etc.) can be assigned to the similarities or similarity indexes of observing Conversational Activities 210 (i.e. silent facial expressions, silent body movements, motionless silence, etc.). Any other higher or lower importance assignment can be implemented. In other aspects, collective substantial similarity of the compared Conversational Activities 210 can be determined based on similarities or similarity indexes of Sub-streams of Digital Pictures 145 and/or Sub-streams of Digital Sound Samples 155 in the compared Conversational Activities 210. For example, an average or weighted average of similarities or similarity indexes of some or all Sub-streams of Digital Pictures 145 and/or Sub-streams of Digital Sound Samples 155 of the compared Conversational Activities 210 can be used to determine collective similarity of the compared Conversational Activities 210. For instance, to affect the weighting of the collective similarity, a higher weight or importance (i.e. importance index, etc.) can be assigned to the similarities or similarity indexes of Sub-streams of Digital Pictures 145 and/or Sub-streams of Digital Sound Samples 155 in the current and/or recent Conversational Activities 210 and decreased for Conversational Activities 210 in the past. In another instance, a higher weight or importance (i.e. importance index, etc.) can be assigned to similarities or similarity indexes of Sub-streams of Digital Pictures 145 and/or Sub-streams of Digital Sound Samples 155 in speaking Conversational Activities 210 while lower weight or importance (i.e. importance index, etc.) can be assigned to similarities or similarity indexes of Sub-streams of Digital Pictures 145 and/or Sub-streams of Digital Sound Samples 155 in observing Conversational Activities 210 (i.e. silent facial expressions, silent body movements, motionless silence, etc.). Any other higher or lower importance assignment can be implemented. In further aspects, collective substantial similarity of the compared Conversational Activities 210 can be determined based on similarity of some or all words, features, sound samples, and/or other elements of Sub-stream of Digital Sound Samples 155 in the compared Conversational Activities 210. In further aspects, collective substantial similarity of the compared Conversational Activities 210 can be determined based on similarity of some or all pictures (i.e. frames, etc.), features, regions, pixels, and/or other elements of Sub-stream of Digital Pictures 145 in the compared Conversational Activities 210. A threshold for collective substantial similarity can be utilized with any of the aforementioned elements and/or techniques. For example, collective substantial similarity of the compared Conversational Activities 210 can be achieved if collective similarity of their elements exceeds a threshold. Such threshold can be defined by a user, by AIIM system administrator, or automatically by the system based on experience, testing, inquiry, analysis, synthesis, or other techniques, knowledge, or input. Any combination of the previously described collective substantial similarity determinations or calculations can be utilized in alternate embodiments. Any other elements and/or techniques can be utilized to determine or calculate collective substantial similarity in alternate embodiments. Similar elements and/or techniques as the aforementioned can be used for collective similarity determinations of other compared elements such as Rounds of Conversational Exchange 200 and/or others. Collective similarity determinations may include any features, functionalities, and embodiments of Substantial Similarity Comparison 125.

In other embodiments, Collection of Sequences 130*c* may enable User 60 to manually choose a particular conversation or part thereof contained in a Sequence 133. For example, Collection of Sequences 130*c* can be shown via a graphical user interface (GUI) and User 60 may select a particular Sequence 133 to implement. The system can simulate a conversation or part thereof contained in the selected Sequence 133 and enable User 60 to recall his/her memories of that particular conversation.

The foregoing exemplary embodiment provides an example of utilizing collective substantial similarity determinations and/or other elements or techniques. It should be understood that any of these elements and/or techniques can be omitted, used in a different combination, or used in combination with other elements and/or techniques, in which case the choice of Sequence 133 in Collection of Sequences 130*c* would be affected accordingly. Also, any of the elements and/or techniques utilized in other examples or embodiments described herein such as individual Substantial Similarity Comparisons 125, ancillary comparisons, concurrent comparisons, various arrangements of Conversational Activities 210 in a Round of Conversational Exchange 200, and/or others can similarly be utilized in this exemplary embodiment. One of ordinary skill in art will understand that this exemplary embodiment is described merely as an example of a variety of possible implementations, and that while all of its variations are too voluminous to describe, they are within the scope of this disclosure.

Figure 25:
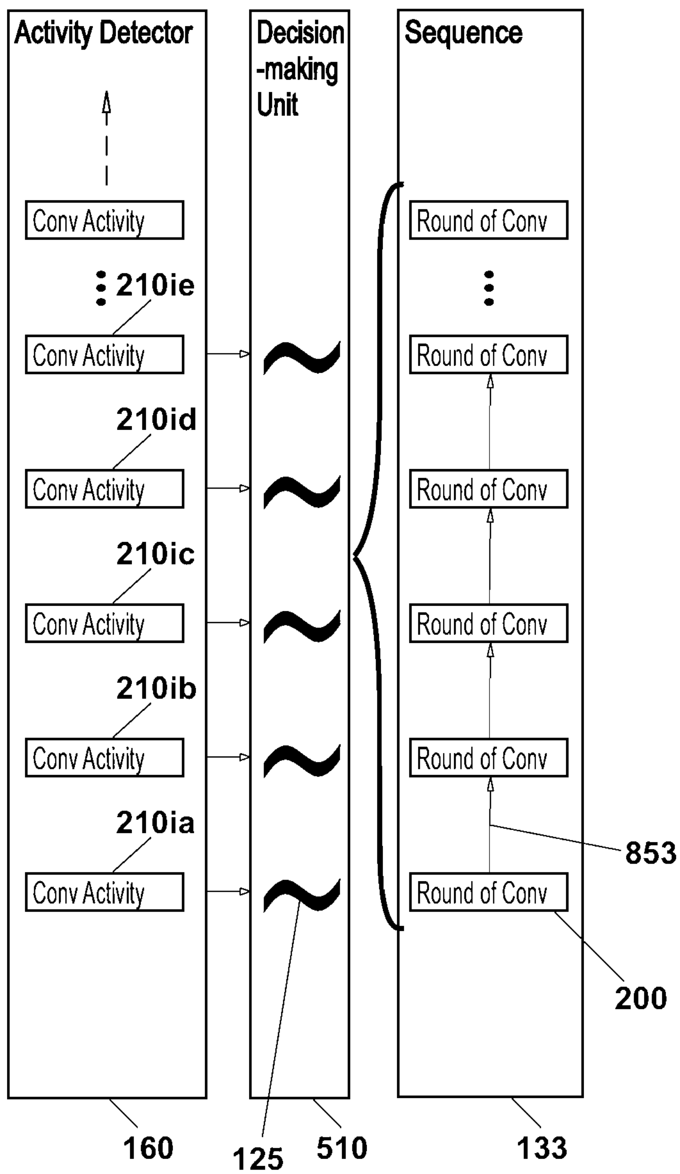
FIG. 25 illustrates an example of selecting Rounds of Conversational Exchange 200 (or Conversational Activities 210 therein) in a single Sequence 133.

Referring to FIG. 25, an exemplary embodiment of selecting Rounds of Conversational Exchange 200 (or Conversational Activities 210 therein) in a single Sequence 133 is illustrated. The single Sequence 133 may include knowledge (i.e. Rounds of Conversational Exchange 200, etc.) of one or more conversations or portions thereof between Conversation Participants 50*a* and 50*b*. In this example, Round of Conversational Exchange 200 comprises a Conversational Activity 210 of Conversation Participant 50*a* correlated with a Conversational Activity 210 of Conversation Participant 50*b* similar to the one shown in FIG. 6A. User 60 may be the same person as Conversation Participant 50*a* or any other person. The conversation is simulated with AI Conversation Participant 55 who uses knowledge of Conversation Participant 50*b* stored in single Sequence 133 to resemble Conversation Participant 50*b*. Individual or collective substantial similarity of the compared Conversational Activities 210 or portions thereof, if achieved, may be used primarily for selecting Rounds of Conversational Exchange 200 in Sequence 133. As the simulated conversation progresses, Decision-making Unit 510 can receive User's 60 Conversational Activities 210 or portions thereof from Activity Detector 160.

In some aspects, Decision-making Unit 510 can perform the previously described individual Substantial Similarity Comparisons 125 of User's 60 Conversational Activities 210 or portions thereof from Activity Detector 160 with Conversational Activities 210 or portions thereof from Rounds of Conversational Exchange 200 in Sequence 133. Such individual Substantial Similarity Comparisons 125 can be performed by traversing Sequence 133. For example, Decision-making Unit 510 can perform individual Substantial Similarity Comparisons 125 of User's 60 Conversational Activity 210 or portion thereof from Activity Detector 160 with Conversational Activities 210 or portions thereof from Rounds of Conversational Exchange 200 of Sequence 133 in incremental or other traversing pattern. The incremental traversing may start from one end of Sequence 133 and move the comparison up or down one (i.e. or any amount, etc.) incremental Conversational Activity 210 at a time. Other traversing patterns or methods can be employed such as starting from the middle of the Sequence 133 and subdividing the resulting subsequences in a recursive pattern, or any other traversing pattern or method.

In other aspects, Decision-making Unit 510 can perform the previously described collective Substantial Similarity Comparisons 125 of a history (i.e. a sequence itself, etc.) of User's 60 Conversational Activities 210 or portions thereof from Activity Detector 160 with Conversational Activities 210 or portions thereof from Rounds of Conversational Exchange 200 in subsequences of Sequence 133. Such collective Substantial Similarity Comparisons 125 can be performed by traversing Sequence 133. For example, Decision-making Unit 510 can perform collective Substantial Similarity Comparisons 125 of a history of User's 60 Conversational Activities 210 or portions thereof from Activity Detector 160 with Conversational Activities 210 or portions thereof from Rounds of Conversational Exchange 200 in subsequences of Sequence 133 in the previously described incremental, recursive, or other traversing pattern. As additional User's 60 Conversational Activities 210 or portions thereof from Activity Detector 160 become available, Decision-making Unit 510 can use a longer history of User's 60 Conversational Activities 210 or portions thereof to compare with Conversational Activities 210 or portions thereof from Rounds of Conversational Exchange 200 in subsequences of Sequence 133. In each cycle of comparisons, Decision-making Unit 510 may choose the most similar of the compared subsequences and switch to a more suitable subsequence based on such collective similarity determinations.

In some designs, a Round of Conversational Exchange 200 can be connected not only with a next Round of Conversational Exchange 200 in Sequence 133, but also with any other Round of Conversational Exchange 200, thereby creating alternate routes or shortcuts through Sequence 133. Any number of Connections 853 connecting any Rounds of Conversational Exchange 200 in Sequence 133 can be utilized. In such implementations, Decision-making Unit 510 can perform Substantial Similarity Comparisons 125 of User's 60 Conversational Activity 210 or portion thereof from Activity Detector 160 with Conversational Activities 210 or portions thereof from Rounds of Conversational Exchange 200 in Sequence 133 interconnected with prior Round of Conversational Exchange 200 by outgoing Connections 853, for example. Decision-making Unit 510 can then follow a Connection 853 based on similarity determinations as previously described. In alternate designs, Connections 853 can be optionally omitted from a Sequence 133 that does not include shortcuts.

In both of the above described and/or other exemplary embodiments, any time that substantial similarity or other similarity threshold is not achieved in one or more of the compared Conversational Activities 210 or portions thereof, Decision-making Unit 510 can decide to look for one or more substantially or otherwise similar Conversational Activities 210 or portions thereof in any one or more Sequences 133.

The foregoing exemplary embodiment provides an example of utilizing individual or collective substantial similarity determinations and/or other elements or techniques. It should be understood that any of these elements and/or techniques can be omitted, used in a different combination, or used in combination with other elements and/or techniques, in which case the choice of Sequence 133 or Rounds of Conversational Exchange 200 (or Conversational Activities 210 therein) in a Sequence 133 would be affected accordingly. Also, any of the elements and/or techniques utilized in other examples or embodiments described herein such as ancillary comparisons, concurrent comparisons, various arrangements of Conversational Activities 210 in a Round of Conversational Exchange 200, and/or others can similarly be utilized in this exemplary embodiment. One of ordinary skill in art will understand that this exemplary embodiment is described merely as an example of a variety of possible implementations, and that while all of its variations are too voluminous to describe, they are within the scope of this disclosure.

Referring now to the aforementioned initial similarity determinations, in some embodiments, it may be desirable to implement an AI Conversation Participant's 55 activity soon or immediately after User 60 starts his/her corresponding Conversational Activity 210. Decision-making Unit 510 does not need to wait to receive an entire User's 60 Conversational Activity 210 in order to compare it with Conversational Activities 210 from Rounds of Conversation Exchange 200 stored in Knowledgebase 130, Neural Network 130*a*, Graph 130*b*, Collection of Sequences 130*c*, Sequence 133, and/or other data structure, knowledge structure, or repository. Instead, Decision-making Unit 510 can perform Substantial Similarity Comparisons 125 of portions of Conversational Activities 210 to determine initial similarity at anytime while User 60 performs his/her Conversational Activity 210. Such portions of Conversational Activities 210 may include pictures (i.e. frames, etc.), features, regions, pixels, or other elements of Sub-streams of Digital Pictures 145 and/or words, features, sound samples, or other elements of Sub-streams of Digital Sound Samples 155 included in the Conversational Activities 210. For example, to determine initial similarity, Decision-making Unit 510 can utilize incoming words as they are received from User 60 in real time. Specifically, in this example, as initial one or more words come from User 60, Decision-making Unit 510 can perform Substantial Similarity Comparisons 125 of these words with words of Conversation Participant's 50*a* Conversational Activities 210 from one or more Rounds of Conversational Exchange 200 stored in Knowledgebase 130, Neural Network 130*a*, Graph 130*b*, Collection of Sequences 130*c*, Sequence 133, and/or other data structure, knowledge structure, or repository. If a threshold for initial similarity is not achieved, Substantial Similarity Comparison 125 can use an additional word coming from User 60 to determine initial similarity. If a threshold for initial similarity is still not achieved, Substantial Similarity Comparison 125 can use additional incoming words, thereby further increasing the number of words used in the initial similarity determination until initial similarity is achieved. Similar logic or process for determining initial similarity can be implemented with incoming sound features, incoming sound samples, incoming pictures (i.e. frames, etc.), incoming regions of pixels, incoming picture features, incoming pixels, and/or other elements of Sub-stream of Digital Sound Samples 155 and/or Sub-stream of Digital Pictures 145. At any point when initial similarity is determined for any of the compared Conversational Activities 210 or portions thereof, Decision-making Unit 510 can play Sub-stream of Digital Pictures 145 and Sub-stream of Digital Sound Samples 155 of a Conversational Activity 210 correlated with the initially similar Conversational Activity 210, thereby simulating AI Conversation Participant's 55 activity during User's 60 corresponding Conversational Activity 210. Therefore, initial similarity determination enables quickly determining a best guess of Conversational Activity 210 to use for simulating AI Conversation Participant 55. Decision-making Unit 510 can switch from an initially similar Conversational Activity 210 to a better Conversational Activity 210 if a better initial, substantial, or other similarity is determined. For example, after initial similarity is determined for a Conversational Activity 210, Decision-making Unit 510 can continue performing Substantial Similarity Comparisons 125 in attempt to find even better initial or other similarity in other Conversational Activities 210, and if found, Decision-making Unit 510 can switch to the more similar Conversational Activity 210 for simulating AI Conversation Participant 55. In some aspects, Decision-making Unit 510 may adjust the length of Sub-stream of Digital Pictures 145 and Sub-stream of Digital Sound Samples 155 of the initially similar Conversational Activity 210 to synchronize their playing with User's 60 Conversational Activity 210. In other aspects, if initial similarity is not achieved after a threshold number of attempts or threshold period of time, Decision-making Unit 510 can use weights of Connections 853 and/or alternative elements or techniques in selecting Conversational Activity 210 for simulating AI Conversation Participant 55.

Referring to some embodiments of System for Using AIIMs 500, in cases where Decision-making Unit 510 does not find a substantially or otherwise acceptably similar Conversational Activity 210 in any of the considered Rounds of Conversational Exchange 200 stored in Knowledgebase 130, Neural Network 130*a*, Graph 130*b*, Collection of Sequences 130*c*, Sequence 133, and/or other data structure, knowledge structure, or repository, Decision-making Unit 510 can utilize various techniques instead of or in addition to Connections 853 in selecting a conversational path. In some aspects, Decision-making Unit 510 can play a message such as "I did not understand that", "what was that", "I do not recall that", or other message that offers User 60 a chance to after the path of conversation by inputting another Conversational Activity 210. The redirecting message itself can be learned by System for Learning AIIMs 100 through the previously described learning process of conversations. One or more such learned redirecting messages can be stored in a special repository dedicated to conversation redirecting functionalities. A redirecting message may include one or more Conversational Activities 210 and/or other elements. In one example, System for Learning AIIMs 100 may include a list of redirecting phrases or messages to look for such as "what was that", "I did not understand that", "I don't recall that", or other messages, which when detected in a conversation may be learned by System for Learning AIIMs 100 and stored in the special repository comprising redirecting messages. In another example, the system may ask Conversation Participant 50 to speak redirecting messages, which System for Learning AIIMs 100 may learn and store in the special repository. Such "training session" may be performed during system configuration or at any time convenient for the user. In other aspects, instead of offering User 60 a chance to alter the path of conversation as aforementioned, Decision-making Unit 510 itself may attempt to redirect the conversation by playing a redirecting message such as "let's talk about", "let me tell you", "you know", or other message, after which, Decision-making Unit 510 can direct User 60 into an alternate conversational path (i.e. follow highest weight or other Connection 853, etc.). Such redirecting message can be learned automatically or through training as previously described. In further aspects, Decision-making Unit 510 can present User 60 with a map or other representation of conversational paths comprising Rounds of Conversational Exchange 200 and/or Conversational Activities 210 where User 60 can manually choose which conversational path to pursue. User 60 can choose by clicking on paths or on individual Rounds of Conversational Exchange 200 and/or Conversational Activities 210 in a graphical or other interface.

Referring to some embodiments of System for Using AIIMs 500, in cases where Decision-making Unit 510 runs out of conversational path, Decision-making Unit 510 can utilize various techniques in redirecting to a new conversational path. In some aspects, Decision-making Unit 510 can play a message such as "what else would you like to talk about", "what else interests you", "how about we talk about something else", or other message that offers User 60 a chance to continue the simulated conversation by inputting another Conversational Activity 210. In other aspects, instead of offering User 60 a chance to continue the simulated conversation in a path that User 60 wants, Decision-making Unit 510 itself may attempt to redirect the conversation by playing a redirecting message such as "let's talk about", "let me tell you", "you know", or other message, after which, Decision-making Unit 510 can direct User 60 into a new conversational path as previously described. Any of the aforementioned redirecting messages can be learned automatically or through training as previously described. In further aspects, Decision-making Unit 510 can present User 60 with a map or other representation of conversational paths comprising Rounds of Conversational Exchange 200 and/or Conversational Activities 210 where User 60 can manually choose which new conversational path to pursue as previously described.

Referring to some embodiments of System for Using AIIMs 500, in cases where Decision-making Unit 510 needs to use Connections 853 (i.e. if substantially or otherwise similar Conversational Activity 210 is not found, etc.) in a conversational path, Decision-making Unit 510 can at times decide to follow a random Connection 853 instead of following the highest weight Connection 853. Following a random Connection 853 may avoid a potential issue of one or more Connections 853 becoming so frequent and dominant that they would not allow alternative paths to be considered or selected.

Referring to some embodiments of System for Using AIIMs 500, in cases where User 60 starts speaking while AI Conversation Participant 55 speaks (i.e. performs a speaking activity, etc.), AI Conversation Participant's 55 speaking can be interrupted and the process of finding a Conversational Activity 210 that is substantially or otherwise similar to User's 60 speaking Conversational Activity 210 and implementing a correlated Conversational Activity 210 by AI Conversation Participant 55 can restart as previously described. The system can therefore give priority to User 60 over AI Conversation Participant 55 in a simulated conversation.

Referring to some embodiments of System for Using AIIMs 500, Decision-making Unit 510 can use various transitioning techniques to switch from one Conversational Activity 210 to another. For example, such transitioning can be implemented when one AI Conversation Participant's 55 Conversational Activity 210 ends and another starts. Transitioning among Conversational Activities 210 enables a simulated conversation to be perceived as smooth or uninterrupted, thereby enhancing User 60 experience. Transitioning mostly relates to visual appearance of AI Conversation Participant 55 in a simulated conversation, although, sound transitioning can also be implemented. Transitioning may include a seamless visual blending of AI Conversation Participant 55 in the last picture of a preceding Sub-stream of Digital Pictures 145 and AI Conversation Participant 55 in the first picture of a subsequent Sub-stream of Digital Pictures 145. In some aspects, transitioning includes moving, centering, aligning, resizing, and/or otherwise transforming AI Conversation Participant's 55 figure (i.e. face, upper body, etc.) or picture within which AI Conversation Participant's 55 figure resides. In one example, AI Conversation Participant's 55 figure can be centered on screen throughout the simulated conversation to smooth the positioning aspect of the transition. Any other moving or aligning can similarly be implemented. In another example, AI Conversation Participant's 55 figure can be resized to a certain size throughout the simulated conversation to smooth the size aspect of the transition. The size can be defined by a user, by AIIM system administrator, or automatically by the system. Any of the previously described resizing and/or other transforming can be utilized in the transitioning. In other aspects, transitioning includes lighting or color adjustments of AI Conversation Participant's 55 figure or picture within which AI Conversation Participant's 55 figure resides. In one example, a certain level or balance of lighting or color can be maintained for AI Conversation Participant's 55 figure throughout the simulated conversation to smooth the lighting or color aspect of the transition. In another example, AI Conversation Participant's 55 figure's lighting or color can be adjusted to better resemble AI Conversation Participant's 55 figure in a preceding Sub-stream of Digital Pictures 145. Any of the previously described lighting or color adjustments can be utilized in the transitioning. In further aspects, transitioning includes a cut, dissolve, and/or other motion picture editing techniques suitable for transitioning between motion pictures. In one example, a cut can be used to switch instantly from one Sub-stream of Digital Pictures 145 to another without any picture processing. In another example, a dissolve (i.e. cross-dissolve, etc.) can be used to gradually transition from one Sub-stream of Digital Pictures 145 to another. In other aspects, transitioning includes morphing and/or other transformations of AI Conversation Participant's 55 figure or picture within which AI Conversation Participant's 55 figure resides. Morphing may involve the steps of warping and cross-dissolving in some implementations. Specifically, morphing comprises defining corresponding points on two pictures and distorting one picture into the other as they cross-dissolve. Defining the corresponding points on the pictures can be performed automatically using picture or facial recognition techniques that can detect corners, blobs, and/or other points of interest on a picture as previously described. Any features, functionalities, and embodiments of Picture Recognizer 163 can be used in transitioning or morphing. In one example, one AI Conversation Participant's 55 figure can be morphed into another by detecting significant points such as the contour of the nose, locations of eyes, corners of the mouth, and/or other facial or body points on both AI Conversation Participant's 55 figures. Morphing can then distort the first AI Conversation Participant's 55 figure into the shape of the second AI Conversation Participant's 55 figure while cross-dissolving the two AI Conversation Participant's 55 figures. Beier and Neely, and/or other algorithm can be used to compute the transformation of image coordinates required for the distortion or warping. Other morphing or warping techniques can be used such as mesh/grid-based warping, feature-based morphing, and/or others. One of ordinary skill in art will understand that the aforementioned transitioning techniques are described merely as examples of a variety of possible implementations, and that while all possible transitioning techniques are too voluminous to describe, other transitioning techniques known in art are within the scope of this disclosure.

Referring to some embodiments of System for Using AIIMs 500, Decision-making Unit 510 can use various bridging techniques to fill a gap between Conversational Activities 210. For example, such bridging can be implemented when a next AI Conversation Participant's 55 Conversational Activity 210 is not yet known or missing. Bridging among Conversational Activities 210 enables a simulated conversation to be perceived as smooth or uninterrupted, thereby enhancing User 60 experience. Bridging mostly relates to visual appearance of AI Conversation Participant 55 in a simulated conversation, although, sound bridging can also be implemented. Bridging may include generating or creating intermediate pictures (i.e. frames, etc.) between two Sub-streams of Digital Pictures 145 to give the appearance that AI Conversation Participant 55 in a preceding Sub-stream of Digital Pictures 145 evolves smoothly into AI Conversation Participant 55 in a subsequent Sub-stream of Digital Pictures 145. Any features, functionalities, and embodiments of the previously described transitioning can be used in bridging. In some aspects, bridging includes interpolation, inbetweening, extrapolation, and/or other picture or frame generation technique. In one example, interpolation and/or inbetweening can be used to generate intermediate pictures (i.e. frames, etc.) between the last picture of a preceding Sub-stream of Digital Pictures 145 and the first picture of a subsequent Sub-stream of Digital Pictures 145. In other aspects, bridging includes playing or replaying one or more Sub-streams of Digital Pictures 145 or portions thereof. In one example, a simple way to bridge between Sub-streams of Digital Pictures 145 is to repeatedly replay or freeze the last picture (i.e. frame, etc.) of a preceding Sub-stream of Digital Pictures 145 until a subsequent Sub-stream of Digital Pictures 145 is known. This approach can be used in any implementation, but may provide realistic bridging for short duration gaps. In another example, a portion (i.e. certain number of rearmost pictures, etc.) of a preceding Sub-stream of Digital Pictures 145 can be repeatedly replayed until a subsequent Sub-stream of Digital Pictures 145 is known. In a further example, the entire preceding Sub-stream of Digital Pictures 145 can be repeatedly replayed until a subsequent Sub-stream of Digital Pictures 145 is known. In a further example, any one or more Sub-streams of Digital Pictures 145 or portions (i.e. certain number of pictures, etc.) thereof can be played or repeatedly replayed until a subsequent Sub-stream of Digital Pictures 145 is known. In such implementations, one or more Sub-streams of Digital Pictures 145 from a similar Conversational Activity 210 may be best suited to play or replay. For instance, if bridging is needed between an observing Conversational Activity 210 (i.e. silent facial expressions, silent body movements, motionless silence, etc.) and a speaking Conversational Activity 210, a Sub-stream of Digital Pictures 145 from another observing Conversational Activity 210, preferably of the same type, can be played or replayed until the speaking Conversational Activity 210 is known. One of ordinary skill in art will understand that the aforementioned bridging techniques are described merely as examples of a variety of possible implementations, and that while all possible bridging techniques are too voluminous to describe, other bridging techniques known in art are within the scope of this disclosure.

Figure 26:
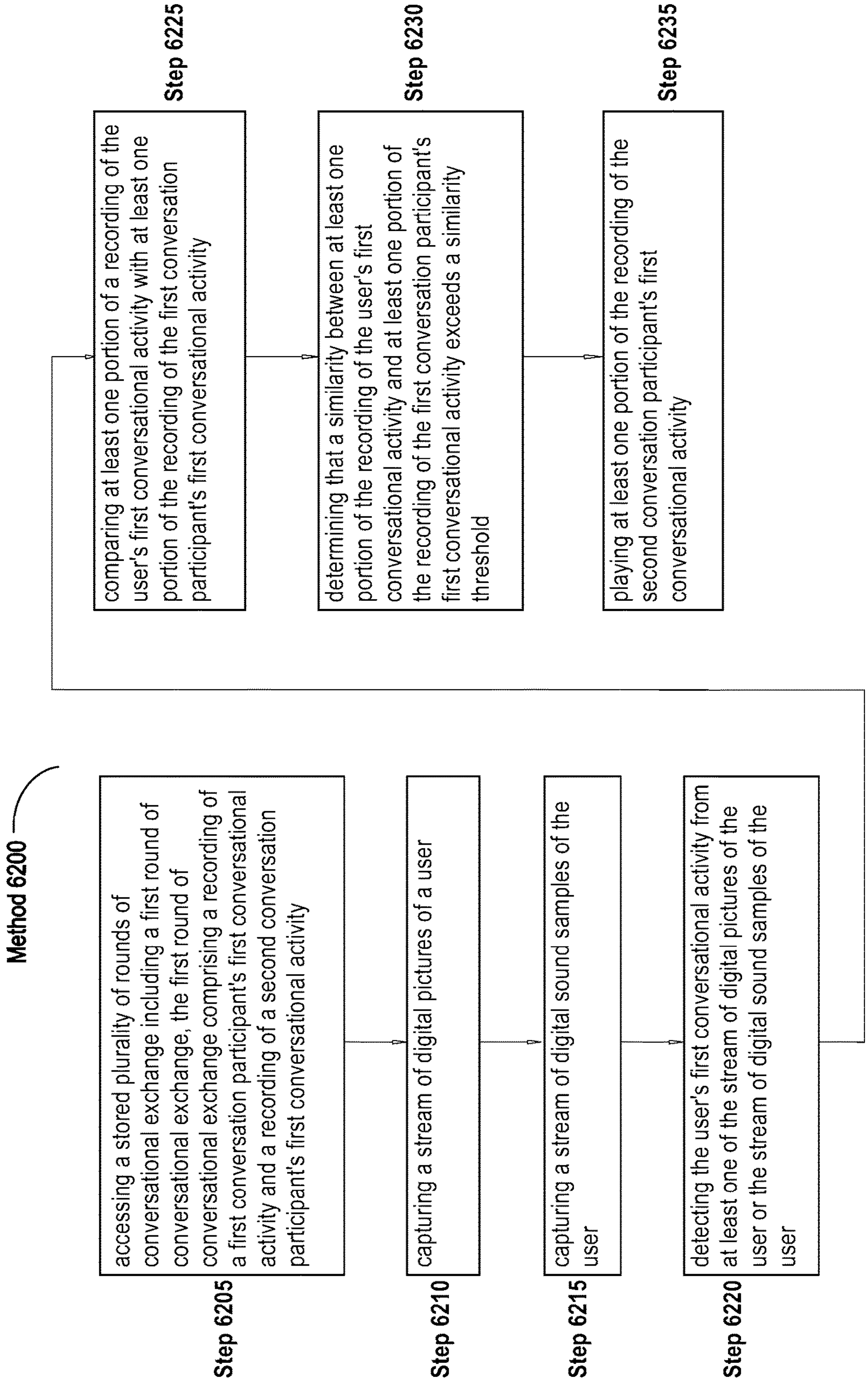
FIG. 26 illustrates a flow chart diagram of an embodiment of method 6200 for using AIIMs.

Referring to FIG. 26, the illustration shows an embodiment of a method 6200 for using AIIMs. The method can be used on a computing device or system to enable simulating a conversation with an artificially intelligent conversation participant. The computing device or system may include a user device (i.e. User Device 80, etc.), a server (i.e. Server 90, etc.), a dedicated device, a host device (i.e. Host Device 98, etc.) or an embedded element thereof, and/or others. Method 6200 may include any action or operation of any of the disclosed methods such as method 6100 and/or others. Other additional steps, actions, or operations can be included as needed, or some of the disclosed ones can be optionally omitted, or a different combination or order thereof can be implemented in alternate embodiments of method 6200.

At step 6205, a stored plurality of rounds of conversational exchange including a first round of conversational exchange are accessed, the first round of conversational exchange comprising a recording of a first conversation participant's first conversational activity and a recording of a second conversation participant's first conversational activity. The stored plurality of rounds of conversational exchange comprise any features, functionalities, and embodiments of the stored plurality of rounds of conversational exchange described in steps 6135 and/or 6140 of method 6100 as applicable.

At step 6210, a stream of digital pictures of a user is captured. Step 6210 may include any action or operation described in step 6105 of method 6100 as applicable.

At step 6215, a stream of digital sound samples of the user is captured. Step 6215 may include any action or operation described in step 6110 of method 6100 as applicable.

At step 6220, the user's first conversational activity is detected from at least one of the stream of digital pictures of the user or the stream of digital sound samples of the user. Step 6220 may include any action or operation described in step 6125 of method 6100 as applicable.

At step 6225, at least one portion of a recording of the user's first conversational activity are compared with at least one portion of the recording of the first conversation participant's first conversational activity. A portion of a recording of a conversational activity (i.e. Conversational Activity 210, etc.) may include sub-stream of digital sound samples (i.e. Sub-stream of Digital Sound Samples 155, etc.) or portion (i.e. word, feature, sound sample, etc.) thereof. A portion of a recording of a conversational activity may include sub-stream of digital pictures (i.e. Sub-stream of Digital Pictures 145, etc.) or portion (i.e. picture, feature, region of pixels, pixel, etc.) thereof. In some embodiments, the comparing may include comparing sub-stream of digital sound samples or portions thereof of one recording of conversational activity with sub-stream of digital sound samples or portions thereof of another recording of conversational activity. In some aspects, the comparing may include comparing one or more words recognized from one sub-stream of digital sound samples with one or more words recognized from another sub-stream of digital sound samples. In other aspects, the comparing may include comparing one or more features (i.e. sound features, etc.) from one sub-stream of digital sound samples with one or more sound features (i.e. sound features, etc.) from another sub-stream of digital sound samples. In further aspects, the comparing may include comparing sound samples from one sub-stream of digital sound samples with sound samples from another sub-stream of digital sound samples. In further aspects, Dynamic Time Warping (DTW) and/or other adjustments or techniques can be utilized for comparing and/or aligning temporal sequences (i.e. sub-streams of digital sound samples, etc.) that may vary in time or speed. Comparing may also include other aspects or properties of digital sound or sound samples examples of which comprise amplitude adjustment, sample rate or frequency adjustment, noise reduction, and/or others. In other embodiments, the comparing may include comparing sub-stream of digital pictures or portions thereof of one recording of conversational activity with sub-stream of digital pictures or portions thereof of another recording of conversational activity. In some designs, Dynamic Time Warping (DTW) and/or other adjustments or techniques can be utilized for comparison and/or aligning temporal sequences (i.e. sub-streams of digital pictures, etc.) that may vary in time or speed. In some aspects, the comparing may include comparing pictures from one sub-stream of digital pictures with pictures from another sub-stream of digital pictures. In some aspects, comparing of individual pictures (i.e. pictures from the sub-streams of digital pictures, etc.) may include comparing one or more features (i.e. picture features, etc.) of one picture with one or more features (i.e. picture features, etc.) of another picture. In other aspects, comparing of individual pictures may include comparing regions of pixels of one picture with regions of pixels of another picture. In further aspects, comparing of individual pictures may include comparing pixels of one picture with pixels of another picture. Comparing may also include other aspects or properties of digital pictures or pixels examples of which comprise color adjustment, size adjustment, transparency (i.e. alpha channel, etc.), use of a mask, and/or others. Any combination of the aforementioned and/or other elements or techniques can be utilized in alternate embodiments of the comparing. Comparing comprises any action or operation by or for a Decision-making Unit 510, Substantial Similarity Comparison 125, and/or other disclosed elements.

At step 6230, a determination is made that a similarity between at least one portion of the recording of the user's first conversational activity and at least one portion of the recording of the first conversation participant's first conversational activity exceeds a similarity threshold. In some embodiments, the determination may include determining that the number or percentage of matching or substantially matching portions of sub-streams of digital pictures and/or portions of sub-streams of digital sound samples of the compared recordings of conversational activities exceeds a threshold number or threshold percentage. In some aspects, weight can be assigned to sub-streams of digital pictures or portions thereof and/or sub-streams of digital sound samples or portions thereof indicating their importance in the similarity determination. In other embodiments, the determination may include determining that the number or percentage of matching words recognized from the sub-streams of digital sound samples exceeds a threshold number (i.e. 1, 2, 4, 7, etc.) or a threshold percentage (i.e. 33%, 58%, 72%, 99%, etc.). In some aspects, the order of words, the type of words, the importance of words, semantic variations of words, concepts of words, and/or other elements and/or techniques relating to words can be utilized for determining similarity using words. In further aspects, some of the words can be omitted in determining similarity using words. Where a reference to a word is used herein it should be understood that a portion of a word or a collection of words can be used instead of or in addition to the word. In further embodiments, the determination may include determining that the number or percentage of matching features from the sub-streams of digital sound samples exceeds a threshold number (i.e. 1, 5, 17, 33, 68, 114, etc.) or a threshold percentage (i.e. 31%, 59%, 82%, 98%, etc.). In some aspects, the order of features, the type of features, the importance of features, and/or other elements or techniques relating to features can be utilized for determining similarity using features. In other aspects, some of the features can be omitted in determining similarity using features. Where a reference to a feature is used herein it should be understood that a portion of a feature or a collection of features can be used instead of or in addition to the feature. In further embodiments, the determination may include determining that the number or percentage of matching sound samples from the sub-streams of digital sound samples exceeds a threshold number (i.e. 21, 85, 154, 297, 422, 699, etc.) or a threshold percentage (i.e. 29%, 48%, 69%, 96%, etc.). In some aspects, the order of sound samples, the importance of sound samples, and/or other elements or techniques relating to sound samples can be utilized for determining similarity using sound samples. In further aspects, some of the sound samples can be omitted in determining similarity using sound samples. Where a reference to a sound sample is used herein it should be understood that a collection (i.e. frame, etc.) of sound samples can be used instead of or in addition to the sound sample. In further embodiments, the determination may include determining that the number or percentage of matching or substantially matching pictures of the sub-streams of digital pictures exceeds a threshold number (i.e. 28, 74, 283, 322, 995, 874, etc.) or a threshold percentage (i.e. 29%, 33%, 58%, 72%, 99%, etc.). In some aspects, the order of pictures, and/or other elements or techniques relating to pictures can be utilized for determining similarity using pictures. In further aspects, some of the pictures can be omitted in determining similarity using pictures. In further embodiments, the determination may include determining that the number or percentage of matching features from individual pictures exceeds a threshold number (i.e. 3, 22, 47, 93, 128, 431, etc.) or a threshold percentage (i.e. 49%, 53%, 68%, 72%, 95%, etc.). In some aspects, the type of features, the importance of features, and/or other elements or techniques relating to features can be utilized for determining similarity using features. In further aspects, some of the features can be omitted in determining similarity using features. In further aspects, similarity determination can focus on features in certain regions of interest from the individual pictures. In further aspects, detection or recognition of persons or objects using features in the pictures can be utilized for determining similarity. Where a reference to a feature is used herein it should be understood that a portion of a feature or a collection of features can be used instead of or in addition to the feature. In further embodiments, the determination may include determining that the number or percentage of matching pixels from individual pictures exceeds a threshold number (i.e. 449, 2219, 92229, 442990, 1000028, etc.) or a threshold percentage (i.e. 39%, 45%, 58%, 72%, 92%, etc.). In some aspects, some of the pixels can be omitted in determining similarity using pixels. In further aspects, similarity determination can focus on pixels in certain regions of interest from the individual pictures. Where a reference to a pixel is used herein it should be understood that a collection (i.e. region, etc.) of pixels can be used instead of or in addition to the pixel. Any combination of the aforementioned and/or other elements or techniques can be utilized in alternate embodiments. Determining comprises any action or operation by or for a Decision-making Unit 510, Substantial Similarity Comparison 125, and/or other disclosed elements.

At step 6235, at least one portion of the recording of the second conversation participant's first conversational activity is played. Playing a recording of conversational activity or portion thereof may include playing sub-stream of digital pictures or portion thereof and/or sub-stream of digital sound samples or portion thereof included in the recording of conversational activity. The playing may be performed concurrently with the user's current (i.e. first, etc.) conversational activity. A played sub-stream of digital pictures or portion thereof may include a conversation participant's (i.e. second conversation participant's, etc.) visual expressions or communication. Similarly, a played sub-stream of digital sound samples may include a conversation participant's (i.e. second conversation participant's, etc.) verbal expressions or communication. In one example, the second conversation participant's observing conversational activity (i.e. silent facial expressions, silent body movements, motionless silence, etc.) or portion thereof can be played to simulate artificially intelligent conversation participant's (i.e. AI Conversation Participant's 55, etc.) observing while user speaks (i.e. performs a speaking conversational activity, etc.). In another example, the second conversation participant's speaking conversational activity or portion thereof can be played to simulate artificially intelligent conversation participant's speaking while user observes (i.e. performs an observing conversational activity [i.e. silent facial expressions, silent body movements, motionless silence, etc.], etc.). In some aspects, playing can be interrupted if the user starts speaking and the process can redirect to step 6210. In some embodiments, the playing may include transitioning from one sub-stream of digital pictures to another (i.e. subsequent, etc.) sub-stream of digital pictures to enable a simulated conversation to be perceived as smooth or uninterrupted, thereby enhancing user experience. Such transitioning may include manipulating one or more pictures or content thereof of a preceding sub-stream of digital pictures and one or more pictures or content thereof of a subsequent sub-stream of digital pictures. In some aspects, transitioning includes moving, centering, aligning, resizing, and/or otherwise transforming one or more pictures or content thereof of a sub-stream of digital pictures. In other aspects, transitioning includes lighting or color adjustment of one or more pictures or content thereof of a sub-stream of digital pictures. In further aspects, transitioning includes a cut, dissolve, and/or other motion picture editing techniques between sub-streams of digital pictures. In further aspects, transitioning includes morphing and/or other transformations of one or more pictures or content thereof of sub-streams of digital pictures. In other embodiments, the playing may include bridging between one sub-stream of digital pictures and another (i.e. subsequent, etc.) sub-stream of digital pictures to enable a simulated conversation to be perceived as smooth or uninterrupted, thereby enhancing user experience. Such bridging may include any of the aforementioned transitioning techniques, generating additional or intermediate pictures, playing or replaying pictures, and/or other techniques. In some aspects, bridging includes interpolation, inbetweening, extrapolation, and/or other picture or frame generation techniques. In other aspects, bridging includes playing or replaying one or more pictures of a sub-stream of digital pictures. Playing comprises any action or operation by or for a Decision-making Unit 510, Display 21, Sound-producing Device 30, and/or other disclosed elements.

It must be noted that as used herein and in the appended claims, the singular forms "a", "an", and "the" include plural referents unless the context clearly dictates otherwise.

A number of embodiments have been described herein. While this disclosure contains many specific implementation details, these should not be construed as limitations on the scope of any inventions or of what may be claimed, but rather as descriptions of features specific to particular embodiments. It should be understood that various modifications can be made without departing from the spirit and scope of the invention. The logic flows depicted in the figures do not require the particular order shown, or sequential order, to achieve desirable results. In addition, other or additional steps, elements, or connections can be included, or some of the steps, elements, or connections can be eliminated, or a combination thereof can be utilized in the described flows, illustrations, or descriptions. Further, the various aspects of the disclosed devices, apparatuses, systems, and/or methods can be combined in whole or in part with each other to produce additional implementations. Moreover, separation of various components in the embodiments described herein should not be understood as requiring such separation in al embodiments, and it should be understood that the described components can generally be integrated together in a single program or product, or packaged into multiple programs or products. Accordingly, other embodiments are within the scope of the following claims.

The invention claimed is:

1. A system for learning artificially intelligent interactive memories, the system implemented at least in part on one or more computing devices, the system comprising:

one or more processor circuits;

a memory unit coupled to the one or more processor circuits;

a first picture-capturing device configured to capture a stream of digital pictures of a first conversation participant and a second picture-capturing device configured to capture a stream of digital pictures of a second conversation participant, the first and the second picture-capturing devices coupled to the one or more processor circuits;

a first sound-capturing device configured to capture a stream of digital sound samples of the first conversation participant and a second sound-capturing device configured to capture a stream of digital sound samples of the second conversation participant, the first and the second sound-capturing devices coupled to the one or more processor circuits, wherein the one or more processor circuits are configured to:

a first activity detector to detect the first conversation participant's first conversational activity from at least one of the stream of digital pictures of the first conversation participant or the stream of digital sound samples of the first conversation participant;

a second activity detector to detect the second conversation participant's first conversational activity from at least one of the stream of digital pictures of the second conversation participant or the stream of digital sound samples of the second conversation participant;

generate a first round of conversational exchange in a sequence including playback of a recording of the first conversation participant's first conversational activity and playback of a recording of the second conversation participant's first conversational activity in order of the sequence;

cause the memory unit to store the first round of conversational exchange, wherein the memory unit stores at least a plurality of rounds of conversational exchange;

applying the plurality of rounds of conversational exchange onto a neural network having a plurality of layers wherein each layer includes one or more rounds of the plurality of rounds of conversational exchange, wherein successive layers can be connected by a Connection, wherein a Connection may be associated with an occurrence count, a weight, or a parameter; and following a path through the neural network to simulate a conversation.

2. The system of claim 1, wherein the one or more processor circuits are further configured to:

determine that the plurality of rounds of conversational exchange do not include a round of conversational exchange whose similarity with the first round of conversational exchange exceeds a similarity threshold.

3. The system of claim 1, wherein the one or more processor circuits are further configured to:

determine that the plurality of rounds of conversational exchange do not include a round of conversational exchange whose all portions match all portions of the first round of conversational exchange.

4. The system of claim 1, wherein the detecting the first conversation participant's first conversational activity includes detecting at least one of: the first conversation participant's visual expressions or communication in a first part of a conversation, or the first conversation participant's verbal expressions or communication in the first part of the conversation, and wherein the detecting the second conversation participant's first conversational activity includes detecting at least one of: the second conversation participant's visual expressions or communication in the first part of the conversation, or the second conversation participant's verbal expressions or communication in the first part of the conversation.

5. The system of claim 1, wherein causing the memory unit to store the first round of conversational exchange includes causing the memory unit to store the first round of conversational exchange to be accessible for use in a simulated conversation.

6. The system of claim 1, wherein the first conversation participant's first conversational activity at least partially coincides with the second conversation participant's first conversational activity.

7. The system of claim 1, wherein the recording of the first conversation participant's first conversational activity includes at least one of: the first conversation participant's visual expressions or communication in a first part of a conversation, or the first conversation participant's verbal expressions or communication in the first part of the conversation, and wherein the recording of the second conversation participant's first conversational activity includes at least one of: the second conversation participant's visual expressions or communication in the first part of the conversation, or the second conversation participant's verbal expressions or communication in the first part of the conversation.

8. The system of claim 1, wherein at least some rounds of conversational exchange of the plurality of rounds of conversational exchange are included in: one or more neural networks, one or more graphs, or one or more sequences.

9. The system of claim 1, wherein at least some elements of the system are included in: a single device, or multiple devices, and wherein the one or more processor circuits include: one or more microcontrollers, one or more computing devices, or one or more electronic devices, and wherein the plurality of rounds of conversational exchange are included in: a knowledgebase, a knowledge structure, or a data structure, and wherein the first conversation participant's first conversational activity includes at least one of: the first conversation participant's speaking, the first conversation participant's silent facial expression, the first conversation participant's silent body movement, the first conversation participant's motionless silence, the first conversation participant's absence, or the first conversation participant's conversational action, and wherein the second conversation participant's first conversational activity includes at least one of: the second conversation participant's speaking, the second conversation participant's silent facial expression, the second conversation participant's silent body movement, the second conversation participant's motionless silence, the second conversation participant's absence, or the second conversation participant's conversational action.

10. The system of claim 1, wherein the one or more processor circuits are further configured to:

detect the first conversation participant's second conversational activity from at least one of the stream of digital pictures of the first conversation participant or the stream of digital sound samples of the first conversation participant;

detect the second conversation participant's second conversational activity from at least one of the stream of digital pictures of the second conversation participant or the stream of digital sound samples of the second conversation participant;

generate a second round of conversational exchange including a recording of the first conversation participant's second conversational activity and a recording of the second conversation participant's second conversational activity; and cause the memory unit to store the second round of conversational exchange.

11. The system of claim 1, wherein the first round of conversational exchange is a data structure for storing, structuring, or organizing the recording of the first conversation participant's first conversational activity and the recording of the second conversation participant's first conversational activity.

12. The system of claim 1, wherein the one or more processor circuits are further configured to:

detect a user's first conversational activity from at least one of: a stream of digital pictures of the user, or a stream of digital sound samples of the user;

determine at least partial match between at least a portion of a recording of the user's first conversational activity and at least a portion of the recording of the first conversation participant's first conversational activity; and cause at least a portion of the recording of the second conversation participant's first conversational activity to be played, wherein the cause the at least the portion of the recording of the second conversation participant's first conversational activity to be played is performed at least in response to the determine the at least partial match between the at least the portion of the recording of the user's first conversational activity and the at least the portion of the recording of the first conversation participant's first conversational activity.

13. The system of claim 1, wherein at least one of: the one or more processor circuits, or the memory unit are included in a server, and wherein the first picture-capturing device and the first sound-capturing device are included in a first device, and wherein the second picture-capturing device and the second sound-capturing device are included in a second device, and wherein the first device is coupled to the server via: a network, or an interface, and wherein the second device is coupled to the server via: the network, the interface, another network, or another interface.

14. A system comprising:

means for processing; and means for storing machine readable code in a non-transitory medium that, when executed by the means for processing, causes the means for processing to perform at least:

receiving a stream of digital pictures of a first conversation participant from;

receiving a stream of digital sound samples of the first conversation participant;

receiving a stream of digital pictures of a second conversation participant;

receiving a stream of digital sound samples of the second conversation participant;

detecting using a first activity detector the first conversation participant's first conversational activity from at least one of the stream of digital pictures of the first conversation participant or the stream of digital sound samples of the first conversation participant;

detecting using a second activity detector the second conversation participant's first conversational activity from at least one of the stream of digital pictures of the second conversation participant or the stream of digital sound samples of the second conversation participant;

generating a first round of conversational exchange in a sequence including both of a recording of the first conversation participant's first conversational activity and a recording of the second conversation participant's first conversational activity;

causing the first round of conversational exchange to be stored and accessible for use in playback of a simulated conversation in order of the sequence, wherein the first round of conversational exchange is included in a plurality of rounds of conversational exchange;

applying the plurality of rounds of conversational exchange onto a neural network having a plurality of layers wherein each layer includes one or more rounds of the plurality of rounds of conversational exchange, wherein successive layers can be connected by a Connection, wherein a Connection may be associated with an occurrence count, a weight, or a parameter; and following a path through the neural network to simulate a conversation.

15. The system of claim 14, wherein the means for processing includes one or more processors, and wherein the means for storing the machine readable code includes one or more non-transitory machine readable media.

16. The system of claim 14, wherein the receiving the stream of digital pictures of the first conversation participant includes receiving the stream of digital pictures of the first conversation participant from a first picture-capturing device, and wherein the receiving the stream of digital sound samples of the first conversation participant includes receiving the stream of digital sound samples of the first conversation participant from a first sound-capturing device, and wherein the receiving the stream of digital pictures of the second conversation participant includes receiving the stream of digital pictures of the second conversation participant from a second picture-capturing device, and wherein the receiving the stream of digital sound samples of the second conversation participant includes receiving the stream of digital sound samples of the second conversation participant from a second sound-capturing device, and wherein the causing the first round of conversational exchange to be stored and accessible for use in the simulated conversation includes causing the first round of conversational exchange to be stored in a memory and accessible for use in the simulated conversation.

17. A method implemented using a computing system that includes one or more processors, the method comprising:

receiving a stream of digital pictures of a first conversation participant;

receiving a stream of digital sound samples of the first conversation participant;

receiving a stream of digital pictures of a second conversation participant;

receiving a stream of digital sound samples of the second conversation participant;

detecting using a first activity detector the first conversation participant's first conversational activity from at least one of the stream of digital pictures of the first conversation participant or the stream of digital sound samples of the first conversation participant;

detecting using a second activity detector the second conversation participant's first conversational activity from at least one of the stream of digital pictures of the second conversation participant or the stream of digital sound samples of the second conversation participant;

generating a first round of conversational exchange in a sequence including both of a recording of the first conversation participant's first conversational activity and a recording of the second conversation participant's first conversational activity in order of the sequence; and storing the first round of conversational exchange to be accessible for use in playback of a simulated conversation, wherein the first round of conversational exchange is included in a plurality of rounds of conversational exchange;

applying the plurality of rounds of conversational exchange onto a neural network having a plurality of layers wherein each layer includes one or more rounds of the plurality of rounds of conversational exchange, wherein successive layers can be connected by a Connection, wherein a Connection may be associated with an occurrence count, a weight, or a parameter; and following a path through the neural network to simulate a conversation.

18. The method of claim 17, wherein the receiving the stream of digital pictures of the first conversation participant includes receiving the stream of digital pictures of the first conversation participant from a first picture-capturing device, and wherein the receiving the stream of digital sound samples of the first conversation participant includes receiving the stream of digital sound samples of the first conversation participant from a first sound-capturing device, and wherein the receiving the stream of digital pictures of the second conversation participant includes receiving the stream of digital pictures of the second conversation participant from a second picture-capturing device, and wherein the receiving the stream of digital sound samples of the second conversation participant includes receiving the stream of digital sound samples of the second conversation participant from a second sound-capturing device, and wherein the storing the first round of conversational exchange to be accessible for use in the simulated conversation includes storing the first round of conversational exchange into a memory to be accessible for use in the simulated conversation.

19. The method of claim 17, wherein the method further comprises:

determining that the plurality of rounds of conversational exchange do not include a round of conversational exchange whose similarity with the first round of conversational exchange exceeds a similarity threshold.

20. The method of claim 17, wherein the method further comprises:

determining that the plurality of rounds of conversational exchange do not include a round of conversational exchange whose all portions match all portions of the first round of conversational exchange.

* * * * *